(12) United States Patent
Binder et al.

(10) Patent No.: US 11,557,310 B2
(45) Date of Patent: Jan. 17, 2023

(54) VOICE TRIGGER FOR A DIGITAL ASSISTANT

(71) Applicant: Apple Inc., Cupertino, CA (US)

(72) Inventors: Justin Binder, Oakland, CA (US);
Samuel D. Post, San Jose, CA (US);
Onur Tackin, Sunnyvale, CA (US);
Thomas R. Gruber, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/713,741

(22) Filed: Apr. 5, 2022

(65) Prior Publication Data

US 2022/0230653 A1 Jul. 21, 2022

Related U.S. Application Data

(63) Continuation of application No. 17/150,513, filed on Jan. 15, 2021, which is a continuation of application
(Continued)

(51) Int. Cl.
*G10L 15/00* (2013.01)
*G10L 21/16* (2013.01)
(Continued)

(52) U.S. Cl.
CPC ............. *G10L 21/16* (2013.01); *G06F 3/167* (2013.01); *G10L 15/22* (2013.01); *G10L 15/26* (2013.01);
(Continued)

(58) Field of Classification Search
CPC combination set(s) only.
See application file for complete search history.

(56) References Cited

U.S. PATENT DOCUMENTS 5,764,852 A 6/1998 Williams
5,907,597 A 5/1999 Mark
(Continued)

FOREIGN PATENT DOCUMENTS

AU 2014100581 B4 9/2014
AU 2015203483 A1 7/2015
(Continued)

OTHER PUBLICATIONS

Notice of Allowance received for Korean Patent Application No. 10-2020-7015307, dated Dec. 23, 2021, 5 pages (2 pages of English Translation and 3 pages of Official Copy).
(Continued)

*Primary Examiner* — Vu B Hang
(74) *Attorney, Agent, or Firm* — Dentons US LLP

(57) ABSTRACT

A method for operating a voice trigger is provided. In some implementations, the method is performed at an electronic device including one or more processors and memory storing instructions for execution by the one or more processors. The method includes receiving a sound input. The sound input may correspond to a spoken word or phrase, or a portion thereof. The method includes determining whether at least a portion of the sound input corresponds to a predetermined type of sound, such as a human voice. The method includes, upon a determination that at least a portion of the sound input corresponds to the predetermined type, determining whether the sound input includes predetermined content, such as a predetermined trigger word or phrase. The method also includes, upon a determination that the sound input includes the predetermined content, initiating a speech-based service, such as a voice-based digital assistant.

45 Claims, 10 Drawing Sheets

Related U.S. Application Data

No. 16/879,348, filed on May 20, 2020, now Pat. No. 10,978,090, which is a continuation of application No. 16/222,249, filed on Dec. 17, 2018, now Pat. No. 10,714,117, which is a continuation of application No. 14/175,864, filed on Feb. 7, 2014, now Pat. No. 10,199,051.

(60) Provisional application No. 61/762,260, filed on Feb. 7, 2013.

(51) Int. Cl.

| | | |
|---|---|---|
| *G10L 15/22* | (2006.01) | |
| *G06F 3/16* | (2006.01) | |
| *G10L 17/24* | (2013.01) | |
| *G10L 15/26* | (2006.01) | |
| *G10L 15/30* | (2013.01) | |
| *G10L 25/51* | (2013.01) | |
| *G10L 25/84* | (2013.01) | |
| *G10L 15/02* | (2006.01) | |

(52) U.S. Cl.
CPC ............. *G10L 17/24* (2013.01); *G10L 15/02* (2013.01); *G10L 15/30* (2013.01); *G10L 25/51* (2013.01); *G10L 25/84* (2013.01); *G10L 2015/223* (2013.01)

(56) References Cited

U.S. PATENT DOCUMENTS

| | | |
|---|---|---|
| 5,983,186 A | 11/1999 | Miyazawa et al. |
| 6,070,140 A | 5/2000 | Tran |
| 6,397,186 B1 | 5/2002 | Bush et al. |
| 6,532,447 B1 | 3/2003 | Christensson |
| 6,671,672 B1 | 12/2003 | Heck |
| 7,272,224 B1 | 9/2007 | Normile et al. |
| 7,657,430 B2 | 2/2010 | Ogawa |
| 7,720,512 B2 | 5/2010 | Tamura et al. |
| 7,774,202 B2 | 8/2010 | Spengler et al. |
| 8,090,571 B2 | 1/2012 | Elshishiny et al. |
| 8,095,364 B2 | 1/2012 | Longe et al. |
| 8,099,289 B2 | 1/2012 | Mozer et al. |
| 8,099,395 B2 | 1/2012 | Pabla et al. |
| 8,099,418 B2 | 1/2012 | Inoue et al. |
| 8,103,510 B2 | 1/2012 | Sato |
| 8,103,947 B2 | 1/2012 | Lunt et al. |
| 8,107,401 B2 | 1/2012 | John et al. |
| 8,112,275 B2 | 2/2012 | Kennewick et al. |
| 8,112,280 B2 | 2/2012 | Lu |
| 8,115,772 B2 | 2/2012 | Ostermann et al. |
| 8,117,026 B2 | 2/2012 | Lee et al. |
| 8,117,037 B2 | 2/2012 | Gazdzinski |
| 8,117,542 B2 | 2/2012 | Radtke et al. |
| 8,121,413 B2 | 2/2012 | Hwang et al. |
| 8,121,837 B2 | 2/2012 | Agapi et al. |
| 8,122,094 B1 | 2/2012 | Kotab |
| 8,122,353 B2 | 2/2012 | Bouta |
| 8,130,929 B2 | 3/2012 | Wilkes et al. |
| 8,131,557 B2 | 3/2012 | Davis et al. |
| 8,135,115 B1 | 3/2012 | Hogg, Jr. et al. |
| 8,138,912 B2 | 3/2012 | Singh et al. |
| 8,140,330 B2 | 3/2012 | Cevik et al. |
| 8,140,335 B2 | 3/2012 | Kennewick et al. |
| 8,140,368 B2 | 3/2012 | Eggenberger et al. |
| 8,140,567 B2 | 3/2012 | Padovitz et al. |
| 8,145,489 B2 | 3/2012 | Freeman et al. |
| 8,150,694 B2 | 4/2012 | Kennewick et al. |
| 8,150,700 B2 | 4/2012 | Shin et al. |
| 8,155,956 B2 | 4/2012 | Cho et al. |
| 8,156,005 B2 | 4/2012 | Vieri |
| 8,156,060 B2 | 4/2012 | Borzestowski et al. |
| 8,160,877 B1 | 4/2012 | Nucci et al. |
| 8,160,883 B2 | 4/2012 | Lecoeuche |
| 8,165,321 B2 | 4/2012 | Paquier et al. |
| 8,165,886 B1 | 4/2012 | Gagnon et al. |
| 8,166,019 B1 | 4/2012 | Lee et al. |
| 8,166,032 B2 | 4/2012 | Sommer et al. |
| 8,170,790 B2 | 5/2012 | Lee et al. |
| 8,170,966 B1 | 5/2012 | Musat et al. |
| 8,171,137 B1 | 5/2012 | Parks et al. |
| 8,175,872 B2 | 5/2012 | Kristjansson et al. |
| 8,175,876 B2 | 5/2012 | Bou-ghazale et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,190,596 B2 | 5/2012 | Nambiar et al. |
| 8,194,827 B2 | 6/2012 | Jaiswal et al. |
| 8,195,460 B2 | 6/2012 | Degani et al. |
| 8,195,467 B2 | 6/2012 | Mozer et al. |
| 8,195,468 B2 | 6/2012 | Weider et al. |
| 8,200,489 B1 | 6/2012 | Baggenstoss |
| 8,200,495 B2 | 6/2012 | Braho et al. |
| 8,201,109 B2 | 6/2012 | Van Os et al. |
| 8,204,238 B2 | 6/2012 | Mozer |
| 8,205,788 B1 | 6/2012 | Gazdzinski et al. |
| 8,209,177 B2 | 6/2012 | Sakuma et al. |
| 8,209,183 B1 | 6/2012 | Patel et al. |
| 8,213,911 B2 | 7/2012 | Williams et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,555 B1 | 7/2012 | Mianji |
| 8,219,608 B2 | 7/2012 | alSafadi et al. |
| 8,224,649 B2 | 7/2012 | Chaudhari et al. |
| 8,224,757 B2 | 7/2012 | Bohle |
| 8,228,299 B1 | 7/2012 | Maloney et al. |
| 8,233,919 B2 | 7/2012 | Haag et al. |
| 8,234,111 B2 | 7/2012 | Lloyd et al. |
| 8,239,206 B1 | 8/2012 | LeBeau et al. |
| 8,239,207 B2 | 8/2012 | Seligman et al. |
| 8,244,545 B2 | 8/2012 | Paek et al. |
| 8,244,712 B2 | 8/2012 | Serlet et al. |
| 8,250,071 B1 | 8/2012 | Killalea et al. |
| 8,254,829 B1 | 8/2012 | Kindred et al. |
| 8,255,216 B2 | 8/2012 | White |
| 8,255,217 B2 | 8/2012 | Stent et al. |
| 8,260,117 B1 | 9/2012 | Xu et al. |
| 8,260,247 B2 | 9/2012 | Lazaridis et al. |
| 8,260,617 B2 | 9/2012 | Dhanakshirur et al. |
| 8,260,619 B1 | 9/2012 | Bansal et al. |
| 8,270,933 B2 | 9/2012 | Riemer et al. |
| 8,271,287 B1 | 9/2012 | Kermani |
| 8,275,621 B2 | 9/2012 | Alewine et al. |
| 8,275,736 B2 | 9/2012 | Guo et al. |
| 8,279,171 B2 | 10/2012 | Hirai et al. |
| 8,280,438 B2 | 10/2012 | Barbera |
| 8,285,546 B2 | 10/2012 | Reich |
| 8,285,551 B2 | 10/2012 | Gazdzinski |
| 8,285,553 B2 | 10/2012 | Gazdzinski |
| 8,285,737 B1 | 10/2012 | Lynn et al. |
| 8,290,274 B2 | 10/2012 | Mori et al. |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,124 B1 | 10/2012 | Holsztynska et al. |
| 8,296,145 B2 | 10/2012 | Clark et al. |
| 8,296,146 B2 | 10/2012 | Gazdzinski |
| 8,296,153 B2 | 10/2012 | Gazdzinski |
| 8,296,380 B1 | 10/2012 | Kelly et al. |
| 8,296,383 B2 | 10/2012 | Lindahl |
| 8,300,776 B2 | 10/2012 | Davies et al. |
| 8,300,801 B2 | 10/2012 | Sweeney et al. |
| 8,301,456 B2 | 10/2012 | Gazdzinski |
| 8,311,189 B2 | 11/2012 | Champlin et al. |
| 8,311,834 B1 | 11/2012 | Gazdzinski |
| 8,311,835 B2 | 11/2012 | Lecoeuche |
| 8,311,838 B2 | 11/2012 | Lindahl et al. |
| 8,312,017 B2 | 11/2012 | Martin et al. |
| 8,321,786 B2 | 11/2012 | Lunati |
| 8,326,627 B2 | 12/2012 | Kennewick et al. |
| 8,332,205 B2 | 12/2012 | Krishnan et al. |
| 8,332,218 B2 | 12/2012 | Cross, Jr. et al. |

(56) References Cited

U.S. PATENT DOCUMENTS

| | | |
|---|---|---|
| 8,332,224 B2 | 12/2012 | Di Cristo et al. |
| 8,332,748 B1 | 12/2012 | Karam |
| 8,335,689 B2 | 12/2012 | Wittenstein et al. |
| 8,340,975 B1 | 12/2012 | Rosenberger |
| 8,345,665 B2 | 1/2013 | Vieri et al. |
| 8,346,563 B1 | 1/2013 | Hjelm et al. |
| 8,346,757 B1 | 1/2013 | Lamping et al. |
| 8,352,183 B2 | 1/2013 | Thota et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,145 B2 | 2/2013 | Endo et al. |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,380,504 B1 | 2/2013 | Peden et al. |
| 8,380,507 B2 | 2/2013 | Herman et al. |
| 8,381,107 B2 | 2/2013 | Rottler et al. |
| 8,381,135 B2 | 2/2013 | Hotelling et al. |
| 8,386,485 B2 | 2/2013 | Kerschberg et al. |
| 8,386,926 B1 | 2/2013 | Matsuoka et al. |
| 8,391,844 B2 | 3/2013 | Novick et al. |
| 8,392,717 B2 | 3/2013 | Chai et al. |
| 8,396,295 B2 | 3/2013 | Gao et al. |
| 8,396,714 B2 | 3/2013 | Rogers et al. |
| 8,396,715 B2 | 3/2013 | Odell et al. |
| 8,401,163 B1 | 3/2013 | Kirchhoff et al. |
| 8,406,745 B1 | 3/2013 | Upadhyay et al. |
| 8,407,239 B2 | 3/2013 | Dean et al. |
| 8,423,288 B2 | 4/2013 | Stahl et al. |
| 8,428,758 B2 | 4/2013 | Naik et al. |
| 8,433,572 B2 | 4/2013 | Caskey et al. |
| 8,433,778 B1 | 4/2013 | Shreesha et al. |
| 8,434,133 B2 | 4/2013 | Kulkarni et al. |
| 8,442,821 B1 | 5/2013 | Vanhoucke |
| 8,447,612 B2 | 5/2013 | Gazdzinski |
| 8,452,597 B2 | 5/2013 | Bringert et al. |
| 8,452,602 B1 | 5/2013 | Bringert et al. |
| 8,453,058 B1 | 5/2013 | Coccaro et al. |
| 8,457,959 B2 | 6/2013 | Kaiser |
| 8,458,115 B2 | 6/2013 | Cai et al. |
| 8,458,278 B2 | 6/2013 | Christie et al. |
| 8,463,592 B2 | 6/2013 | Lu et al. |
| 8,464,150 B2 | 6/2013 | Davidson et al. |
| 8,473,289 B2 | 6/2013 | Jitkoff et al. |
| 8,473,485 B2 | 6/2013 | Wong et al. |
| 8,477,323 B2 | 7/2013 | Low et al. |
| 8,478,816 B2 | 7/2013 | Parks et al. |
| 8,479,122 B2 | 7/2013 | Hotelling et al. |
| 8,484,027 B1 | 7/2013 | Murphy |
| 8,489,599 B2 | 7/2013 | Bellotti |
| 8,498,670 B2 | 7/2013 | Cha et al. |
| 8,498,857 B2 | 7/2013 | Kopparapu et al. |
| 8,514,197 B2 | 8/2013 | Shahraray et al. |
| 8,515,736 B1 | 8/2013 | Duta |
| 8,515,750 B1 | 8/2013 | Lei et al. |
| 8,521,513 B2 | 8/2013 | Millett et al. |
| 8,521,526 B1 | 8/2013 | Lloyd et al. |
| 8,521,531 B1 | 8/2013 | Kim |
| 8,521,533 B1 | 8/2013 | Ostermann et al. |
| 8,527,276 B1 | 9/2013 | Senior et al. |
| 8,533,266 B2 | 9/2013 | Koulomzin et al. |
| 8,537,033 B2 | 9/2013 | Gueziec |
| 8,539,342 B1 | 9/2013 | Lewis |
| 8,543,375 B2 | 9/2013 | Hong |
| 8,543,397 B1 | 9/2013 | Nguyen |
| 8,543,398 B1 | 9/2013 | Strope et al. |
| 8,560,229 B1 | 10/2013 | Park et al. |
| 8,560,366 B2 | 10/2013 | Mikurak |
| 8,571,528 B1 | 10/2013 | Channakeshava |
| 8,571,851 B1 | 10/2013 | Tickner et al. |
| 8,577,683 B2 | 11/2013 | Dewitt |
| 8,583,416 B2 | 11/2013 | Huang et al. |
| 8,583,511 B2 | 11/2013 | Hendrickson |
| 8,583,638 B2 | 11/2013 | Donelli |
| 8,589,156 B2 | 11/2013 | Burke et al. |
| 8,589,161 B2 | 11/2013 | Kennewick et al. |
| 8,589,374 B2 | 11/2013 | Chaudhari |
| 8,589,869 B2 | 11/2013 | Wolfram |
| 8,589,911 B1 | 11/2013 | Sharkey et al. |
| 8,595,004 B2 | 11/2013 | Koshinaka |
| 8,595,642 B1 | 11/2013 | Lagassey |
| 8,600,743 B2 | 12/2013 | Lindahl et al. |
| 8,600,746 B1 | 12/2013 | Lei et al. |
| 8,600,930 B2 | 12/2013 | Sata et al. |
| 8,606,090 B2 | 12/2013 | Eyer |
| 8,606,568 B1 | 12/2013 | Tickner et al. |
| 8,606,576 B1 | 12/2013 | Barr et al. |
| 8,606,577 B1 | 12/2013 | Stewart et al. |
| 8,615,221 B1 | 12/2013 | Cosenza et al. |
| 8,620,659 B2 | 12/2013 | Di Cristo et al. |
| 8,620,662 B2 | 12/2013 | Bellegarda |
| 8,626,681 B1 | 1/2014 | Jurca et al. |
| 8,630,841 B2 | 1/2014 | Van Caldwell et al. |
| 8,635,073 B2 | 1/2014 | Chang |
| 8,638,363 B2 | 1/2014 | King et al. |
| 8,639,516 B2 | 1/2014 | Lindahl et al. |
| 8,645,128 B1 | 2/2014 | Agiomyrgiannakis |
| 8,645,137 B2 | 2/2014 | Bellegarda et al. |
| 8,645,138 B1 | 2/2014 | Weinstein et al. |
| 8,654,936 B1 | 2/2014 | Eslambolchi et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,924 B2 | 2/2014 | Hoch et al. |
| 8,660,970 B1 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,273 B1 | 3/2014 | Fujisaki |
| 8,676,583 B2 | 3/2014 | Gupta et al. |
| 8,676,904 B2 | 3/2014 | Lindahl |
| 8,677,377 B2 | 3/2014 | Cheyer et al. |
| 8,681,950 B2 | 3/2014 | Vlack et al. |
| 8,682,667 B2 | 3/2014 | Haughay |
| 8,687,777 B1 | 4/2014 | Lavian et al. |
| 8,688,446 B2 | 4/2014 | Yanagihara |
| 8,688,453 B1 | 4/2014 | Joshi et al. |
| 8,689,135 B2 | 4/2014 | Portele et al. |
| 8,694,322 B2 | 4/2014 | Snitkovskiy et al. |
| 8,695,074 B2 | 4/2014 | Saraf et al. |
| 8,696,364 B2 | 4/2014 | Cohen |
| 8,706,472 B2 | 4/2014 | Ramerth et al. |
| 8,706,474 B2 | 4/2014 | Blume et al. |
| 8,706,503 B2 | 4/2014 | Cheyer et al. |
| 8,707,195 B2 | 4/2014 | Fleizach et al. |
| 8,712,778 B1 | 4/2014 | Thenthiruperai |
| 8,713,119 B2 | 4/2014 | Lindahl et al. |
| 8,713,418 B2 | 4/2014 | King et al. |
| 8,719,006 B2 | 5/2014 | Bellegarda |
| 8,719,014 B2 | 5/2014 | Wagner |
| 8,719,039 B1 | 5/2014 | Sharifi |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Davis et al. |
| 8,744,852 B1 | 6/2014 | Seymour et al. |
| 8,751,971 B2 | 6/2014 | Fleizach et al. |
| 8,760,537 B2 | 6/2014 | Johnson et al. |
| 8,762,145 B2 | 6/2014 | Ouchi et al. |
| 8,762,156 B2 | 6/2014 | Chen |
| 8,762,469 B2 | 6/2014 | Lindahl |
| 8,768,693 B2 | 7/2014 | Somekh et al. |
| 8,768,702 B2 | 7/2014 | Mason et al. |
| 8,775,154 B2 | 7/2014 | Clinchant et al. |
| 8,775,177 B1 | 7/2014 | Heigold et al. |
| 8,775,341 B1 | 7/2014 | Commons |
| 8,775,931 B2 | 7/2014 | Fux et al. |
| 8,781,456 B2 | 7/2014 | Prociw |
| 8,781,841 B1 | 7/2014 | Wang |

(56) References Cited

U.S. PATENT DOCUMENTS

| | | |
|---|---|---|
| 8,793,301 B2 | 7/2014 | Wegenkittl et al. |
| 8,798,255 B2 | 8/2014 | Lubowich et al. |
| 8,798,995 B1 | 8/2014 | Edara |
| 8,799,000 B2 | 8/2014 | Guzzoni et al. |
| 8,805,684 B1 | 8/2014 | Aleksic et al. |
| 8,805,690 B1 | 8/2014 | Lebeau et al. |
| 8,812,299 B1 | 8/2014 | Su |
| 8,812,302 B2 | 8/2014 | Xiao et al. |
| 8,812,321 B2 | 8/2014 | Gilbert et al. |
| 8,823,507 B1 | 9/2014 | Touloumtzis |
| 8,823,793 B2 | 9/2014 | Clayton et al. |
| 8,831,947 B2 | 9/2014 | Wasserblat et al. |
| 8,831,949 B1 | 9/2014 | Smith et al. |
| 8,838,457 B2 | 9/2014 | Cerra et al. |
| 8,855,915 B2 | 10/2014 | Furuhata et al. |
| 8,861,925 B1 | 10/2014 | Ohme |
| 8,862,252 B2 | 10/2014 | Rottler et al. |
| 8,868,111 B1 | 10/2014 | Kahn et al. |
| 8,868,409 B1 | 10/2014 | Mengibar et al. |
| 8,868,431 B2 | 10/2014 | Yamazaki et al. |
| 8,868,469 B2 | 10/2014 | Xu et al. |
| 8,868,529 B2 | 10/2014 | Lerenc |
| 8,880,405 B2 | 11/2014 | Cerra et al. |
| 8,886,534 B2 | 11/2014 | Nakano et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,893,023 B2 | 11/2014 | Perry et al. |
| 8,897,822 B2 | 11/2014 | Martin |
| 8,898,064 B1 | 11/2014 | Thomas et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,918,321 B2 | 12/2014 | Czahor |
| 8,922,485 B1 | 12/2014 | Lloyd |
| 8,930,176 B2 | 1/2015 | Li et al. |
| 8,930,191 B2 | 1/2015 | Gruber et al. |
| 8,938,394 B1 | 1/2015 | Faaborg et al. |
| 8,938,450 B2 | 1/2015 | Spivack et al. |
| 8,938,688 B2 | 1/2015 | Bradford et al. |
| 8,942,986 B2 | 1/2015 | Cheyer et al. |
| 8,943,423 B2 | 1/2015 | Merrill et al. |
| 8,964,947 B1 | 2/2015 | Noolu et al. |
| 8,965,770 B2 | 2/2015 | Petrushin |
| 8,972,240 B2 | 3/2015 | Brockett et al. |
| 8,972,432 B2 | 3/2015 | Shaw et al. |
| 8,972,878 B2 | 3/2015 | Mohler et al. |
| 8,976,063 B1 | 3/2015 | Hawkins et al. |
| 8,976,108 B2 | 3/2015 | Hawkins et al. |
| 8,977,255 B2 | 3/2015 | Freeman et al. |
| 8,983,383 B1 | 3/2015 | Haskin |
| 8,984,098 B1 | 3/2015 | Tomkins et al. |
| 8,989,713 B2 | 3/2015 | Doulton |
| 8,990,235 B2 | 3/2015 | King et al. |
| 8,994,660 B2 | 3/2015 | Neels et al. |
| 8,995,972 B1 | 3/2015 | Cronin |
| 8,996,350 B1 | 3/2015 | Dub et al. |
| 8,996,376 B2 | 3/2015 | Fleizach et al. |
| 8,996,381 B2 | 3/2015 | Mozer et al. |
| 8,996,639 B1 | 3/2015 | Faaborg et al. |
| 9,002,714 B2 | 4/2015 | Kim et al. |
| 9,009,046 B1 | 4/2015 | Stewart |
| 9,015,036 B2 | 4/2015 | Karov Zangvil et al. |
| 9,020,804 B2 | 4/2015 | Barbaiani et al. |
| 9,026,425 B2 | 5/2015 | Nikoulina et al. |
| 9,026,426 B2 | 5/2015 | Wu et al. |
| 9,031,834 B2 | 5/2015 | Coorman et al. |
| 9,031,970 B1 | 5/2015 | Das et al. |
| 9,037,967 B1 | 5/2015 | Al-Jefri et al. |
| 9,043,208 B2 | 5/2015 | Koch et al. |
| 9,043,211 B2 | 5/2015 | Haiut et al. |
| 9,046,932 B2 | 6/2015 | Medlock et al. |
| 9,049,255 B2 | 6/2015 | Macfarlane et al. |
| 9,049,295 B1 | 6/2015 | Cooper et al. |
| 9,053,706 B2 | 6/2015 | Jitkoff et al. |
| 9,058,105 B2 | 6/2015 | Drory et al. |
| 9,058,332 B1 | 6/2015 | Darby et al. |
| 9,058,811 B2 | 6/2015 | Wang et al. |
| 9,063,979 B2 | 6/2015 | Chiu et al. |
| 9,064,495 B1 | 6/2015 | Torok et al. |
| 9,065,660 B2 | 6/2015 | Ellis et al. |
| 9,070,247 B2 | 6/2015 | Kuhn et al. |
| 9,070,366 B1 | 6/2015 | Mathias et al. |
| 9,071,701 B2 | 6/2015 | Donaldson et al. |
| 9,075,435 B1 | 7/2015 | Noble et al. |
| 9,075,824 B2 | 7/2015 | Gordo et al. |
| 9,076,448 B2 | 7/2015 | Bennett et al. |
| 9,076,450 B1 | 7/2015 | Sadek et al. |
| 9,081,411 B2 | 7/2015 | Kalns et al. |
| 9,081,482 B1 | 7/2015 | Zhai et al. |
| 9,082,402 B2 | 7/2015 | Yadgar et al. |
| 9,083,581 B1 | 7/2015 | Addepalli et al. |
| 9,094,636 B1 | 7/2015 | Sanders et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,212 B2 | 8/2015 | Sheets et al. |
| 9,117,447 B2 | 8/2015 | Gruber et al. |
| 9,123,338 B1 | 9/2015 | Sanders et al. |
| 9,143,907 B1 | 9/2015 | Caldwell et al. |
| 9,159,319 B1 | 10/2015 | Hoffmeister |
| 9,164,983 B2 | 10/2015 | Liu et al. |
| 9,171,541 B2 | 10/2015 | Kennewick et al. |
| 9,171,546 B1 | 10/2015 | Pike |
| 9,172,747 B2 | 10/2015 | Walters et al. |
| 9,183,845 B1 | 11/2015 | Gopalakrishnan et al. |
| 9,190,062 B2 | 11/2015 | Haughay |
| 9,202,520 B1 | 12/2015 | Tang |
| 9,208,153 B1 | 12/2015 | Zaveri et al. |
| 9,213,754 B1 | 12/2015 | Zhan et al. |
| 9,218,122 B2 | 12/2015 | Thoma et al. |
| 9,218,809 B2 | 12/2015 | Bellegard et al. |
| 9,218,819 B1 | 12/2015 | Stekkelpa et al. |
| 9,223,537 B2 | 12/2015 | Brown et al. |
| 9,230,561 B2 | 1/2016 | Ostermann et al. |
| 9,232,293 B1 | 1/2016 | Hanson |
| 9,236,047 B2 | 1/2016 | Rasmussen |
| 9,241,073 B1 | 1/2016 | Rensburg et al. |
| 9,245,151 B2 | 1/2016 | LeBeau et al. |
| 9,250,703 B2 | 2/2016 | Hernandez-Abrego et al. |
| 9,251,713 B1 | 2/2016 | Giovanniello et al. |
| 9,251,787 B1 | 2/2016 | Hart et al. |
| 9,255,812 B2 | 2/2016 | Maeoka et al. |
| 9,257,120 B1 | 2/2016 | Alvarez et al. |
| 9,258,604 B1 | 2/2016 | Bilobrov et al. |
| 9,262,412 B2 | 2/2016 | Yang et al. |
| 9,262,612 B2 | 2/2016 | Cheyer |
| 9,263,058 B2 | 2/2016 | Huang et al. |
| 9,274,598 B2 | 3/2016 | Beymer et al. |
| 9,280,535 B2 | 3/2016 | Varma et al. |
| 9,282,211 B2 | 3/2016 | Osawa |
| 9,286,727 B2 | 3/2016 | Kim et al. |
| 9,286,910 B1 | 3/2016 | Li et al. |
| 9,292,487 B1 | 3/2016 | Weber |
| 9,292,489 B1 | 3/2016 | Sak et al. |
| 9,292,492 B2 | 3/2016 | Sarikaya et al. |
| 9,299,344 B2 | 3/2016 | Braho et al. |
| 9,300,718 B2 | 3/2016 | Khanna |
| 9,301,256 B2 | 3/2016 | Mohan et al. |
| 9,305,543 B2 | 4/2016 | Fleizach et al. |
| 9,305,548 B2 | 4/2016 | Kennewick et al. |
| 9,311,308 B2 | 4/2016 | Sankarasubramaniam et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,325,809 B1 | 4/2016 | Barros et al. |
| 9,325,842 B1 | 4/2016 | Siddiqi et al. |
| 9,330,659 B2 | 5/2016 | Ju et al. |
| 9,330,668 B2 | 5/2016 | Nanavati et al. |
| 9,330,720 B2 | 5/2016 | Lee |
| 9,335,983 B2 | 5/2016 | Breiner et al. |
| 9,338,493 B2 | 5/2016 | Van Os et al. |
| 9,342,829 B2 | 5/2016 | Zhou et al. |
| 9,342,930 B1 | 5/2016 | Kraft et al. |

(56) References Cited

U.S. PATENT DOCUMENTS

| | | |
|---|---|---|
| 9,349,368 B1 | 5/2016 | Lebeau et al. |
| 9,355,472 B2 | 5/2016 | Kocienda et al. |
| 9,361,084 B1 | 6/2016 | Costa |
| 9,367,541 B1 | 6/2016 | Servan et al. |
| 9,368,114 B2 | 6/2016 | Larson et al. |
| 9,377,871 B2 | 6/2016 | Waddell et al. |
| 9,378,456 B2 | 6/2016 | White et al. |
| 9,378,740 B1 | 6/2016 | Rosen et al. |
| 9,380,155 B1 | 6/2016 | Reding et al. |
| 9,383,827 B1 | 7/2016 | Faaborg et al. |
| 9,384,185 B2 | 7/2016 | Medlock et al. |
| 9,390,726 B1 | 7/2016 | Smus et al. |
| 9,396,722 B2 | 7/2016 | Chung et al. |
| 9,401,140 B1 | 7/2016 | Weber et al. |
| 9,401,147 B2 | 7/2016 | Jitkoff et al. |
| 9,405,741 B1 | 8/2016 | Schaaf et al. |
| 9,406,224 B1 | 8/2016 | Sanders et al. |
| 9,406,299 B2 | 8/2016 | Gollan et al. |
| 9,408,182 B1 | 8/2016 | Hurley et al. |
| 9,412,392 B2 | 8/2016 | Lindahl |
| 9,418,650 B2 | 8/2016 | Bharadwaj et al. |
| 9,423,266 B2 | 8/2016 | Clark et al. |
| 9,424,246 B2 | 8/2016 | Spencer et al. |
| 9,424,840 B1 | 8/2016 | Hart et al. |
| 9,431,021 B1 | 8/2016 | Scalise et al. |
| 9,432,499 B2 | 8/2016 | Hajdu et al. |
| 9,436,918 B2 | 9/2016 | Pantel et al. |
| 9,437,186 B1 | 9/2016 | Liu et al. |
| 9,437,189 B2 | 9/2016 | Epstein et al. |
| 9,442,687 B2 | 9/2016 | Park et al. |
| 9,443,527 B1 | 9/2016 | Watanabe et al. |
| 9,454,599 B2 | 9/2016 | Golden et al. |
| 9,454,957 B1 | 9/2016 | Mathias et al. |
| 9,465,798 B2 | 10/2016 | Lin |
| 9,465,833 B2 | 10/2016 | Aravamudan et al. |
| 9,465,864 B2 | 10/2016 | Hu et al. |
| 9,466,027 B2 | 10/2016 | Byrne et al. |
| 9,466,294 B1 | 10/2016 | Tunstall-pedoe et al. |
| 9,471,566 B1 | 10/2016 | Zhang et al. |
| 9,472,196 B1 | 10/2016 | Wang et al. |
| 9,483,388 B2 | 11/2016 | Sankaranarasimhan et al. |
| 9,483,461 B2 | 11/2016 | Fleizach et al. |
| 9,483,529 B1 | 11/2016 | Pasoi et al. |
| 9,484,021 B1 | 11/2016 | Mairesse et al. |
| 9,485,286 B1 | 11/2016 | Sellier et al. |
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,514,470 B2 | 12/2016 | Topatan et al. |
| 9,516,014 B2 | 12/2016 | Zafiroglu et al. |
| 9,519,453 B2 | 12/2016 | Perkuhn et al. |
| 9,524,355 B2 | 12/2016 | Forbes et al. |
| 9,529,500 B1 | 12/2016 | Gauci et al. |
| 9,531,862 B1 | 12/2016 | Vadodaria |
| 9,535,906 B2 | 1/2017 | Lee et al. |
| 9,536,527 B1 | 1/2017 | Carlson |
| 9,536,544 B2 | 1/2017 | Osterman et al. |
| 9,547,647 B2 | 1/2017 | Badaskar |
| 9,548,050 B2 | 1/2017 | Gruber et al. |
| 9,548,979 B1 | 1/2017 | Johnson et al. |
| 9,569,549 B1 | 2/2017 | Jenkins et al. |
| 9,575,964 B2 | 2/2017 | Yadgar et al. |
| 9,576,575 B2 | 2/2017 | Heide |
| 9,578,173 B2 | 2/2017 | Sanghavi et al. |
| 9,602,946 B2 | 3/2017 | Karkkainen et al. |
| 9,607,612 B2 | 3/2017 | Deleeuw |
| 9,612,999 B2 | 4/2017 | Prakah-Asante et al. |
| 9,619,200 B2 | 4/2017 | Chakladar et al. |
| 9,620,113 B2 | 4/2017 | Kennewick et al. |
| 9,620,126 B2 | 4/2017 | Chiba |
| 9,626,695 B2 | 4/2017 | Balasubramanian et al. |
| 9,626,955 B2 | 4/2017 | Fleizach et al. |
| 9,633,004 B2 | 4/2017 | Giuli et al. |
| 9,633,191 B2 | 4/2017 | Fleizach et al. |
| 9,633,660 B2 | 4/2017 | Haughay |
| 9,633,674 B2 | 4/2017 | Sinha |
| 9,646,313 B2 | 5/2017 | Kim et al. |
| 9,648,107 B1 | 5/2017 | Penilla et al. |
| 9,652,453 B2 | 5/2017 | Mathur et al. |
| 9,658,746 B2 | 5/2017 | Cohn et al. |
| 9,659,002 B2 | 5/2017 | Medlock et al. |
| 9,659,298 B2 | 5/2017 | Lynch et al. |
| 9,665,567 B2 | 5/2017 | Li et al. |
| 9,665,662 B1 | 5/2017 | Gautam et al. |
| 9,668,121 B2 | 5/2017 | Naik et al. |
| 9,672,725 B2 | 6/2017 | Dotan-Cohen et al. |
| 9,672,822 B2 | 6/2017 | Brown et al. |
| 9,690,542 B2 | 6/2017 | Reddy et al. |
| 9,691,161 B1 | 6/2017 | Yalniz et al. |
| 9,691,378 B1 | 6/2017 | Meyers et al. |
| 9,696,963 B2 | 7/2017 | Son et al. |
| 9,697,016 B2 | 7/2017 | Jacob |
| 9,697,822 B1 | 7/2017 | Naik et al. |
| 9,697,827 B1 | 7/2017 | Lilly et al. |
| 9,697,828 B1 | 7/2017 | Prasad et al. |
| 9,698,999 B2 | 7/2017 | Mutagi |
| 9,720,907 B2 | 8/2017 | Bangalore et al. |
| 9,721,566 B2 | 8/2017 | Newendorp et al. |
| 9,721,570 B1 | 8/2017 | Beal et al. |
| 9,723,130 B2 | 8/2017 | Rand |
| 9,734,817 B1 | 8/2017 | Putrycz |
| 9,734,839 B1 | 8/2017 | Adams |
| 9,741,343 B1 | 8/2017 | Miles et al. |
| 9,747,083 B1 | 8/2017 | Roman et al. |
| 9,747,093 B2 | 8/2017 | Latino et al. |
| 9,755,605 B1 | 9/2017 | Li et al. |
| 9,760,566 B2 | 9/2017 | Heck et al. |
| 9,767,710 B2 | 9/2017 | Lee et al. |
| 9,772,994 B2 | 9/2017 | Karov et al. |
| 9,786,271 B1 | 10/2017 | Combs et al. |
| 9,792,907 B2 | 10/2017 | Bocklet et al. |
| 9,798,719 B2 | 10/2017 | Karov et al. |
| 9,812,128 B2 | 11/2017 | Mixter et al. |
| 9,813,882 B1 | 11/2017 | Masterman |
| 9,818,400 B2 | 11/2017 | Paulik et al. |
| 9,823,811 B2 | 11/2017 | Brown et al. |
| 9,823,828 B2 | 11/2017 | Zambetti et al. |
| 9,824,379 B2 | 11/2017 | Khandelwal et al. |
| 9,824,691 B1 | 11/2017 | Montero et al. |
| 9,824,692 B1 | 11/2017 | Khoury et al. |
| 9,830,044 B2 | 11/2017 | Brown et al. |
| 9,830,449 B1 | 11/2017 | Wagner |
| 9,842,168 B2 | 12/2017 | Heck et al. |
| 9,842,584 B1 | 12/2017 | Hart et al. |
| 9,846,685 B2 | 12/2017 | Li |
| 9,846,836 B2 | 12/2017 | Gao et al. |
| 9,858,925 B2 | 1/2018 | Gruber et al. |
| 9,858,927 B2 | 1/2018 | Williams et al. |
| 9,886,953 B2 | 2/2018 | Lemay et al. |
| 9,887,949 B2 | 2/2018 | Shepherd et al. |
| 9,911,415 B2 | 3/2018 | Vanblon et al. |
| 9,916,839 B1 | 3/2018 | Scalise et al. |
| 9,922,642 B2 | 3/2018 | Pitschel et al. |
| 9,928,835 B1 | 3/2018 | Tang |
| 9,934,777 B1 | 4/2018 | Joseph et al. |
| 9,934,785 B1 | 4/2018 | Hulaud |
| 9,946,862 B2 | 4/2018 | Yun et al. |
| 9,948,728 B2 | 4/2018 | Linn et al. |
| 9,959,129 B2 | 5/2018 | Kannan et al. |
| 9,959,506 B1 | 5/2018 | Karppanen |
| 9,966,065 B2 | 5/2018 | Gruber et al. |
| 9,966,068 B2 | 5/2018 | Cash et al. |
| 9,967,381 B1 | 5/2018 | Kashimba et al. |
| 9,971,495 B2 | 5/2018 | Shetty et al. |
| 9,984,686 B1 | 5/2018 | Mutagi et al. |
| 9,986,419 B2 | 5/2018 | Naik et al. |
| 9,990,129 B2 | 6/2018 | Yang et al. |
| 9,990,176 B1 | 6/2018 | Gray |
| 9,990,921 B2 | 6/2018 | Vanblon et al. |
| 9,996,626 B1 | 6/2018 | Bailey et al. |
| 9,998,552 B1 | 6/2018 | Ledet |
| 10,001,817 B2 | 6/2018 | Zambetti et al. |

(56) References Cited

U.S. PATENT DOCUMENTS

| | | |
|---|---|---|
| 10,013,416 B1 | 7/2018 | Bhardwaj et al. |
| 10,013,654 B1 | 7/2018 | Levy et al. |
| 10,013,979 B1 | 7/2018 | Roma et al. |
| 10,019,436 B2 | 7/2018 | Huang |
| 10,025,378 B2 | 7/2018 | Venable et al. |
| 10,026,209 B1 | 7/2018 | Dagley et al. |
| 10,027,662 B1 | 7/2018 | Mutagi et al. |
| 10,032,451 B1 | 7/2018 | Mamkina et al. |
| 10,032,455 B2 | 7/2018 | Newman et al. |
| 10,037,758 B2 | 7/2018 | Jing et al. |
| 10,043,516 B2 | 8/2018 | Saddler et al. |
| 10,049,161 B2 | 8/2018 | Kaneko |
| 10,049,663 B2 | 8/2018 | Orr et al. |
| 10,049,668 B2 | 8/2018 | Huang et al. |
| 10,055,390 B2 | 8/2018 | Sharifi et al. |
| 10,055,681 B2 | 8/2018 | Brown et al. |
| 10,074,360 B2 | 9/2018 | Kim |
| 10,074,371 B1 | 9/2018 | Wang et al. |
| 10,078,487 B2 | 9/2018 | Gruber et al. |
| 10,083,213 B1 | 9/2018 | Podgorny et al. |
| 10,083,690 B2 | 9/2018 | Giuli et al. |
| 10,088,972 B2 | 10/2018 | Brown et al. |
| 10,089,072 B2 | 10/2018 | Piersol et al. |
| 10,096,319 B1 | 10/2018 | Jin et al. |
| 10,101,887 B2 | 10/2018 | Bernstein et al. |
| 10,102,359 B2 | 10/2018 | Cheyer |
| 10,115,055 B2 | 10/2018 | Weiss et al. |
| 10,127,901 B2 | 11/2018 | Zhao et al. |
| 10,127,908 B1 | 11/2018 | Deller et al. |
| 10,134,425 B1 | 11/2018 | Johnson, Jr. |
| 10,135,965 B2 | 11/2018 | Woolsey et al. |
| 10,146,923 B2 | 12/2018 | Pitkänen et al. |
| 10,147,421 B2 | 12/2018 | Liddell et al. |
| 10,169,329 B2 | 1/2019 | Futrell et al. |
| 10,170,123 B2 | 1/2019 | Orr et al. |
| 10,170,135 B2 | 1/2019 | Pearce et al. |
| 10,175,879 B2 | 1/2019 | Missig et al. |
| 10,176,167 B2 | 1/2019 | Evermann |
| 10,176,802 B1 | 1/2019 | Ladhak et al. |
| 10,176,808 B1 | 1/2019 | Lovitt et al. |
| 10,178,301 B1 | 1/2019 | Welbourne et al. |
| 10,185,542 B2 | 1/2019 | Carson et al. |
| 10,186,254 B2 | 1/2019 | Williams et al. |
| 10,186,266 B1 | 1/2019 | Devaraj et al. |
| 10,191,627 B2 | 1/2019 | Cieplinski et al. |
| 10,191,646 B2 | 1/2019 | Zambetti et al. |
| 10,191,718 B2 | 1/2019 | Rhee et al. |
| 10,192,546 B1 | 1/2019 | Piersol et al. |
| 10,192,552 B2 | 1/2019 | Raitio et al. |
| 10,192,557 B2 | 1/2019 | Lee et al. |
| 10,198,877 B1 | 2/2019 | Maltsev et al. |
| 10,199,051 B2 | 2/2019 | Binder et al. |
| 10,200,824 B2 | 2/2019 | Gross et al. |
| 10,204,627 B2 | 2/2019 | Nitz et al. |
| 10,210,860 B1 | 2/2019 | Ward et al. |
| 10,216,351 B2 | 2/2019 | Yang |
| 10,216,832 B2 | 2/2019 | Bangalore et al. |
| 10,223,066 B2 | 3/2019 | Martel et al. |
| 10,225,711 B2 | 3/2019 | Parks et al. |
| 10,228,904 B2 | 3/2019 | Raux |
| 10,229,109 B1 | 3/2019 | Cherepanov et al. |
| 10,229,356 B1 | 3/2019 | Liu et al. |
| 10,237,711 B2 | 3/2019 | Linn et al. |
| 10,242,501 B1 | 3/2019 | Pusch et al. |
| 10,248,308 B2 | 4/2019 | Karunamuni et al. |
| 10,249,300 B2 | 4/2019 | Booker et al. |
| 10,249,305 B2 | 4/2019 | Yu |
| 10,255,922 B1 | 4/2019 | Sharifi et al. |
| 10,261,672 B1 | 4/2019 | Dolbakian et al. |
| 10,261,830 B2 | 4/2019 | Gupta et al. |
| 10,269,345 B2 | 4/2019 | Castillo Sanchez et al. |
| 10,275,513 B1 | 4/2019 | Cowan et al. |
| 10,289,205 B1 | 5/2019 | Sumter et al. |
| 10,296,160 B2 | 5/2019 | Shah et al. |
| 10,297,253 B2 | 5/2019 | Walker, II et al. |
| 10,303,772 B2 | 5/2019 | Hosn et al. |
| 10,304,463 B2 | 5/2019 | Mixter et al. |
| 10,311,482 B2 | 6/2019 | Baldwin |
| 10,311,871 B2 | 6/2019 | Newendorp et al. |
| 10,325,598 B2 | 6/2019 | Basye et al. |
| 10,332,509 B2 | 6/2019 | Catanzaro et al. |
| 10,332,513 B1 | 6/2019 | D'souza et al. |
| 10,332,518 B2 | 6/2019 | Garg et al. |
| 10,339,224 B2 | 7/2019 | Fukuoka |
| 10,339,714 B2 | 7/2019 | Corso et al. |
| 10,346,540 B2 | 7/2019 | Karov et al. |
| 10,346,753 B2 | 7/2019 | Soon-Shiong et al. |
| 10,346,878 B1 | 7/2019 | Ostermann et al. |
| 10,353,975 B2 | 7/2019 | Oh et al. |
| 10,354,168 B2 | 7/2019 | Bluche |
| 10,354,677 B2 | 7/2019 | Mohamed et al. |
| 10,356,243 B2 | 7/2019 | Sanghavi et al. |
| 10,360,716 B1 | 7/2019 | Van Der Meulen et al. |
| 10,365,887 B1 | 7/2019 | Mulherkar |
| 10,366,160 B2 | 7/2019 | Castelli et al. |
| 10,366,692 B1 | 7/2019 | Adams et al. |
| 10,372,814 B2 | 8/2019 | Gliozzo et al. |
| 10,372,881 B2 | 8/2019 | Ingrassia, Jr. et al. |
| 10,389,876 B2 | 8/2019 | Engelke et al. |
| 10,402,066 B2 | 9/2019 | Kawana |
| 10,403,283 B1 | 9/2019 | Schramm et al. |
| 10,409,454 B2 | 9/2019 | Kagan et al. |
| 10,410,637 B2 | 9/2019 | Paulik et al. |
| 10,417,037 B2 | 9/2019 | Gruber et al. |
| 10,417,344 B2 | 9/2019 | Futrell et al. |
| 10,417,554 B2 | 9/2019 | Scheffler |
| 10,437,928 B2 | 10/2019 | Bhaya et al. |
| 10,446,142 B2 | 10/2019 | Lim et al. |
| 10,453,117 B1 | 10/2019 | Reavely et al. |
| 10,469,665 B1 | 11/2019 | Bell et al. |
| 10,474,961 B2 | 11/2019 | Brigham et al. |
| 10,475,446 B2 | 11/2019 | Gruber et al. |
| 10,482,875 B2 | 11/2019 | Henry |
| 10,490,195 B1 | 11/2019 | Krishnamoorthy et al. |
| 10,496,364 B2 | 12/2019 | Yao |
| 10,496,705 B1 | 12/2019 | Irani et al. |
| 10,497,365 B2 | 12/2019 | Gruber et al. |
| 10,504,518 B1 | 12/2019 | Irani et al. |
| 10,512,750 B1 | 12/2019 | Lewin et al. |
| 10,515,133 B1 | 12/2019 | Sharifi |
| 10,521,946 B1 | 12/2019 | Roche et al. |
| 10,528,386 B2 | 1/2020 | Yu |
| 10,540,976 B2 | 1/2020 | Van Os et al. |
| 10,558,893 B2 | 2/2020 | Bluche |
| 10,566,007 B2 | 2/2020 | Fawaz et al. |
| 10,568,032 B2 | 2/2020 | Freeman et al. |
| 10,579,401 B2 | 3/2020 | Dawes |
| 10,580,409 B2 | 3/2020 | Walker, II et al. |
| 10,582,355 B1 | 3/2020 | Lebeau et al. |
| 10,585,957 B2 | 3/2020 | Heck et al. |
| 10,586,369 B1 | 3/2020 | Roche et al. |
| 10,599,449 B1 | 3/2020 | Chatzipanagiotis et al. |
| 10,629,186 B1 | 4/2020 | Slifka |
| 10,630,795 B2 | 4/2020 | Aoki et al. |
| 10,642,934 B2 | 5/2020 | Heck et al. |
| 10,659,851 B2 | 5/2020 | Lister et al. |
| 10,671,428 B2 | 6/2020 | Zeitlin |
| 10,684,099 B2 | 6/2020 | Zaetterqvist |
| 10,684,703 B2 | 6/2020 | Hindi et al. |
| 10,699,697 B2 | 6/2020 | Qian et al. |
| 10,706,841 B2 | 7/2020 | Gruber et al. |
| 10,721,190 B2 | 7/2020 | Zhao et al. |
| 10,732,708 B1 | 8/2020 | Roche et al. |
| 10,743,107 B1 | 8/2020 | Yoshioka et al. |
| 10,748,529 B1 | 8/2020 | Milden |
| 10,748,546 B2 | 8/2020 | Kim et al. |
| 10,754,658 B2 | 8/2020 | Tamiya |
| 10,755,032 B2 | 8/2020 | Douglas et al. |
| 10,757,499 B1 | 8/2020 | Vautrin et al. |
| 10,769,385 B2 | 9/2020 | Evermann |
| 10,783,151 B1 | 9/2020 | Bushkin et al. |
| 10,783,883 B2 | 9/2020 | Mixter et al. |
| 10,789,945 B2 | 9/2020 | Acero et al. |
| 10,791,176 B2 | 9/2020 | Phipps et al. |

(56) References Cited

U.S. PATENT DOCUMENTS

| | | |
|---|---|---|
| 10,795,944 B2 | 10/2020 | Brown et al. |
| 10,796,100 B2 | 10/2020 | Bangalore et al. |
| 10,803,255 B2 | 10/2020 | Dubyak et al. |
| 10,811,013 B1 | 10/2020 | Secker-Walker et al. |
| 10,818,288 B2 | 10/2020 | Garcia et al. |
| 10,842,968 B1 | 11/2020 | Kahn et al. |
| 10,846,618 B2 | 11/2020 | Ravi et al. |
| 10,860,629 B1 | 12/2020 | Gangadharaiah et al. |
| 10,861,483 B2 | 12/2020 | Feinauer et al. |
| 10,880,668 B1 | 12/2020 | Robinson et al. |
| 10,885,277 B2 | 1/2021 | Ravi et al. |
| 10,892,996 B2 | 1/2021 | Piersol |
| 10,909,459 B2 | 2/2021 | Tsatsin et al. |
| 10,944,859 B2 | 3/2021 | Weinstein et al. |
| 10,957,311 B2 | 3/2021 | Solomon et al. |
| 10,957,337 B2 | 3/2021 | Chen et al. |
| 10,970,660 B1 | 4/2021 | Harris et al. |
| 10,974,139 B2 | 4/2021 | Feder et al. |
| 10,978,056 B1 | 4/2021 | Challa et al. |
| 10,978,090 B2 | 4/2021 | Binder et al. |
| 10,983,971 B2 | 4/2021 | Carvalho et al. |
| 11,009,970 B2 | 5/2021 | Hindi et al. |
| 11,037,565 B2 | 6/2021 | Kudurshian et al. |
| 11,061,543 B1 | 7/2021 | Blatz et al. |
| 11,076,039 B2 | 7/2021 | Weinstein et al. |
| 11,094,311 B2 | 8/2021 | Candelore et al. |
| 11,132,172 B1 | 9/2021 | Naik et al. |
| 11,169,660 B2 | 11/2021 | Gupta et al. |
| 11,200,027 B2 | 12/2021 | Aggarwal et al. |
| 11,204,787 B2 | 12/2021 | Radebaugh et al. |
| 11,269,426 B2 | 3/2022 | Jorasch et al. |
| 2001/0024967 A1 | 9/2001 | Bauer |
| 2004/0059576 A1 | 3/2004 | Lucke |
| 2005/0075875 A1 | 4/2005 | Shozakai et al. |
| 2005/0184958 A1 | 8/2005 | Gnanamgari et al. |
| 2005/0216271 A1 | 9/2005 | Konig |
| 2006/0206724 A1 | 9/2006 | Schaufele et al. |
| 2007/0004451 A1 | 1/2007 | C. Anderson |
| 2007/0088556 A1 | 4/2007 | Andrew |
| 2008/0267416 A1 | 10/2008 | Goldstein et al. |
| 2009/0043580 A1 | 2/2009 | Mozer et al. |
| 2009/0318198 A1 | 12/2009 | Carroll |
| 2010/0030562 A1 | 2/2010 | Yoshizawa et al. |
| 2010/0332236 A1 | 12/2010 | Tan |
| 2011/0010174 A1 | 1/2011 | Longe et al. |
| 2011/0191108 A1 | 8/2011 | Friedlander |
| 2011/0295590 A1 | 12/2011 | Lloyd et al. |
| 2012/0002820 A1 | 1/2012 | Leichter |
| 2012/0005224 A1 | 1/2012 | Ahrens et al. |
| 2012/0005602 A1 | 1/2012 | Anttila et al. |
| 2012/0008754 A1 | 1/2012 | Mukherjee et al. |
| 2012/0010886 A1 | 1/2012 | Razavilar |
| 2012/0011138 A1 | 1/2012 | Dunning et al. |
| 2012/0013609 A1 | 1/2012 | Reponen et al. |
| 2012/0015629 A1 | 1/2012 | Olsen et al. |
| 2012/0016658 A1 | 1/2012 | Wu et al. |
| 2012/0016678 A1 | 1/2012 | Gruber et al. |
| 2012/0019400 A1 | 1/2012 | Patel et al. |
| 2012/0020490 A1 | 1/2012 | Leichter |
| 2012/0020503 A1 | 1/2012 | Endo et al. |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0022967 A1 | 1/2012 | Bachman et al. |
| 2012/0023088 A1 | 1/2012 | Cheng et al. |
| 2012/0023095 A1 | 1/2012 | Wadycki et al. |
| 2012/0023462 A1 | 1/2012 | Rosing et al. |
| 2012/0026395 A1 | 2/2012 | Jin et al. |
| 2012/0029661 A1 | 2/2012 | Jones et al. |
| 2012/0029910 A1 | 2/2012 | Medlock et al. |
| 2012/0034904 A1 | 2/2012 | LeBeau et al. |
| 2012/0035907 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035925 A1 | 2/2012 | Friend et al. |
| 2012/0035926 A1 | 2/2012 | Ambler |
| 2012/0035931 A1 | 2/2012 | LeBeau et al. |
| 2012/0035932 A1 | 2/2012 | Jitkoff et al. |
| 2012/0035935 A1 | 2/2012 | Park et al. |
| 2012/0036556 A1 | 2/2012 | LeBeau et al. |
| 2012/0039539 A1 | 2/2012 | Boiman et al. |
| 2012/0039578 A1 | 2/2012 | Issa et al. |
| 2012/0041752 A1 | 2/2012 | Wang et al. |
| 2012/0041756 A1 | 2/2012 | Hanazawa et al. |
| 2012/0041759 A1 | 2/2012 | Barker et al. |
| 2012/0042014 A1 | 2/2012 | Desai et al. |
| 2012/0042343 A1 | 2/2012 | Laligand et al. |
| 2012/0052945 A1 | 3/2012 | Miyamoto et al. |
| 2012/0053815 A1 | 3/2012 | Montanari et al. |
| 2012/0053829 A1 | 3/2012 | Agarwal et al. |
| 2012/0053945 A1 | 3/2012 | Gupta et al. |
| 2012/0055253 A1 | 3/2012 | Sinha |
| 2012/0056815 A1 | 3/2012 | Mehra |
| 2012/0058783 A1 | 3/2012 | Kim et al. |
| 2012/0059655 A1 | 3/2012 | Cartales |
| 2012/0059813 A1 | 3/2012 | Sejnoha et al. |
| 2012/0060052 A1 | 3/2012 | White et al. |
| 2012/0062473 A1 | 3/2012 | Xiao et al. |
| 2012/0064975 A1 | 3/2012 | Gault et al. |
| 2012/0065972 A1 | 3/2012 | Strifler et al. |
| 2012/0066212 A1 | 3/2012 | Jennings |
| 2012/0066581 A1 | 3/2012 | Spalink |
| 2012/0075054 A1 | 3/2012 | Ge et al. |
| 2012/0075184 A1 | 3/2012 | Madhvanath |
| 2012/0077479 A1 | 3/2012 | Sabotta et al. |
| 2012/0078611 A1 | 3/2012 | Soltani et al. |
| 2012/0078624 A1 | 3/2012 | Yook et al. |
| 2012/0078627 A1 | 3/2012 | Wagner |
| 2012/0078635 A1 | 3/2012 | Rothkopf et al. |
| 2012/0078747 A1 | 3/2012 | Chakrabarti et al. |
| 2012/0082317 A1 | 4/2012 | Pance et al. |
| 2012/0083286 A1 | 4/2012 | Kim et al. |
| 2012/0084086 A1 | 4/2012 | Gilbert et al. |
| 2012/0084087 A1 | 4/2012 | Yang et al. |
| 2012/0084089 A1 | 4/2012 | Lloyd et al. |
| 2012/0084251 A1 | 4/2012 | Lingenfelder et al. |
| 2012/0084634 A1 | 4/2012 | Wong et al. |
| 2012/0088219 A1 | 4/2012 | Briscoe et al. |
| 2012/0089331 A1 | 4/2012 | Schmidt et al. |
| 2012/0089659 A1 | 4/2012 | Halevi et al. |
| 2012/0094645 A1 | 4/2012 | Jeffrey |
| 2012/0101823 A1 | 4/2012 | Weng et al. |
| 2012/0105257 A1 | 5/2012 | Murillo et al. |
| 2012/0108166 A1 | 5/2012 | Hymel |
| 2012/0108221 A1 | 5/2012 | Thomas et al. |
| 2012/0109632 A1 | 5/2012 | Sugiura et al. |
| 2012/0109753 A1 | 5/2012 | Kennewick et al. |
| 2012/0109997 A1 | 5/2012 | Sparks et al. |
| 2012/0110456 A1 | 5/2012 | Larco et al. |
| 2012/0114108 A1 | 5/2012 | Katis et al. |
| 2012/0116770 A1 | 5/2012 | Chen et al. |
| 2012/0117499 A1 | 5/2012 | Mori et al. |
| 2012/0117590 A1 | 5/2012 | Agnihotri et al. |
| 2012/0124126 A1 | 5/2012 | Alcazar et al. |
| 2012/0124177 A1 | 5/2012 | Sparks |
| 2012/0124178 A1 | 5/2012 | Sparks |
| 2012/0128322 A1 | 5/2012 | Shaffer et al. |
| 2012/0130709 A1 | 5/2012 | Bocchieri et al. |
| 2012/0130978 A1 | 5/2012 | Li et al. |
| 2012/0130995 A1 | 5/2012 | Risvik et al. |
| 2012/0135714 A1 | 5/2012 | King, II |
| 2012/0136529 A1 | 5/2012 | Curtis et al. |
| 2012/0136572 A1 | 5/2012 | Norton |
| 2012/0136649 A1 | 5/2012 | Freising et al. |
| 2012/0136658 A1 | 5/2012 | Shrum, Jr. et al. |
| 2012/0136855 A1 | 5/2012 | Ni et al. |
| 2012/0136985 A1 | 5/2012 | Popescu et al. |
| 2012/0137367 A1 | 5/2012 | Dupont et al. |

(56) References Cited

U.S. PATENT DOCUMENTS

| | | |
|---|---|---|
| 2012/0287067 A1 | 5/2012 | Ikegami |
| 2012/0148077 A1 | 6/2012 | Aldaz et al. |
| 2012/0149342 A1 | 6/2012 | Cohen et al. |
| 2012/0149394 A1 | 6/2012 | Singh et al. |
| 2012/0150532 A1 | 6/2012 | Mirowski et al. |
| 2012/0150544 A1 | 6/2012 | McLoughlin et al. |
| 2012/0150580 A1 | 6/2012 | Norton |
| 2012/0158293 A1 | 6/2012 | Burnham |
| 2012/0158399 A1 | 6/2012 | Tremblay et al. |
| 2012/0158422 A1 | 6/2012 | Burnham et al. |
| 2012/0159380 A1 | 6/2012 | Kocienda et al. |
| 2012/0162540 A1 | 6/2012 | Ouchi et al. |
| 2012/0163710 A1 | 6/2012 | Skaff et al. |
| 2012/0166177 A1 | 6/2012 | Beld et al. |
| 2012/0166196 A1 | 6/2012 | Ju et al. |
| 2012/0166429 A1 | 6/2012 | Moore et al. |
| 2012/0166942 A1 | 6/2012 | Ramerth et al. |
| 2012/0166959 A1 | 6/2012 | Hilerio et al. |
| 2012/0166998 A1 | 6/2012 | Cotterill et al. |
| 2012/0173222 A1 | 7/2012 | Wang et al. |
| 2012/0173244 A1 | 7/2012 | Kwak et al. |
| 2012/0173464 A1 | 7/2012 | Tur et al. |
| 2012/0174121 A1 | 7/2012 | Treat et al. |
| 2012/0176255 A1 | 7/2012 | Choi et al. |
| 2012/0179457 A1 | 7/2012 | Newman et al. |
| 2012/0179467 A1 | 7/2012 | Williams et al. |
| 2012/0179471 A1 | 7/2012 | Newman et al. |
| 2012/0185237 A1 | 7/2012 | Gajic et al. |
| 2012/0185480 A1 | 7/2012 | Ni et al. |
| 2012/0185781 A1 | 7/2012 | Guzman et al. |
| 2012/0185803 A1 | 7/2012 | Wang et al. |
| 2012/0185821 A1 | 7/2012 | Yaseen et al. |
| 2012/0191461 A1 | 7/2012 | Lin et al. |
| 2012/0192096 A1 | 7/2012 | Bowman et al. |
| 2012/0197743 A1 | 8/2012 | Grigg et al. |
| 2012/0197967 A1 | 8/2012 | Sivavakeesar |
| 2012/0197995 A1 | 8/2012 | Caruso |
| 2012/0197998 A1 | 8/2012 | Kessel et al. |
| 2012/0200489 A1 | 8/2012 | Miyashita et al. |
| 2012/0201362 A1 | 8/2012 | Crossan et al. |
| 2012/0203767 A1 | 8/2012 | Williams et al. |
| 2012/0209454 A1 | 8/2012 | Miller et al. |
| 2012/0209654 A1 | 8/2012 | Romagnino et al. |
| 2012/0209853 A1 | 8/2012 | Desai et al. |
| 2012/0209874 A1 | 8/2012 | Wong et al. |
| 2012/0210266 A1 | 8/2012 | Jiang et al. |
| 2012/0210378 A1 | 8/2012 | Mccoy et al. |
| 2012/0214141 A1 | 8/2012 | Raya et al. |
| 2012/0214517 A1 | 8/2012 | Singh et al. |
| 2012/0215640 A1 | 8/2012 | Ramer et al. |
| 2012/0215762 A1 | 8/2012 | Hall et al. |
| 2012/0221339 A1 | 8/2012 | Wang et al. |
| 2012/0221552 A1 | 8/2012 | Reponen et al. |
| 2012/0222132 A1 | 8/2012 | Burger et al. |
| 2012/0223889 A1 | 9/2012 | Medlock et al. |
| 2012/0223936 A1 | 9/2012 | Aughey et al. |
| 2012/0232885 A1 | 9/2012 | Barbosa et al. |
| 2012/0232886 A1 | 9/2012 | Capuozzo et al. |
| 2012/0232906 A1 | 9/2012 | Lindahl |
| 2012/0233207 A1 | 9/2012 | Mohajer |
| 2012/0233266 A1 | 9/2012 | Hassan et al. |
| 2012/0233280 A1 | 9/2012 | Ebara |
| 2012/0239403 A1 | 9/2012 | Cano et al. |
| 2012/0239661 A1 | 9/2012 | Giblin |
| 2012/0239761 A1 | 9/2012 | Linner et al. |
| 2012/0242482 A1 | 9/2012 | Elumalai et al. |
| 2012/0245719 A1 | 9/2012 | Story, Jr. et al. |
| 2012/0245939 A1 | 9/2012 | Braho et al. |
| 2012/0245941 A1 | 9/2012 | Cheyer |
| 2012/0245944 A1 | 9/2012 | Gruber et al. |
| 2012/0246064 A1 | 9/2012 | Balkow |
| 2012/0250858 A1 | 10/2012 | Iqbal et al. |
| 2012/0252367 A1 | 10/2012 | Gaglio et al. |
| 2012/0252540 A1 | 10/2012 | Kirigaya |
| 2012/0253785 A1 | 10/2012 | Hamid et al. |
| 2012/0253791 A1 | 10/2012 | Heck et al. |
| 2012/0254143 A1 | 10/2012 | Varma et al. |
| 2012/0254152 A1 | 10/2012 | Park et al. |
| 2012/0254290 A1 | 10/2012 | Naaman |
| 2012/0259615 A1 | 10/2012 | Morin et al. |
| 2012/0259638 A1 | 10/2012 | Kalinli |
| 2012/0262296 A1 | 10/2012 | Bezar |
| 2012/0265482 A1 | 10/2012 | Grokop et al. |
| 2012/0265528 A1 | 10/2012 | Gruber et al. |
| 2012/0265535 A1 | 10/2012 | Bryant-Rich et al. |
| 2012/0265787 A1 | 10/2012 | Hsu et al. |
| 2012/0265806 A1 | 10/2012 | Blanchflower et al. |
| 2012/0271625 A1 | 10/2012 | Bernard |
| 2012/0271634 A1 | 10/2012 | Lenke |
| 2012/0271635 A1 | 10/2012 | Ljolje |
| 2012/0271640 A1 | 10/2012 | Basir |
| 2012/0271676 A1 | 10/2012 | Aravamudan et al. |
| 2012/0272177 A1 | 10/2012 | Vaghefinazari et al. |
| 2012/0275377 A1 | 11/2012 | Lehane et al. |
| 2012/0278744 A1 | 11/2012 | Kozitsyn et al. |
| 2012/0278812 A1 | 11/2012 | Wang |
| 2012/0284015 A1 | 11/2012 | Drewes |
| 2012/0284027 A1 | 11/2012 | Mallett et al. |
| 2012/0290291 A1 | 11/2012 | Shelley et al. |
| 2012/0290300 A1 | 11/2012 | Lee et al. |
| 2012/0290657 A1 | 11/2012 | Parks et al. |
| 2012/0290680 A1 | 11/2012 | Hwang |
| 2012/0295708 A1 | 11/2012 | Hernandez-Abrego et al. |
| 2012/0296638 A1 | 11/2012 | Patwa |
| 2012/0296649 A1 | 11/2012 | Bansal et al. |
| 2012/0296654 A1 | 11/2012 | Hendrickson et al. |
| 2012/0296891 A1 | 11/2012 | Rangan |
| 2012/0297341 A1 | 11/2012 | Glazer et al. |
| 2012/0297348 A1 | 11/2012 | Santoro |
| 2012/0303369 A1 | 11/2012 | Brush et al. |
| 2012/0303371 A1 | 11/2012 | Labsky et al. |
| 2012/0304124 A1 | 11/2012 | Chen et al. |
| 2012/0304239 A1 | 11/2012 | Shahraray et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O"Sullivan |
| 2012/0310922 A1 | 12/2012 | Johnson et al. |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0316774 A1 | 12/2012 | Yariv et al. |
| 2012/0316862 A1 | 12/2012 | Sultan et al. |
| 2012/0316875 A1 | 12/2012 | Nyquist et al. |
| 2012/0316878 A1 | 12/2012 | Singleton et al. |
| 2012/0316955 A1 | 12/2012 | Panguluri et al. |
| 2012/0317194 A1 | 12/2012 | Tian |
| 2012/0317498 A1 | 12/2012 | Logan et al. |
| 2012/0321112 A1 | 12/2012 | Schubert et al. |
| 2012/0323560 A1 | 12/2012 | Perez Cortes et al. |
| 2012/0324391 A1 | 12/2012 | Tocci |
| 2012/0327009 A1 | 12/2012 | Fleizach |
| 2012/0329529 A1 | 12/2012 | van der Raadt |
| 2012/0330660 A1 | 12/2012 | Jaiswal |
| 2012/0330661 A1 | 12/2012 | Lindahl |
| 2012/0330990 A1 | 12/2012 | Chen et al. |
| 2013/0002716 A1 | 1/2013 | Walker et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0007240 A1 | 1/2013 | Qiu et al. |
| 2013/0007648 A1 | 1/2013 | Gamon et al. |
| 2013/0009858 A1 | 1/2013 | Lacey |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0014026 A1 | 1/2013 | Beringer et al. |
| 2013/0014143 A1 | 1/2013 | Bhatia et al. |
| 2013/0018659 A1 | 1/2013 | Chi |
| 2013/0018863 A1 | 1/2013 | Regan et al. |
| 2013/0024277 A1 | 1/2013 | Tuchman et al. |
| 2013/0024576 A1 | 1/2013 | Dishneau et al. |

(56) References Cited

U.S. PATENT DOCUMENTS

| | | |
|---|---|---|
| 2013/0027875 A1 | 1/2013 | Zhu et al. |
| 2013/0028404 A1 | 1/2013 | Omalley et al. |
| 2013/0030787 A1 | 1/2013 | Cancedda et al. |
| 2013/0030789 A1 | 1/2013 | Dalce |
| 2013/0030804 A1 | 1/2013 | Zavaliagkos et al. |
| 2013/0030815 A1 | 1/2013 | Madhvanath et al. |
| 2013/0030904 A1 | 1/2013 | Aidasani et al. |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0176208 A1 | 1/2013 | Tanaka et al. |
| 2013/0033643 A1 | 2/2013 | Kim et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0035994 A1 | 2/2013 | Pattan et al. |
| 2013/0036200 A1 | 2/2013 | Roberts et al. |
| 2013/0038618 A1 | 2/2013 | Urbach |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041665 A1 | 2/2013 | Jang et al. |
| 2013/0041667 A1 | 2/2013 | Longe et al. |
| 2013/0041968 A1 | 2/2013 | Cohen et al. |
| 2013/0046544 A1 | 2/2013 | Kay et al. |
| 2013/0047178 A1 | 2/2013 | Moon et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054631 A1 | 2/2013 | Govani et al. |
| 2013/0054675 A1 | 2/2013 | Jenkins et al. |
| 2013/0054706 A1 | 2/2013 | Graham et al. |
| 2013/0054945 A1 | 2/2013 | Free et al. |
| 2013/0055099 A1 | 2/2013 | Yao et al. |
| 2013/0055147 A1 | 2/2013 | Vasudev et al. |
| 2013/0055201 A1 | 2/2013 | No et al. |
| 2013/0060571 A1 | 3/2013 | Soemo et al. |
| 2013/0060807 A1 | 3/2013 | Rambhia et al. |
| 2013/0061139 A1 | 3/2013 | Mahkovec et al. |
| 2013/0063611 A1 | 3/2013 | Papakipos et al. |
| 2013/0066832 A1 | 3/2013 | Sheehan et al. |
| 2013/0067307 A1 | 3/2013 | Tian et al. |
| 2013/0067312 A1 | 3/2013 | Rose |
| 2013/0067421 A1 | 3/2013 | Osman et al. |
| 2013/0069769 A1 | 3/2013 | Pennington et al. |
| 2013/0073286 A1 | 3/2013 | Bastea-Forte et al. |
| 2013/0073293 A1 | 3/2013 | Jang et al. |
| 2013/0073346 A1 | 3/2013 | Chun et al. |
| 2013/0073580 A1 | 3/2013 | Mehanna et al. |
| 2013/0073676 A1 | 3/2013 | Cockcroft |
| 2013/0078930 A1 | 3/2013 | Chen et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0080178 A1 | 3/2013 | Kang et al. |
| 2013/0080251 A1 | 3/2013 | Dempski |
| 2013/0082967 A1 | 4/2013 | Hillis et al. |
| 2013/0084882 A1 | 4/2013 | Khorashadi et al. |
| 2013/0085755 A1 | 4/2013 | Bringert et al. |
| 2013/0085761 A1 | 4/2013 | Bringert et al. |
| 2013/0086609 A1 | 4/2013 | Levy et al. |
| 2013/0090921 A1 | 4/2013 | Liu et al. |
| 2013/0091090 A1 | 4/2013 | Spivack et al. |
| 2013/0095805 A1 | 4/2013 | LeBeau et al. |
| 2013/0096909 A1 | 4/2013 | Brun et al. |
| 2013/0096911 A1 | 4/2013 | Beaufort et al. |
| 2013/0096917 A1 | 4/2013 | Edgar et al. |
| 2013/0097566 A1 | 4/2013 | Berglund |
| 2013/0097682 A1 | 4/2013 | Zeljkovic et al. |
| 2013/0100017 A1 | 4/2013 | Papakipos et al. |
| 2013/0100268 A1 | 4/2013 | Mihailidis et al. |
| 2013/0103391 A1 | 4/2013 | Millmore et al. |
| 2013/0103405 A1 | 4/2013 | Namba et al. |
| 2013/0106742 A1 | 5/2013 | Lee et al. |
| 2013/0107053 A1 | 5/2013 | Ozaki |
| 2013/0109412 A1 | 5/2013 | Nguyen et al. |
| 2013/0110505 A1 | 5/2013 | Gruber et al. |
| 2013/0110511 A1 | 5/2013 | Spiegel et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0110943 A1 | 5/2013 | Menon et al. |
| 2013/0111330 A1 | 5/2013 | Staikos et al. |
| 2013/0111348 A1 | 5/2013 | Gruber et al. |
| 2013/0111365 A1 | 5/2013 | Chen et al. |
| 2013/0111487 A1 | 5/2013 | Cheyer et al. |
| 2013/0111581 A1 | 5/2013 | Griffin et al. |
| 2013/0115927 A1 | 5/2013 | Gruber et al. |
| 2013/0117022 A1 | 5/2013 | Chen et al. |
| 2013/0124189 A1 | 5/2013 | Baldwin et al. |
| 2013/0124672 A1 | 5/2013 | Pan |
| 2013/0125168 A1 | 5/2013 | Agnihotri et al. |
| 2013/0130669 A1 | 5/2013 | Xiao et al. |
| 2013/0132081 A1 | 5/2013 | Ryu et al. |
| 2013/0132084 A1 | 5/2013 | Stonehocker et al. |
| 2013/0132089 A1 | 5/2013 | Fanty et al. |
| 2013/0132871 A1 | 5/2013 | Zeng et al. |
| 2013/0138440 A1 | 5/2013 | Strope et al. |
| 2013/0141551 A1 | 6/2013 | Kim |
| 2013/0142317 A1 | 6/2013 | Reynolds |
| 2013/0142345 A1 | 6/2013 | Waldmann |
| 2013/0144594 A1 | 6/2013 | Bangalore et al. |
| 2013/0144616 A1 | 6/2013 | Bangalore |
| 2013/0151258 A1 | 6/2013 | Chandrasekar et al. |
| 2013/0151339 A1 | 6/2013 | Kim et al. |
| 2013/0152092 A1 | 6/2013 | Yadgar |
| 2013/0154811 A1 | 6/2013 | Ferren et al. |
| 2013/0155948 A1 | 6/2013 | Pinheiro et al. |
| 2013/0156198 A1 | 6/2013 | Kim et al. |
| 2013/0157629 A1 | 6/2013 | Lee et al. |
| 2013/0158977 A1 | 6/2013 | Senior |
| 2013/0159847 A1 | 6/2013 | Banke et al. |
| 2013/0159861 A1 | 6/2013 | Rottler et al. |
| 2013/0165232 A1 | 6/2013 | Nelson et al. |
| 2013/0166278 A1 | 6/2013 | James et al. |
| 2013/0166303 A1 | 6/2013 | Chang et al. |
| 2013/0166332 A1 | 6/2013 | Hammad |
| 2013/0166442 A1 | 6/2013 | Nakajima et al. |
| 2013/0167242 A1 | 6/2013 | Paliwal |
| 2013/0170738 A1 | 7/2013 | Capuozzo et al. |
| 2013/0172022 A1 | 7/2013 | Seymour et al. |
| 2013/0173258 A1 | 7/2013 | Liu et al. |
| 2013/0173268 A1 | 7/2013 | Weng et al. |
| 2013/0173513 A1 | 7/2013 | Chu et al. |
| 2013/0173610 A1 | 7/2013 | Hu et al. |
| 2013/0173614 A1 | 7/2013 | Ismalon |
| 2013/0174034 A1 | 7/2013 | Brown et al. |
| 2013/0176147 A1 | 7/2013 | Anderson et al. |
| 2013/0176244 A1 | 7/2013 | Yamamoto et al. |
| 2013/0176592 A1 | 7/2013 | Sasaki |
| 2013/0179168 A1 | 7/2013 | Bae et al. |
| 2013/0179172 A1 | 7/2013 | Nakamura et al. |
| 2013/0179440 A1 | 7/2013 | Gordon |
| 2013/0179806 A1 | 7/2013 | Bastide et al. |
| 2013/0183942 A1 | 7/2013 | Novick et al. |
| 2013/0183944 A1 | 7/2013 | Mozer et al. |
| 2013/0185059 A1 | 7/2013 | Riccardi |
| 2013/0185066 A1 | 7/2013 | Tzirkel-hancock et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0187857 A1 | 7/2013 | Griffin et al. |
| 2013/0190021 A1 | 7/2013 | Vieri et al. |
| 2013/0191117 A1 | 7/2013 | Atti et al. |
| 2013/0191408 A1 | 7/2013 | Volkert |
| 2013/0197911 A1 | 8/2013 | Wei et al. |
| 2013/0197914 A1 | 8/2013 | Yelvington et al. |
| 2013/0198159 A1 | 8/2013 | Hendry |
| 2013/0198841 A1 | 8/2013 | Poulson |

(56) References Cited

U.S. PATENT DOCUMENTS

| | | |
|---|---|---|
| 2013/0204813 A1 | 8/2013 | Master et al. |
| 2013/0204897 A1 | 8/2013 | McDougall |
| 2013/0204967 A1 | 8/2013 | Seo et al. |
| 2013/0207898 A1 | 8/2013 | Sullivan et al. |
| 2013/0210410 A1 | 8/2013 | Xu |
| 2013/0210492 A1 | 8/2013 | You et al. |
| 2013/0212501 A1 | 8/2013 | Anderson et al. |
| 2013/0218553 A1 | 8/2013 | Fujii et al. |
| 2013/0218560 A1 | 8/2013 | Hsiao et al. |
| 2013/0218574 A1 | 8/2013 | Falcon et al. |
| 2013/0218899 A1 | 8/2013 | Raghavan et al. |
| 2013/0219333 A1 | 8/2013 | Palwe et al. |
| 2013/0222249 A1 | 8/2013 | Pasquero et al. |
| 2013/0223279 A1 | 8/2013 | Tinnakornsrisuphap et al. |
| 2013/0225128 A1 | 8/2013 | Gomar |
| 2013/0226935 A1 | 8/2013 | Bai et al. |
| 2013/0226996 A1 | 8/2013 | Itagaki et al. |
| 2013/0231917 A1 | 9/2013 | Naik |
| 2013/0234947 A1 | 9/2013 | Kristensson et al. |
| 2013/0235987 A1 | 9/2013 | Arroniz-Escobar |
| 2013/0238312 A1 | 9/2013 | Waibel |
| 2013/0238326 A1 | 9/2013 | Kim et al. |
| 2013/0238334 A1 | 9/2013 | Ma et al. |
| 2013/0238540 A1 | 9/2013 | O'Donoghue et al. |
| 2013/0238647 A1 | 9/2013 | Thompson |
| 2013/0238729 A1 | 9/2013 | Holzman et al. |
| 2013/0244615 A1 | 9/2013 | Miller |
| 2013/0244633 A1 | 9/2013 | Jacobs et al. |
| 2013/0246048 A1 | 9/2013 | Nagase et al. |
| 2013/0246050 A1 | 9/2013 | Yu et al. |
| 2013/0246329 A1 | 9/2013 | Pasquero et al. |
| 2013/0253911 A1 | 9/2013 | Petri et al. |
| 2013/0253912 A1 | 9/2013 | Medlock et al. |
| 2013/0260739 A1 | 10/2013 | Saino |
| 2013/0262168 A1 | 10/2013 | Makanawala et al. |
| 2013/0268263 A1 | 10/2013 | Park et al. |
| 2013/0268956 A1 | 10/2013 | Recco |
| 2013/0275117 A1 | 10/2013 | Winer |
| 2013/0275136 A1 | 10/2013 | Czahor |
| 2013/0275138 A1 | 10/2013 | Gruber et al. |
| 2013/0275164 A1 | 10/2013 | Gruber et al. |
| 2013/0275199 A1 | 10/2013 | Proctor, Jr. et al. |
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0279724 A1 | 10/2013 | Stafford et al. |
| 2013/0282709 A1 | 10/2013 | Zhu et al. |
| 2013/0283168 A1 | 10/2013 | Brown et al. |
| 2013/0283199 A1 | 10/2013 | Selig et al. |
| 2013/0283283 A1 | 10/2013 | Wang et al. |
| 2013/0285913 A1 | 10/2013 | Griffin et al. |
| 2013/0288722 A1 | 10/2013 | Ramanujam et al. |
| 2013/0289991 A1 | 10/2013 | Eshwar et al. |
| 2013/0289993 A1 | 10/2013 | Rao |
| 2013/0289994 A1 | 10/2013 | Newman et al. |
| 2013/0290001 A1 | 10/2013 | Yun et al. |
| 2013/0290222 A1 | 10/2013 | Gordo et al. |
| 2013/0290905 A1 | 10/2013 | Luvogt et al. |
| 2013/0291015 A1 | 10/2013 | Pan |
| 2013/0297078 A1 | 11/2013 | Kolavennu |
| 2013/0297198 A1 | 11/2013 | Velde et al. |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0304476 A1 | 11/2013 | Kim et al. |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0305119 A1 | 11/2013 | Kern et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311179 A1 | 11/2013 | Wagner |
| 2013/0311184 A1 | 11/2013 | Badavne et al. |
| 2013/0311487 A1 | 11/2013 | Moore et al. |
| 2013/0311997 A1 | 11/2013 | Gruber et al. |
| 2013/0315038 A1 | 11/2013 | Ferren et al. |
| 2013/0316679 A1 | 11/2013 | Miller et al. |
| 2013/0316746 A1 | 11/2013 | Miller et al. |
| 2013/0317921 A1 | 11/2013 | Havas |
| 2013/0318478 A1 | 11/2013 | Ogura |
| 2013/0321267 A1 | 12/2013 | Bhatti et al. |
| 2013/0322634 A1 | 12/2013 | Bennett et al. |
| 2013/0322665 A1 | 12/2013 | Bennett et al. |
| 2013/0325340 A1 | 12/2013 | Forstall et al. |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325460 A1 | 12/2013 | Kim et al. |
| 2013/0325480 A1 | 12/2013 | Lee et al. |
| 2013/0325481 A1 | 12/2013 | Van Os et al. |
| 2013/0325484 A1 | 12/2013 | Chakladar et al. |
| 2013/0325844 A1 | 12/2013 | Plaisant |
| 2013/0325967 A1 | 12/2013 | Parks et al. |
| 2013/0325970 A1 | 12/2013 | Roberts et al. |
| 2013/0325979 A1 | 12/2013 | Mansfield et al. |
| 2013/0326576 A1 | 12/2013 | Zhang et al. |
| 2013/0328809 A1 | 12/2013 | Smith |
| 2013/0329023 A1 | 12/2013 | Suplee, III et al. |
| 2013/0331127 A1 | 12/2013 | Sabatelli et al. |
| 2013/0332113 A1 | 12/2013 | Piemonte et al. |
| 2013/0332159 A1 | 12/2013 | Federighi et al. |
| 2013/0332162 A1 | 12/2013 | Keen |
| 2013/0332164 A1 | 12/2013 | Nalk |
| 2013/0332168 A1 | 12/2013 | Kim et al. |
| 2013/0332172 A1 | 12/2013 | Prakash et al. |
| 2013/0332400 A1 | 12/2013 | González |
| 2013/0332538 A1 | 12/2013 | Clark et al. |
| 2013/0332721 A1 | 12/2013 | Chaudhri et al. |
| 2013/0339028 A1 | 12/2013 | Rosner et al. |
| 2013/0339256 A1 | 12/2013 | Shroff |
| 2013/0339454 A1 | 12/2013 | Walker et al. |
| 2013/0339991 A1 | 12/2013 | Ricci |
| 2013/0342672 A1 | 12/2013 | Gray et al. |
| 2013/0343584 A1 | 12/2013 | Bennett et al. |
| 2013/0343721 A1 | 12/2013 | Abecassis |
| 2013/0346065 A1 | 12/2013 | Davidson et al. |
| 2013/0346068 A1 | 12/2013 | Solem et al. |
| 2013/0346347 A1 | 12/2013 | Patterson et al. |
| 2013/0346488 A1 | 12/2013 | Lunt et al. |
| 2013/0347018 A1 | 12/2013 | Limp et al. |
| 2013/0347029 A1 | 12/2013 | Tang et al. |
| 2013/0347102 A1 | 12/2013 | Shi |
| 2013/0347117 A1 | 12/2013 | Parks et al. |
| 2014/0001255 A1 | 1/2014 | Anthoine |
| 2014/0002338 A1 | 1/2014 | Raffa et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006028 A1 | 1/2014 | Hu |
| 2014/0006030 A1 | 1/2014 | Fleizach et al. |
| 2014/0006153 A1 | 1/2014 | Thangam et al. |
| 2014/0006191 A1 | 1/2014 | Shankar et al. |
| 2014/0006483 A1 | 1/2014 | Garmark et al. |
| 2014/0006496 A1 | 1/2014 | Dearman et al. |
| 2014/0006562 A1 | 1/2014 | Handa et al. |
| 2014/0006947 A1 | 1/2014 | Garmark et al. |
| 2014/0006951 A1 | 1/2014 | Hunter |
| 2014/0006955 A1 | 1/2014 | Greenzeiger et al. |
| 2014/0008163 A1 | 1/2014 | Mikonaho et al. |
| 2014/0012574 A1 | 1/2014 | Pasupalak et al. |
| 2014/0012580 A1 | 1/2014 | Ganong, III et al. |
| 2014/0012586 A1 | 1/2014 | Rubin et al. |
| 2014/0012587 A1 | 1/2014 | Park |
| 2014/0013336 A1 | 1/2014 | Yang |
| 2014/0019116 A1 | 1/2014 | Lundberg et al. |
| 2014/0019133 A1 | 1/2014 | Bao et al. |
| 2014/0019460 A1 | 1/2014 | Sambrani et al. |
| 2014/0026037 A1 | 1/2014 | Garb et al. |
| 2014/0028029 A1 | 1/2014 | Jochman |

(56) References Cited

U.S. PATENT DOCUMENTS

| | | |
|---|---|---|
| 2014/0028477 A1 | 1/2014 | Michalske |
| 2014/0028735 A1 | 1/2014 | Williams et al. |
| 2014/0032453 A1 | 1/2014 | Eustice et al. |
| 2014/0032678 A1 | 1/2014 | Koukoumidis et al. |
| 2014/0033071 A1 | 1/2014 | Gruber et al. |
| 2014/0035823 A1 | 2/2014 | Khoe et al. |
| 2014/0037075 A1 | 2/2014 | Bouzid et al. |
| 2014/0039888 A1 | 2/2014 | Taubman et al. |
| 2014/0039893 A1 | 2/2014 | Weiner et al. |
| 2014/0039894 A1 | 2/2014 | Shostak |
| 2014/0040274 A1 | 2/2014 | Aravamudan et al. |
| 2014/0040748 A1 | 2/2014 | Lemay et al. |
| 2014/0040754 A1 | 2/2014 | Donelli |
| 2014/0040801 A1 | 2/2014 | Patel et al. |
| 2014/0040918 A1 | 2/2014 | Li |
| 2014/0040961 A1 | 2/2014 | Green et al. |
| 2014/0046934 A1 | 2/2014 | Zhou et al. |
| 2014/0047001 A1 | 2/2014 | Phillips et al. |
| 2014/0052451 A1 | 2/2014 | Cheong et al. |
| 2014/0052680 A1 | 2/2014 | Nitz et al. |
| 2014/0052791 A1 | 2/2014 | Chakra et al. |
| 2014/0053082 A1 | 2/2014 | Park |
| 2014/0053101 A1 | 2/2014 | Buehler et al. |
| 2014/0053210 A1 | 2/2014 | Cheong et al. |
| 2014/0057610 A1 | 2/2014 | Olincy et al. |
| 2014/0059030 A1 | 2/2014 | Hakkani-Tur et al. |
| 2014/0059423 A1 | 2/2014 | Gorga et al. |
| 2014/0067361 A1 | 3/2014 | Nikoulina et al. |
| 2014/0067371 A1 | 3/2014 | Liensberger |
| 2014/0067402 A1 | 3/2014 | Kim |
| 2014/0067738 A1 | 3/2014 | Kingsbury |
| 2014/0067740 A1 | 3/2014 | Solari |
| 2014/0068751 A1 | 3/2014 | Last |
| 2014/0074454 A1 | 3/2014 | Brown et al. |
| 2014/0074466 A1 | 3/2014 | Sharifi et al. |
| 2014/0074470 A1 | 3/2014 | Jansche et al. |
| 2014/0074472 A1 | 3/2014 | Lin et al. |
| 2014/0074482 A1 | 3/2014 | Ohno |
| 2014/0074483 A1 | 3/2014 | Van Os |
| 2014/0074589 A1 | 3/2014 | Nielsen et al. |
| 2014/0074815 A1 | 3/2014 | Plimton |
| 2014/0074846 A1 | 3/2014 | Moss et al. |
| 2014/0075453 A1 | 3/2014 | Bellessort et al. |
| 2014/0078065 A1 | 3/2014 | Akkok |
| 2014/0079195 A1 | 3/2014 | Srivastava et al. |
| 2014/0080410 A1 | 3/2014 | Jung et al. |
| 2014/0080428 A1 | 3/2014 | Rhoads et al. |
| 2014/0081619 A1 | 3/2014 | Solntseva et al. |
| 2014/0081633 A1 | 3/2014 | Badaskar |
| 2014/0081635 A1 | 3/2014 | Yanagihara |
| 2014/0081829 A1 | 3/2014 | Milne |
| 2014/0081941 A1 | 3/2014 | Bai et al. |
| 2014/0082500 A1 | 3/2014 | Wilensky et al. |
| 2014/0082501 A1 | 3/2014 | Bae et al. |
| 2014/0082545 A1 | 3/2014 | Zhai et al. |
| 2014/0082715 A1 | 3/2014 | Grajek et al. |
| 2014/0086458 A1 | 3/2014 | Rogers |
| 2014/0087711 A1 | 3/2014 | Geyer et al. |
| 2014/0088952 A1 | 3/2014 | Fife et al. |
| 2014/0088961 A1 | 3/2014 | Woodward et al. |
| 2014/0088964 A1 | 3/2014 | Bellegarda |
| 2014/0088970 A1 | 3/2014 | Kang |
| 2014/0092007 A1 | 4/2014 | Kim et al. |
| 2014/0095171 A1 | 4/2014 | Lynch et al. |
| 2014/0095172 A1 | 4/2014 | Cabaco et al. |
| 2014/0095173 A1 | 4/2014 | Lynch et al. |
| 2014/0095432 A1 | 4/2014 | Trumbull et al. |
| 2014/0095601 A1 | 4/2014 | Abuelsaad et al. |
| 2014/0095965 A1 | 4/2014 | Li |
| 2014/0096077 A1 | 4/2014 | Jacob et al. |
| 2014/0096209 A1 | 4/2014 | Saraf et al. |
| 2014/0098247 A1 | 4/2014 | Rao et al. |
| 2014/0100847 A1 | 4/2014 | Ishii et al. |
| 2014/0101127 A1 | 4/2014 | Simhon et al. |
| 2014/0104175 A1 | 4/2014 | Ouyang et al. |
| 2014/0108017 A1 | 4/2014 | Mason et al. |
| 2014/0108357 A1 | 4/2014 | Procops et al. |
| 2014/0108391 A1 | 4/2014 | Volkert |
| 2014/0112556 A1 | 4/2014 | Kalinli-Akbacak |
| 2014/0114554 A1 | 4/2014 | Lagassey |
| 2014/0115062 A1 | 4/2014 | Liu et al. |
| 2014/0115114 A1 | 4/2014 | Garmark et al. |
| 2014/0118155 A1 | 5/2014 | Bowers et al. |
| 2014/0118624 A1 | 5/2014 | Jang et al. |
| 2014/0120961 A1 | 5/2014 | Buck |
| 2014/0122059 A1 | 5/2014 | Patel et al. |
| 2014/0122085 A1 | 5/2014 | Piety et al. |
| 2014/0122086 A1 | 5/2014 | Kapur et al. |
| 2014/0122136 A1 | 5/2014 | Jayanthi |
| 2014/0122153 A1 | 5/2014 | Truitt |
| 2014/0123022 A1 | 5/2014 | Lee et al. |
| 2014/0128021 A1 | 5/2014 | Walker et al. |
| 2014/0129006 A1 | 5/2014 | Chen et al. |
| 2014/0129226 A1 | 5/2014 | Lee et al. |
| 2014/0132935 A1 | 5/2014 | Kim et al. |
| 2014/0134983 A1 | 5/2014 | Jung et al. |
| 2014/0135036 A1 | 5/2014 | Bonanni et al. |
| 2014/0136013 A1 | 5/2014 | Wolverton et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0136987 A1 | 5/2014 | Rodriguez |
| 2014/0142922 A1 | 5/2014 | Liang et al. |
| 2014/0142923 A1 | 5/2014 | Jones et al. |
| 2014/0142935 A1 | 5/2014 | Lindahl et al. |
| 2014/0142953 A1 | 5/2014 | Kim et al. |
| 2014/0143550 A1 | 5/2014 | Ganong, III et al. |
| 2014/0143721 A1 | 5/2014 | Suzuki et al. |
| 2014/0143784 A1 | 5/2014 | Mistry et al. |
| 2014/0146200 A1 | 5/2014 | Scott et al. |
| 2014/0149118 A1 | 5/2014 | Lee et al. |
| 2014/0152577 A1 | 6/2014 | Yuen et al. |
| 2014/0153709 A1 | 6/2014 | Byrd et al. |
| 2014/0155031 A1 | 6/2014 | Lee et al. |
| 2014/0156262 A1 | 6/2014 | Yuen et al. |
| 2014/0156269 A1 | 6/2014 | Lee et al. |
| 2014/0156279 A1 | 6/2014 | Okamoto et al. |
| 2014/0156564 A1 | 6/2014 | Knight et al. |
| 2014/0157319 A1 | 6/2014 | Kimura et al. |
| 2014/0157422 A1 | 6/2014 | Livshits et al. |
| 2014/0163751 A1 | 6/2014 | Davis et al. |
| 2014/0163951 A1 | 6/2014 | Nikoulina et al. |
| 2014/0163953 A1 | 6/2014 | Parikh |
| 2014/0163954 A1 | 6/2014 | Joshi et al. |
| 2014/0163962 A1 | 6/2014 | Castelli et al. |
| 2014/0163976 A1 | 6/2014 | Park et al. |
| 2014/0163977 A1 | 6/2014 | Hoffmeister et al. |
| 2014/0163978 A1 | 6/2014 | Basye et al. |
| 2014/0163981 A1 | 6/2014 | Cook et al. |
| 2014/0163995 A1 | 6/2014 | Burns et al. |
| 2014/0164305 A1 | 6/2014 | Lynch et al. |
| 2014/0164312 A1 | 6/2014 | Lynch et al. |
| 2014/0164476 A1 | 6/2014 | Thomson |
| 2014/0164508 A1 | 6/2014 | Lynch et al. |
| 2014/0164532 A1 | 6/2014 | Lynch et al. |
| 2014/0164533 A1 | 6/2014 | Lynch et al. |
| 2014/0164953 A1 | 6/2014 | Lynch et al. |
| 2014/0169795 A1 | 6/2014 | Clough |
| 2014/0171064 A1 | 6/2014 | Das |
| 2014/0172412 A1 | 6/2014 | Viegas et al. |
| 2014/0172878 A1 | 6/2014 | Clark et al. |
| 2014/0173445 A1 | 6/2014 | Grassiotto |
| 2014/0173460 A1 | 6/2014 | Kim |
| 2014/0176814 A1 | 6/2014 | Ahn |
| 2014/0179295 A1 | 6/2014 | Luebbers et al. |
| 2014/0180499 A1 | 6/2014 | Cooper et al. |
| 2014/0180689 A1 | 6/2014 | Kim |
| 2014/0180697 A1 | 6/2014 | Torok et al. |
| 2014/0181741 A1 | 6/2014 | Apacible et al. |
| 2014/0181865 A1 | 6/2014 | Koganei |
| 2014/0188335 A1 | 7/2014 | Madhok et al. |
| 2014/0188460 A1 | 7/2014 | Ouyang et al. |
| 2014/0188477 A1 | 7/2014 | Zhang |

(56) References Cited

U.S. PATENT DOCUMENTS

| | | |
|---|---|---|
| 2014/0188478 A1 | 7/2014 | Zhang |
| 2014/0188485 A1 | 7/2014 | Kim et al. |
| 2014/0188835 A1 | 7/2014 | Zhang et al. |
| 2014/0195226 A1 | 7/2014 | Yun et al. |
| 2014/0195230 A1 | 7/2014 | Han et al. |
| 2014/0195233 A1 | 7/2014 | Bapat et al. |
| 2014/0195244 A1 | 7/2014 | Cha et al. |
| 2014/0195251 A1 | 7/2014 | Zeinstra et al. |
| 2014/0195252 A1 | 7/2014 | Gruber et al. |
| 2014/0198048 A1 | 7/2014 | Unruh et al. |
| 2014/0203939 A1 | 7/2014 | Harrington et al. |
| 2014/0205076 A1 | 7/2014 | Kumar et al. |
| 2014/0207439 A1 | 7/2014 | Venkatapathy et al. |
| 2014/0207446 A1 | 7/2014 | Klein et al. |
| 2014/0207447 A1 | 7/2014 | Jiang et al. |
| 2014/0207466 A1 | 7/2014 | Smadi |
| 2014/0207468 A1 | 7/2014 | Bartnik |
| 2014/0207582 A1 | 7/2014 | Flinn et al. |
| 2014/0211944 A1 | 7/2014 | Hayward et al. |
| 2014/0214429 A1 | 7/2014 | Pantel |
| 2014/0214537 A1 | 7/2014 | Yoo et al. |
| 2014/0215367 A1 | 7/2014 | Kim et al. |
| 2014/0215513 A1 | 7/2014 | Ramer et al. |
| 2014/0218372 A1 | 8/2014 | Missig et al. |
| 2014/0222422 A1 | 8/2014 | Sarikaya et al. |
| 2014/0222435 A1 | 8/2014 | Li et al. |
| 2014/0222436 A1 | 8/2014 | Binder et al. |
| 2014/0222678 A1 | 8/2014 | Sheets et al. |
| 2014/0222967 A1 | 8/2014 | Harrang et al. |
| 2014/0223377 A1 | 8/2014 | Shaw et al. |
| 2014/0223481 A1 | 8/2014 | Fundament |
| 2014/0226503 A1 | 8/2014 | Cooper et al. |
| 2014/0229158 A1 | 8/2014 | Zweig et al. |
| 2014/0229184 A1 | 8/2014 | Shires |
| 2014/0230055 A1 | 8/2014 | Boehl |
| 2014/0232570 A1 | 8/2014 | Skinder et al. |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0237366 A1 | 8/2014 | Poulos et al. |
| 2014/0244248 A1 | 8/2014 | Arisoy et al. |
| 2014/0244249 A1 | 8/2014 | Mohamed et al. |
| 2014/0244254 A1 | 8/2014 | Ju et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244266 A1 | 8/2014 | Brown et al. |
| 2014/0244268 A1 | 8/2014 | Abdelsamie et al. |
| 2014/0244270 A1 | 8/2014 | Han et al. |
| 2014/0244271 A1 | 8/2014 | Lindahl |
| 2014/0244712 A1 | 8/2014 | Walters et al. |
| 2014/0245140 A1 | 8/2014 | Brown et al. |
| 2014/0247383 A1 | 9/2014 | Dave et al. |
| 2014/0247926 A1 | 9/2014 | Gainsboro et al. |
| 2014/0249812 A1 | 9/2014 | Bou-Ghazale et al. |
| 2014/0249816 A1 | 9/2014 | Pickering et al. |
| 2014/0249817 A1 | 9/2014 | Hart et al. |
| 2014/0249820 A1 | 9/2014 | Hsu et al. |
| 2014/0249821 A1 | 9/2014 | Kennewick et al. |
| 2014/0250046 A1 | 9/2014 | Winn et al. |
| 2014/0257809 A1 | 9/2014 | Goel et al. |
| 2014/0257815 A1 | 9/2014 | Zhao et al. |
| 2014/0257902 A1 | 9/2014 | Moore et al. |
| 2014/0258324 A1 | 9/2014 | Mauro et al. |
| 2014/0258357 A1 | 9/2014 | Singh et al. |
| 2014/0258857 A1 | 9/2014 | Dykstra-Erickson et al. |
| 2014/0258905 A1 | 9/2014 | Lee et al. |
| 2014/0267022 A1 | 9/2014 | Kim |
| 2014/0267599 A1 | 9/2014 | Drouin et al. |
| 2014/0267933 A1 | 9/2014 | Young |
| 2014/0272821 A1 | 9/2014 | Pitschel et al. |
| 2014/0273979 A1 | 9/2014 | Van Os et al. |
| 2014/0274005 A1 | 9/2014 | Luna et al. |
| 2014/0274203 A1 | 9/2014 | Ganong, III et al. |
| 2014/0274211 A1 | 9/2014 | Sejnoha et al. |
| 2014/0278051 A1 | 9/2014 | Mcgavran et al. |
| 2014/0278343 A1 | 9/2014 | Tran |
| 2014/0278349 A1 | 9/2014 | Grieves et al. |
| 2014/0278379 A1 | 9/2014 | Coccaro et al. |
| 2014/0278390 A1 | 9/2014 | Kingsbury et al. |
| 2014/0278391 A1 | 9/2014 | Braho et al. |
| 2014/0278394 A1 | 9/2014 | Bastyr et al. |
| 2014/0278406 A1 | 9/2014 | Tsumura et al. |
| 2014/0278413 A1 | 9/2014 | Pitschel et al. |
| 2014/0278426 A1 | 9/2014 | Jost et al. |
| 2014/0278429 A1 | 9/2014 | Ganong, III |
| 2014/0278435 A1 | 9/2014 | Ganong, III et al. |
| 2014/0278436 A1 | 9/2014 | Khanna et al. |
| 2014/0278438 A1 | 9/2014 | Hart et al. |
| 2014/0278443 A1 | 9/2014 | Gunn et al. |
| 2014/0278444 A1 | 9/2014 | Larson et al. |
| 2014/0278513 A1 | 9/2014 | Prakash et al. |
| 2014/0279622 A1 | 9/2014 | Lamoureux et al. |
| 2014/0279739 A1 | 9/2014 | Elkington et al. |
| 2014/0279787 A1 | 9/2014 | Cheng et al. |
| 2014/0280072 A1 | 9/2014 | Coleman |
| 2014/0280107 A1 | 9/2014 | Heymans et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0280450 A1 | 9/2014 | Luna |
| 2014/0280757 A1 | 9/2014 | Tran |
| 2014/0281944 A1 | 9/2014 | Winer |
| 2014/0281983 A1 | 9/2014 | Xian et al. |
| 2014/0281997 A1 | 9/2014 | Fleizach et al. |
| 2014/0282003 A1 | 9/2014 | Gruber et al. |
| 2014/0282007 A1 | 9/2014 | Fleizach |
| 2014/0282045 A1 | 9/2014 | Ayanam et al. |
| 2014/0282178 A1 | 9/2014 | Borzello et al. |
| 2014/0282201 A1 | 9/2014 | Pasquero et al. |
| 2014/0282203 A1 | 9/2014 | Pasquero et al. |
| 2014/0282559 A1 | 9/2014 | Verduzco et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0289508 A1 | 9/2014 | Wang |
| 2014/0297267 A1 | 10/2014 | Spencer et al. |
| 2014/0297281 A1 | 10/2014 | Togawa et al. |
| 2014/0297284 A1 | 10/2014 | Gruber et al. |
| 2014/0297288 A1 | 10/2014 | Yu et al. |
| 2014/0298395 A1 | 10/2014 | Yang et al. |
| 2014/0304086 A1 | 10/2014 | Dasdan et al. |
| 2014/0304605 A1 | 10/2014 | Ohmura et al. |
| 2014/0309990 A1 | 10/2014 | Gandrabur et al. |
| 2014/0309996 A1 | 10/2014 | Zhang |
| 2014/0310001 A1 | 10/2014 | Kalns et al. |
| 2014/0310002 A1 | 10/2014 | Nitz et al. |
| 2014/0310348 A1 | 10/2014 | Keskitalo et al. |
| 2014/0310365 A1 | 10/2014 | Sample et al. |
| 2014/0310595 A1 | 10/2014 | Acharya et al. |
| 2014/0313007 A1 | 10/2014 | Harding |
| 2014/0315492 A1 | 10/2014 | Woods |
| 2014/0316585 A1 | 10/2014 | Boesveld et al. |
| 2014/0317030 A1 | 10/2014 | Shen et al. |
| 2014/0317502 A1 | 10/2014 | Brown et al. |
| 2014/0324429 A1 | 10/2014 | Weilhammer et al. |
| 2014/0324884 A1 | 10/2014 | Lindahl et al. |
| 2014/0330560 A1 | 11/2014 | Venkatesha et al. |
| 2014/0330569 A1 | 11/2014 | Kolavennu et al. |
| 2014/0330951 A1 | 11/2014 | Sukoff et al. |
| 2014/0335823 A1 | 11/2014 | Heredia et al. |
| 2014/0337037 A1 | 11/2014 | Chi |
| 2014/0337048 A1 | 11/2014 | Brown et al. |
| 2014/0337266 A1 | 11/2014 | Wolverton et al. |
| 2014/0337370 A1 | 11/2014 | Aravamudan et al. |
| 2014/0337371 A1 | 11/2014 | Li |
| 2014/0337438 A1 | 11/2014 | Govande et al. |
| 2014/0337621 A1 | 11/2014 | Nakhimov |
| 2014/0337751 A1 | 11/2014 | Lim et al. |
| 2014/0337814 A1 | 11/2014 | Kalns et al. |
| 2014/0342762 A1 | 11/2014 | Hajdu et al. |
| 2014/0343834 A1 | 11/2014 | Demerchant et al. |
| 2014/0343943 A1 | 11/2014 | Al-telmissani |

(56) References Cited

U.S. PATENT DOCUMENTS

| | | |
|---|---|---|
| 2014/0343946 A1 | 11/2014 | Torok et al. |
| 2014/0344205 A1 | 11/2014 | Luna et al. |
| 2014/0344627 A1 | 11/2014 | Schaub et al. |
| 2014/0344687 A1 | 11/2014 | Durham et al. |
| 2014/0347181 A1 | 11/2014 | Luna et al. |
| 2014/0350847 A1 | 11/2014 | Ichinokawa |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |
| 2014/0358521 A1 | 12/2014 | Mikutel et al. |
| 2014/0358523 A1 | 12/2014 | Sheth et al. |
| 2014/0358549 A1 | 12/2014 | O'connor et al. |
| 2014/0359637 A1 | 12/2014 | Yan |
| 2014/0359709 A1 | 12/2014 | Nassar et al. |
| 2014/0361973 A1 | 12/2014 | Raux et al. |
| 2014/0363074 A1 | 12/2014 | Dolfing et al. |
| 2014/0364149 A1 | 12/2014 | Marti et al. |
| 2014/0365209 A1 | 12/2014 | Evermann |
| 2014/0365214 A1 | 12/2014 | Bayley |
| 2014/0365216 A1 | 12/2014 | Gruber et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365505 A1 | 12/2014 | Clark et al. |
| 2014/0365880 A1 | 12/2014 | Bellegarda |
| 2014/0365885 A1 | 12/2014 | Carson et al. |
| 2014/0365895 A1 | 12/2014 | Magahern et al. |
| 2014/0365922 A1 | 12/2014 | Yang |
| 2014/0365945 A1 | 12/2014 | Karunamuni et al. |
| 2014/0370817 A1 | 12/2014 | Luna |
| 2014/0370841 A1 | 12/2014 | Roberts et al. |
| 2014/0372112 A1 | 12/2014 | Xue et al. |
| 2014/0372356 A1 | 12/2014 | Bilal et al. |
| 2014/0372468 A1 | 12/2014 | Collins et al. |
| 2014/0372931 A1 | 12/2014 | Zhai et al. |
| 2014/0379326 A1 | 12/2014 | Sarikaya et al. |
| 2014/0379334 A1 | 12/2014 | Fry |
| 2014/0379338 A1 | 12/2014 | Fry |
| 2014/0379341 A1 | 12/2014 | Seo et al. |
| 2014/0379798 A1 | 12/2014 | Bunner et al. |
| 2014/0380285 A1 | 12/2014 | Gabel et al. |
| 2015/0003797 A1 | 1/2015 | Schmidt |
| 2015/0004958 A1 | 1/2015 | Wang et al. |
| 2015/0005009 A1 | 1/2015 | Tomkins et al. |
| 2015/0006148 A1 | 1/2015 | Goldszmit et al. |
| 2015/0006157 A1 | 1/2015 | Silva et al. |
| 2015/0006167 A1 | 1/2015 | Kato et al. |
| 2015/0006176 A1 | 1/2015 | Pogue et al. |
| 2015/0006178 A1 | 1/2015 | Peng et al. |
| 2015/0006184 A1 | 1/2015 | Marti et al. |
| 2015/0006199 A1 | 1/2015 | Snider et al. |
| 2015/0012271 A1 | 1/2015 | Peng et al. |
| 2015/0012862 A1 | 1/2015 | Ikeda et al. |
| 2015/0019219 A1 | 1/2015 | Tzirkel-Hancock et al. |
| 2015/0019221 A1 | 1/2015 | Lee et al. |
| 2015/0019445 A1 | 1/2015 | Glass et al. |
| 2015/0019944 A1 | 1/2015 | Kalgi |
| 2015/0019954 A1 | 1/2015 | Dalal et al. |
| 2015/0019974 A1 | 1/2015 | Doi et al. |
| 2015/0025405 A1 | 1/2015 | Vairavan et al. |
| 2015/0025890 A1 | 1/2015 | Jagatheesan et al. |
| 2015/0026620 A1 | 1/2015 | Kwon et al. |
| 2015/0027178 A1 | 1/2015 | Scalisi |
| 2015/0031416 A1 | 1/2015 | Labowicz et al. |
| 2015/0032443 A1 | 1/2015 | Karov et al. |
| 2015/0032457 A1 | 1/2015 | Koo et al. |
| 2015/0033219 A1 | 1/2015 | Breiner et al. |
| 2015/0033275 A1 | 1/2015 | Natani et al. |
| 2015/0034855 A1 | 2/2015 | Shen |
| 2015/0038161 A1 | 2/2015 | Jakobson et al. |
| 2015/0039292 A1 | 2/2015 | Suleman et al. |
| 2015/0039295 A1 | 2/2015 | Soschen |
| 2015/0039299 A1 | 2/2015 | Weinstein et al. |
| 2015/0039305 A1 | 2/2015 | Huang |
| 2015/0039606 A1 | 2/2015 | Salaka et al. |
| 2015/0040012 A1 | 2/2015 | Faaborg et al. |
| 2015/0045003 A1 | 2/2015 | Vora et al. |
| 2015/0045007 A1 | 2/2015 | Cash |
| 2015/0045068 A1 | 2/2015 | Soffer et al. |
| 2015/0046434 A1 | 2/2015 | Lim et al. |
| 2015/0046537 A1 | 2/2015 | Rakib |
| 2015/0046828 A1 | 2/2015 | Desai et al. |
| 2015/0050633 A1 | 2/2015 | Christmas et al. |
| 2015/0050923 A1 | 2/2015 | Tu et al. |
| 2015/0051754 A1 | 2/2015 | Kwon et al. |
| 2015/0053779 A1 | 2/2015 | Adamek et al. |
| 2015/0053781 A1 | 2/2015 | Nelson et al. |
| 2015/0055879 A1 | 2/2015 | Yang |
| 2015/0058013 A1 | 2/2015 | Pakhomov et al. |
| 2015/0058018 A1 | 2/2015 | Georges et al. |
| 2015/0058720 A1 | 2/2015 | Smadja et al. |
| 2015/0058785 A1 | 2/2015 | Ookawara |
| 2015/0065149 A1 | 3/2015 | Russell et al. |
| 2015/0065200 A1 | 3/2015 | Namgung et al. |
| 2015/0066479 A1 | 3/2015 | Pasupalak et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0066817 A1 | 3/2015 | Slayton et al. |
| 2015/0067485 A1 | 3/2015 | Kim et al. |
| 2015/0067819 A1 | 3/2015 | Shribman et al. |
| 2015/0067822 A1 | 3/2015 | Randall |
| 2015/0071121 A1 | 3/2015 | Patil et al. |
| 2015/0073788 A1 | 3/2015 | Sak et al. |
| 2015/0073804 A1 | 3/2015 | Senior et al. |
| 2015/0074524 A1 | 3/2015 | Nicholson et al. |
| 2015/0074615 A1 | 3/2015 | Han et al. |
| 2015/0081295 A1 | 3/2015 | Yun et al. |
| 2015/0082180 A1 | 3/2015 | Ames et al. |
| 2015/0082229 A1 | 3/2015 | Ouyang et al. |
| 2015/0086174 A1 | 3/2015 | Abecassis et al. |
| 2015/0088511 A1 | 3/2015 | Bharadwaj et al. |
| 2015/0088514 A1 | 3/2015 | Typrin |
| 2015/0088518 A1 | 3/2015 | Kim et al. |
| 2015/0088522 A1 | 3/2015 | Hendrickson et al. |
| 2015/0088523 A1 | 3/2015 | Schuster |
| 2015/0088998 A1 | 3/2015 | Isensee et al. |
| 2015/0092520 A1 | 4/2015 | Robison et al. |
| 2015/0094834 A1 | 4/2015 | Vega et al. |
| 2015/0095031 A1 | 4/2015 | Conkie et al. |
| 2015/0095159 A1 | 4/2015 | Kennewick et al. |
| 2015/0095268 A1 | 4/2015 | Greenzeiger et al. |
| 2015/0095278 A1 | 4/2015 | Flinn et al. |
| 2015/0100144 A1 | 4/2015 | Lee et al. |
| 2015/0100313 A1 | 4/2015 | Sharma |
| 2015/0100316 A1 | 4/2015 | Williams et al. |
| 2015/0100537 A1 | 4/2015 | Grieves et al. |
| 2015/0100983 A1 | 4/2015 | Pan |
| 2015/0106061 A1 | 4/2015 | Yang et al. |
| 2015/0106085 A1 | 4/2015 | Lindahl |
| 2015/0106093 A1 | 4/2015 | Weeks et al. |
| 2015/0106737 A1 | 4/2015 | Montoy-Wilson et al. |
| 2015/0112684 A1 | 4/2015 | Scheffer et al. |
| 2015/0113407 A1 | 4/2015 | Hoffert et al. |
| 2015/0113435 A1 | 4/2015 | Phillips |
| 2015/0120296 A1 | 4/2015 | Stern et al. |
| 2015/0120641 A1 | 4/2015 | Soon-Shiong et al. |
| 2015/0120723 A1 | 4/2015 | Deshmukh et al. |
| 2015/0121216 A1 | 4/2015 | Brown et al. |
| 2015/0123898 A1 | 5/2015 | Kim et al. |
| 2015/0127337 A1 | 5/2015 | Heigold et al. |
| 2015/0127348 A1 | 5/2015 | Follis |
| 2015/0127350 A1 | 5/2015 | Agiomyrgiannakis |
| 2015/0128058 A1 | 5/2015 | Anajwala |
| 2015/0133049 A1 | 5/2015 | Lee et al. |
| 2015/0133109 A1 | 5/2015 | Freeman et al. |
| 2015/0134318 A1 | 5/2015 | Cuthbert et al. |
| 2015/0134322 A1 | 5/2015 | Cuthbert et al. |
| 2015/0134323 A1 | 5/2015 | Cuthbert et al. |
| 2015/0134334 A1 | 5/2015 | Sachidanandam et al. |
| 2015/0135085 A1 | 5/2015 | Shoham et al. |

(56) References Cited

U.S. PATENT DOCUMENTS

| | | |
|---|---|---|
| 2015/0135123 A1 | 5/2015 | Carr et al. |
| 2015/0140934 A1 | 5/2015 | Abdurrahman et al. |
| 2015/0140990 A1 | 5/2015 | Kim et al. |
| 2015/0141150 A1 | 5/2015 | Zha |
| 2015/0142420 A1 | 5/2015 | Sarikaya et al. |
| 2015/0142438 A1 | 5/2015 | Dai et al. |
| 2015/0142440 A1 | 5/2015 | Parkinson et al. |
| 2015/0142447 A1 | 5/2015 | Kennewick et al. |
| 2015/0142851 A1 | 5/2015 | Gupta et al. |
| 2015/0143419 A1 | 5/2015 | Bhagwat et al. |
| 2015/0148013 A1 | 5/2015 | Baldwin et al. |
| 2015/0149177 A1 | 5/2015 | Kalns et al. |
| 2015/0149182 A1 | 5/2015 | Kalns et al. |
| 2015/0149354 A1 | 5/2015 | Mccoy |
| 2015/0149469 A1 | 5/2015 | Xu et al. |
| 2015/0149899 A1 | 5/2015 | Bernstein et al. |
| 2015/0149964 A1 | 5/2015 | Bernstein et al. |
| 2015/0154001 A1 | 6/2015 | Knox et al. |
| 2015/0154185 A1 | 6/2015 | Waibel |
| 2015/0154976 A1 | 6/2015 | Mutagi |
| 2015/0160855 A1 | 6/2015 | Bi |
| 2015/0161291 A1 | 6/2015 | Gur et al. |
| 2015/0161370 A1 | 6/2015 | North et al. |
| 2015/0161521 A1 | 6/2015 | Shah et al. |
| 2015/0161989 A1 | 6/2015 | Hsu et al. |
| 2015/0162000 A1 | 6/2015 | Di Censo et al. |
| 2015/0162001 A1 | 6/2015 | Kar et al. |
| 2015/0162006 A1 | 6/2015 | Kummer |
| 2015/0163558 A1 | 6/2015 | Wheatley |
| 2015/0169081 A1 | 6/2015 | Neels et al. |
| 2015/0169284 A1 | 6/2015 | Quast et al. |
| 2015/0169336 A1 | 6/2015 | Harper et al. |
| 2015/0169696 A1 | 6/2015 | Krishnappa et al. |
| 2015/0170073 A1 | 6/2015 | Baker |
| 2015/0170664 A1 | 6/2015 | Doherty et al. |
| 2015/0172262 A1 | 6/2015 | Ortiz, Jr. et al. |
| 2015/0172463 A1 | 6/2015 | Quast et al. |
| 2015/0178388 A1 | 6/2015 | Winnemoeller et al. |
| 2015/0178785 A1 | 6/2015 | Salonen |
| 2015/0179168 A1 | 6/2015 | Hakkani-Tur et al. |
| 2015/0179176 A1 | 6/2015 | Ryu et al. |
| 2015/0181285 A1 | 6/2015 | Zhang et al. |
| 2015/0185964 A1 | 7/2015 | Stout |
| 2015/0185993 A1 | 7/2015 | Wheatley et al. |
| 2015/0185996 A1 | 7/2015 | Brown et al. |
| 2015/0186012 A1 | 7/2015 | Coleman et al. |
| 2015/0186110 A1 | 7/2015 | Kannan |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0186351 A1 | 7/2015 | Hicks et al. |
| 2015/0186538 A1 | 7/2015 | Yan et al. |
| 2015/0186783 A1 | 7/2015 | Byrne et al. |
| 2015/0186892 A1 | 7/2015 | Zhang et al. |
| 2015/0187355 A1 | 7/2015 | Parkinson et al. |
| 2015/0187369 A1 | 7/2015 | Dadu et al. |
| 2015/0189362 A1 | 7/2015 | Lee et al. |
| 2015/0193379 A1 | 7/2015 | Mehta |
| 2015/0193391 A1 | 7/2015 | Khvostichenko et al. |
| 2015/0193392 A1 | 7/2015 | Greenblatt et al. |
| 2015/0194152 A1 | 7/2015 | Katuri et al. |
| 2015/0194165 A1 | 7/2015 | Faaborg et al. |
| 2015/0195379 A1 | 7/2015 | Zhang et al. |
| 2015/0195606 A1 | 7/2015 | McDevitt |
| 2015/0199077 A1 | 7/2015 | Zuger et al. |
| 2015/0199960 A1 | 7/2015 | Huo et al. |
| 2015/0199965 A1 | 7/2015 | Leak et al. |
| 2015/0199967 A1 | 7/2015 | Reddy et al. |
| 2015/0200879 A1 | 7/2015 | Wu et al. |
| 2015/0201064 A1 | 7/2015 | Bells et al. |
| 2015/0201077 A1 | 7/2015 | Konig et al. |
| 2015/0205425 A1 | 7/2015 | Kuscher et al. |
| 2015/0205568 A1 | 7/2015 | Matsuoka |
| 2015/0205632 A1 | 7/2015 | Gaster |
| 2015/0205858 A1 | 7/2015 | Xie et al. |
| 2015/0206529 A1 | 7/2015 | Kwon et al. |
| 2015/0208226 A1 | 7/2015 | Kuusilinna et al. |
| 2015/0212791 A1 | 7/2015 | Kumar et al. |
| 2015/0213140 A1 | 7/2015 | Volkert |
| 2015/0213796 A1 | 7/2015 | Waltermann et al. |
| 2015/0215258 A1 | 7/2015 | Nowakowski et al. |
| 2015/0215350 A1 | 7/2015 | Slayton et al. |
| 2015/0217870 A1 | 8/2015 | Mccullough et al. |
| 2015/0220264 A1 | 8/2015 | Lewis et al. |
| 2015/0220507 A1 | 8/2015 | Mohajer et al. |
| 2015/0220715 A1 | 8/2015 | Kim et al. |
| 2015/0220972 A1 | 8/2015 | Subramanya et al. |
| 2015/0221302 A1 | 8/2015 | Han et al. |
| 2015/0221304 A1 | 8/2015 | Stewart |
| 2015/0221307 A1 | 8/2015 | Shah et al. |
| 2015/0222586 A1 | 8/2015 | Ebersman et al. |
| 2015/0224848 A1 | 8/2015 | Eisenhour |
| 2015/0227505 A1 | 8/2015 | Morimoto |
| 2015/0227633 A1 | 8/2015 | Shapira |
| 2015/0228274 A1 | 8/2015 | Leppanen et al. |
| 2015/0228275 A1 | 8/2015 | Watanabe et al. |
| 2015/0228281 A1 | 8/2015 | Raniere |
| 2015/0228282 A1 | 8/2015 | Evrard |
| 2015/0228283 A1 | 8/2015 | Ehsani et al. |
| 2015/0228292 A1 | 8/2015 | Goldstein et al. |
| 2015/0230095 A1 | 8/2015 | Smith et al. |
| 2015/0234556 A1 | 8/2015 | Shaofeng et al. |
| 2015/0234636 A1 | 8/2015 | Barnes, Jr. |
| 2015/0234800 A1 | 8/2015 | Patrick et al. |
| 2015/0235434 A1 | 8/2015 | Miller et al. |
| 2015/0237301 A1 | 8/2015 | Shi et al. |
| 2015/0242091 A1 | 8/2015 | Lu et al. |
| 2015/0242385 A1 | 8/2015 | Bao et al. |
| 2015/0243278 A1 | 8/2015 | Kibre et al. |
| 2015/0243279 A1 | 8/2015 | Morse et al. |
| 2015/0243283 A1 | 8/2015 | Halash et al. |
| 2015/0244665 A1 | 8/2015 | Choi et al. |
| 2015/0245154 A1 | 8/2015 | Dadu et al. |
| 2015/0248651 A1 | 9/2015 | Akutagawa et al. |
| 2015/0248886 A1 | 9/2015 | Sarikaya et al. |
| 2015/0249715 A1 | 9/2015 | Helvik et al. |
| 2015/0253146 A1 | 9/2015 | Annapureddy et al. |
| 2015/0253885 A1 | 9/2015 | Kagan et al. |
| 2015/0254057 A1 | 9/2015 | Klein et al. |
| 2015/0254058 A1 | 9/2015 | Klein et al. |
| 2015/0254333 A1 | 9/2015 | Fife et al. |
| 2015/0255068 A1 | 9/2015 | Kim et al. |
| 2015/0255071 A1 | 9/2015 | Chiba |
| 2015/0256873 A1 | 9/2015 | Klein et al. |
| 2015/0261298 A1 | 9/2015 | Li |
| 2015/0261496 A1 | 9/2015 | Faaborg et al. |
| 2015/0261850 A1 | 9/2015 | Mittal |
| 2015/0261944 A1 | 9/2015 | Hosom et al. |
| 2015/0262583 A1 | 9/2015 | Kanda et al. |
| 2015/0269139 A1 | 9/2015 | McAteer et al. |
| 2015/0269617 A1 | 9/2015 | Mikurak |
| 2015/0269677 A1 | 9/2015 | Milne |
| 2015/0269943 A1 | 9/2015 | VanBlon et al. |
| 2015/0277574 A1 | 10/2015 | Jain et al. |
| 2015/0278199 A1 | 10/2015 | Hazen et al. |
| 2015/0278348 A1 | 10/2015 | Paruchuri et al. |
| 2015/0278370 A1 | 10/2015 | Stratvert et al. |
| 2015/0278737 A1 | 10/2015 | Chen Huebscher et al. |
| 2015/0279358 A1 | 10/2015 | Kingsbury et al. |
| 2015/0279360 A1 | 10/2015 | Mengibar et al. |
| 2015/0279366 A1 | 10/2015 | Krestnikov et al. |
| 2015/0281380 A1 | 10/2015 | Wang et al. |
| 2015/0281401 A1 | 10/2015 | Le et al. |
| 2015/0286627 A1 | 10/2015 | Chang et al. |
| 2015/0286716 A1 | 10/2015 | Snibbe et al. |
| 2015/0286937 A1 | 10/2015 | Hildebrand |
| 2015/0287401 A1 | 10/2015 | Lee et al. |
| 2015/0287408 A1 | 10/2015 | Svendsen et al. |
| 2015/0287409 A1 | 10/2015 | Jang |
| 2015/0287411 A1 | 10/2015 | Kojima et al. |
| 2015/0288629 A1 | 10/2015 | Choi et al. |
| 2015/0294086 A1 | 10/2015 | Kare et al. |
| 2015/0294377 A1 | 10/2015 | Chow |
| 2015/0294516 A1 | 10/2015 | Chiang |

(56) References Cited

U.S. PATENT DOCUMENTS

| | | |
|---|---|---|
| 2015/0294670 A1 | 10/2015 | Roblek et al. |
| 2015/0295915 A1 | 10/2015 | Xiu |
| 2015/0296065 A1 | 10/2015 | Narita et al. |
| 2015/0301796 A1 | 10/2015 | Visser et al. |
| 2015/0302316 A1 | 10/2015 | Buryak et al. |
| 2015/0302855 A1 | 10/2015 | Kim et al. |
| 2015/0302856 A1 | 10/2015 | Kim et al. |
| 2015/0302857 A1 | 10/2015 | Yamada |
| 2015/0302870 A1 | 10/2015 | Burke et al. |
| 2015/0308470 A1 | 10/2015 | Graham et al. |
| 2015/0309691 A1 | 10/2015 | Seo et al. |
| 2015/0309997 A1 | 10/2015 | Lee et al. |
| 2015/0310114 A1 | 10/2015 | Ryger et al. |
| 2015/0310858 A1 | 10/2015 | Li et al. |
| 2015/0310862 A1 | 10/2015 | Dauphin et al. |
| 2015/0310879 A1 | 10/2015 | Buchanan et al. |
| 2015/0310888 A1 | 10/2015 | Chen |
| 2015/0312182 A1 | 10/2015 | Langholz |
| 2015/0312409 A1 | 10/2015 | Czarnecki et al. |
| 2015/0314454 A1 | 11/2015 | Breazeal et al. |
| 2015/0317069 A1 | 11/2015 | Clements et al. |
| 2015/0317310 A1 | 11/2015 | Eiche et al. |
| 2015/0319264 A1 | 11/2015 | Allen et al. |
| 2015/0319411 A1 | 11/2015 | Kasmir et al. |
| 2015/0324041 A1 | 11/2015 | Varley et al. |
| 2015/0324334 A1 | 11/2015 | Lee et al. |
| 2015/0324362 A1 | 11/2015 | Glass et al. |
| 2015/0331664 A1 | 11/2015 | Osawa et al. |
| 2015/0331711 A1 | 11/2015 | Huang et al. |
| 2015/0332667 A1 | 11/2015 | Mason |
| 2015/0334346 A1 | 11/2015 | Cheatham, III et al. |
| 2015/0339049 A1 | 11/2015 | Kasemset et al. |
| 2015/0339391 A1 | 11/2015 | Kang et al. |
| 2015/0340033 A1 | 11/2015 | Di Fabbrizio et al. |
| 2015/0340034 A1 | 11/2015 | Schalkwyk et al. |
| 2015/0340040 A1 | 11/2015 | Mun et al. |
| 2015/0340042 A1 | 11/2015 | Sejnoha et al. |
| 2015/0341717 A1 | 11/2015 | Song et al. |
| 2015/0346845 A1 | 12/2015 | Di Censo et al. |
| 2015/0347086 A1 | 12/2015 | Liedholm et al. |
| 2015/0347381 A1 | 12/2015 | Bellegarda |
| 2015/0347382 A1 | 12/2015 | Dolfing et al. |
| 2015/0347383 A1 | 12/2015 | Willmore et al. |
| 2015/0347385 A1 | 12/2015 | Flor et al. |
| 2015/0347393 A1 | 12/2015 | Futrell et al. |
| 2015/0347552 A1 | 12/2015 | Habouzit et al. |
| 2015/0347733 A1 | 12/2015 | Tsou et al. |
| 2015/0347985 A1 | 12/2015 | Gross et al. |
| 2015/0348533 A1 | 12/2015 | Saddler et al. |
| 2015/0348547 A1 | 12/2015 | Paulik et al. |
| 2015/0348548 A1 | 12/2015 | Piernot et al. |
| 2015/0348549 A1 | 12/2015 | Giuli et al. |
| 2015/0348551 A1 | 12/2015 | Gruber et al. |
| 2015/0348554 A1 | 12/2015 | Orr et al. |
| 2015/0348555 A1 | 12/2015 | Sugita |
| 2015/0348565 A1 | 12/2015 | Rhoten et al. |
| 2015/0349934 A1 | 12/2015 | Pollack et al. |
| 2015/0350031 A1 | 12/2015 | Burks et al. |
| 2015/0350342 A1 | 12/2015 | Thorpe et al. |
| 2015/0350594 A1 | 12/2015 | Mate et al. |
| 2015/0352999 A1 | 12/2015 | Bando et al. |
| 2015/0355879 A1 | 12/2015 | Beckhardt et al. |
| 2015/0356410 A1 | 12/2015 | Faith et al. |
| 2015/0363587 A1 | 12/2015 | Ahn et al. |
| 2015/0364128 A1 | 12/2015 | Zhao et al. |
| 2015/0364140 A1 | 12/2015 | Thörn |
| 2015/0365251 A1 | 12/2015 | Kinoshita et al. |
| 2015/0370531 A1 | 12/2015 | Faaborg |
| 2015/0370780 A1 | 12/2015 | Wang et al. |
| 2015/0370787 A1 | 12/2015 | Akbacak et al. |
| 2015/0370884 A1 | 12/2015 | Hurley et al. |
| 2015/0371215 A1 | 12/2015 | Zhou et al. |
| 2015/0371529 A1 | 12/2015 | Dolecki |
| 2015/0371639 A1 | 12/2015 | Foerster et al. |
| 2015/0371663 A1 | 12/2015 | Gustafson et al. |
| 2015/0371664 A1 | 12/2015 | Bar-Or et al. |
| 2015/0371665 A1 | 12/2015 | Naik et al. |
| 2015/0373183 A1 | 12/2015 | Woolsey et al. |
| 2015/0379118 A1 | 12/2015 | Wickenkamp et al. |
| 2015/0379414 A1 | 12/2015 | Yeh et al. |
| 2015/0379993 A1 | 12/2015 | Subhojit et al. |
| 2015/0381923 A1 | 12/2015 | Wickenkamp et al. |
| 2015/0382047 A1 | 12/2015 | Van Os et al. |
| 2015/0382079 A1 | 12/2015 | Lister et al. |
| 2015/0382147 A1 | 12/2015 | Clark et al. |
| 2016/0004499 A1 | 1/2016 | Kim et al. |
| 2016/0004690 A1 | 1/2016 | Bangalore et al. |
| 2016/0005320 A1 | 1/2016 | deCharms et al. |
| 2016/0006795 A1 | 1/2016 | Yunten |
| 2016/0012038 A1 | 1/2016 | Edwards et al. |
| 2016/0014476 A1 | 1/2016 | Caliendo, Jr. et al. |
| 2016/0018872 A1 | 1/2016 | Tu et al. |
| 2016/0018900 A1 | 1/2016 | Tu et al. |
| 2016/0018959 A1 | 1/2016 | Yamashita et al. |
| 2016/0019886 A1 | 1/2016 | Hong |
| 2016/0021414 A1 | 1/2016 | Padi et al. |
| 2016/0026242 A1 | 1/2016 | Burns et al. |
| 2016/0026258 A1 | 1/2016 | Ou et al. |
| 2016/0027431 A1 | 1/2016 | Kurzweil et al. |
| 2016/0028666 A1 | 1/2016 | Li |
| 2016/0028802 A1 | 1/2016 | Balasingh et al. |
| 2016/0029316 A1 | 1/2016 | Mohan et al. |
| 2016/0034042 A1 | 2/2016 | Joo |
| 2016/0034811 A1 | 2/2016 | Paulik et al. |
| 2016/0036750 A1 | 2/2016 | Yuan et al. |
| 2016/0036953 A1 | 2/2016 | Lee et al. |
| 2016/0041809 A1 | 2/2016 | Clayton et al. |
| 2016/0042735 A1 | 2/2016 | Vibbert et al. |
| 2016/0042748 A1 | 2/2016 | Jain et al. |
| 2016/0043905 A1 | 2/2016 | Fiedler |
| 2016/0048666 A1 | 2/2016 | Dey et al. |
| 2016/0050254 A1 | 2/2016 | Rao et al. |
| 2016/0055422 A1 | 2/2016 | Li |
| 2016/0061623 A1 | 3/2016 | Pahwa et al. |
| 2016/0062459 A1 | 3/2016 | Publicover et al. |
| 2016/0062605 A1 | 3/2016 | Agarwal et al. |
| 2016/0063094 A1 | 3/2016 | Udupa et al. |
| 2016/0063095 A1 | 3/2016 | Nassar et al. |
| 2016/0063998 A1 | 3/2016 | Krishnamoorthy et al. |
| 2016/0065155 A1 | 3/2016 | Bharj et al. |
| 2016/0065626 A1 | 3/2016 | Jain et al. |
| 2016/0066020 A1 | 3/2016 | Mountain |
| 2016/0070581 A1 | 3/2016 | Soon-Shiong |
| 2016/0071516 A1 | 3/2016 | Lee et al. |
| 2016/0071517 A1 | 3/2016 | Beaver et al. |
| 2016/0071521 A1 | 3/2016 | Haughay |
| 2016/0072940 A1 | 3/2016 | Cronin |
| 2016/0077794 A1 | 3/2016 | Kim et al. |
| 2016/0078359 A1 | 3/2016 | Csurka et al. |
| 2016/0078860 A1 | 3/2016 | Paulik et al. |
| 2016/0080165 A1 | 3/2016 | Ehsani et al. |
| 2016/0080475 A1 | 3/2016 | Singh et al. |
| 2016/0085295 A1 | 3/2016 | Shimy et al. |
| 2016/0085827 A1 | 3/2016 | Chadha et al. |
| 2016/0086116 A1 | 3/2016 | Rao et al. |
| 2016/0086599 A1 | 3/2016 | Kurata et al. |
| 2016/0088335 A1 | 3/2016 | Zucchetta |
| 2016/0091871 A1 | 3/2016 | Marti et al. |
| 2016/0091967 A1 | 3/2016 | Prokofieva et al. |
| 2016/0092046 A1 | 3/2016 | Hong et al. |
| 2016/0092434 A1 | 3/2016 | Bellegarda |
| 2016/0092447 A1 | 3/2016 | Pathurudeen et al. |
| 2016/0092766 A1 | 3/2016 | Sainath et al. |
| 2016/0093291 A1 | 3/2016 | Kim |
| 2016/0093298 A1 | 3/2016 | Naik et al. |
| 2016/0093301 A1 | 3/2016 | Bellegarda et al. |
| 2016/0093304 A1 | 3/2016 | Kim et al. |
| 2016/0094700 A1 | 3/2016 | Lee et al. |
| 2016/0094889 A1 | 3/2016 | Venkataraman et al. |
| 2016/0094979 A1 | 3/2016 | Naik et al. |
| 2016/0098991 A1 | 4/2016 | Luo et al. |
| 2016/0098992 A1 | 4/2016 | Renard et al. |
| 2016/0099892 A1 | 4/2016 | Palakovich et al. |
| 2016/0099984 A1 | 4/2016 | Karagiannis et al. |

(56) References Cited

U.S. PATENT DOCUMENTS

| | | |
|---|---|---|
| 2016/0104480 A1 | 4/2016 | Sharifi |
| 2016/0104486 A1 | 4/2016 | Penilla et al. |
| 2016/0111091 A1 | 4/2016 | Bakish |
| 2016/0112746 A1 | 4/2016 | Zhang et al. |
| 2016/0112792 A1 | 4/2016 | Lee et al. |
| 2016/0117386 A1 | 4/2016 | Ajmera et al. |
| 2016/0118048 A1 | 4/2016 | Heide |
| 2016/0119338 A1 | 4/2016 | Cheyer |
| 2016/0125048 A1 | 5/2016 | Hamada |
| 2016/0125071 A1 | 5/2016 | Gabbai |
| 2016/0132046 A1 | 5/2016 | Beoughter et al. |
| 2016/0132290 A1 | 5/2016 | Raux |
| 2016/0132484 A1 | 5/2016 | Nauze et al. |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0140951 A1 | 5/2016 | Agiomyrgiannakis et al. |
| 2016/0140962 A1 | 5/2016 | Sharifi |
| 2016/0147725 A1 | 5/2016 | Patten et al. |
| 2016/0148610 A1 | 5/2016 | Kennewick, Jr. et al. |
| 2016/0148612 A1 | 5/2016 | Guo et al. |
| 2016/0149966 A1 | 5/2016 | Remash et al. |
| 2016/0150020 A1 | 5/2016 | Farmer et al. |
| 2016/0151668 A1 | 6/2016 | Barnes et al. |
| 2016/0154624 A1 | 6/2016 | Son et al. |
| 2016/0154880 A1 | 6/2016 | Hoarty |
| 2016/0155442 A1 | 6/2016 | Kannan et al. |
| 2016/0155443 A1 | 6/2016 | Khan et al. |
| 2016/0156574 A1 | 6/2016 | Hum et al. |
| 2016/0162456 A1 | 6/2016 | Munro et al. |
| 2016/0163311 A1 | 6/2016 | Crook et al. |
| 2016/0163312 A1 | 6/2016 | Naik et al. |
| 2016/0170710 A1 | 6/2016 | Kim et al. |
| 2016/0170966 A1 | 6/2016 | Kolo |
| 2016/0171980 A1 | 6/2016 | Liddell et al. |
| 2016/0173578 A1 | 6/2016 | Sharma et al. |
| 2016/0173617 A1 | 6/2016 | Allinson |
| 2016/0173960 A1 | 6/2016 | Snibbe et al. |
| 2016/0179462 A1 | 6/2016 | Bjorkengren |
| 2016/0179464 A1 | 6/2016 | Reddy et al. |
| 2016/0179787 A1 | 6/2016 | Deleeuw |
| 2016/0180840 A1 | 6/2016 | Siddiq et al. |
| 2016/0180844 A1 | 6/2016 | Vanblon et al. |
| 2016/0182410 A1 | 6/2016 | Janakiraman et al. |
| 2016/0182709 A1 | 6/2016 | Kim et al. |
| 2016/0188181 A1 | 6/2016 | Smith |
| 2016/0188738 A1 | 6/2016 | Gruber et al. |
| 2016/0189198 A1 | 6/2016 | Daniel et al. |
| 2016/0189715 A1 | 6/2016 | Nishikawa |
| 2016/0189717 A1 | 6/2016 | Kannan et al. |
| 2016/0196110 A1 | 7/2016 | Yehoshua et al. |
| 2016/0198319 A1 | 7/2016 | Huang et al. |
| 2016/0203002 A1 | 7/2016 | Kannan et al. |
| 2016/0203193 A1 | 7/2016 | Kevin et al. |
| 2016/0210551 A1 | 7/2016 | Lee et al. |
| 2016/0210981 A1 | 7/2016 | Lee |
| 2016/0212206 A1 | 7/2016 | Wu et al. |
| 2016/0212208 A1 | 7/2016 | Kulkarni et al. |
| 2016/0212488 A1 | 7/2016 | Os et al. |
| 2016/0217784 A1 | 7/2016 | Gelfenbeyn et al. |
| 2016/0217794 A1 | 7/2016 | Imoto et al. |
| 2016/0224540 A1 | 8/2016 | Stewart et al. |
| 2016/0224559 A1 | 8/2016 | Hicks et al. |
| 2016/0224774 A1 | 8/2016 | Pender |
| 2016/0225372 A1 | 8/2016 | Cheung et al. |
| 2016/0227107 A1 | 8/2016 | Beaumont |
| 2016/0227633 A1 | 8/2016 | Sun et al. |
| 2016/0232500 A1 | 8/2016 | Wang et al. |
| 2016/0239568 A1 | 8/2016 | Packer et al. |
| 2016/0239645 A1 | 8/2016 | Heo et al. |
| 2016/0239848 A1 | 8/2016 | Chang et al. |
| 2016/0240187 A1 | 8/2016 | Fleizach et al. |
| 2016/0240189 A1 | 8/2016 | Lee et al. |
| 2016/0240192 A1 | 8/2016 | Raghuvir |
| 2016/0247061 A1 | 8/2016 | Trask et al. |
| 2016/0249319 A1 | 8/2016 | Dotan-Cohen et al. |
| 2016/0253312 A1 | 9/2016 | Rhodes |
| 2016/0253528 A1 | 9/2016 | Gao et al. |
| 2016/0259623 A1 | 9/2016 | Sumner et al. |
| 2016/0259656 A1 | 9/2016 | Sumner et al. |
| 2016/0259779 A1 | 9/2016 | Labský et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0262442 A1 | 9/2016 | Davila et al. |
| 2016/0266871 A1 | 9/2016 | Schmid et al. |
| 2016/0267904 A1 | 9/2016 | Biadsy et al. |
| 2016/0269540 A1 | 9/2016 | Butcher et al. |
| 2016/0274938 A1 | 9/2016 | Strinati et al. |
| 2016/0275941 A1 | 9/2016 | Bellegarda et al. |
| 2016/0275947 A1 | 9/2016 | Li et al. |
| 2016/0282824 A1 | 9/2016 | Smallwood et al. |
| 2016/0282956 A1 | 9/2016 | Ouyang et al. |
| 2016/0283185 A1 | 9/2016 | Mclaren et al. |
| 2016/0284005 A1 | 9/2016 | Daniel et al. |
| 2016/0284199 A1 | 9/2016 | Dotan-Cohen et al. |
| 2016/0285808 A1 | 9/2016 | Franklin et al. |
| 2016/0286045 A1 | 9/2016 | Shaltiel et al. |
| 2016/0293157 A1 | 10/2016 | Chen et al. |
| 2016/0293168 A1 | 10/2016 | Chen |
| 2016/0294755 A1 | 10/2016 | Prabhu |
| 2016/0299685 A1 | 10/2016 | Zhai et al. |
| 2016/0299882 A1 | 10/2016 | Hegerty et al. |
| 2016/0299883 A1 | 10/2016 | Zhu et al. |
| 2016/0299977 A1 | 10/2016 | Hreha |
| 2016/0300571 A1 | 10/2016 | Foerster et al. |
| 2016/0301639 A1 | 10/2016 | Liu et al. |
| 2016/0306683 A1 | 10/2016 | Standley et al. |
| 2016/0307566 A1 | 10/2016 | Bellegarda |
| 2016/0308799 A1 | 10/2016 | Schubert et al. |
| 2016/0309035 A1 | 10/2016 | Li |
| 2016/0313906 A1 | 10/2016 | Kilchenko et al. |
| 2016/0314788 A1 | 10/2016 | Jitkoff et al. |
| 2016/0314789 A1 | 10/2016 | Marcheret et al. |
| 2016/0314792 A1 | 10/2016 | Alvarez et al. |
| 2016/0315996 A1 | 10/2016 | Ha et al. |
| 2016/0316349 A1 | 10/2016 | Lee et al. |
| 2016/0317924 A1 | 11/2016 | Tanaka et al. |
| 2016/0321239 A1 | 11/2016 | Iso-Sipilä et al. |
| 2016/0321261 A1 | 11/2016 | Spasojevic et al. |
| 2016/0321358 A1 | 11/2016 | Kanani et al. |
| 2016/0322043 A1 | 11/2016 | Bellegarda |
| 2016/0322044 A1 | 11/2016 | Jung et al. |
| 2016/0322045 A1 | 11/2016 | Hatfield et al. |
| 2016/0322048 A1 | 11/2016 | Amano et al. |
| 2016/0322050 A1 | 11/2016 | Wang et al. |
| 2016/0322055 A1 | 11/2016 | Sainath et al. |
| 2016/0328147 A1 | 11/2016 | Zhang et al. |
| 2016/0328205 A1 | 11/2016 | Agrawal et al. |
| 2016/0328893 A1 | 11/2016 | Cordova et al. |
| 2016/0329060 A1 | 11/2016 | Ito et al. |
| 2016/0334973 A1 | 11/2016 | Reckhow et al. |
| 2016/0335138 A1 | 11/2016 | Surti et al. |
| 2016/0335139 A1 | 11/2016 | Hurley et al. |
| 2016/0335532 A1 | 11/2016 | Sanghavi et al. |
| 2016/0336007 A1 | 11/2016 | Hanazawa et al. |
| 2016/0336010 A1 | 11/2016 | Lindahl |
| 2016/0336011 A1 | 11/2016 | Koll et al. |
| 2016/0336024 A1 | 11/2016 | Choi et al. |
| 2016/0337299 A1 | 11/2016 | Lane et al. |
| 2016/0337301 A1 | 11/2016 | Rollins et al. |
| 2016/0342317 A1 | 11/2016 | Lim et al. |
| 2016/0342685 A1 | 11/2016 | Basu et al. |
| 2016/0342781 A1 | 11/2016 | Jeon |
| 2016/0350650 A1 | 12/2016 | Leeman-Munk et al. |
| 2016/0350812 A1 | 12/2016 | Priness et al. |
| 2016/0351190 A1 | 12/2016 | Piernot et al. |
| 2016/0352567 A1 | 12/2016 | Robbins et al. |
| 2016/0352924 A1 | 12/2016 | Senarath et al. |
| 2016/0357304 A1 | 12/2016 | Hatori et al. |
| 2016/0357728 A1 | 12/2016 | Bellegarda et al. |
| 2016/0357790 A1 | 12/2016 | Elkington et al. |
| 2016/0357861 A1 | 12/2016 | Carlhian et al. |

(56) References Cited

U.S. PATENT DOCUMENTS

| | | |
|---|---|---|
| 2016/0357870 A1 | 12/2016 | Hentschel et al. |
| 2016/0358598 A1 | 12/2016 | Williams et al. |
| 2016/0358600 A1 | 12/2016 | Nallasamy et al. |
| 2016/0358619 A1 | 12/2016 | Ramprashad et al. |
| 2016/0359771 A1 | 12/2016 | Sridhar |
| 2016/0360039 A1 | 12/2016 | Sanghavi et al. |
| 2016/0360336 A1 | 12/2016 | Gross et al. |
| 2016/0360382 A1 | 12/2016 | Gross et al. |
| 2016/0364378 A1 | 12/2016 | Futrell et al. |
| 2016/0365101 A1 | 12/2016 | Foy et al. |
| 2016/0371250 A1 | 12/2016 | Rhodes |
| 2016/0372112 A1 | 12/2016 | Miller et al. |
| 2016/0372119 A1 | 12/2016 | Sak et al. |
| 2016/0378747 A1 | 12/2016 | Orr et al. |
| 2016/0379091 A1 | 12/2016 | Lin et al. |
| 2016/0379626 A1 | 12/2016 | Deisher et al. |
| 2016/0379632 A1 | 12/2016 | Hoffmeister et al. |
| 2016/0379633 A1 | 12/2016 | Lehman et al. |
| 2016/0379639 A1 | 12/2016 | Weinstein et al. |
| 2016/0379641 A1 | 12/2016 | Liu et al. |
| 2017/0000348 A1 | 1/2017 | Karsten et al. |
| 2017/0003931 A1 | 1/2017 | Dvortsov et al. |
| 2017/0004209 A1 | 1/2017 | Johl et al. |
| 2017/0004824 A1 | 1/2017 | Yoo et al. |
| 2017/0005818 A1 | 1/2017 | Gould |
| 2017/0006329 A1 | 1/2017 | Jang et al. |
| 2017/0011091 A1 | 1/2017 | Chehreghani |
| 2017/0011279 A1 | 1/2017 | Soldevila et al. |
| 2017/0011303 A1 | 1/2017 | Annapureddy et al. |
| 2017/0011742 A1 | 1/2017 | Jing et al. |
| 2017/0013124 A1 | 1/2017 | Havelka et al. |
| 2017/0013331 A1 | 1/2017 | Watanabe et al. |
| 2017/0018271 A1 | 1/2017 | Khan et al. |
| 2017/0019987 A1 | 1/2017 | Dragone et al. |
| 2017/0023963 A1 | 1/2017 | Davis et al. |
| 2017/0025124 A1 | 1/2017 | Mixter et al. |
| 2017/0026318 A1 | 1/2017 | Daniel et al. |
| 2017/0026509 A1 | 1/2017 | Rand |
| 2017/0027522 A1 | 2/2017 | Van Hasselt et al. |
| 2017/0031576 A1 | 2/2017 | Saoji et al. |
| 2017/0032783 A1 | 2/2017 | Lord et al. |
| 2017/0032787 A1 | 2/2017 | Dayal |
| 2017/0032791 A1 | 2/2017 | Elson et al. |
| 2017/0039283 A1 | 2/2017 | Bennett et al. |
| 2017/0039475 A1 | 2/2017 | Cheyer et al. |
| 2017/0040002 A1 | 2/2017 | Basson et al. |
| 2017/0041388 A1 | 2/2017 | Tai et al. |
| 2017/0047063 A1 | 2/2017 | Ohmura et al. |
| 2017/0052760 A1 | 2/2017 | Johnson et al. |
| 2017/0053652 A1 | 2/2017 | Choi et al. |
| 2017/0055895 A1 | 3/2017 | Jardins et al. |
| 2017/0060853 A1 | 3/2017 | Lee et al. |
| 2017/0061423 A1 | 3/2017 | Bryant et al. |
| 2017/0068423 A1 | 3/2017 | Napolitano et al. |
| 2017/0068513 A1 | 3/2017 | Stasior et al. |
| 2017/0068550 A1 | 3/2017 | Zeitlin |
| 2017/0068670 A1 | 3/2017 | Orr et al. |
| 2017/0069308 A1 | 3/2017 | Aleksic et al. |
| 2017/0075653 A1 | 3/2017 | Dawidowsky et al. |
| 2017/0076720 A1 | 3/2017 | Gopalan et al. |
| 2017/0076721 A1 | 3/2017 | Bargetzi et al. |
| 2017/0078490 A1 | 3/2017 | Kaminsky et al. |
| 2017/0083179 A1 | 3/2017 | Gruber et al. |
| 2017/0083285 A1 | 3/2017 | Meyers et al. |
| 2017/0083504 A1 | 3/2017 | Huang |
| 2017/0084277 A1 | 3/2017 | Sharifi |
| 2017/0085547 A1 | 3/2017 | De Aguiar et al. |
| 2017/0085696 A1 | 3/2017 | Abkairov |
| 2017/0090428 A1 | 3/2017 | Oohara |
| 2017/0090569 A1 | 3/2017 | Levesque |
| 2017/0091168 A1 | 3/2017 | Bellegarda et al. |
| 2017/0091169 A1 | 3/2017 | Bellegarda et al. |
| 2017/0091612 A1 | 3/2017 | Gruber et al. |
| 2017/0092259 A1 | 3/2017 | Jeon |
| 2017/0092270 A1 | 3/2017 | Newendorp et al. |
| 2017/0092278 A1 | 3/2017 | Evermann et al. |
| 2017/0093356 A1 | 3/2017 | Cudak et al. |
| 2017/0097743 A1 | 4/2017 | Hameed et al. |
| 2017/0102837 A1 | 4/2017 | Toumpelis |
| 2017/0102915 A1 | 4/2017 | Kuscher et al. |
| 2017/0103749 A1 | 4/2017 | Zhao et al. |
| 2017/0103752 A1 | 4/2017 | Senior et al. |
| 2017/0105190 A1 | 4/2017 | Logan et al. |
| 2017/0110117 A1 | 4/2017 | Chakladar et al. |
| 2017/0110125 A1 | 4/2017 | Xu et al. |
| 2017/0116177 A1 | 4/2017 | Walia |
| 2017/0116982 A1 | 4/2017 | Gelfenbeyn et al. |
| 2017/0116987 A1 | 4/2017 | Kang et al. |
| 2017/0116989 A1 | 4/2017 | Yadgar et al. |
| 2017/0124190 A1 | 5/2017 | Wang et al. |
| 2017/0124311 A1 | 5/2017 | Li et al. |
| 2017/0124531 A1 | 5/2017 | McCormack |
| 2017/0125016 A1 | 5/2017 | Wang |
| 2017/0127124 A9 | 5/2017 | Wilson et al. |
| 2017/0131778 A1 | 5/2017 | Iyer |
| 2017/0132019 A1 | 5/2017 | Karashchuk et al. |
| 2017/0132199 A1 | 5/2017 | Vescovi et al. |
| 2017/0133007 A1 | 5/2017 | Drewes |
| 2017/0140041 A1 | 5/2017 | Dotan-Cohen et al. |
| 2017/0140052 A1 | 5/2017 | Bufe, III et al. |
| 2017/0140644 A1 | 5/2017 | Hwang et al. |
| 2017/0140760 A1 | 5/2017 | Sachdev |
| 2017/0147722 A1 | 5/2017 | Greenwood |
| 2017/0147841 A1 | 5/2017 | Stagg et al. |
| 2017/0148044 A1 | 5/2017 | Fukuda et al. |
| 2017/0154033 A1 | 6/2017 | Lee |
| 2017/0154055 A1 | 6/2017 | Dimson et al. |
| 2017/0154628 A1 | 6/2017 | Mohajer et al. |
| 2017/0155940 A1 | 6/2017 | Jin et al. |
| 2017/0155965 A1 | 6/2017 | Ward |
| 2017/0161018 A1 | 6/2017 | Lemay et al. |
| 2017/0161268 A1 | 6/2017 | Badaskar |
| 2017/0161293 A1 | 6/2017 | Ionescu et al. |
| 2017/0161393 A1 | 6/2017 | Oh et al. |
| 2017/0161500 A1 | 6/2017 | Yang |
| 2017/0162191 A1 | 6/2017 | Grost et al. |
| 2017/0162202 A1 | 6/2017 | Anthony et al. |
| 2017/0162203 A1 | 6/2017 | Huang et al. |
| 2017/0169506 A1 | 6/2017 | Wishne et al. |
| 2017/0169818 A1 | 6/2017 | Vanblon et al. |
| 2017/0169819 A1 | 6/2017 | Mese et al. |
| 2017/0177080 A1 | 6/2017 | Deleeuw |
| 2017/0177547 A1 | 6/2017 | Ciereszko et al. |
| 2017/0178619 A1 | 6/2017 | Naik et al. |
| 2017/0178620 A1 | 6/2017 | Fleizach et al. |
| 2017/0178626 A1 | 6/2017 | Gruber et al. |
| 2017/0178666 A1 | 6/2017 | Yu |
| 2017/0180499 A1 | 6/2017 | Gelfenbeyn et al. |
| 2017/0185375 A1 | 6/2017 | Martel et al. |
| 2017/0185581 A1 | 6/2017 | Bojja et al. |
| 2017/0186429 A1 | 6/2017 | Giuli et al. |
| 2017/0187711 A1 | 6/2017 | Joo et al. |
| 2017/0193083 A1 | 7/2017 | Bhatt et al. |
| 2017/0195493 A1 | 7/2017 | Sudarsan et al. |
| 2017/0195495 A1 | 7/2017 | Deora et al. |
| 2017/0195636 A1 | 7/2017 | Child et al. |
| 2017/0199870 A1 | 7/2017 | Zheng et al. |
| 2017/0199874 A1 | 7/2017 | Patel et al. |
| 2017/0200066 A1 | 7/2017 | Wang et al. |
| 2017/0201609 A1 | 7/2017 | Salmenkaita et al. |
| 2017/0201613 A1 | 7/2017 | Engelke et al. |
| 2017/0206899 A1 | 7/2017 | Bryant et al. |
| 2017/0215052 A1 | 7/2017 | Koum et al. |
| 2017/0220212 A1 | 8/2017 | Yang et al. |
| 2017/0221486 A1 | 8/2017 | Kurata et al. |
| 2017/0223189 A1 | 8/2017 | Meredith et al. |
| 2017/0227935 A1 | 8/2017 | Su et al. |
| 2017/0228367 A1 | 8/2017 | Pasupalak et al. |
| 2017/0228382 A1 | 8/2017 | Haviv et al. |
| 2017/0229121 A1 | 8/2017 | Taki et al. |
| 2017/0230429 A1 | 8/2017 | Garmark et al. |
| 2017/0230497 A1 | 8/2017 | Kim et al. |
| 2017/0230709 A1 | 8/2017 | Van Os et al. |
| 2017/0235361 A1 | 8/2017 | Rigazio et al. |

(56) References Cited

U.S. PATENT DOCUMENTS

| | | |
|---|---|---|
| 2017/0235618 A1 | 8/2017 | Lin et al. |
| 2017/0235721 A1 | 8/2017 | Almosallam et al. |
| 2017/0236512 A1 | 8/2017 | Williams et al. |
| 2017/0236514 A1 | 8/2017 | Nelson |
| 2017/0238039 A1 | 8/2017 | Sabattini |
| 2017/0242478 A1 | 8/2017 | Ma |
| 2017/0242653 A1 | 8/2017 | Lang et al. |
| 2017/0242657 A1 | 8/2017 | Jarvis et al. |
| 2017/0242840 A1 | 8/2017 | Lu et al. |
| 2017/0243468 A1 | 8/2017 | Dotan-Cohen et al. |
| 2017/0243576 A1 | 8/2017 | Millington et al. |
| 2017/0243583 A1 | 8/2017 | Raichelgauz et al. |
| 2017/0243586 A1 | 8/2017 | Civelli et al. |
| 2017/0249309 A1 | 8/2017 | Sarikaya |
| 2017/0256256 A1 | 9/2017 | Wang et al. |
| 2017/0262051 A1 | 9/2017 | Tall et al. |
| 2017/0263247 A1 | 9/2017 | Kang et al. |
| 2017/0263248 A1 | 9/2017 | Gruber et al. |
| 2017/0263249 A1 | 9/2017 | Akbacak et al. |
| 2017/0263254 A1 | 9/2017 | Dewan et al. |
| 2017/0264451 A1 | 9/2017 | Yu et al. |
| 2017/0264711 A1 | 9/2017 | Natarajan et al. |
| 2017/0270715 A1 | 9/2017 | Lindsay et al. |
| 2017/0270822 A1 | 9/2017 | Cohen |
| 2017/0270912 A1 | 9/2017 | Levit et al. |
| 2017/0278513 A1 | 9/2017 | Li et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0287472 A1 | 10/2017 | Ogawa et al. |
| 2017/0289305 A1 | 10/2017 | Liensberger et al. |
| 2017/0295446 A1 | 10/2017 | Shivappa |
| 2017/0301348 A1 | 10/2017 | Chen et al. |
| 2017/0308552 A1 | 10/2017 | Soni et al. |
| 2017/0308609 A1 | 10/2017 | Berkhin et al. |
| 2017/0311005 A1 | 10/2017 | Lin |
| 2017/0316775 A1 | 11/2017 | Le et al. |
| 2017/0316782 A1 | 11/2017 | Haughay |
| 2017/0319123 A1 | 11/2017 | Voss et al. |
| 2017/0323637 A1 | 11/2017 | Naik |
| 2017/0329466 A1 | 11/2017 | Krenkler et al. |
| 2017/0329490 A1 | 11/2017 | Esinovskaya et al. |
| 2017/0329572 A1 | 11/2017 | Shah et al. |
| 2017/0329630 A1 | 11/2017 | Jann et al. |
| 2017/0330567 A1 | 11/2017 | Van Wissen et al. |
| 2017/0336920 A1 | 11/2017 | Chan et al. |
| 2017/0337035 A1 | 11/2017 | Choudhary et al. |
| 2017/0337478 A1 | 11/2017 | Sarikaya et al. |
| 2017/0345411 A1 | 11/2017 | Raitio et al. |
| 2017/0345420 A1 | 11/2017 | Barnett, Jr. |
| 2017/0345429 A1 | 11/2017 | Hardee et al. |
| 2017/0346949 A1 | 11/2017 | Sanghavi et al. |
| 2017/0351487 A1 | 12/2017 | Avilés-Casco et al. |
| 2017/0352346 A1 | 12/2017 | Paulik et al. |
| 2017/0352350 A1 | 12/2017 | Booker et al. |
| 2017/0357478 A1 | 12/2017 | Piersol et al. |
| 2017/0357529 A1 | 12/2017 | Venkatraman et al. |
| 2017/0357632 A1 | 12/2017 | Pagallo et al. |
| 2017/0357633 A1 | 12/2017 | Wang et al. |
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358302 A1 | 12/2017 | Orr et al. |
| 2017/0358303 A1 | 12/2017 | Walker, II et al. |
| 2017/0358304 A1 | 12/2017 | Castillo et al. |
| 2017/0358305 A1 | 12/2017 | Kudurshian et al. |
| 2017/0358317 A1 | 12/2017 | James |
| 2017/0359680 A1 | 12/2017 | Ledvina et al. |
| 2017/0365251 A1 | 12/2017 | Park et al. |
| 2017/0371509 A1 | 12/2017 | Jung et al. |
| 2017/0371885 A1 | 12/2017 | Aggarwal et al. |
| 2017/0374093 A1 | 12/2017 | Dhar et al. |
| 2017/0374176 A1 | 12/2017 | Agrawal et al. |
| 2018/0004372 A1 | 1/2018 | Zurek et al. |
| 2018/0004396 A1 | 1/2018 | Ying |
| 2018/0005112 A1 | 1/2018 | Iso-Sipila et al. |
| 2018/0007060 A1 | 1/2018 | Leblang et al. |
| 2018/0007096 A1 | 1/2018 | Levin et al. |
| 2018/0007538 A1 | 1/2018 | Naik et al. |
| 2018/0012596 A1 | 1/2018 | Piernot et al. |
| 2018/0018248 A1 | 1/2018 | Bhargava et al. |
| 2018/0018590 A1 | 1/2018 | Szeto et al. |
| 2018/0018814 A1 | 1/2018 | Patrik et al. |
| 2018/0024985 A1 | 1/2018 | Asano |
| 2018/0025124 A1 | 1/2018 | Mohr et al. |
| 2018/0025287 A1 | 1/2018 | Mathew et al. |
| 2018/0028918 A1 | 2/2018 | Tang et al. |
| 2018/0033431 A1 | 2/2018 | Newendorp et al. |
| 2018/0033435 A1 | 2/2018 | Jacobs, II |
| 2018/0033436 A1 | 2/2018 | Zhou |
| 2018/0045963 A1 | 2/2018 | Hoover et al. |
| 2018/0046340 A1 | 2/2018 | Mall |
| 2018/0047201 A1 | 2/2018 | Filev et al. |
| 2018/0047391 A1 | 2/2018 | Baik et al. |
| 2018/0047393 A1 | 2/2018 | Tian et al. |
| 2018/0047406 A1 | 2/2018 | Park |
| 2018/0052909 A1 | 2/2018 | Sharifi et al. |
| 2018/0054505 A1 | 2/2018 | Hart et al. |
| 2018/0060032 A1 | 3/2018 | Boesen |
| 2018/0060301 A1 | 3/2018 | Li et al. |
| 2018/0060312 A1 | 3/2018 | Won |
| 2018/0060555 A1 | 3/2018 | Boesen |
| 2018/0061400 A1 | 3/2018 | Carbune et al. |
| 2018/0061401 A1 | 3/2018 | Sarikaya et al. |
| 2018/0062691 A1 | 3/2018 | Barnett, Jr. |
| 2018/0063308 A1 | 3/2018 | Crystal et al. |
| 2018/0063324 A1 | 3/2018 | Van Meter, II |
| 2018/0063624 A1 | 3/2018 | Boesen |
| 2018/0067904 A1 | 3/2018 | Li |
| 2018/0067914 A1 | 3/2018 | Chen et al. |
| 2018/0067918 A1 | 3/2018 | Bellegarda et al. |
| 2018/0068074 A1 | 3/2018 | Shen |
| 2018/0069743 A1 | 3/2018 | Bakken et al. |
| 2018/0075847 A1 | 3/2018 | Lee et al. |
| 2018/0075849 A1 | 3/2018 | Khoury et al. |
| 2018/0077095 A1 | 3/2018 | Deyle et al. |
| 2018/0082692 A1 | 3/2018 | Khoury et al. |
| 2018/0088969 A1 | 3/2018 | Vanblon et al. |
| 2018/0089166 A1 | 3/2018 | Meyer et al. |
| 2018/0089588 A1 | 3/2018 | Ravi et al. |
| 2018/0090143 A1 | 3/2018 | Saddler et al. |
| 2018/0091604 A1 | 3/2018 | Yamashita et al. |
| 2018/0091847 A1 | 3/2018 | Wu et al. |
| 2018/0096683 A1 | 4/2018 | James et al. |
| 2018/0096690 A1 | 4/2018 | Mixter et al. |
| 2018/0101599 A1 | 4/2018 | Kenneth et al. |
| 2018/0101925 A1 | 4/2018 | Brinig et al. |
| 2018/0102914 A1 | 4/2018 | Kawachi et al. |
| 2018/0103209 A1 | 4/2018 | Fischler et al. |
| 2018/0107917 A1 | 4/2018 | Hewavitharana et al. |
| 2018/0107945 A1 | 4/2018 | Gao et al. |
| 2018/0108346 A1 | 4/2018 | Paulik et al. |
| 2018/0108351 A1 | 4/2018 | Beckhardt et al. |
| 2018/0108357 A1 | 4/2018 | Liu |
| 2018/0113673 A1 | 4/2018 | Sheynblat |
| 2018/0314362 A1 | 4/2018 | Kim et al. |
| 2018/0121432 A1 | 5/2018 | Parson et al. |
| 2018/0122376 A1 | 5/2018 | Kojima |
| 2018/0122378 A1 | 5/2018 | Mixter et al. |
| 2018/0126260 A1 | 5/2018 | Chansoriya et al. |
| 2018/0129967 A1 | 5/2018 | Herreshoff |
| 2018/0130470 A1 | 5/2018 | Lemay et al. |
| 2018/0130471 A1 | 5/2018 | Trufinescu et al. |
| 2018/0137856 A1 | 5/2018 | Gilbert |
| 2018/0137857 A1 | 5/2018 | Zhou et al. |
| 2018/0137865 A1 | 5/2018 | Ling |
| 2018/0143857 A1 | 5/2018 | Anbazhagan et al. |
| 2018/0143967 A1 | 5/2018 | Anbazhagan et al. |
| 2018/0144465 A1 | 5/2018 | Hsieh et al. |
| 2018/0144615 A1 | 5/2018 | Kinney et al. |
| 2018/0144746 A1 | 5/2018 | Mishra et al. |
| 2018/0144748 A1 | 5/2018 | Leong |

(56) References Cited

U.S. PATENT DOCUMENTS

| | | |
|---|---|---|
| 2018/0146089 A1 | 5/2018 | Rauenbuehler et al. |
| 2018/0150744 A1 | 5/2018 | Orr et al. |
| 2018/0152557 A1 | 5/2018 | White et al. |
| 2018/0157372 A1 | 6/2018 | Kurabayashi |
| 2018/0157408 A1 | 6/2018 | Yu et al. |
| 2018/0157992 A1 | 6/2018 | Susskind et al. |
| 2018/0158548 A1 | 6/2018 | Taheri et al. |
| 2018/0158552 A1 | 6/2018 | Liu et al. |
| 2018/0165857 A1 | 6/2018 | Lee et al. |
| 2018/0166076 A1 | 6/2018 | Higuchi et al. |
| 2018/0167884 A1 | 6/2018 | Dawid et al. |
| 2018/0173403 A1 | 6/2018 | Carbune et al. |
| 2018/0173542 A1 | 6/2018 | Chan et al. |
| 2018/0174406 A1 | 6/2018 | Arashi et al. |
| 2018/0174576 A1 | 6/2018 | Soltau et al. |
| 2018/0174597 A1 | 6/2018 | Lee et al. |
| 2018/0182376 A1 | 6/2018 | Gysel et al. |
| 2018/0188840 A1 | 7/2018 | Tamura et al. |
| 2018/0188948 A1 | 7/2018 | Ouyang et al. |
| 2018/0189267 A1 | 7/2018 | Takiel |
| 2018/0190263 A1 | 7/2018 | Calef, III |
| 2018/0190273 A1 | 7/2018 | Karimli et al. |
| 2018/0190279 A1 | 7/2018 | Anderson et al. |
| 2018/0191670 A1 | 7/2018 | Suyama |
| 2018/0196683 A1 | 7/2018 | Radebaugh et al. |
| 2018/0205983 A1 | 7/2018 | Lee et al. |
| 2018/0210874 A1 | 7/2018 | Fuxman et al. |
| 2018/0213448 A1 | 7/2018 | Segal et al. |
| 2018/0217810 A1 | 8/2018 | Agrawal |
| 2018/0218735 A1 | 8/2018 | Hunt et al. |
| 2018/0221783 A1 | 8/2018 | Gamero |
| 2018/0225131 A1 | 8/2018 | Tommy et al. |
| 2018/0225274 A1 | 8/2018 | Tommy et al. |
| 2018/0232203 A1 | 8/2018 | Gelfenbeyn et al. |
| 2018/0232688 A1 | 8/2018 | Pike et al. |
| 2018/0233132 A1 | 8/2018 | Herold et al. |
| 2018/0233140 A1 | 8/2018 | Koishida et al. |
| 2018/0247065 A1 | 8/2018 | Rhee et al. |
| 2018/0253209 A1 | 9/2018 | Jaygarl et al. |
| 2018/0253652 A1 | 9/2018 | Palzer et al. |
| 2018/0260680 A1 | 9/2018 | Finkelstein et al. |
| 2018/0268023 A1 | 9/2018 | Korpusik et al. |
| 2018/0268106 A1 | 9/2018 | Velaga |
| 2018/0270343 A1 | 9/2018 | Rout et al. |
| 2018/0275839 A1 | 9/2018 | Kocienda et al. |
| 2018/0276197 A1 | 9/2018 | Nell et al. |
| 2018/0277113 A1 | 9/2018 | Hartung et al. |
| 2018/0278740 A1 | 9/2018 | Choi et al. |
| 2018/0285056 A1 | 10/2018 | Cutler et al. |
| 2018/0293984 A1 | 10/2018 | Lindahl |
| 2018/0293988 A1 | 10/2018 | Huang et al. |
| 2018/0293989 A1 | 10/2018 | De et al. |
| 2018/0299878 A1 | 10/2018 | Celia et al. |
| 2018/0300317 A1 | 10/2018 | Bradbury |
| 2018/0300400 A1 | 10/2018 | Paulus |
| 2018/0300608 A1 | 10/2018 | Sevrens et al. |
| 2018/0308470 A1 | 10/2018 | Park et al. |
| 2018/0308477 A1 | 10/2018 | Nagasaka |
| 2018/0308480 A1 | 10/2018 | Jang et al. |
| 2018/0308485 A1 | 10/2018 | Kudurshian et al. |
| 2018/0308486 A1 | 10/2018 | Saddler et al. |
| 2018/0314552 A1 | 11/2018 | Kim et al. |
| 2018/0314689 A1 | 11/2018 | Wang et al. |
| 2018/0315415 A1 | 11/2018 | Mosley et al. |
| 2018/0315416 A1 | 11/2018 | Berthelsen et al. |
| 2018/0322112 A1 | 11/2018 | Bellegarda et al. |
| 2018/0322881 A1 | 11/2018 | Min et al. |
| 2018/0324518 A1 | 11/2018 | Dusan et al. |
| 2018/0329508 A1 | 11/2018 | Klein et al. |
| 2018/0329677 A1 | 11/2018 | Gruber et al. |
| 2018/0329957 A1 | 11/2018 | Frazzingaro et al. |
| 2018/0329982 A1 | 11/2018 | Patel et al. |
| 2018/0329998 A1 | 11/2018 | Thomson et al. |
| 2018/0330714 A1 | 11/2018 | Paulik et al. |
| 2018/0330721 A1 | 11/2018 | Thomson et al. |
| 2018/0330722 A1 | 11/2018 | Newendorp et al. |
| 2018/0330723 A1 | 11/2018 | Acero et al. |
| 2018/0330729 A1 | 11/2018 | Golipour et al. |
| 2018/0330730 A1 | 11/2018 | Garg et al. |
| 2018/0330731 A1 | 11/2018 | Zeitlin et al. |
| 2018/0330733 A1 | 11/2018 | Orr et al. |
| 2018/0330737 A1 | 11/2018 | Paulik et al. |
| 2018/0332118 A1 | 11/2018 | Phipps et al. |
| 2018/0332389 A1 | 11/2018 | Ekkizogloy et al. |
| 2018/0335903 A1 | 11/2018 | Coffman et al. |
| 2018/0336049 A1 | 11/2018 | Mukherjee et al. |
| 2018/0336184 A1 | 11/2018 | Bellegarda et al. |
| 2018/0336197 A1 | 11/2018 | Skilling et al. |
| 2018/0336275 A1 | 11/2018 | Graham et al. |
| 2018/0336439 A1 | 11/2018 | Kliger et al. |
| 2018/0336449 A1 | 11/2018 | Adan et al. |
| 2018/0336880 A1 | 11/2018 | Arik et al. |
| 2018/0336885 A1 | 11/2018 | Mukherjee et al. |
| 2018/0336892 A1 | 11/2018 | Kim et al. |
| 2018/0336894 A1 | 11/2018 | Graham et al. |
| 2018/0336904 A1 | 11/2018 | Piercy et al. |
| 2018/0336905 A1 | 11/2018 | Kim et al. |
| 2018/0336911 A1 | 11/2018 | Dahl et al. |
| 2018/0336920 A1 | 11/2018 | Bastian et al. |
| 2018/0338191 A1 | 11/2018 | Van Scheltinga et al. |
| 2018/0341643 A1 | 11/2018 | Alders et al. |
| 2018/0343557 A1 | 11/2018 | Naik et al. |
| 2018/0349084 A1 | 12/2018 | Nagasaka et al. |
| 2018/0349346 A1 | 12/2018 | Hatori et al. |
| 2018/0349349 A1 | 12/2018 | Bellegarda et al. |
| 2018/0349447 A1 | 12/2018 | Maccartney et al. |
| 2018/0349472 A1 | 12/2018 | Kohlschuetter et al. |
| 2018/0349728 A1 | 12/2018 | Wang et al. |
| 2018/0350345 A1 | 12/2018 | Naik |
| 2018/0350353 A1 | 12/2018 | Gruber et al. |
| 2018/0357073 A1 | 12/2018 | Johnson et al. |
| 2018/0357308 A1 | 12/2018 | Cheyer |
| 2018/0358015 A1 | 12/2018 | Cash et al. |
| 2018/0358019 A1 | 12/2018 | Mont-Reynaud |
| 2018/0365653 A1 | 12/2018 | Cleaver et al. |
| 2018/0366105 A1 | 12/2018 | Kim |
| 2018/0366116 A1 | 12/2018 | Nicholson et al. |
| 2018/0373487 A1 | 12/2018 | Gruber et al. |
| 2018/0373493 A1 | 12/2018 | Watson et al. |
| 2018/0373796 A1 | 12/2018 | Rathod |
| 2018/0374484 A1 | 12/2018 | Huang et al. |
| 2019/0005024 A1 | 1/2019 | Somech et al. |
| 2019/0012141 A1 | 1/2019 | Piersol et al. |
| 2019/0012445 A1 | 1/2019 | Lesso et al. |
| 2019/0012449 A1 | 1/2019 | Cheyer |
| 2019/0012599 A1 | 1/2019 | El Kaliouby et al. |
| 2019/0013018 A1 | 1/2019 | Rekstad |
| 2019/0013025 A1 | 1/2019 | Alcorn et al. |
| 2019/0014450 A1 | 1/2019 | Gruber et al. |
| 2019/0019077 A1 | 1/2019 | Griffin et al. |
| 2019/0027152 A1 | 1/2019 | Huang et al. |
| 2019/0034040 A1 | 1/2019 | Shah et al. |
| 2019/0034826 A1 | 1/2019 | Ahmad et al. |
| 2019/0035385 A1 | 1/2019 | Lawson et al. |
| 2019/0035405 A1 | 1/2019 | Haughay |
| 2019/0037258 A1 | 1/2019 | Justin et al. |
| 2019/0042059 A1 | 2/2019 | Baer |
| 2019/0042627 A1 | 2/2019 | Osotio et al. |
| 2019/0043507 A1 | 2/2019 | Huang et al. |
| 2019/0044854 A1 | 2/2019 | Yang et al. |
| 2019/0045040 A1 | 2/2019 | Lee et al. |
| 2019/0051306 A1 | 2/2019 | Torama et al. |
| 2019/0051309 A1 | 2/2019 | Kim et al. |
| 2019/0057697 A1 | 2/2019 | Giuli et al. |
| 2019/0065144 A1 | 2/2019 | Sumner et al. |
| 2019/0065993 A1 | 2/2019 | Srinivasan et al. |
| 2019/0066674 A1 | 2/2019 | Jaygarl et al. |
| 2019/0068810 A1 | 2/2019 | Okamoto et al. |
| 2019/0173996 A1 | 2/2019 | Butcher et al. |
| 2019/0073607 A1 | 3/2019 | Jia et al. |
| 2019/0073998 A1 | 3/2019 | Leblang et al. |
| 2019/0074009 A1 | 3/2019 | Kim et al. |
| 2019/0074015 A1 | 3/2019 | Orr et al. |
| 2019/0074016 A1 | 3/2019 | Orr et al. |

(56) References Cited

U.S. PATENT DOCUMENTS

| | | |
|---|---|---|
| 2019/0079476 A1 | 3/2019 | Funes |
| 2019/0080685 A1 | 3/2019 | Johnson, Jr. |
| 2019/0080698 A1 | 3/2019 | Miller |
| 2019/0082044 A1 | 3/2019 | Olivia et al. |
| 2019/0087412 A1 | 3/2019 | Seyed Ibrahim et al. |
| 2019/0087455 A1 | 3/2019 | He et al. |
| 2019/0095050 A1 | 3/2019 | Gruber et al. |
| 2019/0095069 A1 | 3/2019 | Proctor et al. |
| 2019/0095171 A1 | 3/2019 | Carson et al. |
| 2019/0102145 A1 | 4/2019 | Wilberding et al. |
| 2019/0102378 A1 | 4/2019 | Piernot et al. |
| 2019/0102381 A1 | 4/2019 | Futrell et al. |
| 2019/0103103 A1 | 4/2019 | Ni et al. |
| 2019/0103112 A1 | 4/2019 | Walker et al. |
| 2019/0116264 A1 | 4/2019 | Sanghavi et al. |
| 2019/0122666 A1 | 4/2019 | Raitio et al. |
| 2019/0122692 A1 | 4/2019 | Binder et al. |
| 2019/0124019 A1 | 4/2019 | Leon et al. |
| 2019/0129499 A1 | 5/2019 | Li |
| 2019/0129615 A1 | 5/2019 | Sundar et al. |
| 2019/0132694 A1 | 5/2019 | Hanes et al. |
| 2019/0134501 A1 | 5/2019 | Feder et al. |
| 2019/0138704 A1 | 5/2019 | Shrivastava et al. |
| 2019/0139541 A1 | 5/2019 | Andersen et al. |
| 2019/0139563 A1 | 5/2019 | Chen et al. |
| 2019/0141494 A1 | 5/2019 | Gross et al. |
| 2019/0147052 A1 | 5/2019 | Lu et al. |
| 2019/0147369 A1 | 5/2019 | Gupta et al. |
| 2019/0147880 A1 | 5/2019 | Booker et al. |
| 2019/0147883 A1 | 5/2019 | Mellenthin et al. |
| 2019/0149972 A1 | 5/2019 | Parks et al. |
| 2019/0156830 A1 | 5/2019 | Devaraj et al. |
| 2019/0158994 A1 | 5/2019 | Gross et al. |
| 2019/0163667 A1 | 5/2019 | Feuz et al. |
| 2019/0164546 A1 | 5/2019 | Piernot et al. |
| 2019/0172243 A1 | 6/2019 | Mishra et al. |
| 2019/0172467 A1 | 6/2019 | Kim et al. |
| 2019/0179607 A1 | 6/2019 | Thangarathnam et al. |
| 2019/0179890 A1 | 6/2019 | Evermann |
| 2019/0180770 A1 | 6/2019 | Kothari et al. |
| 2019/0182176 A1 | 6/2019 | Niewczas |
| 2019/0187787 A1 | 6/2019 | White et al. |
| 2019/0188326 A1 | 6/2019 | Daianu et al. |
| 2019/0188328 A1 | 6/2019 | Oyenan et al. |
| 2019/0189118 A1 | 6/2019 | Piernot et al. |
| 2019/0189125 A1 | 6/2019 | Van Os et al. |
| 2019/0197053 A1 | 6/2019 | Graham et al. |
| 2019/0213601 A1 | 7/2019 | Hackman et al. |
| 2019/0213774 A1 | 7/2019 | Jiao et al. |
| 2019/0213999 A1 | 7/2019 | Grupen et al. |
| 2019/0214024 A1 | 7/2019 | Gruber et al. |
| 2019/0220245 A1 | 7/2019 | Martel et al. |
| 2019/0220246 A1 | 7/2019 | Orr et al. |
| 2019/0220247 A1 | 7/2019 | Lemay et al. |
| 2019/0220704 A1 | 7/2019 | Schulz-Trieglaff et al. |
| 2019/0220727 A1 | 7/2019 | Dohrmann et al. |
| 2019/0222684 A1 | 7/2019 | Li et al. |
| 2019/0224049 A1 | 7/2019 | Creasy et al. |
| 2019/0230215 A1 | 7/2019 | Zhu et al. |
| 2019/0230426 A1 | 7/2019 | Chun |
| 2019/0236130 A1 | 8/2019 | Li et al. |
| 2019/0236459 A1 | 8/2019 | Cheyer et al. |
| 2019/0244618 A1 | 8/2019 | Newendorp et al. |
| 2019/0251167 A1 | 8/2019 | Krishnapura et al. |
| 2019/0251339 A1 | 8/2019 | Hawker |
| 2019/0251960 A1 | 8/2019 | Maker et al. |
| 2019/0259386 A1 | 8/2019 | Kudurshian et al. |
| 2019/0272818 A1 | 9/2019 | Fernandez et al. |
| 2019/0272825 A1 | 9/2019 | O'Malley et al. |
| 2019/0272831 A1 | 9/2019 | Kajarekar |
| 2019/0273963 A1 | 9/2019 | Jobanputra et al. |
| 2019/0278841 A1 | 9/2019 | Pusateri et al. |
| 2019/0287012 A1 | 9/2019 | Asli et al. |
| 2019/0287522 A1 | 9/2019 | Lambourne et al. |
| 2019/0295529 A1 | 9/2019 | Tomita |
| 2019/0295540 A1 | 9/2019 | Grima |
| 2019/0295544 A1 | 9/2019 | Garcia et al. |
| 2019/0303442 A1 | 10/2019 | Peitz et al. |
| 2019/0304438 A1 | 10/2019 | Qian et al. |
| 2019/0310765 A1 | 10/2019 | Napolitano et al. |
| 2019/0311708 A1 | 10/2019 | Bengio et al. |
| 2019/0311720 A1 | 10/2019 | Pasko |
| 2019/0318722 A1 | 10/2019 | Bromand |
| 2019/0318724 A1 | 10/2019 | Chao et al. |
| 2019/0318725 A1 | 10/2019 | Le Roux et al. |
| 2019/0318732 A1 | 10/2019 | Huang et al. |
| 2019/0318735 A1 | 10/2019 | Chao et al. |
| 2019/0318739 A1 | 10/2019 | Garg et al. |
| 2019/0339784 A1 | 11/2019 | Lemay et al. |
| 2019/0341027 A1 | 11/2019 | Vescovi et al. |
| 2019/0341056 A1 | 11/2019 | Paulik et al. |
| 2019/0347063 A1 | 11/2019 | Liu et al. |
| 2019/0348022 A1 | 11/2019 | Park et al. |
| 2019/0354548 A1 | 11/2019 | Orr et al. |
| 2019/0355346 A1 | 11/2019 | Bellegarda |
| 2019/0355384 A1 | 11/2019 | Sereshki et al. |
| 2019/0361729 A1 | 11/2019 | Gruber et al. |
| 2019/0369748 A1 | 12/2019 | Hindi et al. |
| 2019/0369842 A1 | 12/2019 | Dolbakian et al. |
| 2019/0369868 A1 | 12/2019 | Jin et al. |
| 2019/0370292 A1 | 12/2019 | Irani et al. |
| 2019/0370323 A1 | 12/2019 | Davidson et al. |
| 2019/0371315 A1 | 12/2019 | Newendorp et al. |
| 2019/0371316 A1 | 12/2019 | Weinstein et al. |
| 2019/0371317 A1 | 12/2019 | Irani et al. |
| 2019/0371331 A1 | 12/2019 | Schramm et al. |
| 2019/0372902 A1 | 12/2019 | Piersol |
| 2019/0373102 A1 | 12/2019 | Weinstein et al. |
| 2019/0385418 A1 | 12/2019 | Mixter et al. |
| 2019/0387352 A1 | 12/2019 | Jot et al. |
| 2020/0019609 A1 | 1/2020 | Yu et al. |
| 2020/0020326 A1 | 1/2020 | Srinivasan et al. |
| 2020/0035224 A1 | 1/2020 | Ward et al. |
| 2020/0042334 A1 | 2/2020 | Radebaugh et al. |
| 2020/0043467 A1 | 2/2020 | Qian et al. |
| 2020/0043471 A1 | 2/2020 | Ma et al. |
| 2020/0043482 A1 | 2/2020 | Gruber et al. |
| 2020/0043489 A1 | 2/2020 | Bradley et al. |
| 2020/0044485 A1 | 2/2020 | Smith et al. |
| 2020/0051583 A1 | 2/2020 | Wu et al. |
| 2020/0053218 A1 | 2/2020 | Gray |
| 2020/0058299 A1 | 2/2020 | Lee et al. |
| 2020/0065601 A1 | 2/2020 | Andreassen |
| 2020/0073629 A1 | 3/2020 | Lee et al. |
| 2020/0075018 A1 | 3/2020 | Chen |
| 2020/0075040 A1 | 3/2020 | Provost et al. |
| 2020/0076538 A1 | 3/2020 | Soultan et al. |
| 2020/0081615 A1 | 3/2020 | Yi et al. |
| 2020/0090393 A1 | 3/2020 | Shin et al. |
| 2020/0091958 A1 | 3/2020 | Curtis et al. |
| 2020/0092625 A1 | 3/2020 | Raffle |
| 2020/0098352 A1 | 3/2020 | Feinstein et al. |
| 2020/0098362 A1 | 3/2020 | Piernot et al. |
| 2020/0098368 A1 | 3/2020 | Lemay et al. |
| 2020/0104357 A1 | 4/2020 | Bellegarda et al. |
| 2020/0104362 A1 | 4/2020 | Yang et al. |
| 2020/0104369 A1 | 4/2020 | Bellegarda |
| 2020/0104668 A1 | 4/2020 | Sanghavi et al. |
| 2020/0105260 A1 | 4/2020 | Piernot et al. |
| 2020/0117717 A1 | 4/2020 | Ramamurti et al. |
| 2020/0118566 A1 | 4/2020 | Zhou |
| 2020/0118568 A1 | 4/2020 | Kudurshian et al. |
| 2020/0125820 A1 | 4/2020 | Kim et al. |
| 2020/0127988 A1 | 4/2020 | Bradley et al. |
| 2020/0134316 A1 | 4/2020 | Krishnamurthy et al. |
| 2020/0135180 A1 | 4/2020 | Mukherjee et al. |
| 2020/0135209 A1 | 4/2020 | Delfarah et al. |
| 2020/0137230 A1 | 4/2020 | Spohrer |
| 2020/0143812 A1 | 5/2020 | Walker, II et al. |
| 2020/0143819 A1 | 5/2020 | Delcroix et al. |
| 2020/0152186 A1 | 5/2020 | Koh et al. |
| 2020/0159579 A1 | 5/2020 | Shear et al. |
| 2020/0159651 A1 | 5/2020 | Myers |
| 2020/0160179 A1 | 5/2020 | Chien et al. |

(56) References Cited

U.S. PATENT DOCUMENTS

| | | |
|---|---|---|
| 2020/0169637 A1 | 5/2020 | Sanghavi et al. |
| 2020/0175566 A1 | 6/2020 | Bender et al. |
| 2020/0176004 A1 | 6/2020 | Kleijn et al. |
| 2020/0176018 A1 | 6/2020 | Feinauer et al. |
| 2020/0184964 A1 | 6/2020 | Myers et al. |
| 2020/0184966 A1 | 6/2020 | Yavagal |
| 2020/0193997 A1 | 6/2020 | Piernot et al. |
| 2020/0210142 A1 | 7/2020 | Mu et al. |
| 2020/0218780 A1 | 7/2020 | Jun et al. |
| 2020/0219517 A1 | 7/2020 | Wang et al. |
| 2020/0221155 A1 | 7/2020 | Hansen et al. |
| 2020/0227034 A1 | 7/2020 | Summa et al. |
| 2020/0227044 A1 | 7/2020 | Lindahl |
| 2020/0243069 A1 | 7/2020 | Amores et al. |
| 2020/0249985 A1 | 8/2020 | Zeitlin |
| 2020/0252508 A1 | 8/2020 | Gray |
| 2020/0258508 A1 | 8/2020 | Aggarwal et al. |
| 2020/0267222 A1 | 8/2020 | Phipps et al. |
| 2020/0272485 A1 | 8/2020 | Karashchuk et al. |
| 2020/0279556 A1 | 9/2020 | Gruber et al. |
| 2020/0279576 A1 | 9/2020 | Binder et al. |
| 2020/0279627 A1 | 9/2020 | Nida et al. |
| 2020/0285327 A1 | 9/2020 | Hindi et al. |
| 2020/0286472 A1 | 9/2020 | Newendorp et al. |
| 2020/0286493 A1 | 9/2020 | Orr et al. |
| 2020/0294494 A1 | 9/2020 | Suyama et al. |
| 2020/0298394 A1 | 9/2020 | Han et al. |
| 2020/0301950 A1 | 9/2020 | Theo et al. |
| 2020/0302356 A1 | 9/2020 | Gruber et al. |
| 2020/0302919 A1 | 9/2020 | Greborio et al. |
| 2020/0302925 A1 | 9/2020 | Shah et al. |
| 2020/0302930 A1 | 9/2020 | Chen et al. |
| 2020/0302932 A1 | 9/2020 | Schramm et al. |
| 2020/0304955 A1 | 9/2020 | Gross et al. |
| 2020/0304972 A1 | 9/2020 | Gross et al. |
| 2020/0305084 A1 | 9/2020 | Freeman et al. |
| 2020/0310513 A1 | 10/2020 | Nicholson et al. |
| 2020/0312315 A1 | 10/2020 | Li et al. |
| 2020/0312317 A1 | 10/2020 | Kothari et al. |
| 2020/0314191 A1 | 10/2020 | Madhavan et al. |
| 2020/0319850 A1 | 10/2020 | Stasior et al. |
| 2020/0320592 A1 | 10/2020 | Soule et al. |
| 2020/0327895 A1 | 10/2020 | Gruber et al. |
| 2020/0334492 A1 | 10/2020 | Zheng et al. |
| 2020/0342849 A1 | 10/2020 | Yu et al. |
| 2020/0342863 A1 | 10/2020 | Aggarwal et al. |
| 2020/0356243 A1 | 11/2020 | Meyer et al. |
| 2020/0356634 A1 | 11/2020 | Srinivasan et al. |
| 2020/0357391 A1 | 11/2020 | Ghoshal et al. |
| 2020/0357406 A1 | 11/2020 | York et al. |
| 2020/0357409 A1 | 11/2020 | Sun et al. |
| 2020/0364411 A1 | 11/2020 | Evermann |
| 2020/0365155 A1 | 11/2020 | Milden |
| 2020/0367006 A1 | 11/2020 | Beckhardt |
| 2020/0372633 A1 | 11/2020 | Lee, II et al. |
| 2020/0372904 A1 | 11/2020 | Vescovi et al. |
| 2020/0372905 A1 | 11/2020 | Wang et al. |
| 2020/0374243 A1 | 11/2020 | Jina et al. |
| 2020/0379610 A1 | 12/2020 | Ford et al. |
| 2020/0379640 A1 | 12/2020 | Bellegarda et al. |
| 2020/0379726 A1 | 12/2020 | Blatz et al. |
| 2020/0379727 A1 | 12/2020 | Blatz et al. |
| 2020/0379728 A1 | 12/2020 | Gada et al. |
| 2020/0380389 A1 | 12/2020 | Eldeeb et al. |
| 2020/0380956 A1 | 12/2020 | Rossi et al. |
| 2020/0380963 A1 | 12/2020 | Chappidi et al. |
| 2020/0380966 A1 | 12/2020 | Acero et al. |
| 2020/0380973 A1 | 12/2020 | Novitchenko et al. |
| 2020/0380980 A1 | 12/2020 | Shum et al. |
| 2020/0380985 A1 | 12/2020 | Gada et al. |
| 2020/0382616 A1 | 12/2020 | Vaishampayan et al. |
| 2020/0382635 A1 | 12/2020 | Vora et al. |
| 2021/0110106 A1 | 12/2020 | Vescovi et al. |
| 2021/0006943 A1 | 1/2021 | Gross et al. |
| 2021/0011557 A1 | 1/2021 | Lemay et al. |
| 2021/0012113 A1 | 1/2021 | Petill et al. |
| 2021/0012775 A1 | 1/2021 | Kang et al. |
| 2021/0012776 A1 | 1/2021 | Peterson et al. |
| 2021/0043190 A1 | 2/2021 | Wang et al. |
| 2021/0065698 A1 | 3/2021 | Topcu et al. |
| 2021/0067631 A1 | 3/2021 | Van Os et al. |
| 2021/0072953 A1 | 3/2021 | Amarilio et al. |
| 2021/0074264 A1 | 3/2021 | Liang et al. |
| 2021/0090314 A1 | 3/2021 | Hussen et al. |
| 2021/0097998 A1 | 4/2021 | Kim et al. |
| 2021/0104232 A1 | 4/2021 | Lee et al. |
| 2021/0105528 A1 | 4/2021 | Van Os et al. |
| 2021/0110115 A1 | 4/2021 | Moritz et al. |
| 2021/0110254 A1 | 4/2021 | Duy et al. |
| 2021/0124597 A1 | 4/2021 | Ramakrishnan et al. |
| 2021/0127220 A1 | 4/2021 | Mathieu et al. |
| 2021/0141839 A1 | 5/2021 | Tang et al. |
| 2021/0149629 A1 | 5/2021 | Martel et al. |
| 2021/0149996 A1 | 5/2021 | Bellegarda |
| 2021/0150151 A1 | 5/2021 | Jiaming et al. |
| 2021/0151041 A1 | 5/2021 | Gruber et al. |
| 2021/0151070 A1 | 5/2021 | Binder et al. |
| 2021/0152684 A1 | 5/2021 | Weinstein et al. |
| 2021/0165826 A1 | 6/2021 | Graham et al. |
| 2021/0191603 A1 | 6/2021 | Napolitano et al. |
| 2021/0191968 A1 | 6/2021 | Orr et al. |
| 2021/0208752 A1 | 7/2021 | Hwang |
| 2021/0208841 A1 | 7/2021 | Wilberding |
| 2021/0216760 A1 | 7/2021 | Dominic et al. |
| 2021/0224032 A1 | 7/2021 | Ryan et al. |
| 2021/0224474 A1 | 7/2021 | Jerome et al. |
| 2021/0233532 A1 | 7/2021 | Aram et al. |
| 2021/0248804 A1 | 8/2021 | Hussen et al. |
| 2021/0249009 A1 | 8/2021 | Manjunath et al. |
| 2021/0258881 A1 | 8/2021 | Freeman et al. |
| 2021/0264913 A1 | 8/2021 | Schramm et al. |
| 2021/0271333 A1 | 9/2021 | Hindi et al. |
| 2021/0273894 A1 | 9/2021 | Tian et al. |
| 2021/0281965 A1 | 9/2021 | Malik et al. |
| 2021/0294569 A1 | 9/2021 | Piersoi et al. |
| 2021/0294571 A1 | 9/2021 | Carson et al. |
| 2021/0303116 A1 | 9/2021 | Barlow |
| 2021/0306812 A1 | 9/2021 | Gross et al. |
| 2021/0312931 A1 | 10/2021 | Paulik et al. |
| 2021/0318901 A1 | 10/2021 | Gruber et al. |
| 2021/0327409 A1 | 10/2021 | Naik |
| 2021/0334528 A1 | 10/2021 | Bray et al. |
| 2021/0335342 A1 | 10/2021 | Yuan et al. |
| 2021/0349605 A1 | 11/2021 | Nonaka et al. |
| 2021/0349608 A1 | 11/2021 | Blatz et al. |
| 2021/0350799 A1 | 11/2021 | Hansen et al. |
| 2021/0350803 A1 | 11/2021 | Hansen et al. |
| 2021/0350810 A1 | 11/2021 | Phipps et al. |
| 2021/0352115 A1 | 11/2021 | Hansen et al. |
| 2021/0357172 A1 | 11/2021 | Sinesio et al. |
| 2021/0365161 A1 | 11/2021 | Ellis et al. |
| 2021/0365174 A1 | 11/2021 | Ellis et al. |
| 2021/0366480 A1 | 11/2021 | Lemay et al. |
| 2021/0373851 A1 | 12/2021 | Stasior et al. |
| 2021/0375290 A1 | 12/2021 | Hu et al. |
| 2021/0377381 A1 | 12/2021 | Aggarwal et al. |
| 2021/0390259 A1 | 12/2021 | Hildick-Smith et al. |
| 2021/0390955 A1 | 12/2021 | Piernot |
| 2021/0402306 A1 | 12/2021 | Huang |
| 2021/0407318 A1 | 12/2021 | Pitschel et al. |
| 2021/0407502 A1 | 12/2021 | Vescovi et al. |
| 2022/0019292 A1 | 1/2022 | Lemay et al. |
| 2022/0021631 A1 | 1/2022 | Jina et al. |
| 2022/0021978 A1 | 1/2022 | Gui et al. |
| 2022/0028387 A1 | 1/2022 | Walker et al. |
| 2022/0030345 A1 | 1/2022 | Gong et al. |
| 2022/0043986 A1 | 2/2022 | Nell et al. |
| 2022/0067283 A1 | 3/2022 | Bellegarda et al. |
| 2022/0068278 A1 | 3/2022 | York et al. |
| 2022/0083986 A1 | 3/2022 | Duffy et al. |
| 2022/0084511 A1 | 3/2022 | Nickson et al. |
| 2022/0093088 A1 | 3/2022 | Sridhar et al. |
| 2022/0093095 A1 | 3/2022 | Dighe et al. |

(56) References Cited

U.S. PATENT DOCUMENTS

| | | | |
|---|---|---|---|
| 2022/0093109 A1 | 3/2022 | Orr et al. | |
| 2022/0093110 A1 | 3/2022 | Kim et al. | |
| 2022/0107780 A1 | 4/2022 | Gruber et al. | |

FOREIGN PATENT DOCUMENTS

| | | |
|---|---|---|
| AU | 2015101171 A4 | 10/2015 |
| AU | 2018100187 A4 | 3/2018 |
| AU | 2017222436 A1 | 10/2018 |
| CA | 2666438 C | 6/2013 |
| CH | 709795 A1 | 12/2015 |
| CN | 101459722 A | 6/2009 |
| CN | 101515952 A | 8/2009 |
| CN | 101567167 A | 10/2009 |
| CN | 101601088 A | 12/2009 |
| CN | 102324233 A | 1/2012 |
| CN | 102340590 A | 2/2012 |
| CN | 102346557 A | 2/2012 |
| CN | 102346719 A | 2/2012 |
| CN | 102368256 A | 3/2012 |
| CN | 102402985 A | 4/2012 |
| CN | 102405463 A | 4/2012 |
| CN | 102449438 A | 5/2012 |
| CN | 102483915 A | 5/2012 |
| CN | 102495406 A | 6/2012 |
| CN | 102498457 A | 6/2012 |
| CN | 102510426 A | 6/2012 |
| CN | 102520789 A | 6/2012 |
| CN | 101661754 B | 7/2012 |
| CN | 102629246 A | 8/2012 |
| CN | 102651217 A | 8/2012 |
| CN | 102663016 A | 9/2012 |
| CN | 102681761 A | 9/2012 |
| CN | 102681896 A | 9/2012 |
| CN | 102682769 A | 9/2012 |
| CN | 102682771 A | 9/2012 |
| CN | 102685295 A | 9/2012 |
| CN | 102693725 A | 9/2012 |
| CN | 102694909 A | 9/2012 |
| CN | 202453859 U | 9/2012 |
| CN | 102710976 A | 10/2012 |
| CN | 102722478 A | 10/2012 |
| CN | 102737104 A | 10/2012 |
| CN | 102750087 A | 10/2012 |
| CN | 102792320 A | 11/2012 |
| CN | 102801853 A | 11/2012 |
| CN | 102820033 A | 12/2012 |
| CN | 102844738 A | 12/2012 |
| CN | 102866828 A | 1/2013 |
| CN | 102870065 A | 1/2013 |
| CN | 102882752 A | 1/2013 |
| CN | 102890936 A | 1/2013 |
| CN | 102915731 A | 2/2013 |
| CN | 102917004 A | 2/2013 |
| CN | 102917271 A | 2/2013 |
| CN | 102918493 A | 2/2013 |
| CN | 102955652 A | 3/2013 |
| CN | 103035240 A | 4/2013 |
| CN | 103035251 A | 4/2013 |
| CN | 103038728 A | 4/2013 |
| CN | 103064956 A | 4/2013 |
| CN | 103093334 A | 5/2013 |
| CN | 103093755 A | 5/2013 |
| CN | 103109249 A | 5/2013 |
| CN | 103135916 A | 6/2013 |
| CN | 103187053 A | 7/2013 |
| CN | 103197963 A | 7/2013 |
| CN | 103198831 A | 7/2013 |
| CN | 103209369 A | 7/2013 |
| CN | 103217892 A | 7/2013 |
| CN | 103226949 A | 7/2013 |
| CN | 103236260 A | 8/2013 |
| CN | 103246638 A | 8/2013 |
| CN | 103268315 A | 8/2013 |
| CN | 103280218 A | 9/2013 |
| CN | 103292437 A | 9/2013 |
| CN | 103324100 A | 9/2013 |
| CN | 103327063 A | 9/2013 |
| CN | 103365279 A | 10/2013 |
| CN | 103366741 A | 10/2013 |
| CN | 203249629 U | 10/2013 |
| CN | 103390016 A | 11/2013 |
| CN | 103412789 A | 11/2013 |
| CN | 103414949 A | 11/2013 |
| CN | 103426428 A | 12/2013 |
| CN | 103455234 A | 12/2013 |
| CN | 103456303 A | 12/2013 |
| CN | 103456306 A | 12/2013 |
| CN | 103457837 A | 12/2013 |
| CN | 103475551 A | 12/2013 |
| CN | 103477592 A | 12/2013 |
| CN | 103533143 A | 1/2014 |
| CN | 103533154 A | 1/2014 |
| CN | 103543902 A | 1/2014 |
| CN | 103562863 A | 2/2014 |
| CN | 103582896 A | 2/2014 |
| CN | 103593054 A | 2/2014 |
| CN | 103608859 A | 2/2014 |
| CN | 103620605 A | 3/2014 |
| CN | 103645876 A | 3/2014 |
| CN | 103677261 A | 3/2014 |
| CN | 103686723 A | 3/2014 |
| CN | 103714816 A | 4/2014 |
| CN | 103716454 A | 4/2014 |
| CN | 103727948 A | 4/2014 |
| CN | 103744761 A | 4/2014 |
| CN | 103760984 A | 4/2014 |
| CN | 103761104 A | 4/2014 |
| CN | 103765385 A | 4/2014 |
| CN | 103778527 A | 5/2014 |
| CN | 103780758 A | 5/2014 |
| CN | 103792985 A | 5/2014 |
| CN | 103794212 A | 5/2014 |
| CN | 103795850 A | 5/2014 |
| CN | 103809548 A | 5/2014 |
| CN | 103841268 A | 6/2014 |
| CN | 103885663 A | 6/2014 |
| CN | 103902373 A | 7/2014 |
| CN | 103930945 A | 7/2014 |
| CN | 103942932 A | 7/2014 |
| CN | 103959751 A | 7/2014 |
| CN | 203721183 U | 7/2014 |
| CN | 103971680 A | 8/2014 |
| CN | 104007832 A | 8/2014 |
| CN | 102693729 B | 9/2014 |
| CN | 104036774 A | 9/2014 |
| CN | 104038621 A | 9/2014 |
| CN | 104050153 A | 9/2014 |
| CN | 104090652 A | 10/2014 |
| CN | 104092829 A | 10/2014 |
| CN | 104113471 A | 10/2014 |
| CN | 104125322 A | 10/2014 |
| CN | 104144377 A | 11/2014 |
| CN | 104145304 A | 11/2014 |
| CN | 104169837 A | 11/2014 |
| CN | 104180815 A | 12/2014 |
| CN | 104185868 A | 12/2014 |
| CN | 104240701 A | 12/2014 |
| CN | 104243699 A | 12/2014 |
| CN | 104281259 A | 1/2015 |
| CN | 104281390 A | 1/2015 |
| CN | 104284257 A | 1/2015 |
| CN | 104284486 A | 1/2015 |
| CN | 104335207 A | 2/2015 |
| CN | 104335234 A | 2/2015 |
| CN | 104350454 A | 2/2015 |
| CN | 104360990 A | 2/2015 |
| CN | 104374399 A | 2/2015 |
| CN | 104423625 A | 3/2015 |
| CN | 104423780 A | 3/2015 |
| CN | 104427104 A | 3/2015 |
| CN | 104463552 A | 3/2015 |
| CN | 104464733 A | 3/2015 |
| CN | 104487929 A | 4/2015 |

(56) References Cited

FOREIGN PATENT DOCUMENTS

| | | |
|---|---|---|
| CN | 104516522 A | 4/2015 |
| CN | 104573472 A | 4/2015 |
| CN | 104575493 A | 4/2015 |
| CN | 104575501 A | 4/2015 |
| CN | 104584010 A | 4/2015 |
| CN | 104584096 A | 4/2015 |
| CN | 104584601 A | 4/2015 |
| CN | 104604274 A | 5/2015 |
| CN | 104679472 A | 6/2015 |
| CN | 104699746 A | 6/2015 |
| CN | 104731441 A | 6/2015 |
| CN | 104769584 A | 7/2015 |
| CN | 104769670 A | 7/2015 |
| CN | 104798012 A | 7/2015 |
| CN | 104821167 A | 8/2015 |
| CN | 104821934 A | 8/2015 |
| CN | 104836909 A | 8/2015 |
| CN | 104854583 A | 8/2015 |
| CN | 104867492 A | 8/2015 |
| CN | 104869342 A | 8/2015 |
| CN | 104951077 A | 9/2015 |
| CN | 104967748 A | 10/2015 |
| CN | 104969289 A | 10/2015 |
| CN | 104978963 A | 10/2015 |
| CN | 105025051 A | 11/2015 |
| CN | 105027197 A | 11/2015 |
| CN | 105093526 A | 11/2015 |
| CN | 105100356 A | 11/2015 |
| CN | 105144136 A | 12/2015 |
| CN | 105164678 A | 12/2015 |
| CN | 105164719 A | 12/2015 |
| CN | 105190607 A | 12/2015 |
| CN | 105247511 A | 1/2016 |
| CN | 105247551 A | 1/2016 |
| CN | 105264524 A | 1/2016 |
| CN | 105278681 A | 1/2016 |
| CN | 105320251 A | 2/2016 |
| CN | 105320726 A | 2/2016 |
| CN | 105379234 A | 3/2016 |
| CN | 105430186 A | 3/2016 |
| CN | 105471705 A | 4/2016 |
| CN | 105472587 A | 4/2016 |
| CN | 105516441 A | 4/2016 |
| CN | 105554217 A | 5/2016 |
| CN | 105556592 A | 5/2016 |
| CN | 105808200 A | 7/2016 |
| CN | 105830048 A | 8/2016 |
| CN | 105869641 A | 8/2016 |
| CN | 105872222 A | 8/2016 |
| CN | 105917311 A | 8/2016 |
| CN | 106030699 A | 10/2016 |
| CN | 106062734 A | 10/2016 |
| CN | 106062790 A | 10/2016 |
| CN | 106415412 A | 2/2017 |
| CN | 106462383 A | 2/2017 |
| CN | 106463114 A | 2/2017 |
| CN | 106465074 A | 2/2017 |
| CN | 106471570 A | 3/2017 |
| CN | 106534469 A | 3/2017 |
| CN | 106558310 A | 4/2017 |
| CN | 106773742 A | 5/2017 |
| CN | 106776581 A | 5/2017 |
| CN | 107004412 A | 8/2017 |
| CN | 107450800 A | 12/2017 |
| CN | 107480161 A | 12/2017 |
| CN | 107491285 A | 12/2017 |
| CN | 107491468 A | 12/2017 |
| CN | 107506037 A | 12/2017 |
| CN | 107545262 A | 1/2018 |
| CN | 107608998 A | 1/2018 |
| CN | 107615378 A | 1/2018 |
| CN | 107623616 A | 1/2018 |
| CN | 107786730 A | 3/2018 |
| CN | 107852436 A | 3/2018 |
| CN | 107871500 A | 4/2018 |
| CN | 107919123 A | 4/2018 |
| CN | 107924313 A | 4/2018 |
| CN | 107978313 A | 5/2018 |
| CN | 108268187 A | 7/2018 |
| CN | 108647681 A | 10/2018 |
| CN | 109447234 A | 3/2019 |
| CN | 109657629 A | 4/2019 |
| CN | 110135411 A | 8/2019 |
| CN | 110263144 A | 9/2019 |
| CN | 105164719 B | 11/2019 |
| CN | 110531860 A | 12/2019 |
| CN | 110598671 A | 12/2019 |
| CN | 110647274 A | 1/2020 |
| CN | 110825469 A | 2/2020 |
| CN | 110945840 A | 3/2020 |
| CN | 111124224 A | 5/2020 |
| CN | 107123417 B | 6/2020 |
| CN | 111316203 A | 6/2020 |
| DE | 202016008226 U1 | 5/2017 |
| EP | 1022724 A1 | 7/2000 |
| EP | 1278360 A1 | 1/2003 |
| EP | 1562180 A1 | 8/2005 |
| EP | 2431842 A2 | 3/2012 |
| EP | 2523109 A1 | 11/2012 |
| EP | 2523188 A1 | 11/2012 |
| EP | 2551784 A1 | 1/2013 |
| EP | 2555536 A1 | 2/2013 |
| EP | 2575128 A2 | 4/2013 |
| EP | 2632129 A1 | 8/2013 |
| EP | 2639792 A1 | 9/2013 |
| EP | 2669889 A2 | 12/2013 |
| EP | 2672229 A2 | 12/2013 |
| EP | 2672231 A2 | 12/2013 |
| EP | 2675147 A1 | 12/2013 |
| EP | 2680257 A1 | 1/2014 |
| EP | 2683147 A1 | 1/2014 |
| EP | 2683175 A1 | 1/2014 |
| EP | 2672231 A3 | 4/2014 |
| EP | 2717259 A2 | 4/2014 |
| EP | 2725577 A2 | 4/2014 |
| EP | 2733598 A2 | 5/2014 |
| EP | 2733896 A1 | 5/2014 |
| EP | 2743846 A2 | 6/2014 |
| EP | 2760015 A1 | 7/2014 |
| EP | 2779160 A1 | 9/2014 |
| EP | 2781883 A2 | 9/2014 |
| EP | 2787683 A1 | 10/2014 |
| EP | 2801890 A1 | 11/2014 |
| EP | 2801972 A1 | 11/2014 |
| EP | 2801974 A2 | 11/2014 |
| EP | 2824564 A1 | 1/2015 |
| EP | 2849177 A1 | 3/2015 |
| EP | 2879402 A1 | 6/2015 |
| EP | 2881939 A1 | 6/2015 |
| EP | 2891049 A1 | 7/2015 |
| EP | 2915021 A2 | 9/2015 |
| EP | 2930715 A1 | 10/2015 |
| EP | 2938022 A1 | 10/2015 |
| EP | 2940556 A1 | 11/2015 |
| EP | 2947859 A1 | 11/2015 |
| EP | 2950307 A1 | 12/2015 |
| EP | 2957986 A1 | 12/2015 |
| EP | 2973380 A2 | 1/2016 |
| EP | 2985984 A2 | 2/2016 |
| EP | 2891049 A4 | 3/2016 |
| EP | 3032532 A1 | 6/2016 |
| EP | 3035329 A1 | 6/2016 |
| EP | 3038333 A1 | 6/2016 |
| EP | 3115905 A1 | 1/2017 |
| EP | 3125097 A2 | 2/2017 |
| EP | 2672231 B1 | 5/2017 |
| EP | 3161612 A1 | 5/2017 |
| EP | 3200185 A1 | 8/2017 |
| EP | 3224708 A1 | 10/2017 |
| EP | 3227771 A1 | 10/2017 |
| EP | 3246916 A1 | 11/2017 |
| EP | 3270658 A1 | 1/2018 |
| EP | 3300074 A1 | 3/2018 |
| EP | 2973380 B1 | 8/2018 |

(56) References Cited

FOREIGN PATENT DOCUMENTS

| | | |
|---|---|---|
| EP | 2983065 B1 | 8/2018 |
| EP | 3392876 A1 | 10/2018 |
| EP | 3401773 A1 | 11/2018 |
| EP | 2973002 B1 | 6/2019 |
| EP | 3506151 A1 | 7/2019 |
| EP | 3323058 B1 | 2/2020 |
| GB | 2445436 A | 7/2008 |
| IN | 2011MU03716 A | 2/2012 |
| IN | 2012MU01227 A | 6/2012 |
| JP | 2-146099 A | 6/1990 |
| JP | 9-62293 A | 3/1997 |
| JP | 10-312194 A | 11/1998 |
| JP | 11-288296 A | 10/1999 |
| JP | 2000-29661 A | 1/2000 |
| JP | 2000-214879 A | 8/2000 |
| JP | 2000-312255 A | 11/2000 |
| JP | 2003-44090 A | 2/2003 |
| JP | 2003-255991 A | 9/2003 |
| JP | 2003-298687 A | 10/2003 |
| JP | 2004-56226 A | 2/2004 |
| JP | 2004-101901 A | 4/2004 |
| JP | 2004-202227 A | 7/2004 |
| JP | 2004-294946 A | 10/2004 |
| JP | 2004-310034 A | 11/2004 |
| JP | 2005-303435 A | 10/2005 |
| JP | 3726448 B2 | 12/2005 |
| JP | 2007-272773 A | 10/2007 |
| JP | 2008-309864 A | 12/2008 |
| JP | 2009-15148 A | 1/2009 |
| JP | 2009-116841 A | 5/2009 |
| JP | 2009-169470 A | 7/2009 |
| JP | 4319573 B2 | 8/2009 |
| JP | 2010-135976 A | 6/2010 |
| JP | 2011-237621 A | 11/2011 |
| JP | 2012-14394 A | 1/2012 |
| JP | 2012-502377 A | 1/2012 |
| JP | 2012-22478 A | 2/2012 |
| JP | 2012-33997 A | 2/2012 |
| JP | 2012-37619 A | 2/2012 |
| JP | 2012-40655 A | 3/2012 |
| JP | 2012-63536 A | 3/2012 |
| JP | 2012-508530 A | 4/2012 |
| JP | 2012-89020 A | 5/2012 |
| JP | 2012-511774 A | 5/2012 |
| JP | 2012-116442 A | 6/2012 |
| JP | 2012-142744 A | 7/2012 |
| JP | 2012-147063 A | 8/2012 |
| JP | 2012-150804 A | 8/2012 |
| JP | 2012-164070 A | 8/2012 |
| JP | 2012-165084 A | 8/2012 |
| JP | 2012-518847 A | 8/2012 |
| JP | 2012-211932 A | 11/2012 |
| JP | 2012-220959 A | 11/2012 |
| JP | 2013-37688 A | 2/2013 |
| JP | 2013-46171 A | 3/2013 |
| JP | 2013-511214 A | 3/2013 |
| JP | 2013-65284 A | 4/2013 |
| JP | 2013-73240 A | 4/2013 |
| JP | 2013-513315 A | 4/2013 |
| JP | 2013-80476 A | 5/2013 |
| JP | 2013-517566 A | 5/2013 |
| JP | 2013-131087 A | 7/2013 |
| JP | 2013-134430 A | 7/2013 |
| JP | 2013-134729 A | 7/2013 |
| JP | 2013-140520 A | 7/2013 |
| JP | 2013-527947 A | 7/2013 |
| JP | 2013-528012 A | 7/2013 |
| JP | 2013-148419 A | 8/2013 |
| JP | 2013-156349 A | 8/2013 |
| JP | 2013-174987 A | 9/2013 |
| JP | 2013-535059 A | 9/2013 |
| JP | 2013-200265 A | 10/2013 |
| JP | 2013-200423 A | 10/2013 |
| JP | 2013-205999 A | 10/2013 |
| JP | 2013-238935 A | 11/2013 |
| JP | 2013-238936 A | 11/2013 |
| JP | 2013-248292 A | 12/2013 |
| JP | 2013-257694 A | 12/2013 |
| JP | 2013-258600 A | 12/2013 |
| JP | 2014-2586 A | 1/2014 |
| JP | 2014-10688 A | 1/2014 |
| JP | 2014-502445 A | 1/2014 |
| JP | 2014-26629 A | 2/2014 |
| JP | 2014-45449 A | 3/2014 |
| JP | 2014-507903 A | 3/2014 |
| JP | 2014-60600 A | 4/2014 |
| JP | 2014-72586 A | 4/2014 |
| JP | 2014-77969 A | 5/2014 |
| JP | 2014-89711 A | 5/2014 |
| JP | 2014-109889 A | 6/2014 |
| JP | 2014-124332 A | 7/2014 |
| JP | 2014-126600 A | 7/2014 |
| JP | 2014-127754 A | 7/2014 |
| JP | 2014-140121 A | 7/2014 |
| JP | 2014-518409 A | 7/2014 |
| JP | 2014-142566 A | 8/2014 |
| JP | 2014-145842 A | 8/2014 |
| JP | 2014-146940 A | 8/2014 |
| JP | 2014-150323 A | 8/2014 |
| JP | 2014-519648 A | 8/2014 |
| JP | 2014-524627 A | 9/2014 |
| JP | 2014-191272 A | 10/2014 |
| JP | 2014-219614 A | 11/2014 |
| JP | 2014-222514 A | 11/2014 |
| JP | 2015-1931 A | 1/2015 |
| JP | 2015-4928 A | 1/2015 |
| JP | 2015-8001 A | 1/2015 |
| JP | 2015-12301 A | 1/2015 |
| JP | 2015-18365 A | 1/2015 |
| JP | 2015-501022 A | 1/2015 |
| JP | 2015-501034 A | 1/2015 |
| JP | 2015-504619 A | 2/2015 |
| JP | 2015-41845 A | 3/2015 |
| JP | 2015-52500 A | 3/2015 |
| JP | 2015-60423 A | 3/2015 |
| JP | 2015-81971 A | 4/2015 |
| JP | 2015-83938 A | 4/2015 |
| JP | 2015-94848 A | 5/2015 |
| JP | 2015-514254 A | 5/2015 |
| JP | 2015-519675 A | 7/2015 |
| JP | 2015-524974 A | 8/2015 |
| JP | 2015-526776 A | 9/2015 |
| JP | 2015-527683 A | 9/2015 |
| JP | 2015-528140 A | 9/2015 |
| JP | 2015-528918 A | 10/2015 |
| JP | 2015-531909 A | 11/2015 |
| JP | 2016-504651 A | 2/2016 |
| JP | 2016-35614 A | 3/2016 |
| JP | 2016-508007 A | 3/2016 |
| JP | 2016-71247 A | 5/2016 |
| JP | 2016-119615 A | 6/2016 |
| JP | 2016-151928 A | 8/2016 |
| JP | 2016-524193 A | 8/2016 |
| JP | 2016-536648 A | 11/2016 |
| JP | 2017-11608 A | 1/2017 |
| JP | 2017-19331 A | 1/2017 |
| JP | 2017-516153 A | 6/2017 |
| JP | 2017-123187 A | 7/2017 |
| JP | 2017-211608 A | 11/2017 |
| JP | 2017-537361 A | 12/2017 |
| JP | 6291147 B1 | 2/2018 |
| JP | 2018-101242 A | 6/2018 |
| JP | 2018-113035 A | 7/2018 |
| JP | 2018-525950 A | 9/2018 |
| JP | 2018-536889 A | 12/2018 |
| KR | 10-2003-0018073 A | 3/2003 |
| KR | 10-2006-0068393 A | 6/2006 |
| KR | 10-2006-0084455 A | 7/2006 |
| KR | 10-0702645 B1 | 4/2007 |
| KR | 10-2011-0005937 A | 1/2011 |
| KR | 10-2011-0100620 A | 9/2011 |
| KR | 10-2012-0020164 A | 3/2012 |
| KR | 10-2012-0031722 A | 4/2012 |
| KR | 10-2012-0066523 A | 6/2012 |

(56) References Cited

FOREIGN PATENT DOCUMENTS

| | | |
|---|---|---|
| KR | 10-2012-0082371 A | 7/2012 |
| KR | 10-2012-0084472 A | 7/2012 |
| KR | 10-1178310 B1 | 8/2012 |
| KR | 10-2012-0120316 A | 11/2012 |
| KR | 10-2012-0137424 A | 12/2012 |
| KR | 10-2012-0137435 A | 12/2012 |
| KR | 10-2012-0137440 A | 12/2012 |
| KR | 10-2012-0138826 A | 12/2012 |
| KR | 10-2012-0139827 A | 12/2012 |
| KR | 10-1193668 B1 | 12/2012 |
| KR | 10-2013-0035983 A | 4/2013 |
| KR | 10-2013-0086750 A | 8/2013 |
| KR | 10-2013-0090947 A | 8/2013 |
| KR | 10-2013-0108563 A | 10/2013 |
| KR | 10-1334342 B1 | 11/2013 |
| KR | 10-2013-0131252 A | 12/2013 |
| KR | 10-2013-0133629 A | 12/2013 |
| KR | 10-2014-0007282 A | 1/2014 |
| KR | 10-2014-0024271 A | 2/2014 |
| KR | 10-2014-0025996 A | 3/2014 |
| KR | 10-2014-0031283 A | 3/2014 |
| KR | 10-2014-0033574 A | 3/2014 |
| KR | 10-2014-0042994 A | 4/2014 |
| KR | 10-2014-0055204 A | 5/2014 |
| KR | 10-2014-0059697 A | 5/2014 |
| KR | 10-2014-0068752 A | 6/2014 |
| KR | 10-2014-0071208 A | 6/2014 |
| KR | 10-2014-0088449 A | 7/2014 |
| KR | 10-2014-0093949 A | 7/2014 |
| KR | 10-2014-0106715 A | 9/2014 |
| KR | 10-2014-0107253 A | 9/2014 |
| KR | 10-2014-0147557 A | 12/2014 |
| KR | 10-2015-0006454 A | 1/2015 |
| KR | 10-2015-0013631 A | 2/2015 |
| KR | 10-1506510 B1 | 3/2015 |
| KR | 10-2015-0038375 A | 4/2015 |
| KR | 10-2015-0039380 A | 4/2015 |
| KR | 10-2015-0041974 A | 4/2015 |
| KR | 10-2015-0043512 A | 4/2015 |
| KR | 10-2015-0062811 A | 6/2015 |
| KR | 10-2015-0095624 A | 8/2015 |
| KR | 10-1555742 B1 | 9/2015 |
| KR | 10-2015-0113127 A | 10/2015 |
| KR | 10-2015-0131262 A | 11/2015 |
| KR | 10-2015-0138109 A | 12/2015 |
| KR | 10-2016-0004351 A | 1/2016 |
| KR | 10-2016-0010523 A | 1/2016 |
| KR | 10-2016-0040279 A | 4/2016 |
| KR | 10-2016-0055839 A | 5/2016 |
| KR | 10-2016-0065503 A | 6/2016 |
| KR | 10-2016-0101079 A | 8/2016 |
| KR | 10-2016-0101198 A | 8/2016 |
| KR | 10-2016-0105847 A | 9/2016 |
| KR | 10-2016-0121585 A | 10/2016 |
| KR | 10-2016-0127165 A | 11/2016 |
| KR | 10-2016-0140694 A | 12/2016 |
| KR | 10-2016-0147854 A | 12/2016 |
| KR | 10-2017-0004482 A | 1/2017 |
| KR | 10-2017-0036805 A | 4/2017 |
| KR | 10-2017-0104006 A | 9/2017 |
| KR | 10-2017-0107058 A | 9/2017 |
| KR | 10-1776673 B1 | 9/2017 |
| KR | 10-2018-0032632 A | 3/2018 |
| KR | 10-2018-0034637 A | 4/2018 |
| KR | 10-2018-0135877 A | 12/2018 |
| KR | 10-1959328 B1 | 3/2019 |
| KR | 10-2020-0105519 A | 9/2020 |
| RU | 2012141604 A | 4/2014 |
| TW | 201227715 A | 7/2012 |
| TW | 201245989 A | 11/2012 |
| TW | 201312548 A | 3/2013 |
| TW | 201407184 A | 2/2014 |
| TW | 201610982 A | 3/2016 |
| TW | 201629750 A | 8/2016 |
| WO | 2007/009225 A1 | 1/2007 |
| WO | 2008/075082 A1 | 6/2008 |
| WO | 2009/034686 A1 | 3/2009 |
| WO | 2010/054373 A2 | 5/2010 |
| WO | 2010/109358 A1 | 9/2010 |
| WO | 2011/088053 A2 | 7/2011 |
| WO | 2011/133573 A2 | 10/2011 |
| WO | 2011/097309 A3 | 12/2011 |
| WO | 2011/163350 A1 | 12/2011 |
| WO | 2011/088053 A3 | 1/2012 |
| WO | 2012/008434 A1 | 1/2012 |
| WO | 2012/019020 A1 | 2/2012 |
| WO | 2012/019637 A1 | 2/2012 |
| WO | 2012/033312 A1 | 3/2012 |
| WO | 2012/056463 A1 | 5/2012 |
| WO | 2012/063260 A2 | 5/2012 |
| WO | 2012/084965 A1 | 6/2012 |
| WO | 2012/092562 A1 | 7/2012 |
| WO | 2012/112331 A2 | 8/2012 |
| WO | 2012/129231 A1 | 9/2012 |
| WO | 2012/063260 A3 | 10/2012 |
| WO | 2012/135157 A2 | 10/2012 |
| WO | 2012/154317 A1 | 11/2012 |
| WO | 2012/154748 A1 | 11/2012 |
| WO | 2012/155079 A2 | 11/2012 |
| WO | 2012/160567 A1 | 11/2012 |
| WO | 2012/167168 A2 | 12/2012 |
| WO | 2012/173902 A2 | 12/2012 |
| WO | 2013/009578 A2 | 1/2013 |
| WO | 2013/022135 A1 | 2/2013 |
| WO | 2013/022223 A2 | 2/2013 |
| WO | 2013/048880 A1 | 4/2013 |
| WO | 2013/049358 A1 | 4/2013 |
| WO | 2013/057153 A1 | 4/2013 |
| WO | 2013/101489 A1 | 7/2013 |
| WO | 2013/118988 A1 | 8/2013 |
| WO | 2013/122310 A1 | 8/2013 |
| WO | 2013/128999 A1 | 9/2013 |
| WO | 2013/133533 A1 | 9/2013 |
| WO | 2013/137660 A1 | 9/2013 |
| WO | 2013/163113 A1 | 10/2013 |
| WO | 2013/163857 A1 | 11/2013 |
| WO | 2013/169842 A2 | 11/2013 |
| WO | 2013/173504 A1 | 11/2013 |
| WO | 2013/173511 A2 | 11/2013 |
| WO | 2013/176847 A1 | 11/2013 |
| WO | 2013/184953 A1 | 12/2013 |
| WO | 2013/184990 A1 | 12/2013 |
| WO | 2014/003138 A1 | 1/2014 |
| WO | 2014/004544 A2 | 1/2014 |
| WO | 2014/018580 A1 | 1/2014 |
| WO | 2014/021967 A1 | 2/2014 |
| WO | 2014/022148 A1 | 2/2014 |
| WO | 2014/028735 A2 | 2/2014 |
| WO | 2014/028797 A1 | 2/2014 |
| WO | 2014/031505 A1 | 2/2014 |
| WO | 2014/032461 A1 | 3/2014 |
| WO | 2014/040022 A2 | 3/2014 |
| WO | 2014/046475 A1 | 3/2014 |
| WO | 2014/047047 A1 | 3/2014 |
| WO | 2014/048855 A1 | 4/2014 |
| WO | 2014/066352 A1 | 5/2014 |
| WO | 2014/070872 A1 | 5/2014 |
| WO | 2014/073825 A1 | 5/2014 |
| WO | 2014/078965 A1 | 5/2014 |
| WO | 2014/093339 A1 | 6/2014 |
| WO | 2014/093911 A2 | 6/2014 |
| WO | 2014/096506 A1 | 6/2014 |
| WO | 2014/124332 A2 | 8/2014 |
| WO | 2014/137074 A1 | 9/2014 |
| WO | 2014/138604 A1 | 9/2014 |
| WO | 2014/143959 A2 | 9/2014 |
| WO | 2014/144395 A1 | 9/2014 |
| WO | 2014/144579 A1 | 9/2014 |
| WO | 2014/144949 A2 | 9/2014 |
| WO | 2014/149473 A1 | 9/2014 |
| WO | 2014/151153 A2 | 9/2014 |
| WO | 2014/124332 A3 | 10/2014 |
| WO | 2014/159578 A1 | 10/2014 |
| WO | 2014/159581 A1 | 10/2014 |

(56) References Cited

FOREIGN PATENT DOCUMENTS

| | | |
|---|---|---|
| WO | 2014/162570 A1 | 10/2014 |
| WO | 2014/169269 A1 | 10/2014 |
| WO | 2014/173189 A1 | 10/2014 |
| WO | 2013/173504 A8 | 12/2014 |
| WO | 2014/197336 A1 | 12/2014 |
| WO | 2014/197339 A1 | 12/2014 |
| WO | 2014/197635 A2 | 12/2014 |
| WO | 2014/197730 A1 | 12/2014 |
| WO | 2014/200728 A1 | 12/2014 |
| WO | 2014/204659 A2 | 12/2014 |
| WO | 2014/210392 A2 | 12/2014 |
| WO | 2015/018440 A1 | 2/2015 |
| WO | 2015/020942 A1 | 2/2015 |
| WO | 2015/029379 A1 | 3/2015 |
| WO | 2015/030796 A1 | 3/2015 |
| WO | 2015/036817 A1 | 3/2015 |
| WO | 2015/041882 A1 | 3/2015 |
| WO | 2015/041892 A1 | 3/2015 |
| WO | 2015/047932 A1 | 4/2015 |
| WO | 2015/053485 A1 | 4/2015 |
| WO | 2015/054141 A1 | 4/2015 |
| WO | 2015/080530 A1 | 6/2015 |
| WO | 2015/084659 A1 | 6/2015 |
| WO | 2015/092943 A1 | 6/2015 |
| WO | 2015/094169 A1 | 6/2015 |
| WO | 2015/094369 A1 | 6/2015 |
| WO | 2015/098306 A1 | 7/2015 |
| WO | 2015/099939 A1 | 7/2015 |
| WO | 2015/112625 A1 | 7/2015 |
| WO | 2015/116151 A1 | 8/2015 |
| WO | 2015/121449 A1 | 8/2015 |
| WO | 2015/127404 A1 | 8/2015 |
| WO | 2015/151133 A1 | 10/2015 |
| WO | 2015/153310 A1 | 10/2015 |
| WO | 2015/157013 A1 | 10/2015 |
| WO | 2015/183368 A1 | 12/2015 |
| WO | 2015/183401 A1 | 12/2015 |
| WO | 2015/183699 A1 | 12/2015 |
| WO | 2015/184186 A1 | 12/2015 |
| WO | 2015/184387 A1 | 12/2015 |
| WO | 2015/200207 A1 | 12/2015 |
| WO | 2016/027933 A1 | 2/2016 |
| WO | 2016/028946 A1 | 2/2016 |
| WO | 2016/033257 A1 | 3/2016 |
| WO | 2016/039992 A1 | 3/2016 |
| WO | 2016/040721 A1 | 3/2016 |
| WO | 2016/051519 A1 | 4/2016 |
| WO | 2016/052164 A1 | 4/2016 |
| WO | 2016/054230 A1 | 4/2016 |
| WO | 2016/057268 A1 | 4/2016 |
| WO | 2016/075081 A1 | 5/2016 |
| WO | 2016/085775 A2 | 6/2016 |
| WO | 2016/085776 A1 | 6/2016 |
| WO | 2016/089029 A1 | 6/2016 |
| WO | 2016/100139 A1 | 6/2016 |
| WO | 2016/111881 A1 | 7/2016 |
| WO | 2016/144840 A1 | 9/2016 |
| WO | 2016/144982 A1 | 9/2016 |
| WO | 2016/144983 A1 | 9/2016 |
| WO | 2016/175354 A1 | 11/2016 |
| WO | 2016/187149 A1 | 11/2016 |
| WO | 2016/190950 A1 | 12/2016 |
| WO | 2016/209444 A1 | 12/2016 |
| WO | 2016/209924 A1 | 12/2016 |
| WO | 2017/044160 A1 | 3/2017 |
| WO | 2017/044257 A1 | 3/2017 |
| WO | 2017/044260 A1 | 3/2017 |
| WO | 2017/044629 A1 | 3/2017 |
| WO | 2017/053311 A1 | 3/2017 |
| WO | 2017/058293 A1 | 4/2017 |
| WO | 2017/059388 A1 | 4/2017 |
| WO | 2017/071420 A1 | 5/2017 |
| WO | 2017/142116 A1 | 8/2017 |
| WO | 2017/160487 A1 | 9/2017 |
| WO | 2017/200777 A1 | 11/2017 |
| WO | 2017/203484 A1 | 11/2017 |
| WO | 2017/213678 A1 | 12/2017 |
| WO | 2017/213682 A1 | 12/2017 |
| WO | 2017/218194 A1 | 12/2017 |
| WO | 2018/009397 A1 | 1/2018 |
| WO | 2018/044633 A1 | 3/2018 |
| WO | 2018/067528 A1 | 4/2018 |
| WO | 2018/176053 A1 | 9/2018 |
| WO | 2018/209152 A1 | 11/2018 |
| WO | 2018/213401 A1 | 11/2018 |
| WO | 2018/213415 A1 | 11/2018 |
| WO | 2018/231307 A1 | 12/2018 |
| WO | 2019/067930 A1 | 4/2019 |
| WO | 2019/078576 A1 | 4/2019 |
| WO | 2019/079017 A1 | 4/2019 |
| WO | 2019/143397 A1 | 7/2019 |
| WO | 2019/147429 A1 | 8/2019 |
| WO | 2019/236217 A1 | 12/2019 |
| WO | 2020/010530 A1 | 1/2020 |
| WO | 2020/109074 A1 | 6/2020 |
| WO | 2021/054565 A1 | 3/2021 |
| WO | 2021/252230 A1 | 12/2021 |

OTHER PUBLICATIONS

Office Action received for Korean Patent Application No. 10-2020-7015307, dated Aug. 24, 2021, 7 pages (3 pages of English Translation and 4 pages of Official Copy).
AAAAPlay, "Sony Media Remote for iOS and Android", Online available at: <https://www.youtube.com/watch?v=W8QoeQhlGok>, Feb. 4, 2012, 3 pages.
"Alexa, Turn Up the Heat!, Smartthings Samsung [online]", Online available at:—<https://web.archive.org/web/20160329142041/https://blog.smartthings.com/news/smartthingsupdates/alexa-turn-up-the-heat/>, Mar. 3, 2016, 3 pages.
Alfred App, "Alfred", Online available at:—<http://www.alfredapp.com/>, retrieved on Feb. 8, 2012, 5 pages.
Anania Peter, "Amazon Echo with Home Automation (Smartthings)", Online available at:—<https://www.youtube.com/watch?v=LMW6aXmsWNE>, Dec. 20, 2015, 1 page.
Android Authority, "How to use Tasker: A Beginner's Guide", Online available at:—<https://youtube.com/watch?v= rDpdS_YWzFc>, May 1, 2013, 1 page.
Apple, "VoiceOver for Os X", Online available at:—<http://www.apple.com/accessibility/voiceover/>, May 19, 2014, pp. 1-3.
Applicant Initiated Interview Summary received for U.S. Appl. No. 16/222,249, dated Nov. 26, 2019, 3 pages.
Asakura et al., "What LG thinks; How the TV should be in the Living Room", HiVi, vol. 31, No. 7, Stereo Sound Publishing, Inc., Jun. 17, 2013, pp. 68-71.
AshingtonDCTech & Gaming, "SwipeStatusBar—Reveal the Status Bar in a Fullscreen App", Online Available at: <https://www.youtube.com/watch?v=wA_tT9IAreQ>, Jul. 1, 2013, 3 pages.
"Ask Alexa—Things That Are Smart Wiki", Online available at:—<http://thingsthataresmart.wiki/index.php?title=Ask_Alexa&oldid=4283>, Jun. 8, 2016, pp. 1-31.
Automate Your Life, "How to Setup Google Home Routines—A Google Home Routines Walkthrough", Online Available at: <https://www.youtube.com/watch?v=pXokZHP9kZg>, Aug. 12, 2018, 1 page.
Bell, Jason, "Machine Learning Hands-On for Developers and Technical Professionals", Wiley, 2014, 82 pages.
Bellegarda, Jeromer, "Chapter 1: Spoken Language Understanding for Natural Interaction: The Siri Experience", Natural Interaction with Robots, Knowbots and Smartphones, 2014, pp. 3-14.
Bellegarda, Jeromer, "Spoken Language Understanding for Natural Interaction: The Siri Experience", Slideshow retrieved from : <https://www.uni-ulm.de/fileadmin/website_uni_ulm/iui.iwsds2012/files/Bellegarda.pdf>, International Workshop on Spoken Dialog Systems (IWSDS), May 2012, pp. 1-43.
beointegration.com, "BeoLink Gateway—Programming Example", Online Available at: <https://www.youtube.com/watch?v=TXDaJFm5UH4>, Mar. 4, 2015, 3 pages.

(56) References Cited

OTHER PUBLICATIONS

Board Decision received for Chinese Patent Application No. 201480007349.6, mailed on Jan. 8, 2021, 19 pages.
Burgess, Brian, "Amazon Echo Tip: Enable the Wake Up Sound", Online available at:—<https://www.groovypost.com/howto/amazon-echo-tip-enable-wake-up-sound/>, Jun. 30, 2015, 4 pages.
Butcher, Mike, "EVI Arrives in Town to go Toe-to-Toe with Siri", TechCrunch, Jan. 23, 2012, pp. 1-2.
Cambria et al., "Jumping NLP curves: A Review of Natural Language Processing Research.", IEEE Computational Intelligence magazine, 2014, vol. 9, May 2014, pp. 48-57.
Caraballo et al., "Language Identification Based on a Discriminative Text Categorization Technique", Iberspeech 2012—VII Jornadas En Tecnologia Del Habla and III Iberian Sltech Workshop, Nov. 21, 2012, pp. 1-10.
Castleos, "Whole House Voice Control Demonstration", Online available at:—<https://www.youtube.com/watch?v=9SRCoxrZ_W4>, Jun. 2, 2012, 1 pages.
Chang et al., "Monaural Multi-Talker Speech Recognition with Attention Mechanism and Gated Convolutional Networks", Interspeech 2018, Sep. 2-6, 2018, pp. 1586-1590.
Chen et al., "A Convolutional Neural Network with Dynamic Correlation Pooling", 13th International Conference on Computational Intelligence and Security, IEEE, 2017, pp. 496-499.
Chen et al., "Progressive Joint Modeling in Unsupervised Single-Channel Overlapped Speech Recognition", IEEE/ACM Transactions on Audio, Speech, and Language Processing, vol. 26, No. 1, Jan. 2018, pp. 184-196.
Chen, Yi, "Multimedia Siri Finds and Plays Whatever You Ask for", PSFK Report, Feb. 9, 2012, pp. 1-9.
Cheyer, Adam, "Adam Cheyer—About", Online available at:—<http://www.adam.cheyer.com/about.html>, retrieved on Sep. 17, 2012, pp. 1-2.
Colt, Sam, "Here's One Way Apple's Smartwatch Could Be Better Than Anything Else", Business Insider, Aug. 21, 2014, pp. 1-4.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
Czech Lucas, "A System for Recognizing Natural Spelling of English Words", Diploma Thesis, Karlsruhe Institute of Technology, May 7, 2014, 107 pages.
Decision of the Board of Appeal received for Japanese Patent Application No. 2015-557147, mailed on Jan. 21, 2019, 27 pages.
Decision to Grant received for European Patent Application No. 14707872.9, dated Mar. 4, 2021, 2 pages.
Decision to Grant received for German Patent Application No. 112014000709.9, dated Sep. 22, 2021, 9 pages.
Deedeevuu, "Amazon Echo Alarm Feature", Online available at:—<https://www.youtube.com/watch?v=fdjU8eRLk7c>, Feb. 16, 2015, 1 page.
Delcroix et al., "Context Adaptive Deep Neural Networks For Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
Derrick, Amanda, "How to Set Up Google Home for Multiple Users", Lifewire, Online available at:—<https://www.lifewire.com/set-up-google-home-multiple-users-4685691 >, Jun. 8, 2020, 9 pages.
Dihelson, "How Can I Use Voice or Phrases as Triggers to Macrodroid?", Macrodroid Forums, Online Available at:—<https://www.tapatalk.com/groups/macrodroid/how-can-i-use-voice-or-phrases-as-triggers-to-macr-t4845.html>, May 9, 2018, 5 pages.
"DIRECTV™ Voice", Now Part of the directtv Mobile App for Phones, Sep. 18, 2013, 5 pages.
Earthling1984, "Samsung Galaxy Smart Stay Feature Explained", Online available at:—<https://www.youtube.com/watch?v=RpjBNtSjupl>, May 29, 2013, 1 page.

Eder et al., "At the Lower End of Language—Exploring the Vulgar and Obscene Side of German", Proceedings of the Third Workshop on Abusive Language Online, Florence, Italy, Aug. 1, 2019, pp. 119-128.
Edim, et al., "A Multi-Agent Based Virtual Personal Assistant for E-Health Service", Journal of Information Engineering and Applications, vol. 3, No. 11, 2013, 9 pages.
Evi, "Meet Evi: The One Mobile Application that Provides Solutions for your Everyday Problems", Feb. 2012, 3 pages.
Examiner's Pre-Review Report received for Japanese Patent Application No. 2015-557147, dated Mar. 1, 2018, 4 pages.
Extended European Search Report received for European Patent Application No. 20198363.2, dated Mar. 22, 2021, 7 pages.
Filipowicz, Luke, "How to use the QuickType keyboard in iOS 8", Online available at:—<https://www.imore.com/comment/568232>, Oct. 11, 2014, pp. 1-17.
Final Office Action received for U.S. Appl. No. 14/175,864, dated Feb. 23, 2018, 26 pages.
Final Office Action received for U.S. Appl. No. 16/222,249 dated Sep. 6, 2019, 9 pages.
Findlater et al., "Beyond QWERTY: Augmenting Touch-Screen Keyboards with Multi-Touch Gestures for Non-Alphanumeric Input", CHI '12, May 5-10, 2012, 4 pages.
Gadget Hacks, "Tasker Too Complicated? Give MacroDroid a Try [How-To]", Online available at: <https://www.youtube.com/watch?v=8YL9cWCykKc>, May 27, 2016, 1 page.
"Galaxy S7: How to Adjust Screen Timeout & Lock Screen Timeout", Online available at:—<https://www.youtube.com/watch?v=n6e1WKUS2ww>, Jun. 9, 2016, 1 page.
Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Google Developers,"Voice search in your app", Online available at:—<https://www.youtube.com/watch?v=PS1FbB5qWEI>, Nov. 12, 2014, 1 page.
Gruber et al., "Unpublished U.S. Appl. No. 61/657,744, filed Jun. 9, 2012 titled "Automatically Adapting User Interfaces for Hands-Free Interaction"", 40 pages.
Guim, Mark, "How to Set a Person-Based Reminder with Cortana", Online available at:—<http://www.wpcentral.com/how-to-person-based-reminder-cortana>, Apr. 26, 2014, 15 pages.
Gupta et al., "I-vector-based Speaker Adaptation of Deep Neural Networks for French Broadcast Audio Transcription", ICASSP, 2014, 2014, pp. 6334-6338.
Gupta, Naresh, "Inside Bluetooth Low Energy", Artech House, 2013, 274 pages.
Hardawar, Devindra, "Driving App Waze Builds its own Siri for Hands-Free Voice Control", Online available at:—<http://venturebeat.com/2012/02/09/driving-app-waze-builds-its-own-siri-for-hands-free-voice-control/>, retrieved on Feb. 9, 2012, 4 pages.
Hashimoto, Yoshiyuki, "Simple Guide for iPhone Siri, which can be Operated with your Voice", Shuwa System Co., Ltd., vol. 1, Jul. 5, 2012, pp. 8, 130, 131.
"Headset Button Controller v7.3 APK Full APP Download for Andriod, Blackberry, iPhone", Online available at:—<http://fullappdownload.com/headset-button-controller-v7-3-apk/>, Jan. 27, 2014, 11 pages.
Hershey et al., "Deep Clustering: Discriminative Embeddings for Segmentation and Separation", Proc. ICASSP, Mar. 2016, 6 pages.
"Hey Google: How to Create a Shopping List with Your Google Assistant", Online available at:—<https://www.youtube.com/watch?v=w9NCsElax1Y>, May 25, 2018, 1 page.
"How to Enable Google Assistant on Galaxy S7 and Other Android Phones (No. Root)", Online available at:—<https://www.youtube.com/watch?v=HeklQbWyksE>, Mar. 20, 2017, 1 page.
"How to Use Ok Google Assistant Even Phone is Locked", Online available at:—<https://www.youtube.com/watch?v=9B_gP4j_SP8>, Mar. 12, 2018, 1 page.
Hutsko et al., "iPhone All-in-One for Dummies", 3rd Edition, 2013, 98 pages.

(56) References Cited

OTHER PUBLICATIONS id3.org, "id3v2.4.0—Frames", Online available at:—<http://id3.org/id3v2.4.0-frames?action=print>, retrieved on Jan. 22, 2015, pp. 1-41.
Ikeda, Masaru, "beGLOBAL Seoul 2015 Startup Battle: Talkey", YouTube Publisher, Online Available at:—<https://www.youtube.com/watch?v=4Wkp7sAAldg>, May 14, 2015, 1 page.
INews and Tech,"How to Use The QuickType Keyboard In IOS 8", Online available at:—<http://www.inewsandtech.com/how-to-use-the-quicktype-keyboard-in-ios-8/>, Sep. 17, 2014, 6 pages.
Intention to Grant received for European Patent Application No. 14707872.9, dated May 27, 2020, 11 pages.
Intention to Grant received for European Patent Application No. 14707872.9, dated Oct. 29, 2020, 8 pages.
"Interactive Voice", Online available at:—<http://www.helloivee.com/company/>, retrieved on Feb. 10, 2014, 2 pages.
International Preliminary Report on Patentability received for PCT Patent Application No. PCT/US2014/015418, dated Aug. 20, 2015, 12 pages.
International Search Report and Written Opinion received for PCT Patent Application No. PCT/US2014/015418, dated Aug. 26, 2014, 17 pages.
Internet Services and Social Net, "How to Search for Similar Websites", Online available at:—<https://www.youtube.com/watch?v=nLf2uirpt5s>, see from 0:17 to 1:06, Jul. 4, 2013, 1 page.
Invitation to pay additional fees received for the PCT Patent Application No. PCT/US2014/015418, dated May 26, 2014, 5 pages.
"iPhone 6 Smart Guide Full Version for SoftBank", Gijutsu-Hyohron Co., Ltd., vol. 1, Dec. 1, 2014, 4 pages.
Isik et al., "Single-Channel Multi-Speaker Separation using Deep Clustering", Interspeech 2016, Sep. 8-12, 2016, pp. 545-549.
Jonsson et al., "Proximity-based Reminders Using Bluetooth", 2014 IEEE International Conference on Pervasive Computing and Communications Demonstrations, 2014, pp. 151-153.
Jouvet et al., "Evaluating Grapheme-to-phoneme Converters in Automatic Speech Recognition Context", IEEE, 2012, pp. 4821-4824.
Karn, Ujjwal, "An Intuitive Explanation of Convolutional Neural Networks", The Data Science Blog, Aug. 11, 2016, 23 pages.
Kastrenakes, Jacob, "Siri's creators will unveil their new AI bot on Monday", The Verge, Online available at:—<https://web.archive.org/web/20160505090418/https://www.theverge.com/2016/5/4/11593564/viv-labs-unveiling-monday-new-ai-from-siri-creators>, May 4, 2016, 3 pages.
Kazmucha Allyson, "How to Send Map Locations Using iMessage", iMore.com, Online available at:—<http://www.imore.com/how-use-imessage-share-your-location-your-iphone>, Aug. 2, 2012, 6 pages.
Kickstarter, "Ivee Sleek: Wi-Fi Voice-Activated Assistant", Online available at:—<https://www.kickstarter.com/projects/ivee/ivee-sleek-wi-fi-voice-activated-assistant>, retrieved on Feb. 10, 2014, pp. 1-13.
King et al., "Robust Speech Recognition via Anchor Word Representations", Interspeech 2017, Aug. 20-24, 2017, pp. 2471-2475.
Lee, Sungjin, "Structured Discriminative Model for Dialog State Tracking", Proceedings of the SIGDIAL 2013 Conference, Aug. 22-24, 2013, pp. 442-451.
"Link Your Voice to Your Devices with Voice Match, Google Assistant Help", Online available at: <https://support.google.com/assistant/answer/9071681?co=GENIE.Platform%3DAndroid&hl=en>, Retrieved on Jul. 1, 2020, 2 pages.
Liou et al., "Autoencoder for Words", Neurocomputing, vol. 139, Sep. 2014, pp. 84-96.
Liu et al., "Accurate Endpointing with Expected Pause Duration", Sep. 6-10, 2015, pp. 2912-2916.
Loukides et al., "What Is the Internet of Things?", O'Reilly Media, Inc., Online Available at: <https://www.oreilly.com/library/view/what-is-the/9781491975633/>, 2015, 31 pages.

Luo et al., "Speaker-Independent Speech Separation With Deep Attractor Network", IEEE/ACM Transactions on Audio, Speech, and Language Processing, vol. 26, No. 4, Apr. 2018, pp. 787-796.
Marketing Land,"Amazon Echo: Play music", Online Available at:—<https://www.youtube.com/watch?v=A7V5NPbsXi4>, Apr. 27, 2015, 3 pages.
"Meet Ivee, Your Wi-Fi Voice Activated Assistant", Availale Online at:—<http://www.helloivee.com/>, retrieved on Feb. 10, 2014, 8 pages.
Mhatre et al., "Donna Interactive Chat-bot acting as a Personal Assistant", International Journal of Computer Applications (0975-8887), vol. 140, No. 10, Apr. 2016, 6 pages.
Mikolov et al., "Linguistic Regularities in Continuous Space Word Representations", Proceedings of NAACL-HLT, Jun. 9-14, 2013, pp. 746-751.
Miller Chance, "Google Keyboard Updated with New Personalized Suggestions Feature", Online available at:—<http://9to5google.com/2014/03/19/google-keyboard-updated-with-new-personalized-suggestions-feature/>, Mar. 19, 2014, 4 pages.
"Mobile Speech Solutions, Mobile Accessibility", SVOX AG Product Information Sheet, Online available at:—<http://www.svox.com/site/bra840604/con782768/mob965831936.aSQ?osLang=1>, Sep. 27, 2012, 1 page.
Modern Techies,"Braina-Artificial Personal Assistant for PC(like Cortana,Siri)!!!!", Online available at: <https://www.youtube.com/watch?v=_Coo2P8ilqQ>, Feb. 24, 2017, 3 pages.
Morrison Jonathan, "iPhone 5 Siri Demo", Online Available at:—<https://www.youtube.com/watch?v=_wHWwG5lhWc>, Sep. 21, 2012, 3 pages.
My Cool Aids, "What's New", Online available at:—<http://www.mycoolaids.com/>, 2012, 1 page.
Nakamura et al., "Study of Information Clouding Methods to Prevent Spoilers of Sports Match", Proceedings of the International Working Conference on Advanced Visual Interfaces (AVI'12), ISBN: 978-1-4503-1287-5, May 2012, pp. 661-664.
Nakamura et al., "Study of Methods to Diminish Spoilers of Sports Match: Potential of a Novel Concept "Information Clouding"", vol. 54, No. 4, ISSN: 1882-7764. Online available at: <https://ipsj.ixsq.nii.ac.jp/ej/index.php?active_action=repository_view_main_item_detail&page_id=13&block_id=8&item_id=91589&item_no=1>, Apr. 2013, pp. 1402-1412.
"Natural Language Interface Using Constrained Intermediate Dictionary of Results", List of Publications Manually reviewed for the Search of U.S. Pat. No. 7,177,798, Mar. 22, 2013, 1 page.
NDTV, "Sony Smartwatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Non-Final Office Action received for U.S. Appl. No. 14/175,864, dated Jul. 7, 2017, 27 pages.
Non-Final Office Action received for U.S. Appl. No. 14/175,864, dated Jun. 22, 2016, 17 pages.
Non-Final Office Action received for U.S. Appl. No. 14/175,864, dated Mar. 15, 2017, 21 pages.
Non-Final Office Action received for U.S. Appl. No. 14/175,864, dated Sep. 24, 2015, 17 pages.
Non-Final Office Action received for U.S. Appl. No. 16/222,249 dated Feb. 5, 2019, 9 pages.
Non-Final Office Action received for U.S. Appl. No. 16/222,249 dated Jan. 15, 2020, 11 pages.
Non-Final Office Action received for U.S. Appl. No. 16/879,348, dated Sep. 22, 2020, 9 pages.
Notice of Acceptance received for Australian Patent Application No. 2017210578, dated Mar. 13, 2019, 3 pages.
Notice of Acceptance received for Australian Patent Application No. 2019204501, dated Apr. 13, 2021, 3 pages.
Notice of Allowance received for Brazilian Patent Application No. BR112015018905-9, dated Dec. 21, 2021, 3 pages.
Notice of Allowance received for Chinese Patent Application No. 201480007349.6, dated Apr. 12, 2021, 2 pages.
Notice of Allowance received for Chinese Patent Application No. 202110646912.6, dated Feb. 24, 2022, 2 pages.
Notice of Allowance received for Japanese Patent Application No. 2017-250005, dated Aug. 2, 2019, 4 pages.

(56) References Cited

OTHER PUBLICATIONS

Notice of Allowance received for Japanese Patent Application No. 2019-157207, dated Aug. 10, 2021, 4 pages.
Notice of Allowance received for Korean Patent Application No. 1020167029691, dated Feb. 26, 2020, 5 pages.
Notice of Allowance received for Korean Patent Application No. 10-2018-7017535, dated Feb. 26, 2020, 5 pages.
Notice of Allowance received for U.S. Appl. No. 14/175,864, dated Jul. 2, 2018, 8 pages.
Notice of Allowance received for U.S. Appl. No. 14/175,864, dated Oct. 24, 2018, 8 pages.
Notice of Allowance received for U.S. Appl. No. 16/222,249, dated Apr. 6, 2020, 9 pages.
Notice of Allowance received for U.S. Appl. No. 16/879,348, dated Feb. 8, 2021, 8 pages.
Notice of Allowance received for U.S. Appl. No. 16/879,348, dated Oct. 30, 2020, 8 pages.
Notice of Hearing received for Indian Patent Application No. 4245/CHENP/2015, mailed on Oct. 28, 2021, 3 pages.
Office Action received for Australian Patent Application No. 2014214676, dated Aug. 2, 2017, 4 pages.
Office Action received for Australian Patent Application No. 2014214676, dated Aug. 3, 2016, 3 pages.
Office Action received for Australian Patent Application No. 2015101078, dated Jan. 25, 2016, 8 pages.
Office Action received for Australian Patent Application No. 2015101078, dated Oct. 9, 2015, 3 pages.
Office Action received for Australian Patent Application No. 2017210578, dated Mar. 16, 2018, 3 pages.
Office Action received for Australian Patent Application No. 2017210578, dated Nov. 23, 2018, 5 pages.
Office Action received for Australian Patent Application No. 2019204501, dated Jun. 12, 2020, 5 pages.
Office Action received for Australian Patent Application No. 2019204501, dated Mar. 5, 2021, 5 pages.
Office Action received for Australian Patent Application No. 2019204501, dated Oct. 26, 2020, 6 pages.
Office Action received for Australian Patent Application No. 2021202255, dated Feb. 22, 2022, 3 pages.
Office Action received for Brazilian Patent Application No. BR112015018905-9, dated May 24, 2020, 6 pages.
Office Action received for Chinese Patent Application No. 201480007349.6, dated Aug. 26, 2019, 10 pages.
Office Action received for Chinese Patent Application No. 201480007349.6, dated Feb. 22, 2021, 6 pages.
Office Action received for Chinese Patent Application No. 201480007349.6, dated Jun. 30, 2017, 16 pages.
Office Action received for Chinese Patent Application No. 201480007349.6, dated Sep. 3, 2018, 12 pages.
Office Action received for Chinese Patent Application No. 202110646912.6, dated Nov. 29, 2021, 10 pages.
Office Action received for Chinese Patent Application No. 201480007349.6, dated Apr. 10, 2019, 10 pages.
Office Action received for European Patent Application No. 14707872.9, dated May 12, 2016, 3 pages.
Office Action received for European Patent Application No. 14707872.9, dated May 29, 2019, 7 pages.
Office Action received for European Patent Application No. 14707872.9, dated Nov. 29, 2018, 6 pages.
Office Action received for German Patent Application No. 112014000709.9, dated Sep. 19, 2019, 9 pages.
Office Action received for Indian Patent Application No. 4245/CHENP/2015, dated Feb. 28, 2019, 7 pages.
Office Action received for Japanese Patent Application No. 2015-557147, dated Oct. 14, 2016, 7 pages.
Office Action received for Japanese Patent Application No. 2015-557147, dated Sep. 1, 2017, 7 pages.
Office Action received for Japanese Patent Application No. 2017-250005, dated Jul. 5, 2019, 4 pages.
Office Action received for Japanese Patent Application No. 2017-250005, dated Oct. 26, 2018, 7 pages.
Office Action received for Japanese Patent Application No. 2019-157207, dated Jun. 4, 2021, 5 pages.
Office Action received for Japanese Patent Application No. 2019-157207, dated Mar. 5, 2021, 8 pages.
Office Action received for Japanese Patent Application No. 2019-157207, dated Oct. 2, 2020, 9 pages.
Office Action received for Korean Patent Application No. 10-2015-7021438, dated Feb. 24, 2017, 11 pages.
Office Action received for Korean Patent Application No. 10-2015-7021438, dated Mar. 21, 2018, 14 pages.
Office Action received for Korean Patent Application No. 10-2015-7021438, dated May 23, 2016, 11 pages.
Office Action received for Korean Patent Application No. 10-2015-7021438, dated Nov. 20, 2017, 6 pages.
Office Action received for Korean Patent Application No. 10-2016-7029691, dated Apr. 27, 2018, 10 pages.
Office Action received for Korean Patent Application No. 10-2016-7029691, dated Dec. 27, 2017, 6 pages.
Office Action received for Korean Patent Application No. 10-2016-7029691, dated Feb. 13, 2017, 9 pages.
Office Action received for Korean Patent Application No. 1020167029691, dated Mar. 28, 2019, 12 pages.
Office Action received for Korean Patent Application No. 10-2018-7017535, dated Apr. 26, 2019, 7 pages.
Office Action received for Korean Patent Application No. 10-2018-7017535, dated Sep. 25, 2018, 11 pages.
Office Action received for Korean Patent Application No. 10-2020-7015307, dated Aug. 25, 2020, 12 pages.
Office Action received for Korean Patent Application No. 10-2020-7015307, dated Feb. 25, 2021, 9 pages.
OSXDaily, "Get a List of Siri Commands Directly from Siri", Online available at:—<http://osxdaily.com/2013/02/05/list-siri-commands/>, Feb. 5, 2013, 15 pages.
Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.
Pathak et al., "Privacy-preserving Speech Processing: Cryptographic and String-matching Frameworks Show Promise", In: IEEE signal processing magazine, Online available at:—<http://www.merl.com/publications/docs/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
PC Mag, "How to Voice Train Your Google Home Smart Speaker", Online available at: <https://in.pcmag.com/google-home/126520/how-to-voice-train-your-google-home-smart-speaker>, Oct. 25, 2018, 12 pages.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Perlow, Jason, "Alexa Loop Mode with Playlist for Sleep Noise", Online Available at: <https://www.youtube.com/watch?v=nSkSuXziJSg>, Apr. 11, 2016, 3 pages.
pocketables.com,"AutoRemote example profile", Online available at: https://www.youtube.com/watch?v=kC_zhUnNZj8, Jun. 25, 2013, 1 page.
Qian et al., "Single-channel Multi-talker Speech Recognition With Permutation Invariant Training", Speech Communication, Issue 104, 2018, pp. 1-11.
"Quick Type Keyboard on iOS 8 Makes Typing Easier", Online available at:—<https://www.youtube.com/watch?v=0CldLR4fhVU>, Jun. 3, 2014, 3 pages.
Rasch, Katharina, "Smart Assistants for Smart Homes", Doctoral Thesis in Electronic and Computer Systems, 2013, 150 pages.
Result of Consultation received for European Patent Application No. 14707872.9, mailed on Nov. 25, 2019, 3 pages.
Rios Mafe, "New Bar Search for Facebook", YouTube, available at:—<https://www.youtube.com/watch?v=vwgN1WbvCas>, Jul. 19, 2013, 2 pages.

(56) References Cited

OTHER PUBLICATIONS

Ritchie, Rene, "QuickType keyboard in iOS 8: Explained", Online Available at:—<https://www.imore.com/quicktype-keyboards-ios-8-explained>, Jun. 21, 2014, pp. 1-19.
Routines, "SmartThings Support", Online available at:—<https://web.archive.org/web/20151207165701/https://support.smartthings.com/hc/en-us/articles/205380034-Routines>, 2015, 3 pages.
Rowland et al., "Designing Connected Products: UX for the Consumer Internet of Things", O'Reilly, May 2015, 452 pages.
Samsung Support, "Create a Quick Command in Bixby to Launch Custom Settings by at Your Command", Online Available at:—<https://www.facebook.com/samsungsupport/videos/10154746303151213>, Nov. 13, 2017, 1 page.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Seehafer Brent, "Activate Google Assistant on Galaxy S7 with Screen off", Online available at:—<https://productforums.google.com/forum/#!topic/websearch/lp3qlGBHLVI>, Mar. 8, 2017, 4 pages.
Selfridge et al., "Interact: Tightly-coupling Multimodal Dialog with an Interactive Virtual Assistant", International Conference on Multimodal Interaction, ACM, Nov. 9, 2015, pp. 381-382.
Senior et al., "Improving DNN Speaker Independence With I-Vector Inputs", ICASSP, 2014, pp. 225-229.
Seroter et al., "SOA Patterns with BizTalk Server 2013 and Microsoft Azure", Packt Publishing, Jun. 2015, 454 pages.
Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Simonite, Tom, "Confronting Siri: Microsoft Launches Digital Assistant Cortana", 2014, 2 pages.
Siou, Serge, "How to Control Apple TV 3rd Generation Using Remote app", Online available at: <https://www.youtube.com/watch?v=PhyKftZ0S9M>, May 12, 2014, 3 pages.
"Skilled at Playing my iPhone 5", Beijing Hope Electronic Press, Jan. 2013, 6 pages.
"SmartThings +Amazon Echo", Smartthings Samsung [online], Online available at:—<https://web.archive.org/web/20160509231428/https://blog.smartthings.com/featured/alexa-turn-on-my-smartthings/>, Aug. 21, 2015, 3 pages.
Smith, Jake, "Amazon Alexa Calling: How to Set it up and Use it on Your Echo", iGeneration, May 30, 2017, 5 pages.
SRI, "SRI Speech: Products: Software Development Kits: EduSpeak", Online available at:—<http://web.archive.org/web/20090828084033/http://www.speechatsri.com/products/eduspeak>shtml, retrieved on Jun. 20, 2013, pp. 1-2.
Sundaram et al., "Latent Perceptual Mapping with Data-Driven Variable-Length Acoustic Units for Template-Based Speech Recognition", ICASSP 2012, Mar. 2012, pp. 4125-4128.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Sundermeyer et al., "LSTM Neural Networks for Language Modeling", INTERSPEECH 2012, Sep. 9-13, 2012, pp. 194-197.
Tan et al., "Knowledge Transfer in Permutation Invariant Training for Single-channel Multi-talker Speech Recognition", ICASSP 2018, 2018, pp. 5714-5718.
Tofel et al., "SpeakToit: A Personal Assistant for Older iPhones, iPads", Apple News, Tips and Reviews, Feb. 9, 2012, 7 pages.
Vaswani et al., "Attention Is All You Need", 31st Conference on Neural Information Processing Systems (NIPS 2017), 2017, pp. 1-11.
Villemure et al., "The Dragon Drive Innovation Showcase: Advancing the State-of-the-art in Automotive Assistants", 2018, 7 pages.
Vodafone Deutschland, "Samsung Galaxy S3 TastaturSpracheingabe", Online available at—<https://www.youtube.com/watch?v=6kOd6Gr8uFE>, Aug. 22, 2012, 1 page.
Wang et al., "End-to-end Anchored Speech Recognition", Proc. ICASSP2019, May 12-17, 2019, 5 pages.
Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.
Wikipedia, "Home Automation", Online Available at:—<https://en.wikipedia.org/w/index.php?title=Home_automation&oldid=686569068>, Oct. 19, 2015, 9 pages.
Wikipedia, "Siri", Online Available at:—<https://en.wikipedia.org/w/index.php?title=Siri&oldid=689697795>, Nov. 8, 2015, 13 Pages.
Wikipedia, "Virtual Assistant", Wikipedia, Online Available at:—<https://en.wikipedia.org/w/index.php?title=Virtual_assistant&oldid=679330666>, Sep. 3, 2015, 4 pages.
X.AI, "How it Works", Online available at:—<https://web.archive.org/web/20160531201426/https://x.ai/how-it-works/>, May 31, 2016, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Policy Optimization of Dialogue Management in Spoken Dialogue System for Out-of-Domain Utterances", 2016 International Conference on Asian Language Processing (IALP), IEEE, Nov. 21, 2016, pp. 10-13.
Yan et al., "A Scalable Approach to Using DNN-derived Features in GMM-HMM Based Acoustic Modeling for LVCSR", 14th Annual Conference of the International Speech Communication Association, InterSpeech 2013, Aug. 2013, pp. 104-108.
Yang Astor, "Control Android TV via Mobile Phone APP RKRemoteControl", Online Available at : <https://www.youtube.com/watch?v=zpmUeOX_xro>, Mar. 31, 2015, 4 pages.
Yates MichaelC., "How Can I Exit Google Assistant After I'm Finished with it", Online available at:—<https://productforums.google.com/forum/#!msg/phone-by-google/faECnR2RJwA/gKNtOkQgAQAJ>, Jan. 11, 2016, 2 pages.
Ye et al., "iPhone 4S Native Secret", Jun. 30, 2012, 1 page.
Yeh Jui-Feng, "Speech Act Identification Using Semantic Dependency Graphs With Probabilistic Context-free Grammars", ACM Transactions on Asian and Low-Resource Language Information Processing, vol. 15, No. 1, Dec. 2015, pp. 5.1-5.28.
Yousef, Zulfikara., "Braina (A.I) Artificial Intelligence Virtual Personal Assistant", Online available at:—<https://www.youtube.com/watch?v=2h6xpB8bPSA>, Feb. 7, 2017, 3 pages.
Yu et al., "Permutation Invariant Training of Deep Models for Speaker-Independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zainab, "Google Input Tools Shows Onscreen Keyboard in Multiple Languages [Chrome]", Online available at:—<http://www.addictivetips.com/internet-tips/google-input-tools-shows-multiple-language-onscreen-keyboards-chrome/>, Jan. 3, 2012, 3 pages.
Zhan et al., "Play with Android Phones", Feb. 29, 2012, 1 page.
Zhong et al., "JustSpeak: Enabling Universal Voice Control on Android", W4A'14, Proceedings of the 11th Web for All Conference, No. 36, Apr. 7-9, 2014, 8 pages.
Zmolikova et al., "Speaker-Aware Neural Network Based Beamformer for Speaker Extraction in Speech Mixtures", Interspeech 2017, Aug. 20-24, 2017, pp. 2655-2659.
Office Action received for Chinese Patent Application No. 202110648589.6, dated Jun. 15, 2022, 11 pages (6 pages of English Translation and 5 pages of Official Copy).
Notice of Allowance received for Japanese Patent Application No. 2022-054189, dated Jun. 10, 2022, 4 pages (1 page of English Translation and 3 pages of Official Copy).
Notice of Acceptance received for Australian Patent Application No. 2021202255, dated May 17, 2022, 3 pages.
Notice of Acceptance received for Australian Patent Application No. 2021202255, dated May 31, 2022, 3 pages.

(56) References Cited

OTHER PUBLICATIONS

Office Action received for Indian Patent Application No. 202148055773, dated May 30, 2022, 6 pages.
Notice of Acceptance received for Australian Patent Application No. 2022203177, dated Jun. 27, 2022, 3 pages.
Notice of Allowance received for Korean Patent Application No. 10-2022-7009916, dated Apr. 18, 2022, 5 pages (2 pages of English Translation and 3 pages of Official Copy).
Abdelaziz et al., "Speaker-Independent Speech-Driven Visual Speech Synthesis using Domain-Adapted Acoustic Models", May 15, 2019, 9 pages.
"Accessibility on Ios", Apple Inc., Online available at: https://developer.apple.com/accessibility/ios/, Retrieved on Jul. 26, 2021, 2 pages.
Alsharif et al., "Long Short-Term Memory Neural Network for Keyboard Gesture Decoding", IEEE International Conference on Acoustics, Speech and Signal Processing (ICASSP), Brisbane, Australia, Sep. 2015, 5 pages.
Apple Differential Privacy Team, "Learning with Privacy at Scale", Apple Machine Learning Blog, vol. 1, No. 8, Online available at: <https://machinelearning.apple.com/2017/12/06/learning-with-privacy-at-scale.html>, Dec. 2017, 9 pages.
Bodapati et al., "Neural Word Decomposition Models for Abusive Language Detection", Proceedings of the Third Workshop on Abusive Language Online, Aug. 1, 2019, pp. 135-145.
Büttner et al., "The Design Space of Augmented and Virtual Reality Applications for Assistive Environments in Manufacturing: A Visual Approach", In Proceedings of the 10th International Conference on PErvasive Technologies Related to Assistive Environments (PETRA '17), Island of Rhodes, Greece, Online available at: https://dl.acm.org/doi/pdf/10.1145/3056540.3076193, Jun. 21-23, 2017, pp. 433-440.
Chen, Angela, "Amazon's Alexa now handles patient health information", Available online at: <https://www.theverge.com/2019/4/4/18295260/amazon-hipaa-alexa-echo-patient-health-information-privacy-voice-assistant>, Apr. 4, 2019, 2 pages.
Chenghao, Yuan, "MacroDroid", Online available at: https://www.ifanr.com/weizhizao/612531, Jan. 25, 2016, 7 pages (Official Copy Only). {See communication under 37 CFR § 1.98(a) (3)}.
Dai, et al., "Transformer-XL: Attentive Language Models Beyond a Fixed-Length Context", Online available at: arXiv:1901,02860v3, Jun. 2, 2019, 20 pages.
Dighe et al., "Lattice-Based Improvements for Voice Triggering Using Graph Neural Networks", in 2020 IEEE International Conference on Acoustics, Speech and Signal Processing (ICASSP), Jan. 25, 2020, 5 pages.
Dwork et al., "The Algorithmic Foundations of Differential Privacy", Foundations and Trends in Theoretical Computer Science: vol. 9: No. 3-4, 211-407, 2014, 281 pages.
Ganin et al., "Unsupervised Domain Adaptation by Backpropagation", in Proceedings of the 32nd International Conference on Machine Learning, vol. 37, Jul. 2015, 10 pages.
Gatys et al., "Image Style Transfer Using Convolutional Neural Networks", Proceedings of IEEE International Conference on Acoustics, Speech and Signal Processing (ICASSP), 2016, pp. 2414-2423.
Geyer et al., "Differentially Private Federated Learning: A Client Level Perspective", arXiv:1712.07557v2, Mar. 2018, 7 pages.
Goodfellow et al., "Generative Adversarial Networks", Proceedings of the Neural Information Processing Systems, Dec. 2014, 9 pages.
Graves, Alex, "Sequence Transduction with Recurrent Neural Networks", Proceeding of International Conference of Machine Learning (ICML) Representation Learning Workshop, Nov. 14, 2012, 9 pages.
Gu et al., "BadNets: Evaluating Backdooring Attacks on Deep Neural Networks", IEEE Access, vol. 7, Mar. 21, 2019, pp. 47230-47244.
Guo et al., "StateLens: A Reverse Engineering Solution for Making Existing Dynamic Touchscreens Accessible", In Proceedings of the 32nd Annual Symposium on User Interface Software and Technology (UIST '19), New Orleans, LA, USA, Online available at: https://dl.acm.org/doi/pdf/10.1145/3332165.3347873, Oct. 20-23, 2019, pp. 371-385.
Guo et al., "Time-Delayed Bottleneck Highway Networks Using a DFT Feature for Keyword Spotting", IEEE International Conference on Acoustics, Speech and Signal Processing (ICASSP). IEEE, 2018, 5 pages.
Guo et al., "VizLens: A Robust and Interactive Screen Reader for Interfaces in the Real World", In Proceedings of the 29th Annual Symposium on User Interface Software and Technology (UIST '16), Tokyo, Japan, Online available at: https://dl.acm.org/doi/pdf/10.1145/2984511.2984518, Oct. 16-19, 2016, pp. 651-664.
Haung et al., "A Study for Improving Device-Directed Speech Detection Toward Frictionless Human-Machine Interaction", in Proc. Interspeech, 2019, 5 pages.
Hawkeye, "Hawkeye—A better user testing platform", Online Available at: https://www.youtube.com/watch?v=el0TW0g_76o, Oct. 16, 2019, 3 pages.
Hawkeye, "Learn where people look in your products", Online Available at: https://www.usehawkeye.com, 2019, 6 pages.
Heller et al., "AudioScope: Smartphones as Directional Microphones in Mobile Audio Augmented Reality Systems", In Proceedings of the 33rd Annual ACM Conference on Human Factors in Computing Systems (CHI '15), Crossings, Seoul, Korea, Online available at: https://dl.acm.org/doi/pdf/10.1145/2702123.2702159, Apr. 18-23, 2015, pp. 949-952.
Henderson et al., "Efficient Natural Language Response Suggestion for Smart Reply", Available Online at: https://static.googleusercontent.com/media/research.google.com/en//pubs/archive/1846e8a466c079eae7e90727e27caf5f98f10e0c.pdf, 2017, 15 pages.
Hinton et al., "Distilling the Knowledge in A Neural Network", arXiv preprintarXiv:1503.02531, Mar. 2, 2015, 9 pages.
Hook et al., "Automatic speech based emotion recognition using paralinguistics features", Bulletin of the Polish Academy of Sciences, Technical Sciences, vol. 67, No. 3, 2019, pp. 479-488.
"How to adjust the order of control center buttons on iPhone iOS12 version after buying a mobile phone", Available online at: https://jingyan.baidu.com/article/5bbb5albbe5a9713eba1791b.html?, Jun. 14, 2019, 4 pages (Official Copy only). {See communication under 37 CFR § 1.98(a) (3)}.
Idasallinen, "What's the 'Like' Meter Based on?", Online Available at: <https://community.spotify.com/t5/Content-Questions/What-s-the-like-meter-based-on/td-p/1209974>, Sep. 22, 2015, 6 pages.
Jeon et al., "Voice Trigger Detection from LVCSR Hypothesis Lattices Using Bidirectional Lattice Recurrent Neural Networks", International Conference on Acoustics, Speech and Signal Processing (ICASSP). IEEE, Feb. 29, 2020, 5 pages.
Jeong et al., "Development Trend of N-Screen Service", Journal of Broadcasting Engineering, vol. 17, No. 1, Sep. 2012, 18 pages (6 pages of English Translation and 12 pages of Official Copy).
Kannan et al., "Smart Reply: Automated Response Suggestion for Email", Available Online at: https://arxiv.org/pdf/1606.04870.pdf, Jun. 15, 2016, 10 pages.
Kondrat, Tomek, "Automation for Everyone with MacroDroid", Online available at: https://www.xda-developers.com/automation-for-everyone-with-macrodroid/, Nov. 17, 2013, 6 pages.
Kruger et al., "Virtual World Accessibility with the Perspective Viewer", Proceedings of ICEAPVI, Athens, Greece, Feb. 12-14, 2015, 6 pages.
Kumar, Shiu, "Ubiquitous Smart Home System Using Android Application", International Journal of Computer Networks & Communications (IJCNC) vol. 6, No. 1, Jan. 2014, pp. 33-43.
Kumatani et al., "Direct Modeling of Raw Audio with DNNS For Wake Word Detection", in 2017 IEEE Automatic Speech Recognition and Understanding Workshop (ASRU), 2017, 6 pages.
Lin, Luyuan, "An Assistive Handwashing System with Emotional Intelligence", Using Emotional Intelligence in Cognitive Intelligent Assistant Systems, 2014, 101 pages.
Maas et al., "Combining Acoustic Embeddings And Decoding Features for End-Of-Utterance Detection in Real-Time Far-Field Speech Recognition Systems", in 2018 IEEE International Conference on Acoustics, Speech and Signal Processing (ICASSP). IEEE, 2018, 5 pages.

(56) References Cited

OTHER PUBLICATIONS

Mallidi et al., "Device-Directed Utterance Detection", Proc. Interspeech, Aug. 7, 2018, 4 pages.
"Method to Provide Remote Voice Navigation Capability on the Device", IP.com, Jul. 21, 2016, 4 pages.
Microsoft Soundscape—A map delivered in 3D sound, Microsoft Research, Online available at: https://www.microsoft.com/en-us/research/product/soundscape/, Retrieved on Jul. 26, 2021, 5 pages.
Mnih et al., "Human-Level Control Through Deep Reinforcement Learning", Nature, vol. 518, Feb. 26, 2015, pp. 529-533.
Müller et al., "A Taxonomy for Information Linking in Augmented Reality", AVR 2016, Part I, LNCS 9768, 2016, pp. 368-387.
Muller et al., "Control Theoretic Models of Pointing", ACM Transactions on Computer-Human Interaction, Aug. 2017, 36 pages.
Norouzian et al., "Exploring Attention Mechanism for Acoustic based Classification of Speech Utterances into System-Directed and Non-System-Directed", International Conference on Acoustics, Speech and Signal Processing (ICASSP). IEEE, Feb. 1, 2019, 5 pages.
Office Action received for Chinese Patent Application No. 202110648589.6, dated Mar. 2, 2022, 14 pages (7 pages of English Translation and 7 pages of Official Copy).
Pavlopoulos et al., "ConvAI at SemEval-2019 Task 6: Offensive Language Identification and Categorization with Perspective and BERT", Proceedings of the 13th International Workshop on Semantic Evaluation (SemEval-2019), Jun. 6-7, 2019, pp. 571-576.
Philips, Chris, "Thumbprint Radio: A Uniquely Personal Station Inspired by All of Your Thumbs Up", Pandora News, Online Available at: <https://blog.pandora.com/author/chris-phillips/>, Dec. 14, 2015, 7 pages.
Ping et al., "Deep Voice 3: Scaling Text to Speech with Convolutional Sequence Learning", Available online at: https://arxiv.org/abs/1710.07654, Feb. 22, 2018, 16 pages.
"Pose, Cambridge Dictionary Definition of Pose", Available online at: <https://dictionary.cambridge.org/dictionary/english/pose>, 4 pages.
"Radio Stations Tailored to You Based on the Music You Listen to on iTunes", Apple Announces iTunes Radio, Press Release, Jun. 10, 2013, 3 pages.
Ramakrishnan et al., "Speech emotion recognition approaches in human computer interaction", Telecommunication Systems, vol. 52, 2013, pp. 1467-1478.
Raux, Antoine, "High-Density Dialog Management The Topic Stack", Adventures in High Density, Online available at: https://medium.com/adventures-in-high-density/high-density-dialog-management-23efcf91db1e, Aug. 1, 2018, 10 pages.
Ravi, Sujith, "Google AI Blog: On-device Machine Intelligence", Available Online at: https://ai.googleblog.com/2017/02/on-device-machine-intelligence.html, Feb. 9, 2017, 4 pages.
Robbins, F. Mike, "Automatically place an Android Phone on Vibrate at Work", Available online at: https://mikefrobbins.com/2016/07/21/automatically-place-an-android-phone-on-vibrate-at-work/, Jul. 21, 2016, pp. 1-11.
Rodrigues et al., "Exploring Mixed Reality in Specialized Surgical Environments", In Proceedings of the 2017 CHI Conference Extended Abstracts on Human Factors in Computing Systems (CHI EA '17), Denver, Co, USA, Online available at: https://dl.acm.org/doi/pdf/10.1145/3027063.3053273, May 6-11, 2017, pp. 2591-2598.
Ross et al., "Epidemiology as a Framework for Large-Scale Mobile Application Accessibility Assessment", In Proceedings of the 19th International ACM SIGACCESS Conference on Computers and Accessibility (ASSETS '17), Baltimore, MD, USA, Online available at: https://dl.acm.org/doi/pdf/10.1145/3132525.3132547, Oct. 29-Nov. 1, 2017, pp. 2-11.
Schenk et al., "GazeEverywhere: Enabling Gaze-only User Interaction on an Unmodified Desktop PC in Everyday Scenarios", In Proceedings of the 2017 CHI Conference on Human Factors in Computing Systems (CHI'17). ACM, New York, NY, 30343044. Online Available at: https://doi.org/10.1145/3025453.3025455, May 6-11, 2017, 11 pages.

Sigtia et al., "Efficient Voice Trigger Detection for Low Resource Hardware", in Proc. Interspeech 2018, Sep. 2-6, 2018, pp. 2092-2096.
Sigtia et al., "Multi-Task Learning for Voice Trigger Detection", in IEEE International Conference on Acoustics, Speech and Signal Processing (ICASSP), 2020, Apr. 20, 2020, 5 pages.
Song, Yang, "Research of Chinese Continuous Digital Speech Input System Based on HTK", Computer and Digital Engineering, vol. 40, No. 4, Dec. 31, 2012, 5 pages (Official Copy Only). {See communication under 37 CFR § 1.98(a) (3)}.
Speicher et al., "What is Mixed Reality?", In Proceedings of the 2019 CHI Conference on Human Factors in Computing Systems (CHI '19). ACM, Article 537, Glasgow, Scotland, UK, Online available at: https://dl.acm.org/doi/pdf/10.1145/3290605.3300767, May 4-9, 2019, 15 pages.
Sperber et al., "Self-Attentional Models for Lattice Inputs", in Proceedings of the 57th Annual Meeting of the Association for Computational Linguistics, Florence, Italy, Association for Computational Linguistics, Jun. 4, 2019, 13 pages.
Sutskever et al., "Sequence to Sequence Learning with Neural Networks", Proceedings of the 27th International Conference on Neural Information Processing Systems, 2014, 9 pages.
Tamar et al., "Value Iteration Networks", Advances in Neural Information Processing Systems, vol. 29, 2016, 16 pages.
Tech Target Contributor, "AI Accelerator", Available online at: https://searchenterpriseai.techtarget.com/definition/AI-accelerator, Apr. 2018, 3 pages.
Tech With Brett, "Everything the Google Nest Hub Can Do", Available online at: https://www.youtube.com/watch?v=x3vdytgru2E, Nov. 12, 2018, 13 pages.
Tech With Brett, "Google Home Multiple Users Setup", Available online at: https://www.youtube.com/watch?v=BQOAbRUeFRo&t=257s, Jun. 29, 2017, 4 pages.
Tkachenko, Sergey, "Chrome will automatically create Tab Groups", Available online at: https://winaero.com/chrome-will-automatically-create-tab-groups/, Sep. 18, 2020, 5 pages.
Tkachenko, Sergey, "Enable Tab Groups Auto Create in Google Chrome", Available online at: https://winaero.com/enable-tab-groups-auto-create-in-google-chrome/, Nov. 30, 2020, 5 pages.
"Use Macrodroid skillfully to automatically clock in with Ding Talk", Online available at: https://blog.csdn.net/qq_26614295/article/details/84304541, Nov. 20, 2018, 11 pages (Official Copy Only). {See communication under 37 CFR § 1.98(a) (3)}.
Vazquez et al., "An Assisted Photography Framework to Help Visually Impaired Users Properly Aim a Camera", ACM Transactions on Computer-Human Interaction, vol. 21, No. 5, Article 25, Online available at: https://dl.acm.org/doi/pdf/10.1145/2651380, Nov. 2014, 29 pages.
Velian Speaks Tech, "10 Google Assistant Tips!", Available online at: https://www.youtube.com/watch?v=3RNWA3NK9fs, Feb. 24, 2020, 3 pages.
Walker, Amy, "NHS Gives Amazon Free Use of Health Data Under Alexa Advice Deal", Available online at: <https://www.theguardian.com/society/2019/dec/08/nhs-gives-amazon-free-use-of-health-data-under-alexa-advice-deal>, 3 pages.
Wang, et al., "Tacotron: Towards End to End Speech Synthesis", Available online at: https://arxiv.org/abs/1703.10135, Apr. 6, 2017, 10 pages.
Wang, et al., "Training Deep Neural Networks with 8-bit Floating Point Numbers", 32nd Conference on Neural Information Processing Systems (NeurIPS 2018), 2018, 10 pages.
Wei et al., "Design and Implement on Smart Home System", 2013 Fourth International Conference on Intelligent Systems Design and Engineering Applications, Available online at: https://ieeexplore.ieee.org/document/6843433, 2013, pp. 229-231.
"What's on Spotify?", Music for everyone, Online Available at: <https://web.archive.org/web/20160428115328/https://www.spotify.com/us/>, Apr. 28, 2016, 6 pages.
Win, et al., "Myanmar Text to Speech System based on Tacotron-2", International Conference on Information and Communication Technology Convergence (ICTC), Oct. 21-23, 2020, pp. 578-583.

(56) References Cited

OTHER PUBLICATIONS

Wu et al., "Monophone-Based Background Modeling for Two-Stage On-device Wake Word Detection", in 2018 IEEE International Conference on Acoustics, Speech and Signal Processing (ICASSP), Apr. 2018, 5 pages.
Xu et al., "Show, Attend and Tell: Neural Image Caption Generation with Visual Attention", Proceedings of the 32nd International Conference on Machine Learning, Lille, France, 2015, 10 pages.
Young et al., "POMDP-Based Statistical Spoken Dialog Systems: A Review", Proceedings of the IEEE, vol. 101, No. 5, 2013, 18 pages.
Zhang et al., "Interaction Proxies for Runtime Repair and Enhancement of Mobile Application Accessibility", In Proceedings of the 2017 CHI Conference on Human Factors in Computing Systems (CHI '17). ACM, Denver, CO, USA, Online available at: https://dl.acm.org/doi/pdf/10.1145/3025453.3025846, May 6-11, 2017, pp. 6024-6037.
Zhang et al., "Very Deep Convolutional Networks for End-To-End Speech Recognition", IEEE International Conference on Acoustics, Speech and Signal Processing (ICASSP), 2017, 5 pages.
Zhao et al., "Big Data Analysis and Application", Aviation Industry Press, Dec. 2015, pp. 236-241 (Official Copy Only). {See communication under 37 CFR § 1.98(a) (3)}.
Zhao et al., "CueSee: Exploring Visual Cues for People with Low Vision to Facilitate a Visual Search Task", In Proceedings of the 2016 ACM International Joint Conference on Pervasive and Ubiquitous Computing. ACM, UbiComp '16, Heidelberg, Germany, Online available at: https://dl.acm.org/doi/pdf/10.1145/2971648.2971730, Sep. 12-16, 2016, pp. 73-84.
Zhao et al., "Enabling People with Visual Impairments to Navigate Virtual Reality with a Haptic and Auditory Cane Simulation", In Proceedings of the 2018 CHI Conference on Human Factors in Computing Systems (CHI '18). ACM, Article 116, Montréal, QC, Canada, Online available at: https://dl.acm.org/doi/pdf/10.1145/3173574.3173690, Apr. 21-26, 2018, 14 pages.
Zhao et al., "SeeingVR: A Set of Tools to Make Virtual Reality More Accessible to People with Low Vision", In Proceedings of the 2019 CHI Conference on Human Factors in Computing Systems (CHI '19). ACM, Article 111, Glasgow, Scotland, UK, Online available at: https://dl.acm.org/doi/pdf/10.1145/3290605.3300341, May 4-9, 2019, 14 pages.
Zhao et al., "Transferring Age and Gender Attributes for Dimensional Emotion Prediction from Big Speech Data Using Hierarchical Deep Learning", 2018 4th IEEE International Conference on Big Data Security on Cloud, 2018, pp. 20-24.
Zheng et al., "Intent Detection and Semantic Parsing for Navigation Dialogue Language Processing", 2017 IEEE 20th International Conference on Intelligent Transportation Systems (ITSC), 2017, 6 pages.
Zhou et al., "Learning Dense Correspondence via 3D-guided Cycle Consistency", Proceedings of the IEEE Conference on Computer Vision and Pattern Recognition (CVPR), 2016, 10 pages.
Notice of Allowance received for Chinese Patent Application No. 202110648589.6, dated Aug. 31, 2022, 2 pages (1 page of English Translation and 1 page of Official Copy).
Notice of Acceptance received for Australian Patent Application No. 2022224789, dated Oct. 17, 2022, 3 pages.
Notice of Allowance received for Japanese Patent Application No. 2021-142657, dated Oct. 21, 2022, 4 pages (1 page of English Translation and 3 pages of Official Copy).
Office Action received for Korean Patent Application No. 10-2022-7024872, dated Aug. 29, 2022, 7 pages (3 pages of English Translation and 4 pages of Official Copy).
Automatic UPnP AV Network Setup Technology by WLAN proximity, Proceedings of HCI Korea, Feb. 2007, 14 pages (9 pages of English Translation and 5 pages of Official Copy).

VOICE TRIGGER FOR A DIGITAL ASSISTANT

CROSS-REFERENCE TO RELATED APPLICATIONS

This Application is a continuation U.S. application Ser. No. 17/150,513, filed on Jan. 15, 2021, entitled VOICE TRIGGER FOR A DIGITAL ASSISTANT, which is a continuation of U.S. application Ser. No. 16/879,348, filed on May 20, 2020, entitled VOICE TRIGGER FOR A DIGITAL ASSISTANT, which is a continuation of U.S. application Ser. No. 16/222,249, filed on Dec. 17, 2018, entitled VOICE TRIGGER FOR A DIGITAL ASSISTANT, which is a continuation of U.S. application Ser. No. 14/175,864, filed on Feb. 7, 2014, entitled VOICE TRIGGER FOR A DIGITAL ASSISTANT, which claims the benefit of U.S. Provisional Application No. 61/762,260, filed on Feb. 7, 2013, entitled VOICE TRIGGER FOR A DIGITAL ASSISTANT. The contents of each of these applications are hereby incorporated by reference in their entireties for all purposes.

TECHNICAL FIELD

The disclosed implementations relate generally to digital assistants, and more specifically, to a method and system for a voice trigger for a digital assistant.

BACKGROUND

Recently, voice-based digital assistants, such as Apple's SIRI, have been introduced into the marketplace to handle various tasks such as web searching and navigation. One advantage of such voice-based digital assistants is that users can interact with a device in a hands-free manner without handling or even looking at the device. Hands-free operation can be particularly beneficial when a person cannot or should not physically handle a device, such as when they are driving. However, to initiate the voice-based assistant, users typically must press a button or select an icon on a touch screen. This tactile input detracts from the hands-free experience. Accordingly, it would be advantageous to provide a method and system of activating a voice-based digital assistant (or other speech-based service) using a voice input or signal, and not a tactile input.

Activating a voice-based assistant using a voice input requires monitoring an audio channel to detect the voice input. This monitoring consumes electrical power, which is a limited resource on handheld or portable devices that rely on batteries and on which such voice-based digital assistants often run. Thus, it would be beneficial to provide an energy-efficient voice trigger that can be used to initiate voice- and/or speech-based services on a device.

SUMMARY

Accordingly, there is a need for a low-power voice trigger that can provide "always-listening" voice trigger functionality without excessively consuming limited power resources.

The implementations described below provide systems and methods for initiating a voice-based assistant using a voice trigger at an electronic device. Interactions with a voice-based digital assistant (or other speech-based services, such as a speech-to-text transcription service) often begin when a user presses an affordance (e.g., a button or icon) on a device in order to activate the digital assistant, followed by the device providing some indication to the user that the digital assistant is active and listening, such as a light, a sound (e.g., a beep), or a vocalized output (e.g., "what can I do for you?"). As described herein, voice triggers can also be implemented so that they are activated in response to a specific, predetermined word, phrase, or sound, and without requiring a physical interaction by the user. For example, a user may be able to activate a SIRI digital assistant on an iPHONE (both provided by Apple Inc., the assignee of the present application) by reciting the phrase "Hey, SIRI." In response, the device outputs a beep, sound, or speech output (e.g., "what can I do for you?") indicating to the user that the listening mode is active. Accordingly, the user can initiate an interaction with the digital assistant without having to physically touch the device that provides the digital assistant functionality.

One technique for initiating a speech-based service with a voice trigger is to have the speech-based service continuously listen for a predetermined trigger word, phrase, or sound (any of which may be referred to herein as "the trigger sound"). However, continuously operating the speech-based service (e.g., the voice-based digital assistant) requires substantial audio processing and battery power. In order to reduce the power consumed by providing voice trigger functionality, several techniques may be employed. In some implementations, the main processor of an electronic device (i.e., an "application processor") is kept in a low-power or un-powered state while one or more sound detectors that use less power (e.g., because they do not rely on the application processor) remain active. (When it is in a low-power or un-powered state, an application processor or any other processor, program, or module may be described as inactive or in a standby mode.) For example, a low-power sound detector is used to monitor an audio channel for a trigger sound even when the application processor is inactive. This sound detector is sometimes referred to herein as a trigger sound detector. In some implementations, it is configured to detect particular sounds, phonemes, and/or words. The trigger sound detector (including hardware and/or software components) is designed to recognize specific words, sound, or phrases, but is generally not capable of or optimized for providing full speech-to-text functionality, as such tasks require greater computational and power resources. Thus, in some implementations, the trigger sound detector recognizes whether a voice input includes a predefined pattern (e.g., a sonic pattern matching the words "Hey, SIRI"), but is not able to (or is not configured to) convert the voice input into text or recognize a significant amount of other words. Once the trigger sound has been detected, then, the digital assistant is brought out of a standby mode so that the user can provide a voice command.

In some implementations, the trigger sound detector is configured to detect several different trigger sounds, such as a set of words, phrases, sounds, and/or combinations thereof. The user can then use any of those sounds to initiate the speech-based service. In one example, a voice trigger is preconfigured to respond to the phrases "Hey, SIRI," "Wake up, SIRI," "Invoke my digital assistant," or "Hello, HAL, do you read me, HAL?" In some implementations, the user must select one of the preconfigured trigger sounds as the sole trigger sound. In some implementations, the user selects a subset of the preconfigured trigger sounds, so that the user can initiate the speech-based service with different trigger sounds. In some implementations, all of the preconfigured trigger sounds remain valid trigger sounds.

In some implementations, another sound detector is used so that even the trigger sound detector can be kept in a lowor no-power mode for much of the time. For example, a different type of sound detector (e.g., one that uses less power than the trigger sound detector) is used to monitor an audio channel to determine whether the sound input corresponds to a certain type of sound. Sounds are categorized as different "types" based on certain identifiable characteristics of the sounds. For example, sounds that are of the type "human voice" have certain spectral content, periodicity, fundamental frequencies, etc. Other types of sounds (e.g., whistles, hand claps, etc.) have different characteristics. Sounds of different types are identified using audio and/or signal processing techniques, as described herein.

This sound detector is sometimes referred to herein as a "sound-type detector." For example, if a predetermined trigger phrase is "Hey, SIRI", the sound-type detector determines whether the input likely corresponds to human speech. If the trigger sound is a non-voiced sound, such as a whistle, the sound-type detector determines whether a sound input likely corresponds to a whistle. When the appropriate type of sound is detected, the sound-type detector initiates the trigger sound detector to further process and/or analyze the sound. And because the sound-type detector requires less power than the trigger sound detector (e.g., because it uses circuitry with lower power demands and/or more efficient audio processing algorithms than the trigger-sound detector), the voice trigger functionality consumes even less power than with a trigger sound detector alone.

In some implementations, yet another sound detector is used so that both the sound-type detector and the trigger sound detector described above can be kept in a low- or no-power mode for much of the time. For example, a sound detector that uses less power than the sound-type detector is used to monitor an audio channel to determine whether a sound input satisfies a predetermined condition, such as an amplitude (e.g., volume) threshold. This sound detector may be referred to herein as a noise detector. When the noise detector detects a sound that satisfies the predetermined threshold, the noise detector initiates the sound-type detector to further process and/or analyze the sound. And because the noise detector requires less power than either the sound-type detector or the trigger sound detector (e.g., because it uses circuitry with lower power demands and/or more efficient audio processing algorithms), the voice trigger functionality consumes even less power than the combination of the sound-type detector and the trigger sound detector without the noise detector.

In some implementations, any one or more of the sound detectors described above are operated according to a duty cycle, where they are cycled between "on" and "off" states. This further helps to reduce power consumption of the voice trigger. For example, in some implementations, the noise detector is "on" (i.e., actively monitoring an audio channel) for 10 milliseconds, and "off" for the following 90 milliseconds. This way, the noise detector is "off" 90% of the time, while still providing effectively continuous noise detection functionality. In some implementations, the on and off durations for the sound detectors are selected so that all of the detectors are be activated while the trigger sound is still being input. For example, for a trigger phrase of "Hey, SIRI," the sound detectors may be configured so that no matter where in the duty cycle(s) the trigger phrase begins, the trigger sound detector is activated in time to analyze a sufficient amount of the input. For example, the trigger sound detector will be activated in time to receive, process, and analyze the sounds "ay SIRI," which is enough to determine that the sound matches the trigger phrase. In some implementations, sound inputs are stored in memory as they are received and passed to an upstream detector so that a larger portion of the sound input can be analyzed. Accordingly, even if the trigger sound detector is not initiated until after a trigger phrase has been uttered, it can still analyze the entire recorded trigger phrase.

Some implementations provide a method for operating a voice trigger. The method is performed at an electronic device including one or more processors and memory storing instructions for execution by the one or more processors. The method includes receiving a sound input. The method further includes determining whether at least a portion of the sound input corresponds to a predetermined type of sound. The method further includes, upon a determination that at least a portion of the sound input corresponds to the predetermined type, determining whether the sound input includes predetermined content. The method further includes, upon a determination that the sound input includes the predetermined content, initiating a speech-based service. In some implementations, the speech-based service is a voice-based digital assistant. In some implementations, speech-based service is a dictation service.

In some implementations, determining whether the sound input corresponds to a predetermined type of sound is performed by a first sound detector, and determining whether the sound input includes predetermined content is performed by a second sound detector. In some implementations, the first sound detector consumes less power while operating than the second sound detector. In some implementations, the first sound detector performs frequency-domain analysis of the sound input. In some implementations, determining whether the sound input corresponds to the predetermined type of sound is performed upon a determination that the sound input satisfies a predetermined condition (e.g., as determined by a third sound detector, discussed below).

In some implementations, the first sound detector periodically monitors an audio channel according to a duty cycle. In some implementations, the duty cycle includes an on-time of about 20 milliseconds, and an off-time of about 100 milliseconds.

In some implementations, the predetermined type is a human voice and the predetermined content is one or more words. In some implementations, determining whether at least a portion of the sound input corresponds to the predetermined type of sound includes determining whether at least a portion of the sound input includes frequencies characteristic of a human voice.

In some implementations, the second sound detector is initiated in response to a determination by the first sound detector that the sound input corresponds to the predetermined type. In some implementations, the second sound detector is operated for at least a predetermined amount of time after a determination by the first sound detector that the sound input corresponds to the predetermined type. In some implementations, the predetermined amount of time corresponds to a duration of the predetermined content.

In some implementations, the predetermined content is one or more predetermined phonemes. In some implementations, the one or more predetermined phonemes constitute at least one word.

In some implementations, the method includes, prior to determining whether the sound input corresponds to a predetermined type of sound, determining whether the sound input satisfies a predetermined condition. In some implementations, the predetermined condition is an amplitude threshold. In some implementations, determining whether the sound input satisfies a predetermined condition is performed by a third sound detector, wherein the third sound detector consumes less power while operating than the first sound detector. In some implementations, the third sound detector periodically monitors an audio channel according to a duty cycle. In some implementations, the duty cycle includes an on-time of about 20 milliseconds, and an off-time of about 500 milliseconds. In some implementations, the third sound detector performs time-domain analysis of the sound input.

In some implementations, the method includes storing at least a portion of the sound input in memory, and providing the portion of the sound input to the speech-based service once the speech-based service is initiated. In some implementations, the portion of the sound input is stored in memory using direct memory access.

In some implementations, the method includes determining whether the sound input corresponds to a voice of a particular user. In some implementations, the speech-based service is initiated upon a determination that the sound input includes the predetermined content and that the sound input corresponds to the voice of the particular user. In some implementations, the speech-based service is initiated in a limited access mode upon a determination that the sound input includes the predetermined content and that the sound input does not correspond to the voice of the particular user. In some implementations, the method includes, upon a determination that the sound input corresponds to the voice of the particular user, outputting a voice prompt including a name of the particular user.

In some implementations, determining whether the sound input includes predetermined content includes comparing a representation of the sound input to a reference representation, and determining that the sound input includes the predetermined content when the representation of the sound input matches the reference representation. In some implementations, a match is determined if the representation of the sound input matches the reference representation to a predetermined confidence. In some implementations, the method includes receiving a plurality of sound inputs including the sound input; and iteratively adjusting the reference representation, using respective ones of the plurality of sound inputs, in response to determining that the respective sound inputs include the predetermined content.

In some implementations, the method includes determining whether the electronic device is in a predetermined orientation, and upon a determination that the electronic device is in the predetermined orientation, activating a predetermined mode of the voice trigger. In some implementations, the predetermined orientation corresponds to a display screen of the device being substantially horizontal and facing down, and the predetermined mode is a standby mode. In some implementations, the predetermined orientation corresponds to a display screen of the device being substantially horizontal and facing up, and the predetermined mode is a listening mode.

Some implementations provide a method for operating a voice trigger. The method is performed at an electronic device including one or more processors and memory storing instructions for execution by the one or more processors. The method includes operating a voice trigger in a first mode. The method further includes determining whether the electronic device is in a substantially enclosed space by detecting that one or more of a microphone and a camera of the electronic device is occluded. The method further includes, upon a determination that the electronic device is in a substantially enclosed space, switching the voice trigger to a second mode. In some implementations, the second mode is a standby mode.

Some implementations provide a method for operating a voice trigger. The method is performed at an electronic device including one or more processors and memory storing instructions for execution by the one or more processors. The method includes determining whether the electronic device is in a predetermined orientation, and, upon a determination that the electronic device is in the predetermined orientation, activating a predetermined mode of a voice trigger. In some implementations, the predetermined orientation corresponds to a display screen of the device being substantially horizontal and facing down, and the predetermined mode is a standby mode. In some implementations, the predetermined orientation corresponds to a display screen of the device being substantially horizontal and facing up, and the predetermined mode is a listening mode.

In accordance with some implementations, an electronic device includes a sound receiving unit configured to receive sound input; and a processing unit coupled to the sound receiving unit. The processing unit is configured to determine whether at least a portion of the sound input corresponds to a predetermined type of sound; upon a determination that at least a portion of the sound input corresponds to the predetermined type, determine whether the sound input includes predetermined content; and upon a determination that the sound input includes the predetermined content, initiate a speech-based service. In some implementations, the processing unit is further configured to, prior to determining whether the sound input corresponds to a predetermined type of sound, determine whether the sound input satisfies a predetermined condition. In some implementations, the processing unit is further configured to determine whether the sound input corresponds to a voice of a particular user.

In accordance with some implementations, an electronic device includes a voice trigger unit configured to operate a voice trigger in a first mode of a plurality of modes; and a processing unit coupled to the voice trigger unit. In some implementations, the processing unit is configured to: determine whether the electronic device is in a substantially enclosed space by detecting that one or more of a microphone and a camera of the electronic device is occluded; and upon a determination that the electronic device is in a substantially enclosed space, switch the voice trigger to a second mode. In some implementations, the processing unit is configured to determine whether the electronic device is in a predetermined orientation; and upon a determination that the electronic device is in the predetermined orientation, activate a predetermined mode of a voice trigger.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods described herein.

In accordance with some implementations, an electronic device (e.g., a portable electronic device) is provided that comprises means for performing any of the methods described herein.

In accordance with some implementations, an electronic device (e.g., a portable electronic device) is provided that comprises a processing unit configured to perform any of the methods described herein.

In accordance with some implementations, an electronic device (e.g., a portable electronic device) is provided that comprises one or more processors and memory storing one or more programs for execution by the one or more processors, the one or more programs including instructions for performing any of the methods described herein.

In accordance with some implementations, an information processing apparatus for use in an electronic device is provided, the information processing apparatus comprising means for performing any of the methods described herein.

BRIEF DESCRIPTION OF THE DRAWINGS

Like reference numerals refer to corresponding parts throughout the drawings.

DESCRIPTION OF IMPLEMENTATIONS

Figure 1:
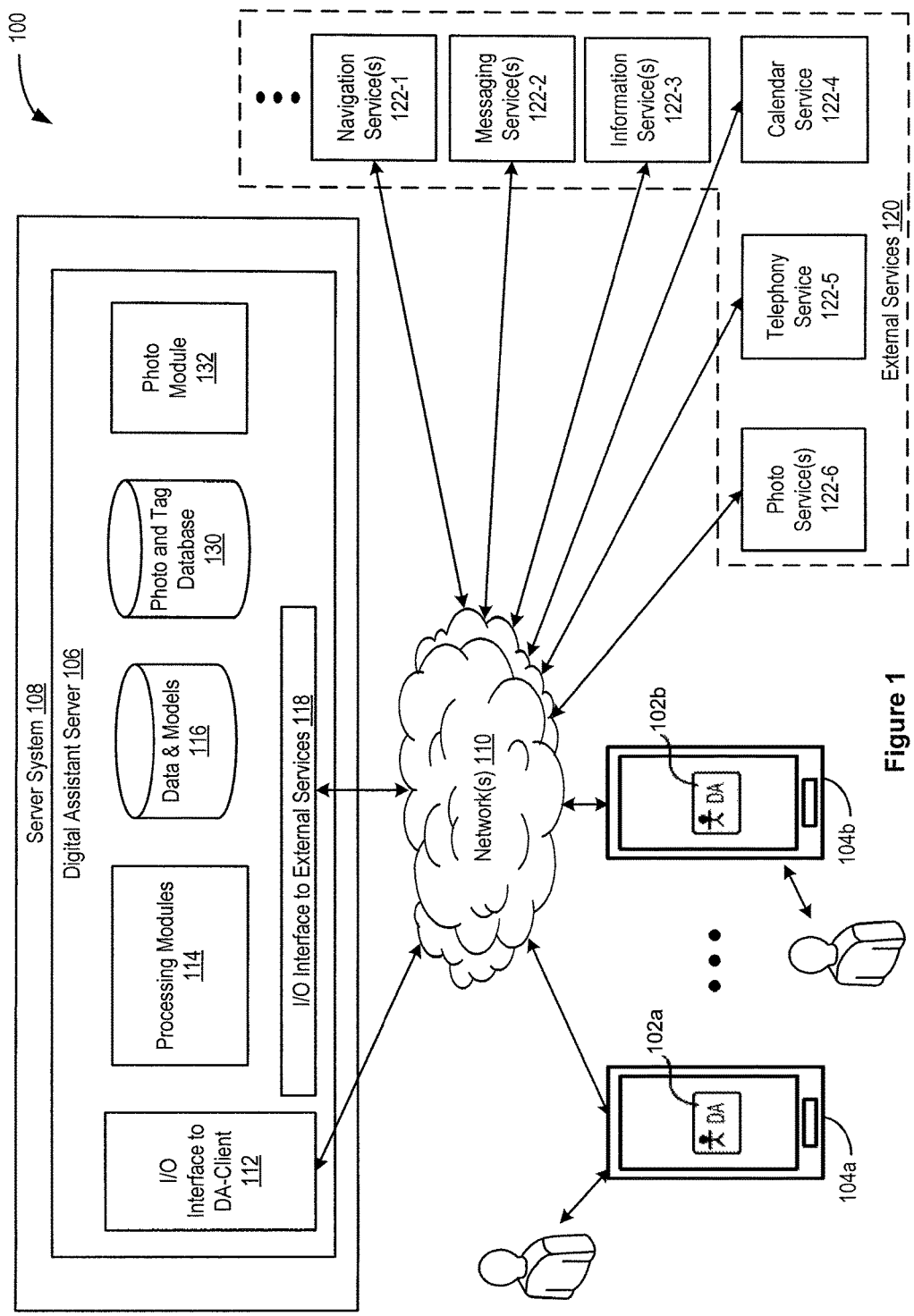
FIG. 1 is a block diagram illustrating an environment in which a digital assistant operates in accordance with some implementations.

FIG. 1 is a block diagram of an operating environment 100 of a digital assistant according to some implementations. The terms "digital assistant," "virtual assistant," "intelligent automated assistant," "voice-based digital assistant," or "automatic digital assistant," refer to any information processing system that interprets natural language input in spoken and/or textual form to deduce user intent (e.g., identify a task type that corresponds to the natural language input), and performs actions based on the deduced user intent (e.g., perform a task corresponding to the identified task type). For example, to act on a deduced user intent, the system can perform one or more of the following: identifying a task flow with steps and parameters designed to accomplish the deduced user intent (e.g., identifying a task type), inputting specific requirements from the deduced user intent into the task flow, executing the task flow by invoking programs, methods, services, APIs, or the like (e.g., sending a request to a service provider); and generating output responses to the user in an audible (e.g., speech) and/or visual form.

Specifically, once initiated, a digital assistant system is capable of accepting a user request at least partially in the form of a natural language command, request, statement, narrative, and/or inquiry. Typically, the user request seeks either an informational answer or performance of a task by the digital assistant system. A satisfactory response to the user request is generally either provision of the requested informational answer, performance of the requested task, or a combination of the two. For example, a user may ask the digital assistant system a question, such as "Where am I right now?" Based on the user's current location, the digital assistant may answer, "You are in Central Park near the west gate." The user may also request the performance of a task, for example, by stating "Please invite my friends to my girlfriend's birthday party next week." In response, the digital assistant may acknowledge the request by generating a voice output, "Yes, right away," and then send a suitable calendar invite from the user's email address to each of the user' friends listed in the user's electronic address book or contact list. There are numerous other ways of interacting with a digital assistant to request information or performance of various tasks. In addition to providing verbal responses and taking programmed actions, the digital assistant can also provide responses in other visual or audio forms (e.g., as text, alerts, music, videos, animations, etc.).

As shown in FIG. 1, in some implementations, a digital assistant system is implemented according to a client-server model. The digital assistant system includes a client-side portion (e.g., 102a and 102b) (hereafter "digital assistant (DA) client 102") executed on a user device (e.g., 104a and 104b), and a server-side portion 106 (hereafter "digital assistant (DA) server 106") executed on a server system 108. The DA client 102 communicates with the DA server 106 through one or more networks 110. The DA client 102 provides client-side functionalities such as user-facing input and output processing and communications with the DA server 106. The DA server 106 provides server-side functionalities for any number of DA clients 102 each residing on a respective user device 104 (also called a client device or electronic device).

In some implementations, the DA server 106 includes a client-facing I/O interface 112, one or more processing modules 114, data and models 116, an I/O interface to external services 118, a photo and tag database 130, and a photo-tag module 132. The client-facing I/O interface facilitates the client-facing input and output processing for the digital assistant server 106. The one or more processing modules 114 utilize the data and models 116 to determine the user's intent based on natural language input and perform task execution based on the deduced user intent. Photo and tag database 130 stores fingerprints of digital photographs, and, optionally digital photographs themselves, as well as tags associated with the digital photographs. Photo-tag module 132 creates tags, stores tags in association with photographs and/or fingerprints, automatically tags photographs, and links tags to locations within photographs.

In some implementations, the DA server 106 communicates with external services 120 (e.g., navigation service(s) 122-1, messaging service(s) 122-2, information service(s) 122-3, calendar service 122-4, telephony service 122-5, photo service(s) 122-6, etc.) through the network(s) 110 for task completion or information acquisition. The I/O interface to the external services 118 facilitates such communications.

Examples of the user device 104 include, but are not limited to, a handheld computer, a personal digital assistant (PDA), a tablet computer, a laptop computer, a desktop computer, a cellular telephone, a smartphone, an enhanced general packet radio service (EGPRS) mobile phone, a media player, a navigation device, a game console, a television, a remote control, or a combination of any two or more of these data processing devices or any other suitable data processing devices. More details on the user device 104 are provided in reference to an exemplary user device 104 shown in FIG. 2.

Examples of the communication network(s) 110 include local area networks (LAN) and wide area networks (WAN), e.g., the Internet. The communication network(s) 110 may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), WiMAX, or any other suitable communication protocol.

The server system 108 can be implemented on at least one data processing apparatus and/or a distributed network of computers. In some implementations, the server system 108 also employs various virtual devices and/or services of third party service providers (e.g., third-party cloud service providers) to provide the underlying computing resources and/or infrastructure resources of the server system 108.

Although the digital assistant system shown in FIG. 1 includes both a client side portion (e.g., the DA client 102) and a server-side portion (e.g., the DA server 106), in some implementations, a digital assistant system refers only to the server-side portion (e.g., the DA server 106). In some implementations, the functions of a digital assistant can be implemented as a standalone application installed on a user device. In addition, the divisions of functionalities between the client and server portions of the digital assistant can vary in different implementations. For example, in some implementations, the DA client 102 is a thin-client that provides only user-facing input and output processing functions, and delegates all other functionalities of the digital assistant to the DA server 106. In some other implementations, the DA client 102 is configured to perform or assist one or more functions of the DA server 106.

Figure 2:
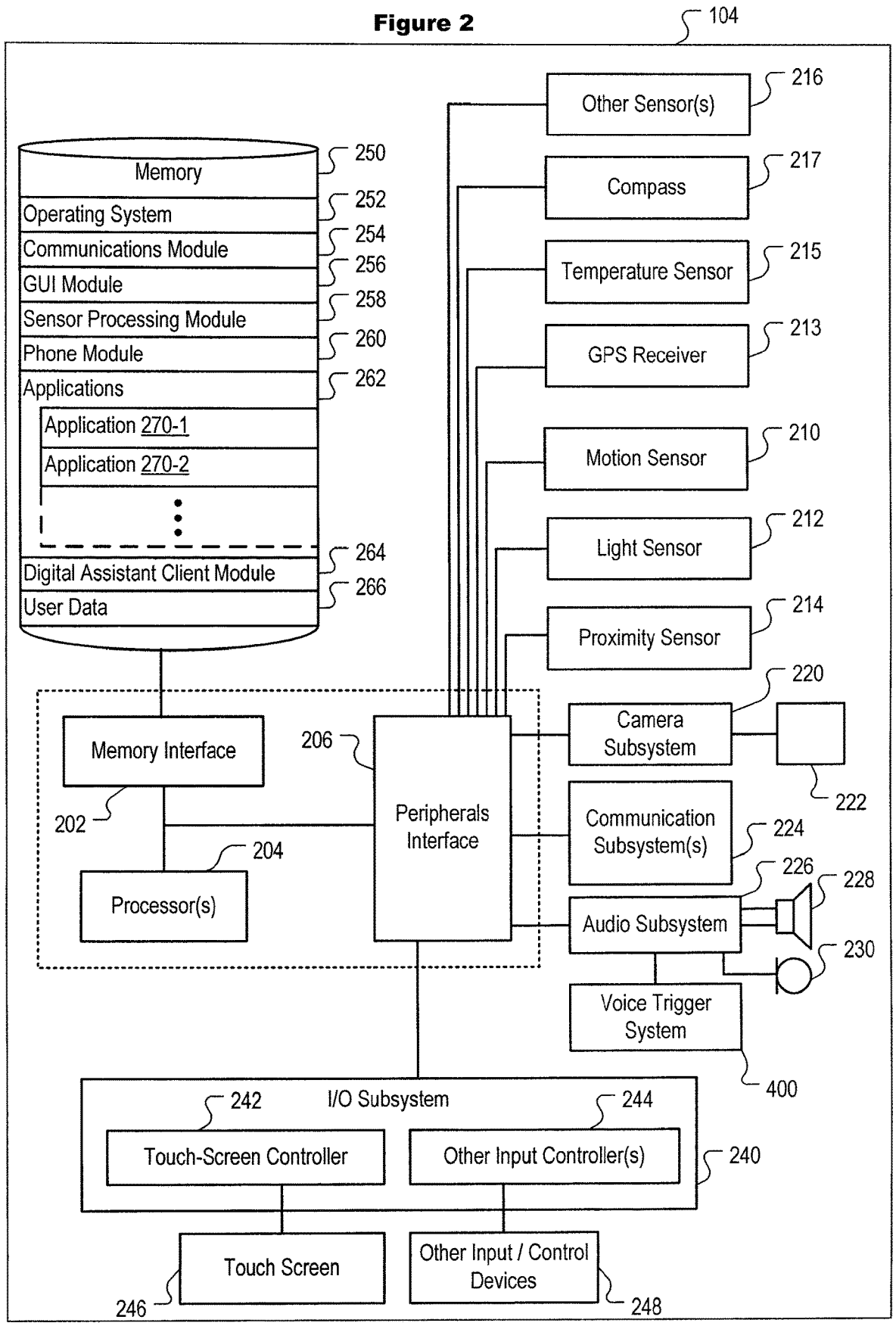
FIG. 2 is a block diagram illustrating a digital assistant client system in accordance with some implementations.

FIG. 2 is a block diagram of a user device 104 in accordance with some implementations. The user device 104 includes a memory interface 202, one or more processors 204, and a peripherals interface 206. The various components in the user device 104 are coupled by one or more communication buses or signal lines. The user device 104 includes various sensors, subsystems, and peripheral devices that are coupled to the peripherals interface 206. The sensors, subsystems, and peripheral devices gather information and/or facilitate various functionalities of the user device 104.

For example, in some implementations, a motion sensor 210 (e.g., an accelerometer), a light sensor 212, a GPS receiver 213, a temperature sensor, and a proximity sensor 214 are coupled to the peripherals interface 206 to facilitate orientation, light, and proximity sensing functions. In some implementations, other sensors 216, such as a biometric sensor, barometer, and the like, are connected to the peripherals interface 206, to facilitate related functionalities.

In some implementations, the user device 104 includes a camera subsystem 220 coupled to the peripherals interface 206. In some implementations, an optical sensor 222 of the camera subsystem 220 facilitates camera functions, such as taking photographs and recording video clips. In some implementations, the user device 104 includes one or more wired and/or wireless communication subsystems 224 provide communication functions. The communication subsystems 224 typically includes various communication ports, radio frequency receivers and transmitters, and/or optical (e.g., infrared) receivers and transmitters. In some implementations, the user device 104 includes an audio subsystem 226 coupled to one or more speakers 228 and one or more microphones 230 to facilitate voice-enabled functions, such as voice recognition, voice replication, digital recording, and telephony functions. In some implementations, the audio subsystem 226 is coupled to a voice trigger system 400. In some implementations, the voice trigger system 400 and/or the audio subsystem 226 includes low-power audio circuitry and/or programs (i.e., including hardware and/or software) for receiving and/or analyzing sound inputs, including, for example, one or more analog-to-digital converters, digital signal processors (DSPs), sound detectors, memory buffers, codecs, and the like. In some implementations, the low-power audio circuitry (alone or in addition to other components of the user device 104) provides voice (or sound) trigger functionality for one or more aspects of the user device 104, such as a voice-based digital assistant or other speech-based service. In some implementations, the low-power audio circuitry provides voice trigger functionality even when other components of the user device 104 are shut down and/or in a standby mode, such as the processor(s) 204, I/O subsystem 240, memory 250, and the like. The voice trigger system 400 is described in further detail with respect to FIG. 4.

In some implementations, an I/O subsystem 240 is also coupled to the peripheral interface 206. In some implementations, the user device 104 includes a touch screen 246, and the I/O subsystem 240 includes a touch screen controller 242 coupled to the touch screen 246. When the user device 104 includes the touch screen 246 and the touch screen controller 242, the touch screen 246 and the touch screen controller 242 are typically con figured to, for example, detect contact and movement or break thereof using any of a plurality of touch sensitivity technologies, such as capacitive, resistive, infrared, surface acoustic wave technologies, proximity sensor arrays, and the like. In some implementations, the user device 104 includes a display that does not include a touch-sensitive surface. In some implementations, the user device 104 includes a separate touch-sensitive surface. In some implementations, the user device 104 includes other input controller(s) 244. When the user device 104 includes the other input controller(s) 244, the other input controller(s) 244 are typically coupled to other input/control devices 248, such as one or more buttons, rocker switches, thumb-wheel, infrared port, USB port, and/or a pointer device such as a stylus.

The memory interface 202 is coupled to memory 250. In some implementations, memory 250 includes a non-transitory computer readable medium, such as high-speed random access memory and/or non-volatile memory (e.g., one or more magnetic disk storage devices, one or more flash memory devices, one or more optical storage devices, and/or other non-volatile solid-state memory devices).

In some implementations, memory 250 stores an operating system 252, a communications module 254, a graphical user interface module 256, a sensor processing module 258, a phone module 260, and applications 262, and a subset or superset thereof. The operating system 252 includes instructions for handling basic system services and for performing hardware dependent tasks. The communications module 254 facilitates communicating with one or more additional devices, one or more computers and/or one or more servers. The graphical user interface module 256 facilitates graphic user interface processing. The sensor processing module 258 facilitates sensor-related processing and functions (e.g., processing voice input received with the one or more microphones 228). The phone module 260 facilitates phone-related processes and functions. The application module 262 facilitates various functionalities of user applications, such as electronic-messaging, web browsing, media processing, navigation, imaging and/or other processes and functions. In some implementations, the user device 104 stores in memory 250 one or more software applications 270-1 and 270-2 each associated with at least one of the external service providers.

As described above, in some implementations, memory 250 also stores client-side digital assistant instructions (e.g., in a digital assistant client module 264) and various user data 266 (e.g., user-specific vocabulary data, preference data, and/or other data such as the user's electronic address book or contact list, to-do lists, shopping lists, etc.) to provide the client-side functionalities of the digital assistant.

In various implementations, the digital assistant client module 264 is capable of accepting voice input, text input, touch input, and/or gestural input through various user interfaces (e.g., the I/O subsystem 244) of the user device 104. The digital assistant client module 264 is also capable of providing output in audio, visual, and/or tactile forms. For example, output can be provided as voice, sound, alerts, text messages, menus, graphics, videos, animations, vibrations, and/or combinations of two or more of the above. During operation, the digital assistant client module 264 communicates with the digital assistant server (e.g., the digital assistant server 106, FIG. 1) using the communication subsystems 224.

In some implementations, the digital assistant client module 264 utilizes various sensors, subsystems and peripheral devices to gather additional information from the surrounding environment of the user device 104 to establish a context associated with a user input. In some implementations, the digital assistant client module 264 provides the context information or a subset thereof with the user input to the digital assistant server (e.g., the digital assistant server 106, FIG. 1) to help deduce the user's intent.

In some implementations, the context information that can accompany the user input includes sensor information, e.g., lighting, ambient noise, ambient temperature, images or videos of the surrounding environment, etc. In some implementations, the context information also includes the physical state of the device, e.g., device orientation, device location, device temperature, power level, speed, acceleration, motion patterns, cellular signals strength, etc. In some implementations, information related to the software state of the user device 106, e.g., running processes, installed programs, past and present network activities, background services, error logs, resources usage, etc., of the user device 104 is also provided to the digital assistant server (e.g., the digital assistant server 106, FIG. 1) as context information associated with a user input.

In some implementations, the DA client module 264 selectively provides information (e.g., at least a portion of the user data 266) stored on the user device 104 in response to requests from the digital assistant server. In some implementations, the digital assistant client module 264 also elicits additional input from the user via a natural language dialogue or other user interfaces upon request by the digital assistant server 106 (FIG. 1). The digital assistant client module 264 passes the additional input to the digital assistant server 106 to help the digital assistant server 106 in intent deduction and/or fulfillment of the user's intent expressed in the user request.

In some implementations, memory 250 may include additional instructions or fewer instructions. Furthermore, various functions of the user device 104 may be implemented in hardware and/or in firmware, including in one or more signal processing and/or application specific integrated circuits, and the user device 104, thus, need not include all modules and applications illustrated in FIG. 2.

Figure 3A:
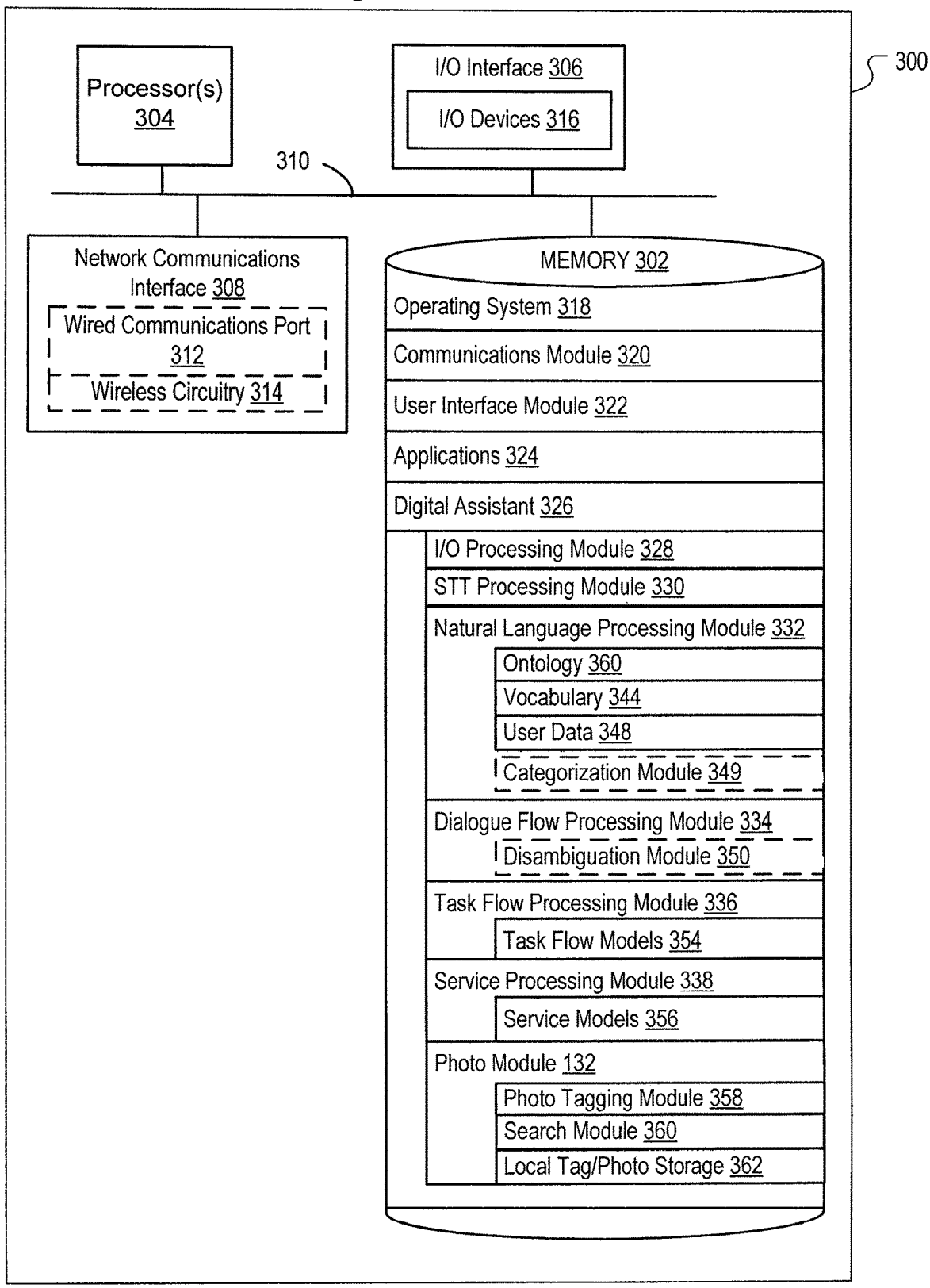
FIG. 3A is a block diagram illustrating a standalone digital assistant system or a digital assistant server system in accordance with some implementations.

FIG. 3A is a block diagram of an exemplary digital assistant system 300 (also referred to as the digital assistant) in accordance with some implementations. In some implementations, the digital assistant system 300 is implemented on a standalone computer system. In some implementations, the digital assistant system 300 is distributed across multiple computers. In some implementations, some of the modules and functions of the digital assistant are divided into a server portion and a client portion, where the client portion resides on a user device (e.g., the user device 104) and communicates with the server portion (e.g., the server system 108) through one or more networks, e.g., as shown in FIG. 1. In some implementations, the digital assistant system 300 is an embodiment of the server system 108 (and/or the digital assistant server 106) shown in FIG. 1. In some implementations, the digital assistant system 300 is implemented in a user device (e.g., the user device 104, FIG. 1), thereby eliminating the need for a client-server system. It should be noted that the digital assistant system 300 is only one example of a digital assistant system, and that the digital assistant system 300 may have more or fewer components than shown, may combine two or more components, or may have a different configuration or arrangement of the components. The various components shown in FIG. 3A may be implemented in hardware, software, firmware, including one or more signal processing and/or application specific integrated circuits, or a combination of thereof.

The digital assistant system 300 includes memory 302, one or more processors 304, an input/output (I/O) interface 306, and a network communications interface 308. These components communicate with one another over one or more communication buses or signal lines 310.

In some implementations, memory 302 includes a non-transitory computer readable medium, such as high-speed random access memory and/or a non-volatile computer readable storage medium (e.g., one or more magnetic disk storage devices, one or more flash memory devices, one or more optical storage devices, and/or other non-volatile solid-state memory devices).

The I/O interface 306 couples input/output devices 316 of the digital assistant system 300, such as displays, a keyboards, touch screens, and microphones, to the user interface module 322. The I/O interface 306, in conjunction with the user interface module 322, receives user inputs (e.g., voice input, keyboard inputs, touch inputs, etc.) and process them accordingly. In some implementations, when the digital assistant is implemented on a standalone user device, the digital assistant system 300 includes any of the components and I/O and communication interfaces described with respect to the user device 104 in FIG. 2 (e.g., one or more microphones 230). In some implementations, the digital assistant system 300 represents the server portion of a digital assistant implementation, and interacts with the user through a client-side portion residing on a user device (e.g., the user device 104 shown in FIG. 2).

In some implementations, the network communications interface 308 includes wired communication port(s) 312 and/or wireless transmission and reception circuitry 314. The wired communication port(s) receive and send communication signals via one or more wired interfaces, e.g., Ethernet, Universal Serial Bus (USB), FIREWIRE, etc. The wireless circuitry 314 typically receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 308 enables communication between the digital assistant system 300 with networks, such as the Internet, an intranet and/or a wireless network, such as a cellular telephone network, a wireless local area network (LAN) and/or a metropolitan area network (MAN), and other devices.

In some implementations, the non-transitory computer readable storage medium of memory 302 stores programs, modules, instructions, and data structures including all or a subset of: an operating system 318, a communications module 320, a user interface module 322, one or more applications 324, and a digital assistant module 326. The one or more processors 304 execute these programs, modules, and instructions, and reads/writes from/to the data structures.

The operating system 318 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

The communications module 320 facilitates communications between the digital assistant system 300 with other devices over the network communications interface 308. For example, the communication module 320 may communicate with the communications module 254 of the device 104 shown in FIG. 2. The communications module 320 also includes various software components for handling data received by the wireless circuitry 314 and/or wired communications port 312.

In some implementations, the user interface module 322 receives commands and/or inputs from a user via the I/O interface 306 (e.g., from a keyboard, touch screen, and/or microphone), and provides user interface objects on a display.

The applications 324 include programs and/or modules that are configured to be executed by the one or more processors 304. For example, if the digital assistant system is implemented on a standalone user device, the applications 324 may include user applications, such as games, a calendar application, a navigation application, or an email application. If the digital assistant system 300 is implemented on a server farm, the applications 324 may include resource management applications, diagnostic applications, or scheduling applications, for example.

Memory 302 also stores the digital assistant module (or the server portion of a digital assistant) 326. In some implementations, the digital assistant module 326 includes the following sub-modules, or a subset or superset thereof: an input/output processing module 328, a speech-to-text (STT) processing module 330, a natural language processing module 332, a dialogue flow processing module 334, a task flow processing module 336, a service processing module 338, and a photo module 132. Each of these processing modules has access to one or more of the following data and models of the digital assistant 326, or a subset or superset thereof: ontology 360, vocabulary index 344, user data 348, categorization module 349, disambiguation module 350, task flow models 354, service models 356, photo tagging module 358, search module 360, and local tag/photo storage 362.

In some implementations, using the processing modules (e.g., the input/output processing module 328, the STT processing module 330, the natural language processing module 332, the dialogue flow processing module 334, the task flow processing module 336, and/or the service processing module 338), data, and models implemented in the digital assistant module 326, the digital assistant system 300 performs at least some of the following: identifying a user's intent expressed in a natural language input received from the user; actively eliciting and obtaining information needed to fully deduce the user's intent (e.g., by disambiguating words, names, intentions, etc.); determining the task flow for fulfilling the deduced intent; and executing the task flow to fulfill the deduced intent. In some implementations, the digital assistant also takes appropriate actions when a satisfactory response was not or could not be provided to the user for various reasons.

In some implementations, as discussed below, the digital assistant system 300 identifies, from a natural language input, a user's intent to tag a digital photograph, and processes the natural language input so as to tag the digital photograph with appropriate information. In some implementations, the digital assistant system 300 performs other tasks related to photographs as well, such as searching for digital photographs using natural language input, auto-tagging photographs, and the like.

Figure 3B:
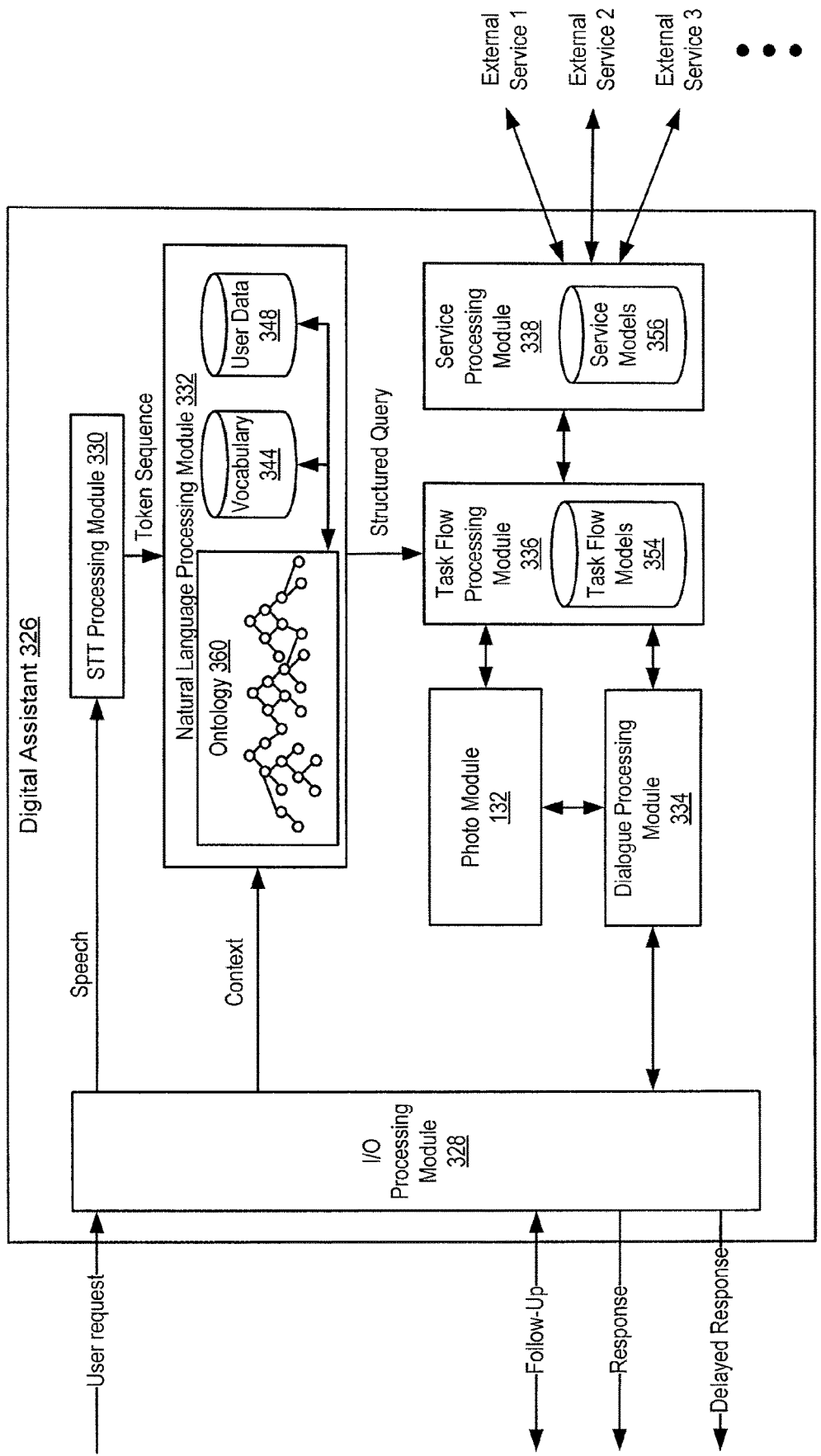
FIG. 3B is a block diagram illustrating functions of the digital assistant shown in FIG. 3A in accordance with some implementations.

As shown in FIG. 3B, in some implementations, the I/O processing module 328 interacts with the user through the I/O devices 316 in FIG. 3A or with a user device (e.g., a user device 104 in FIG. 1) through the network communications interface 308 in FIG. 3A to obtain user input (e.g., a speech input) and to provide responses to the user input. The I/O processing module 328 optionally obtains context information associated with the user input from the user device, along with or shortly after the receipt of the user input. The context information includes user-specific data, vocabulary, and/or preferences relevant to the user input. In some implementations, the context information also includes software and hardware states of the device (e.g., the user device 104 in FIG. 1) at the time the user request is received, and/or information related to the surrounding environment of the user at the time that the user request was received. In some implementations, the I/O processing module 328 also sends follow-up questions to, and receives answers from, the user regarding the user request. In some implementations, when a user request is received by the I/O processing module 328 and the user request contains a speech input, the I/O processing module 328 forwards the speech input to the speech-to-text (STT) processing module 330 for speech-to-text conversions.

In some implementations, the speech-to-text processing module 330 receives speech input (e.g., a user utterance captured in a voice recording) through the I/O processing module 328. In some implementations, the speech-to-text processing module 330 uses various acoustic and language models to recognize the speech input as a sequence of phonemes, and ultimately, a sequence of words or tokens written in one or more languages. The speech-to-text processing module 330 is implemented using any suitable speech recognition techniques, acoustic models, and language models, such as Hidden Markov Models, Dynamic Time Warping (DTW)-based speech recognition, and other statistical and/or analytical techniques. In some implementations, the speech-to-text processing can be performed at least partially by a third party service or on the user's device. Once the speech-to-text processing module 330 obtains the result of the speech-to-text processing (e.g., a sequence of words or tokens), it passes the result to the natural language processing module 332 for intent deduction.

The natural language processing module 332 ("natural language processor") of the digital assistant 326 takes the sequence of words or tokens ("token sequence") generated by the speech-to-text processing module 330, and attempts to associate the token sequence with one or more "actionable intents" recognized by the digital assistant. As used herein, an "actionable intent" represents a task that can be performed by the digital assistant 326 and/or the digital assistant system 300 (FIG. 3A), and has an associated task flow implemented in the task flow models 354. The associated task flow is a series of programmed actions and steps that the digital assistant system 300 takes in order to perform the task. The scope of a digital assistant system's capabilities is dependent on the number and variety of task flows that have been implemented and stored in the task flow models 354, or in other words, on the number and variety of "actionable intents" that the digital assistant system 300 recognizes. The effectiveness of the digital assistant system 300, however, is also dependent on the digital assistant system's ability to deduce the correct "actionable intent(s)" from the user request expressed in natural language.

In some implementations, in addition to the sequence of words or tokens obtained from the speech-to-text processing module 330, the natural language processor 332 also receives context information associated with the user request (e.g., from the I/O processing module 328). The natural language processor 332 optionally uses the context information to clarify, supplement, and/or further define the information contained in the token sequence received from the speech-to-text processing module 330. The context information includes, for example, user preferences, hardware and/or software states of the user device, sensor information collected before, during, or shortly after the user request, prior interactions (e.g., dialogue) between the digital assistant and the user, and the like.

In some implementations, the natural language processing is based on an ontology 360. The ontology 360 is a hierarchical structure containing a plurality of nodes, each node representing either an "actionable intent" or a "property" relevant to one or more of the "actionable intents" or other "properties." As noted above, an "actionable intent" represents a task that the digital assistant system 300 is capable of performing (e.g., a task that is "actionable" or can be acted on). A "property" represents a parameter associated with an actionable intent or a sub-aspect of another property. A linkage between an actionable intent node and a property node in the ontology 360 defines how a parameter represented by the property node pertains to the task represented by the actionable intent node.

In some implementations, the ontology 360 is made up of actionable intent nodes and property nodes. Within the ontology 360, each actionable intent node is linked to one or more property nodes either directly or through one or more intermediate property nodes. Similarly, each property node is linked to one or more actionable intent nodes either directly or through one or more intermediate property nodes. For example, the ontology 360 shown in FIG. 3C includes a "restaurant reservation" node, which is an actionable intent node. Property nodes "restaurant," "date/time" (for the reservation), and "party size" are each directly linked to the "restaurant reservation" node (i.e., the actionable intent node). In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, the ontology 360 shown in FIG. 3C also includes a "set reminder" node, which is another actionable intent node. Property nodes "date/time" (for the setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in the ontology 360.

An actionable intent node, along with its linked concept nodes, may be described as a "domain." In the present discussion, each domain is associated with a respective actionable intent, and refers to the group of nodes (and the relationships therebetween) associated with the particular actionable intent. For example, the ontology 360 shown in FIG. 3C includes an example of a restaurant reservation domain 362 and an example of a reminder domain 364 within the ontology 360. The restaurant reservation domain includes the actionable intent node "restaurant reservation," property nodes "restaurant," "date/time," and "party size," and sub-property nodes "cuisine," "price range," "phone number," and "location." The reminder domain 364 includes the actionable intent node "set reminder," and property nodes "subject" and "date/time." In some implementations, the ontology 360 is made up of many domains. Each domain may share one or more property nodes with one or more other domains. For example, the "date/time" property node may be associated with many other domains (e.g., a scheduling domain, a travel reservation domain, a movie ticket domain, etc.), in addition to the restaurant reservation domain 362 and the reminder domain 364.

Figure 3C:
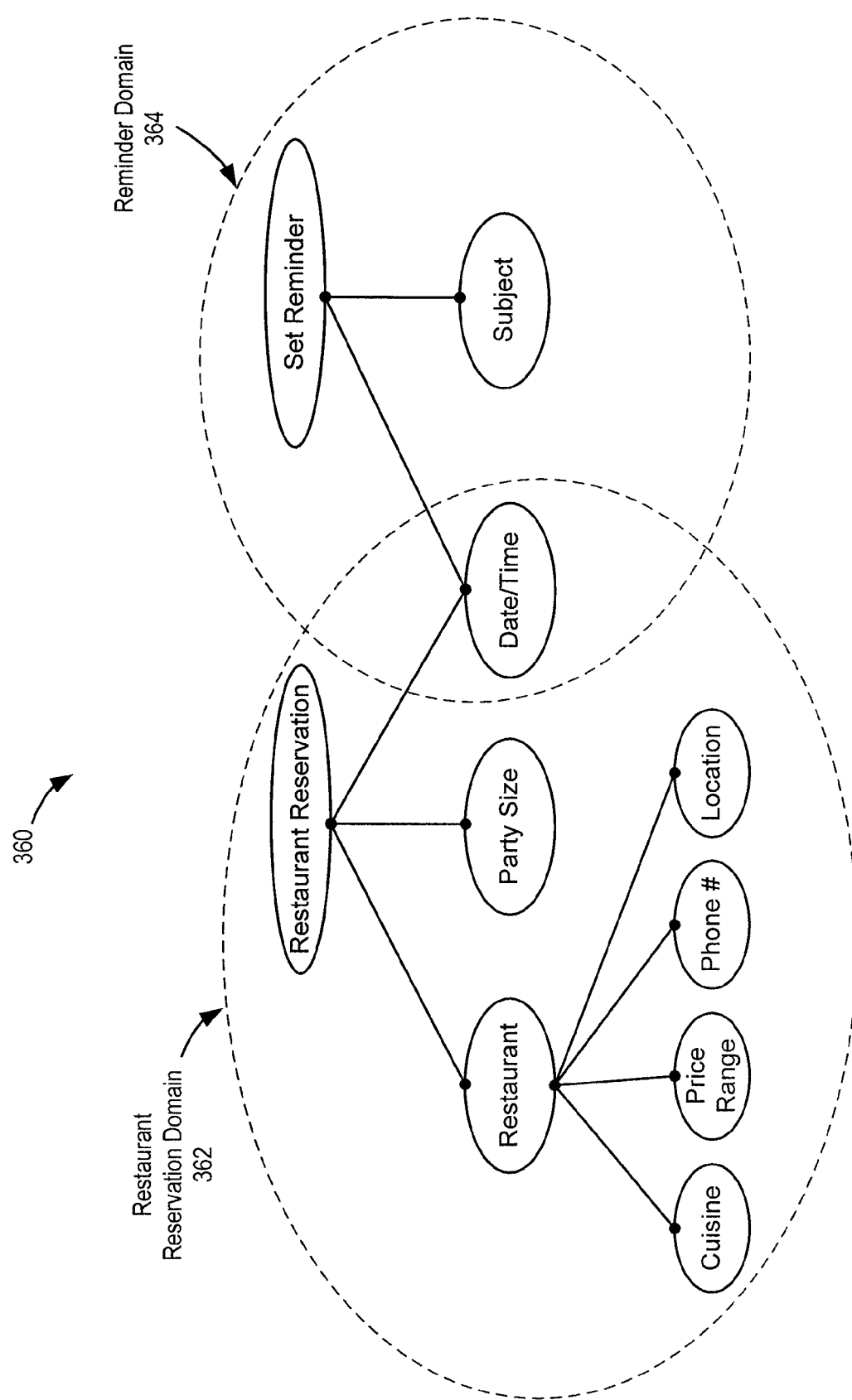
FIG. 3C is a network diagram illustrating a portion of an ontology in accordance with some implementations.

While FIG. 3C illustrates two exemplary domains within the ontology 360, the ontology 360 may include other domains (or actionable intents), such as "initiate a phone call," "find directions," "schedule a meeting," "send a message," and "provide an answer to a question," "tag a photo," and so on. For example, a "send a message" domain is associated with a "send a message" actionable intent node, and may further include property nodes such as "recipient(s)," "message type," and "message body." The property node "recipient" may be further defined, for example, by the sub-property nodes such as "recipient name" and "message address."

In some implementations, the ontology 360 includes all the domains (and hence actionable intents) that the digital assistant is capable of understanding and acting upon. In some implementations, the ontology 360 may be modified, such as by adding or removing domains or nodes, or by modifying relationships between the nodes within the ontology 360.

In some implementations, nodes associated with multiple related actionable intents may be clustered under a "super domain" in the ontology 360. For example, a "travel" super-domain may include a cluster of property nodes and actionable intent nodes related to travels. The actionable intent nodes related to travels may include "airline reservation," "hotel reservation," "car rental," "get directions," "find points of interest," and so on. The actionable intent nodes under the same super domain (e.g., the "travels" super domain) may have many property nodes in common. For example, the actionable intent nodes for "airline reservation," "hotel reservation," "car rental," "get directions," "find points of interest" may share one or more of the property nodes "start location," "destination," "departure date/time," "arrival date/time," and "party size."

In some implementations, each node in the ontology 360 is associated with a set of words and/or phrases that are relevant to the property or actionable intent represented by the node. The respective set of words and/or phrases associated with each node is the so-called "vocabulary" associated with the node. The respective set of words and/or phrases associated with each node can be stored in the vocabulary index 344 (FIG. 3B) in association with the property or actionable intent represented by the node. For example, returning to FIG. 3B, the vocabulary associated with the node for the property of "restaurant" may include words such as "food," "drinks," "cuisine," "hungry," "eat," "pizza," "fast food," "meal," and so on. For another example, the vocabulary associated with the node for the actionable intent of "initiate a phone call" may include words and phrases such as "call," "phone," "dial," "ring," "call this number," "make a call to," and so on. The vocabulary index 344 optionally includes words and phrases in different languages.

In some implementations, the natural language processor 332 shown in FIG. 3B receives the token sequence (e.g., a text string) from the speech-to-text processing module 330, and determines what nodes are implicated by the words in the token sequence. In some implementations, if a word or phrase in the token sequence is found to be associated with one or more nodes in the ontology 360 (via the vocabulary index 344), the word or phrase will "trigger" or "activate" those nodes. When multiple nodes are "triggered," based on the quantity and/or relative importance of the activated nodes, the natural language processor 332 will select one of the actionable intents as the task (or task type) that the user intended the digital assistant to perform. In some implementations, the domain that has the most "triggered" nodes is selected. In some implementations, the domain having the highest confidence value (e.g., based on the relative importance of its various triggered nodes) is selected. In some implementations, the domain is selected based on a combination of the number and the importance of the triggered nodes. In some implementations, additional factors are considered in selecting the node as well, such as whether the digital assistant system 300 has previously correctly interpreted a similar request from a user.

In some implementations, the digital assistant system 300 also stores names of specific entities in the vocabulary index 344, so that when one of these names is detected in the user request, the natural language processor 332 will be able to recognize that the name refers to a specific instance of a property or sub-property in the ontology. In some implementations, the names of specific entities are names of businesses, restaurants, people, movies, and the like. In some implementations, the digital assistant system 300 can search and identify specific entity names from other data sources, such as the user's address book or contact list, a movies database, a musicians database, and/or a restaurant database. In some implementations, when the natural language processor 332 identifies that a word in the token sequence is a name of a specific entity (such as a name in the user's address book or contact list), that word is given additional significance in selecting the actionable intent within the ontology for the user request.

For example, when the words "Mr. Santo" are recognized from the user request, and the last name "Santo" is found in the vocabulary index 344 as one of the contacts in the user's contact list, then it is likely that the user request corresponds to a "send a message" or "initiate a phone call" domain. For another example, when the words "ABC Café" are found in the user request, and the term "ABC Café" is found in the vocabulary index 344 as the name of a particular restaurant in the user's city, then it is likely that the user request corresponds to a "restaurant reservation" domain.

User data 348 includes user-specific information, such as user-specific vocabulary, user preferences, user address, user's default and secondary languages, user's contact list, and other short-term or long-term information for each user. The natural language processor 332 can use the user-specific information to supplement the information contained in the user input to further define the user intent. For example, for a user request "invite my friends to my birthday party," the natural language processor 332 is able to access user data 348 to determine who the "friends" are and when and where the "birthday party" would be held, rather than requiring the user to provide such information explicitly in his/her request.

In some implementations, natural language processor 332 includes categorization module 349. In some implementations, the categorization module 349 determines whether each of the one or more terms in a text string (e.g., corresponding to a speech input associated with a digital photograph) is one of an entity, an activity, or a location, as discussed in greater detail below. In some implementations, the categorization module 349 classifies each term of the one or more terms as one of an entity, an activity, or a location.

Once the natural language processor 332 identifies an actionable intent (or domain) based on the user request, the natural language processor 332 generates a structured query to represent the identified actionable intent. In some implementations, the structured query includes parameters for one or more nodes within the domain for the actionable intent, and at least some of the parameters are populated with the specific information and requirements specified in the user request. For example, the user may say "Make me a dinner reservation at a sushi place at 7." In this case, the natural language processor 332 may be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. Based on the information contained in the user's utterance, the natural language processor 332 may generate a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some implementations, the natural language processor 332 populates some parameters of the structured query with received context information. For example, if the user requested a sushi restaurant "near me," the natural language processor 332 may populate a {location} parameter in the structured query with GPS coordinates from the user device 104.

In some implementations, the natural language processor 332 passes the structured query (including any completed parameters) to the task flow processing module 336 ("task flow processor"). The task flow processor 336 is configured to perform one or more of: receiving the structured query from the natural language processor 332, completing the structured query, and performing the actions required to "complete" the user's ultimate request. In some implementations, the various procedures necessary to complete these tasks are provided in task flow models 354. In some implementations, the task flow models 354 include procedures for obtaining additional information from the user, and task flows for performing actions associated with the actionable intent.

As described above, in order to complete a structured query, the task flow processor 336 may need to initiate additional dialogue with the user in order to obtain additional information, and/or disambiguate potentially ambiguous utterances. When such interactions are necessary, the task flow processor 336 invokes the dialogue processing module 334 ("dialogue processor") to engage in a dialogue with the user. In some implementations, the dialogue processing module 334 determines how (and/or when) to ask the user for the additional information, and receives and processes the user responses. In some implementations, the questions are provided to and answers are received from the users through the I/O processing module 328. For example, the dialogue processing module 334 presents dialogue output to the user via audio and/or visual output, and receives input from the user via spoken or physical (e.g., touch gesture) responses. Continuing with the example above, when the task flow processor 336 invokes the dialogue processor 334 to determine the "party size" and "date" information for the structured query associated with the domain "restaurant reservation," the dialogue processor 334 generates questions such as "For how many people?" and "On which day?" to pass to the user. Once answers are received from the user, the dialogue processing module 334 populates the structured query with the missing information, or passes the information to the task flow processor 336 to complete the missing information from the structured query.

In some cases, the task flow processor 336 may receive a structured query that has one or more ambiguous properties. For example, a structured query for the "send a message" domain may indicate that the intended recipient is "Bob," and the user may have multiple contacts named "Bob." The task flow processor 336 will request that the dialogue processor 334 disambiguate this property of the structured query. In turn, the dialogue processor 334 may ask the user "Which Bob?", and display (or read) a list of contacts named "Bob" from which the user may choose.

In some implementations, dialogue processor 334 includes disambiguation module 350. In some implementations, disambiguation module 350 disambiguates one or more ambiguous terms (e.g., one or more ambiguous terms in a text string corresponding to a speech input associated with a digital photograph). In some implementations, disambiguation module 350 identifies that a first term of the one or more teens has multiple candidate meanings, prompts a user for additional information about the first term, receives the additional information from the user in response to the prompt and identifies the entity, activity, or location associated with the first term in accordance with the additional information.

In some implementations, disambiguation module 350 disambiguates pronouns. In such implementations, disambiguation module 350 identifies one of the one or more terms as a pronoun and determines a noun to which the pronoun refers. In some implementations, disambiguation module 350 determines a noun to which the pronoun refers by using a contact list associated with a user of the electronic device. Alternatively, or in addition, disambiguation module 350 determines a noun to which the pronoun refers as a name of an entity, an activity, or a location identified in a previous speech input associated with a previously tagged digital photograph. Alternatively, or in addition, disambiguation module 350 determines a noun to which the pronoun refers as a name of a person identified based on a previous speech input associated with a previously tagged digital photograph.

In some implementations, disambiguation module 350 accesses information obtained from one or more sensors (e.g., proximity sensor 214, light sensor 212, GPS receiver 213, temperature sensor 215, and motion sensor 210) of a handheld electronic device (e.g., user device 104) for determining a meaning of one or more of the terms. In some implementations, disambiguation module 350 identifies two terms each associated with one of an entity, an activity, or a location. For example, a first of the two terms refers to a person, and a second of the two terms refers to a location. In some implementations, disambiguation module 350 identifies three terms each associated with one of an entity, an activity, or a location.

Once the task flow processor 336 has completed the structured query for an actionable intent, the task flow processor 336 proceeds to perform the ultimate task associated with the actionable intent. Accordingly, the task flow processor 336 executes the steps and instructions in the task flow model according to the specific parameters contained in the structured query. For example, the task flow model for the actionable intent of "restaurant reservation" may include steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, the task flow processor 336 may perform the steps of: (1) logging onto a server of the ABC Café or a restaurant reservation system that is configured to accept reservations for multiple restaurants, such as the ABC Café, (2) entering the date, time, and party size information in a form on the website, (3) submitting the form, and (4) making a calendar entry for the reservation in the user's calendar. In another example, described in greater detail below, the task flow processor 336 executes steps and instructions associated with tagging or searching for digital photographs in response to a voice input, e.g., in conjunction with photo module 132.

In some implementations, the task flow processor 336 employs the assistance of a service processing module 338 ("service processor") to complete a task requested in the user input or to provide an informational answer requested in the user input. For example, the service processor 338 can act on behalf of the task flow processor 336 to make a phone call, set a calendar entry, invoke a map search, invoke or interact with other user applications installed on the user device, and invoke or interact with third party services (e.g. a restaurant reservation portal, a social networking website or service, a banking portal, etc.,). In some implementations, the protocols and application programming interfaces (API) required by each service can be specified by a respective service model among the service models 356. The service processor 338 accesses the appropriate service model for a service and generates requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameters to the online reservation service. When requested by the task flow processor 336, the service processor 338 can establish a network connection with the online reservation service using the web address stored in the service models 356, and send the necessary parameters of the reservation (e.g., time, date, party size) to the online reservation interface in a format according to the API of the online reservation service.

In some implementations, the natural language processor 332, dialogue processor 334, and task flow processor 336 are used collectively and iteratively to deduce and define the user's intent, obtain information to further clarify and refine the user intent, and finally generate a response (e.g., provide an output to the user, or complete a task) to fulfill the user's intent.

In some implementations, after all of the tasks needed to fulfill the user's request have been performed, the digital assistant 326 formulates a confirmation response, and sends the response back to the user through the I/O processing module 328. If the user request seeks an informational answer, the confirmation response presents the requested information to the user. In some implementations, the digital assistant also requests the user to indicate whether the user is satisfied with the response produced by the digital assistant 326.

Figure 4:
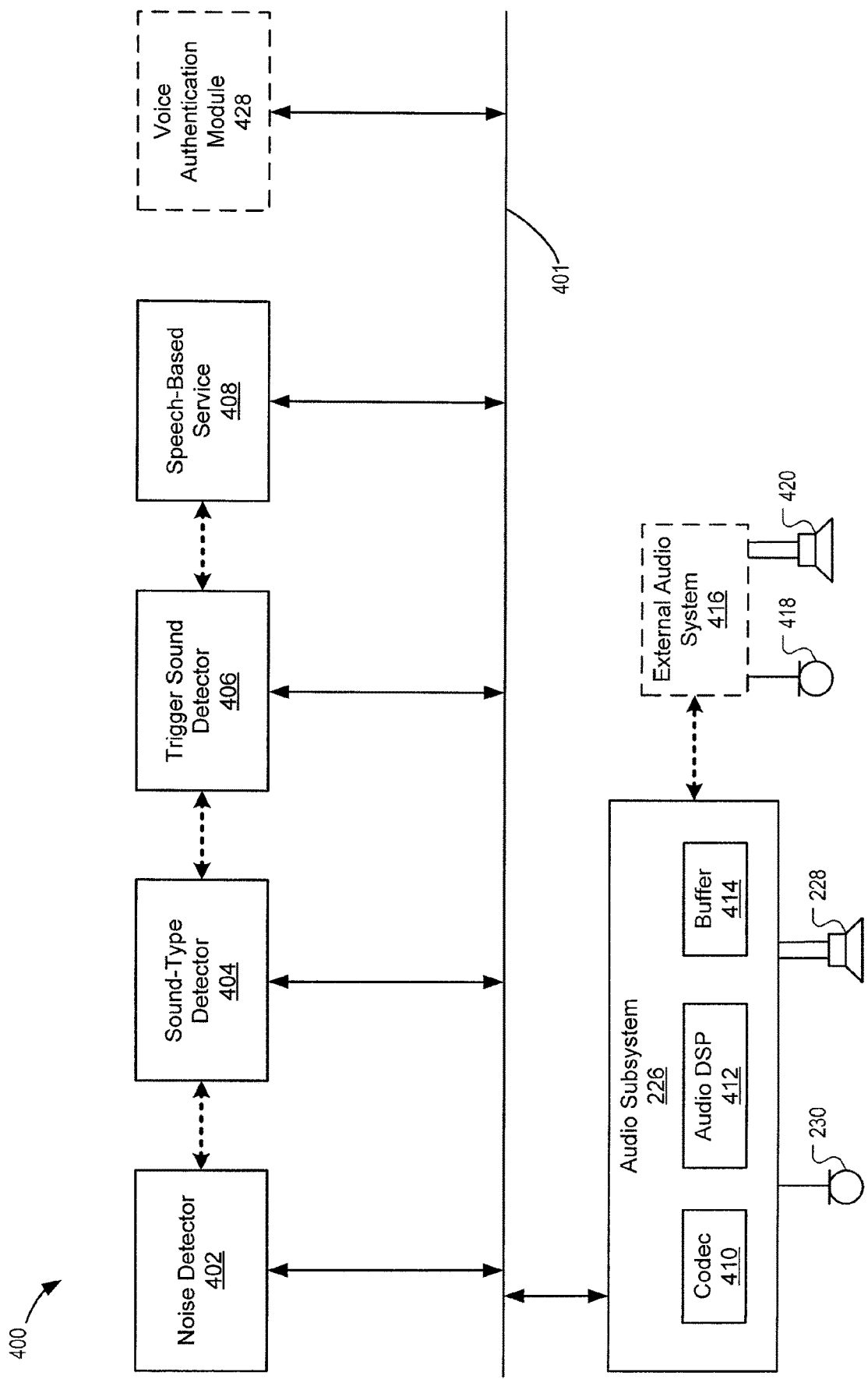
FIG. 4 is a block diagram illustrating components of a voice trigger system, in accordance with some implementations.

Attention is now directed to FIG. 4, which is a block diagram illustrating components of a voice trigger system 400, in accordance with some implementations. (The voice trigger system 400 is not limited to voice, and implementations described herein apply equally to non-voice sounds.) The voice trigger system 400 is composed of various components, modules, and/or software programs within the electronic device 104.

In some implementations, the voice trigger system 400 includes a noise detector 402, a sound-type detector 404, a trigger sound detector 406, and a speech-based service 408, and an audio subsystem 226, each coupled to an audio bus 401. In some implementations, more or fewer of these modules are used. The sound detectors 402, 404, and 406 may be referred to as modules, and may include hardware (e.g., circuitry, memory, processors, etc.), software (e.g., programs, software-on-a-chip, firmware, etc.), and/or any combinations thereof for performing the functionality described herein. In some implementations, the sound detectors are communicatively, programmatically, physically, and/or operationally coupled to one another (e.g., via a communications bus), as illustrated in FIG. 4 by the broken lines. (For ease of illustration, FIG. 4 shows each sound detector coupled only to adjacent sound detectors. It will be understood that the each sound detector can be coupled to any of the other sound detectors as well.)

In some implementations, the audio subsystem 226 includes a codec 410, an audio digital signal processor (DSP) 412, and a memory buffer 414. In some implementations, the audio subsystem 226 is coupled to one or more microphones 230 (FIG. 2) and one or more speakers 228 (FIG. 2). The audio subsystem 226 provides sound inputs to the sound detectors 402, 404, 406 and the speech-based service 408 (as well as other components or modules, such as a phone and/or baseband subsystem of a phone) for processing and/or analysis. In some implementations, the audio subsystem 226 is coupled to an external audio system 416 that includes at least one microphone 418 and at least one speaker 420.

In some implementations, the speech-based service 408 is a voice-based digital assistant, and corresponds to one or more components or functionalities of the digital assistant system described above with reference to FIGS. 1-3C. In some implementations, the speech-based service is a speech-to-text service, a dictation service, or the like.

In some implementations, the noise detector 402 monitors an audio channel to determine whether a sound input from the audio subsystem 226 satisfies a predetermined condition, such as an amplitude threshold. The audio channel corresponds to a stream of audio information received by one or more sound pickup devices, such as the one or more microphones 230 (FIG. 2). The audio channel refers to the audio information regardless of its state of processing or the particular hardware that is processing and/or transmitting the audio information. For example, the audio channel may refer to analog electrical impulses (and/or the circuits on which they are propagated) from the microphone 230, as well as a digitally encoded audio stream resulting from processing of the analog electrical impulses (e.g., by the audio subsystem 226 and/or any other audio processing system of the electronic device 104).

In some implementations, the predetermined condition is whether the sound input is above a certain volume for a predetermined amount of time. In some implementations, the noise detector uses time-domain analysis of the sound input, which requires relatively little computational and battery resources as compared to other types of analysis (e.g., as performed by the sound-type detector 404, the trigger word detector 406, and/or the speech-based service 408). In some implementations, other types of signal processing and/or audio analysis are used, including, for example, frequency-domain analysis. If the noise detector 402 determines that the sound input satisfies the predetermined condition, it initiates an upstream sound detector, such as the sound-type detector 404 (e.g., by providing a control signal to initiate one or more processing routines, and/or by providing power to the upstream sound detector). In some implementations, the upstream sound detector is initiated in response to other conditions being satisfied. For example, in some implementations, the upstream sound detector is initiated in response to determining that the device is not being stored in an enclosed space (e.g., based on a light detector detecting a threshold level of light).

The sound-type detector 404 monitors the audio channel to determine whether a sound input corresponds to a certain type of sound, such as sound that is characteristic of a human voice, whistle, clap, etc. The type of sound that the sound-type detector 404 is configured to recognize will correspond to the particular trigger sound(s) that the voice trigger is configured to recognize. In implementations where the trigger sound is a spoken word or phrase, the sound-type detector 404 includes a "voice activity detector" (VAD). In some implementations, the sound-type detector 404 uses frequency-domain analysis of the sound input. For example, the sound-type detector 404 generates a spectrogram of a received sound input (e.g., using a Fourier transform), and analyzes the spectral components of the sound input to determine whether the sound input is likely to correspond to a particular type or category of sounds (e.g., human speech). Thus, in implementations where the trigger sound is a spoken word or phrase, if the audio channel is picking up ambient sound (e.g., traffic noise) but not human speech, the VAD will not initiate the trigger sound detector 406.

In some implementations, the sound-type detector 404 remains active for as long as predetermined conditions of any downstream sound detector (e.g., the noise detector 402) are satisfied. For example, in some implementations, the sound-type detector 404 remains active as long as the sound input includes sound above a predetermined amplitude threshold (as determined by the noise detector 402), and is deactivated when the sound drops below the predetermined threshold. In some implementations, once initiated, the sound-type detector 404 remains active until a condition is met, such as the expiration of a timer (e.g., for 1, 2, 5, or 10 seconds, or any other appropriate duration), the expiration of a certain number of on/off cycles of the sound-type detector 404, or the occurrence of an event (e.g., the amplitude of the sound falls below a second threshold, as determined by the noise detector 402 and/or the sound-type detector 404).

As mentioned above, if the sound-type detector 404 determines that the sound input corresponds to a predetermined type of sound, it initiates an upstream sound detector (e.g., by providing a control signal to initiate one or more processing routines, and/or by providing power to the upstream sound detector), such as the trigger sound detector 406.

The trigger sound detector 406 is configured to determine whether a sound input includes at least part of certain predetermined content (e.g., at least part of the trigger word, phrase, or sound). In some implementations, the trigger sound detector 406 compares a representation of the sound input (an "input representation") to one or more reference representations of the trigger word. If the input representation matches at least one of the one or more reference representations with an acceptable confidence, the trigger sound detector 406 initiates the speech-based service 408 (e.g., by providing a control signal to initiate one or more processing routines, and/or by providing power to the upstream sound detector). In some implementations, the input representation and the one or more reference representations are spectrograms (or mathematical representations thereof), which represent how the spectral density of a signal varies with time. In some implementations, the representations are other types of audio signatures or voiceprints. In some implementations, initiating the speech-based service 408 includes bringing one or more circuits, programs, and/or processors out of a standby mode, and invoking the sound-based service. The sound-based service is then ready to provide more comprehensive speech recognition, speech-to-text processing, and/or natural language processing.

In some implementations, the voice-trigger system 400 includes voice authentication functionality, so that it can determine if a sound input corresponds to a voice of a particular person, such as an owner/user of the device. For example, in some implementations, the sound-type detector 404 uses a voiceprinting technique to determine that the sound input was uttered by an authorized user. Voice authentication and voiceprinting are described in more detail in U.S. patent application Ser. No. 13/053,144, assigned to the assignee of the instant application, which is hereby incorporated by reference in its entirety. In some implementations, voice authentication is included in any of the sound detectors described herein (e.g., the noise detector 402, the sound-type detector 404, the trigger sound detector 406, and/or the speech-based service 408). In some implementations, voice authentication is implemented as a separate module from the sound detectors listed above (e.g., as voice authentication module 428, FIG. 4), and may be operationally positioned after the noise detector 402, after the sound-type detector 404, after the trigger sound detector 406, or at any other appropriate position.

In some implementations, the trigger sound detector 406 remains active for as long as conditions of any downstream sound detector(s) (e.g., the noise detector 402 and/or the sound-type detector 404) are satisfied. For example, in some implementations, the trigger sound detector 406 remains active as long as the sound input includes sound above a predetermined threshold (as detected by the noise detector 402). In some implementations, it remains active as long as the sound input includes sound of a certain type (as detected by the sound-type detector 404). In some implementations, it remains active as long as both the foregoing conditions are met.

In some implementations, once initiated, the trigger sound detector 406 remains active until a condition is met, such as the expiration of a timer (e.g., for 1, 2, 5, or 10 seconds, or any other appropriate duration), the expiration of a certain number of on/off cycles of the trigger sound detector 406, or the occurrence of an event (e.g., the amplitude of the sound falls below a second threshold).

In some implementations, when one sound detector initiates another detector, both sound detectors remain active. However, the sound detectors may be active or inactive at various times, and it is not necessary that all of the downstream (e.g., the lower power and/or sophistication) sound detectors be active (or that their respective conditions are met) in order for upstream sound detectors to be active. For example, in some implementations, after the noise detector 402 and the sound-type detector 404 determine that their respective conditions are met, and the trigger sound detector 406 is initiated, one or both of the noise detector 402 and the sound-type detector 404 are deactivated and/or enter a standby mode while the trigger sound detector 406 operates. In other implementations, both the noise detector 402 and the sound-type detector 404 (or one or the other) stay active while the trigger sound detector 406 operates. In various implementations, different combinations of the sound detectors are active at different times, and whether one is active or inactive may depend on the state of other sound detectors, or may be independent of the state of other sound detectors.

While FIG. 4 describes three separate sound detectors, each configured to detect different aspects of a sound input, more or fewer sound detectors are used in various implementations of the voice trigger. For example, in some implementations, only the trigger sound detector 406 is used. In some implementations, the trigger sound detector 406 is used in conjunction with either the noise detector 402 or the sound-type detector 404. In some implementations, all of the detectors 402-406 are used. In some implementations, additional sound detectors are included as well.

Moreover, different combinations of sound detectors may be used at different times. For example, the particular combination of sound detectors and how they interact may depend on one or more conditions, such as the context or operating state of a device. As a specific example, if a device is plugged in (and thus not relying exclusively on battery power), the trigger sound detector 406 is active, while the noise detector 402 and the sound-type detector 404 remain inactive. In another example, if the device is in a pocket or backpack, all sound detectors are inactive.

By cascading sound detectors as described above, where the detectors that require more power are invoked only when necessary by detectors that require lower power, power efficient voice triggering functionality can be provided. As described above, additional power efficiency is achieved by operating one or more of the sound detectors according to a duty cycle. For example, in some implementations, the noise detector 402 operates according to a duty cycle so that it performs effectively continuous noise detection, even though the noise detector is off for at least part of the time. In some implementations, the noise detector 402 is on for 10 milliseconds and off for 90 milliseconds. In some implementations, the noise detector 402 is on for 20 milliseconds and off for 500 milliseconds. Other on and off durations are also possible.

In some implementations, if the noise detector 402 detects a noise during its "on" interval, the noise detector 402 will remain on in order to further process and/or analyze the sound input. For example, the noise detector 402 may be configured to initiate an upstream sound detector if it detects sound above a predetermined amplitude for a predetermined amount of time (e.g., 100 milliseconds). Thus, if the noise detector 402 detects sound above a predetermined amplitude during its 10 millisecond "on" interval, it will not immediately enter the "off" interval. Instead, the noise detector 402 remains active and continues to process the sound input to determine whether it exceeds the threshold for the full predetermined duration (e.g., 100 milliseconds).

In some implementations, the sound-type detector 404 operates according to a duty cycle. In some implementations, the sound-type detector 404 is on for 20 milliseconds and off for 100 milliseconds. Other on and off durations are also possible. In some implementations, the sound-type detector 404 is able to determine whether a sound input corresponds to a predetermined type of sound within the "on" interval of its duty cycle. Thus, the sound-type detector 404 will initiate the trigger sound detector 406 (or any other upstream sound detector) if the sound-type detector 404 determines, during its "on" interval, that the sound is of a certain type. Alternatively, in some implementations, if the sound-type detector 404 detects, during the "on" interval, sound that may correspond to the predetermined type, the detector will not immediately enter the "off" interval. Instead, the sound-type detector 404 remains active and continues to process the sound input and determine whether it corresponds to the predetermined type of sound. In some implementations, if the sound detector determines that the predetermined type of sound has been detected, it initiates the trigger sound detector 406 to further process the sound input and determine if the trigger sound has been detected.

Similar to the noise detector 402 and the sound-type detector 404, in some implementations, the trigger sound detector 406 operates according to a duty cycle. In some implementations, the trigger sound detector 406 is on for 50 milliseconds and off for 50 milliseconds. Other on and off durations are also possible. If the trigger sound detector 406 detects, during its "on" interval, that there is sound that may correspond to a trigger sound, the detector will not immediately enter the "off" interval. Instead, the trigger sound detector 406 remains active and continues to process the sound input and determine whether it includes the trigger sound. In some implementations, if such a sound is detected, the trigger sound detector 406 remains active to process the audio for a predetermined duration, such as 1, 2, 5, or 10 seconds, or any other appropriate duration. In some implementations, the duration is selected based on the length of the particular trigger word or sound that it is configured to detect. For example, if the trigger phrase is "Hey, SIRI," the trigger word detector is operated for about 2 seconds to determine whether the sound input includes that phrase.

In some implementations, some of the sound detectors are operated according to a duty cycle, while others operate continuously when active. For example, in some implementations, only the first sound detector is operated according to a duty cycle (e.g., the noise detector 402 in FIG. 4), and upstream sound detectors are operated continuously once they are initiated. In some other implementations, the noise detector 402 and the sound-type detector 404 are operated according to a duty cycle, while the trigger sound detector 406 is operated continuously. Whether a particular sound detector is operated continuously or according to a duty cycle depends on one or more conditions, such as the context or operating state of a device. In some implementations, if a device is plugged in and not relying exclusively on battery power, all of the sound detectors operate continuously once they are initiated. In other implementations, the noise detector 402 (or any of the sound detectors) operates according to a duty cycle if the device is in a pocket or backpack (e.g., as determined by sensor and/or microphone signals), but operates continuously when it is determined that the device is likely not being stored. In some implementations, whether a particular sound detector is operated continuously or according to a duty cycle depends on the battery charge level of the device. For example, the noise detector 402 operates continuously when the battery charge is above 50%, and operates according to a duty cycle when the battery charge is below 50%.

In some implementations, the voice trigger includes noise, echo, and/or sound cancellation functionality (referred to collectively as noise cancellation). In some implementations, noise cancellation is performed by the audio subsystem 226 (e.g., by the audio DSP 412). Noise cancellation reduces or removes unwanted noise or sounds from the sound input prior to it being processed by the sound detectors. In some cases, the unwanted noise is background noise from the user's environment, such as a fan or the clicking from a keyboard. In some implementations, the unwanted noise is any sound above, below, or at predetermined amplitudes or frequencies. For example, in some implementations, sound above the typical human vocal range (e.g., 3,000 Hz) is filtered out or removed from the signal. In some implementations, multiple microphones (e.g., the microphones 230) are used to help determine what components of received sound should be reduced and/or removed. For example, in some implementations, the audio subsystem 226 uses beam forming techniques to identify sounds or portions of sound inputs that appear to originate from a single point in space (e.g., a user's mouth). The audio subsystem 226 then focuses on this sound by removing from the sound input sounds that are received equally by all microphones (e.g., ambient sound that does not appear to originate from any particular direction).

In some implementations, the DSP 412 is configured to cancel or remove from the sound input sounds that are being output by the device on which the digital assistant is operating. For example, if the audio subsystem 226 is outputting music, radio, a podcast, a voice output, or any other audio content (e.g., via the speaker 228), the DSP 412 removes any of the outputted sound that was picked up by a microphone and included in the sound input. Thus, the sound input is free of the outputted audio (or at least contains less of the outputted audio). Accordingly, the sound input that is provided to the sound detectors will be cleaner, and the triggers more accurate. Aspects of noise cancellation are described in more detail in U.S. Pat. No. 7,272,224, assigned to the assignee of the instant application, which is hereby incorporated by reference in its entirety.

In some implementations, different sound detectors require that the sound input be filtered and/or preprocessed in different ways. For example, in some implementations, the noise detector 402 is configured to analyze time-domain audio signal between 60 and 20,000 Hz, and the sound-type detector is configured to perform frequency-domain analysis of audio between 60 and 3,000 Hz. Thus, in some implementations, the audio DSP 412 (and/or other audio DSPs of the device 104) preprocesses received audio according to the respective needs of the sound detectors. In some implementations, on the other hand, the sound detectors are configured to filter and/or preprocess the audio from the audio subsystem 226 according to their specific needs. In such cases, the audio DSP 412 may still perform noise cancellation prior to providing the sound input to the sound detectors.

In some implementations, the context of the electronic device is used to help determine whether and how to operate the voice trigger. For example, it may be unlikely that users will invoke a speech-based service, such as a voice-based digital assistant, when the device is stored in their pocket, purse, or backpack. Also, it may be unlikely that users will invoke a speech-based service when they are at a loud rock concert. For some users, it is unlikely that they will invoke a speech-based service at certain times of the day (e.g., late at night). On the other hand, there are also contexts in which it is more likely that a user will invoke a speech-based service using a voice trigger. For example, some users will be more likely to use a voice trigger when they are driving, when they are alone, when they are at work, or the like. Various techniques are used to determine the context of a device. In various implementations, the device uses information from any one or more of the following components or information sources to determine the context of a device: GPS receivers, light sensors, microphones, proximity sensors, orientation sensors, inertial sensors, cameras, communications circuitry and/or antennas, charging and/or power circuitry, switch positions, temperature sensors, compasses, accelerometers, calendars, user preferences, etc.

The context of the device can then be used to adjust how and whether the voice trigger operates. For example, in certain contexts, the voice trigger will be deactivated (or operated in a different mode) as long as that context is maintained. For example, in some implementations, the voice trigger is deactivated when the phone is in a predetermined orientation (e.g., lying face-down on a surface), during predetermined time periods (e.g., between 10:00 PM and 8:00 AM), when the phone is in a "silent" or a "do not disturb" mode (e.g., based on a switch position, mode setting, or user preference), when the device is in a substantially enclosed space (e.g., a pocket, bag, purse, drawer, or glove box), when the device is near other devices that have a voice trigger and/or speech-based services (e.g., based on proximity sensors, acoustic/wireless/infrared communications), and the like. In some implementations, instead of being deactivated, the voice trigger system 400 is operated in a low-power mode (e.g., by operating the noise detector 402 according to a duty cycle with a 10 millisecond "on" interval and a 5 second "off" interval). In some implementations, an audio channel is monitored more infrequently when the voice trigger system 400 is operated in a low-power mode. In some implementations, a voice trigger uses a different sound detector or combination of sound detectors when it is in a low-power mode than when it is in a normal mode. (The voice trigger may be capable of numerous different modes or operating states, each of which may use a different amount of power, and different implementations will use them according to their specific designs.)

On the other hand, when the device is in some other contexts, the voice trigger will be activated (or operated in a different mode) so long as that context is maintained. For example, in some implementations, the voice trigger remains active while it is plugged into a power source, when the phone is in a predetermined orientation (e.g., lying face-up on a surface), during predetermined time periods (e.g., between 8:00 AM and 10:00 PM), when the device is travelling and/or in a car (e.g., based on GPS signals, BLUETOOTH connection or docking with a vehicle, etc.), and the like. Aspects of detect lining when a device is in a vehicle are described in more detail in U.S. Provisional Patent Application No. 61/657,744, assigned to the assignee of the instant application, which is hereby incorporated by reference in its entirety. Several specific examples of how to determine certain contexts are provided below. In various embodiments, different techniques and/or information sources are used to detect these and other contexts.

As noted above, whether or not the voice trigger system 400 is active (e.g., listening) can depend on the physical orientation of a device. In some implementations, the voice trigger is active when the device is placed "face-up" on a surface (e.g., with the display and/or touchscreen surface visible), and/or is inactive when it is "face-down." This provides a user with an easy way to activate and/or deactivate the voice trigger without requiring manipulation of settings menus, switches, or buttons. In some implementations, the device detects whether it is face-up or face-down on a surface using light sensors (e.g., based on the difference in incident light on a front and a back face of the device 104), proximity sensors, magnetic sensors, accelerometers, gyroscopes, tilt sensors, cameras, and the like.

In some implementations, other operating modes, settings, parameters, or preferences are affected by the orientation and/or position of the device. In some implementations, the particular trigger sound, word, or phrase of the voice trigger is listening for depends on the orientation and/or position of the device. For example, in some implementations, the voice trigger listens for a first trigger word, phrase, or sound when the device is in one orientation (e.g., laying face-up on a surface), and a different trigger word, phrase, or sound when the device is in another orientation (e.g., laying face-down). In some implementations, the trigger phrase for a face-down orientation is longer and/or more complex than for a face-up orientation. Thus, a user can place a device face-down when they are around other people or in a noisy environment so that the voice trigger can still be operational while also reducing false accepts, which may be more frequent for shorter or simpler trigger words. As a specific example, a face-up trigger phrase may be "Hey, SIRI," while a face-down trigger phrase may be "Hey, SIRI, this is Andrew, please wake up." The longer trigger phrase also provides a larger voice sample for the sound detectors and/or voice authenticators to process and/or analyze, thus increasing the accuracy of the voice trigger and decreasing false accepts.

In some implementations, the device 104 detects whether it is in a vehicle (e.g., a car). A voice trigger is particularly beneficial for invoking a speech-based service when the user is in a vehicle, as it helps reduce the physical interactions that are necessary to operate the device and/or the speech based service. Indeed, one of the benefits of a voice-based digital assistant is that it can be used to perform tasks where looking at and touching a device would be impractical or unsafe. Thus, the voice trigger may be used when the device is in a vehicle so that the user does not have to touch the device in order to invoke the digital assistant. In some implementations, the device determines that it is in a vehicle by detecting that it has been connected to and/or paired with a vehicle, such as through BLUETOOTH communications (or other wireless communications) or through a docking connector or cable. In some implementations, the device determines that it is in a vehicle by determining the device's location and/or speed (e.g., using GPS receivers, accelerometers, and/or gyroscopes). If it is determined that the device is likely in a vehicle, because it is travelling above 20 miles per hour and is determined to be travelling along a road, for example, then the voice trigger remains active and/or in a high-power or more sensitive state.

In some implementations, the device detects whether the device is stored (e.g., in a pocket, purse, bag, a drawer, or the like) by determining whether it is in a substantially enclosed space. In some implementations, the device uses light sensors (e.g., dedicated ambient light sensors and/or cameras) to determine that it is stored. For example, in some implementations, the device is likely being stored if light sensors detect little or no light. In some implementations, the time of day and/or location of the device are also considered. For example, if the light sensors detect low light levels when high light levels would be expected (e.g., during the day), the device may be in storage and the voice trigger system 400 not needed. Thus, the voice trigger system 400 will be placed in a low-power or standby state.

In some implementations, the difference in light detected by sensors located on opposite faces of a device can be used to determine its position, and hence whether or not it is stored. Specifically, users are likely to attempt to activate a voice trigger when the device is resting on a table or surface rather than when it is being stored in a pocket or bag. But when a device is lying face-down (or face-up) on a surface such as a table or desk, one surface of the device will be occluded so that little or no light reaches that surface, while the other surface will be exposed to ambient light. Thus, if light sensors on the front and back face of a device detect significantly different light levels, the device determines that it is not being stored. On the other hand, if light sensors on opposite faces detect the same or similar light levels, the device determines that it is being stored in a substantially enclosed space. Also, if the light sensors both detect a low light level during the daytime (or when the device would expect the phone to be in a bright environment, the device determines with a greater confidence that it is being stored.

In some implementations, other techniques are used (instead of or in addition to light sensors) to determine whether the device is stored. For example, in some implementations, the device emits one or more sounds (e.g., tones, clicks, pings, etc.) from a speaker or transducer (e.g., speaker 228), and monitors one or more microphones or transducers (e.g., microphone 230) to detect echoes of the omitted sound(s). (In some implementations, the device emits inaudible signals, such as sound outside of the human hearing range.) From the echoes, the device determines characteristics of the surrounding environment. For example, a relatively large environment (e.g., a room or a vehicle) will reflect the sound differently than a relatively small, enclosed environment (e.g., a pocket, purse, bag, a drawer, or the like).

In some implementations, the voice trigger system 400 is operates differently if it is near other devices (such as other devices that have voice triggers and/or speech-based services) than if it is not near other devices. This may be useful, for example, to shut down or decrease the sensitivity of the voice trigger system 400 when many devices are close together so that if one person utters a trigger word, other surrounding devices are not triggered as well. In some implementations, a device determines proximity to other devices using RFID, near-field communications, infrared/acoustic signals, or the like.

As noted above, voice triggers are particularly useful when a device is being operated in a hands-free mode, such as when the user is driving. In such cases, users often use external audio systems, such as wired or wireless headsets, watches with speakers and/or microphones, a vehicle's built-in microphones and speakers, etc., to free themselves from having to hold a device near their face to make a call or dictate text inputs. For example, wireless headsets and vehicle audio systems may connect to an electronic device using BLUETOOTH communications, or any other appropriate wireless communication. However, it may be inefficient for a voice trigger to monitor audio received via a wireless audio accessory because of the power required to maintain an open audio channel with the wireless accessory. In particular, a wireless headset may hold enough charge in its battery to provide a few hours of continuous talk-time, and it is therefore preferable to reserve the battery for when the headset is needed for actual communication, instead of using it to simply monitor ambient audio and wait for a possible trigger sound. Moreover, wired external headset accessories may require significantly more power than on-board microphones alone, and keeping the headset microphone active will deplete the device's battery charge. This is especially true considering that the ambient audio received by the wireless or wired headset will typically consist mostly of silence or irrelevant sounds. Thus, in some implementations, the voice trigger system 400 monitors audio from the microphone 230 on the device even when the device is coupled to an external microphone (wired or wireless). Then, when the voice trigger detects the trigger word, the device initializes an active audio link with the external microphone in order to receive subsequent sound inputs (such as a command to a voice-based digital assistant) via the external microphone rather than the on-device microphone 230.

When certain conditions are met, though, an active communication link can be maintained between an external audio system 416 (which may be communicatively coupled to the device 104 via wires or wirelessly) and the device so that the voice trigger system 400 can listen for a trigger sound via the external audio system 416 instead of (or in addition to) the on-device microphone 230. For example, in some implementations, characteristics of the motion of the electronic device and/or the external audio system 416 (e.g., as determined by accelerometers, gyroscopes, etc. on the respective devices) are used to determine whether the voice trigger system 400 should monitor ambient sound using the on-device microphone 230 or an external microphone 418. Specifically, the difference between the motion of the device and the external audio system 416 provides information about whether the external audio system 416 is actually in use. For example, if both the device and a wireless headset are moving (or not moving) substantially identically, it may be determined that the headset is not in use or is not being worn. This may occur, for example, because both devices are near to each other and idle (e.g., sitting on a table or stored in a pocket, bag, purse, drawer, etc.). Accordingly, under these conditions, the voice trigger system 400 monitors the on-device microphone, because it is unlikely that the headset is actually being used. If there is a difference in motion between the wireless headset and the device, however, it is determined that the headset is being worn by a user. These conditions may occur, for example, because the device has been set down (e.g., on a surface or in a bag), while the headset is being worn on the user's head (which will likely move at least a small amount, even when the wearer is relatively still). Under these conditions, because it is likely that the headset is being worn, the voice trigger system 400 maintains an active communication link and monitors the microphone 418 of the headset instead of (or in addition to) the on-device microphone 230. And because this technique focuses on the difference in the motion of the device and the headset, motion that is common to both devices can be canceled out. This may be useful, for example, when a user is using a headset in a moving vehicle, where the device (e.g., a cellular phone) is resting in a cup holder, empty seat, or in the user's pocket, and the headset is worn on the user's head. Once the motion that is common to both devices is cancelled out (e.g., the vehicle's motion), the relative motion of the headset as compared to the device (if any) can be determined in order to determine whether the headset is likely in use (or, whether the headset is not being worn). While the above discussion refers to wireless headsets, similar techniques are applied to wired headsets as well.

Because people's voices vary greatly, it may be necessary or beneficial to tune a voice trigger to improve its accuracy in recognizing the voice of a particular user. Also, people's voices may change over time, for example, because of illnesses, natural voice changes relating to aging or hormonal changes, and the like. Thus, in some implementations, the voice trigger system 400 is able to adapt its voice and/or sound recognition profiles for a particular user or group of users.

As described above, sound detectors (e.g., the sound-type detector 404 and/or the trigger sound detector 406) may be configured to compare a representation of a sound input (e.g., the sound or utterance provided by a user) to one or more reference representations. For example, if an input representation matches the reference representation to a predetermined confidence level, the sound detector will determine that the sound input corresponds to a predetermined type of sound (e.g., the sound-type detector 404), or that the sound input includes predetermined content (e.g., the trigger sound detector 406). In order to tune the voice trigger system 400, in some implementations, the device adjusts the reference representation to which the input representation is compared. In some implementations, the reference representation is adjusted (or created) as part of a voice enrollment or "training" procedure, where a user outputs the trigger sound several times so that the device can adjust (or create) the reference representation. The device can then create a reference representation using that person's actual voice.

In some implementations, the device uses trigger sounds that are received under normal use conditions to adjust the reference representation. For example, after a successful voice triggering event (e.g., where the sound input was found to satisfy all of the triggering criteria) the device will use information from the sound input to adjust and/or tune the reference representation. In some implementations, only sound inputs that were determined to satisfy all or some of the triggering criteria with a certain confidence level are used to adjust the reference representation. Thus, when the voice trigger is less confident that a sound input corresponds to or includes a trigger sound, that voice input may be ignored for the purposes of adjusting the reference representation. On the other hand, in some implementations, sound inputs that satisfied the voice trigger system 400 to a lower confidence are used to adjust the reference representation.

In some implementations, the device 104 iteratively adjusts the reference representation (using these or other techniques) as more and more sound inputs are received so that slight changes in a user's voice over time can be accommodated. For example, in some implementations, the device 104 (and/or associated devices or services) adjusts the reference representation after each successful triggering event. In some implementations, the device 104 analyzes the sound input associated with each successful triggering event and determines if the reference representations should be adjusted based on that input (e.g., if certain conditions are met), and only adjusts the reference representation if it is appropriate to do so. In some implementations, the device 104 maintains a moving average of the reference representation over time.

In some implementations, the voice trigger system 400 detects sounds that do not satisfy one or more of the triggering criteria (e.g., as determined by one or more of the sound detectors), but that may actually be attempts by an authorized user to do so. For example, voice trigger system 400 may be configured to respond to a trigger phrase such as "Hey, SIRI", but if a user's voice has changed (e.g., due to sickness, age, accent/inflection changes, etc.), the voice trigger system 400 may not recognize the user's attempt to activate the device. (This may also occur when the voice trigger system 400 has not been properly tuned for that user's particular voice, such as when the voice trigger system 400 is set to default conditions and/or the user has not performed an initialization or training procedure to customize the voice trigger system 400 for his or her voice.) If the voice trigger system 400 does not respond to the user's first attempt to active the voice trigger, the user is likely to repeat the trigger phrase. The device detects that these repeated sound inputs are similar to one another, and/or that they are similar to the trigger phrase (though not similar enough to cause the voice trigger system 400 to activate the speech-based service). If such conditions are met, the device determines that the sound inputs correspond to valid attempts to activate the voice trigger system 400. Accordingly, in some implementations, the voice trigger system 400 uses those received sound inputs to adjust one or more aspects of the voice trigger system 400 so that similar utterances by the user will be accepted as valid triggers in the future. In some implementations, these sound inputs are used to adapt the voice trigger system 400 only if a certain conditions or combinations of conditions are met. For example, in some implementations, the sound inputs are used to adapt the voice trigger system 400 when a predetermined number of sound inputs are received in succession (e.g., 2, 3, 4, 5, or any other appropriate number), when the sound inputs are sufficiently similar to the reference representation, when the sound inputs are sufficiently similar to each other, when the sound inputs are close together (e.g., when they are received within a predetermined time period and/or at or near a predetermined interval), and/or any combination of these or other conditions.

In some cases, the voice trigger system 400 may detect one or more sound inputs that do not satisfy one or more of the triggering criteria, followed by a manual initiation of the speech-based service (e.g., by pressing a button or icon). In some implementations, the voice trigger system 400 determines that, because speech-based service was initiated shortly after the sound inputs were received, the sound inputs actually corresponded to failed voice triggering attempts. Accordingly, the voice trigger system 400 uses those received sound inputs to adjust one or more aspects of the voice trigger system 400 so that utterances by the user will be accepted as valid triggers in the future, as described above.

While the adaptation techniques described above refer to adjusting a reference representation, other aspects of the trigger sound detecting techniques may be adjusted in the same or similar manner in addition to or instead of adjusting the reference representation. For example, in some implementations, the device adjusts how sound inputs are filtered and/or what filters are applied to sound inputs, such as to focus on and/or eliminate certain frequencies or ranges of frequencies of a sound input. In some implementations, the device adjusts an algorithm that is used to compare the input representation with the reference representation. For example, in some implementations, one or more terms of a mathematical function used to determine the difference between an input representation and a reference representation are changed, added, or removed, or a different mathematical function is substituted.

Figure 5:
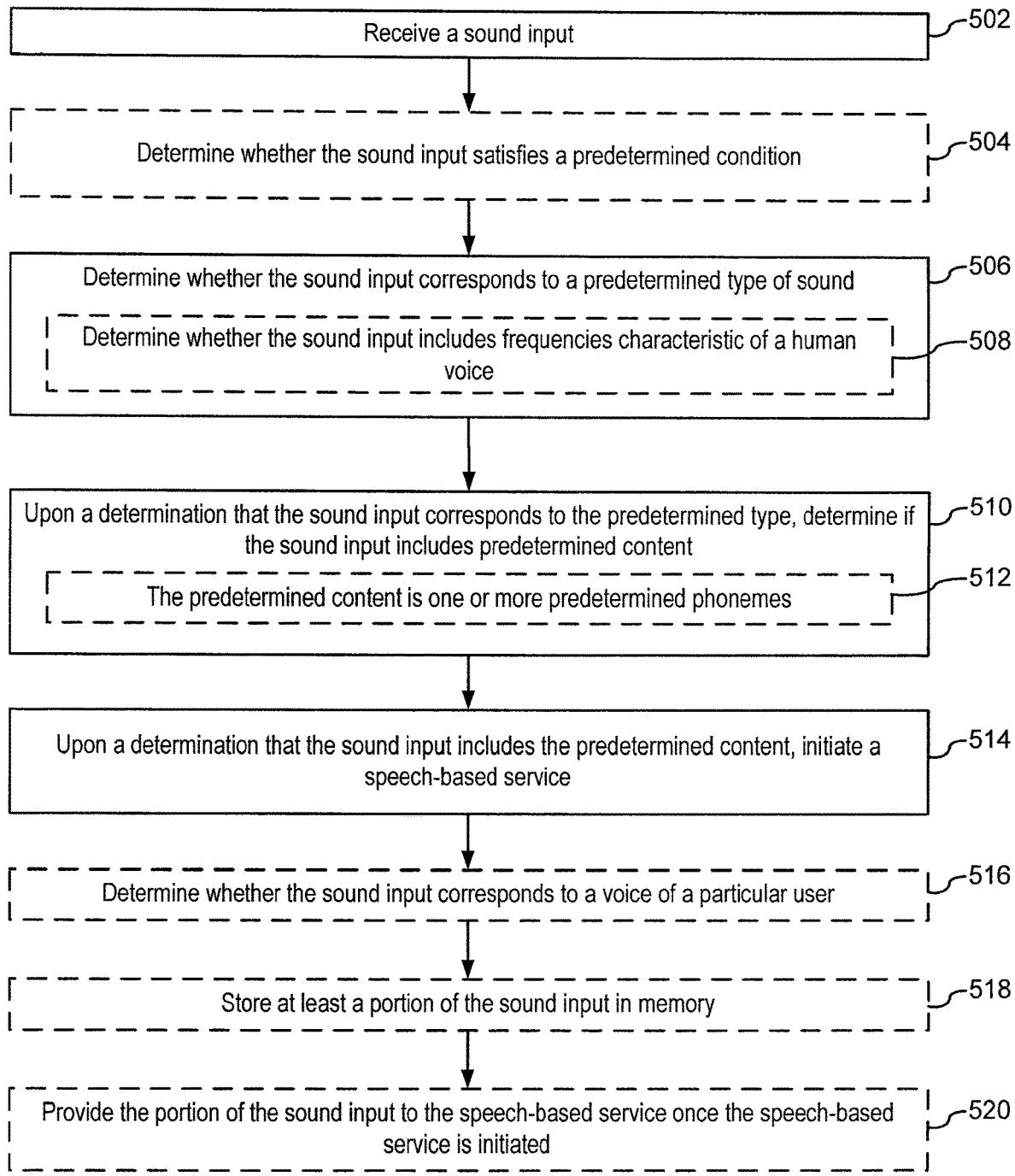
FIGS. 5-7 are flow charts illustrating methods for operating a voice trigger system, in accordance with some implementations.
Figure 6:
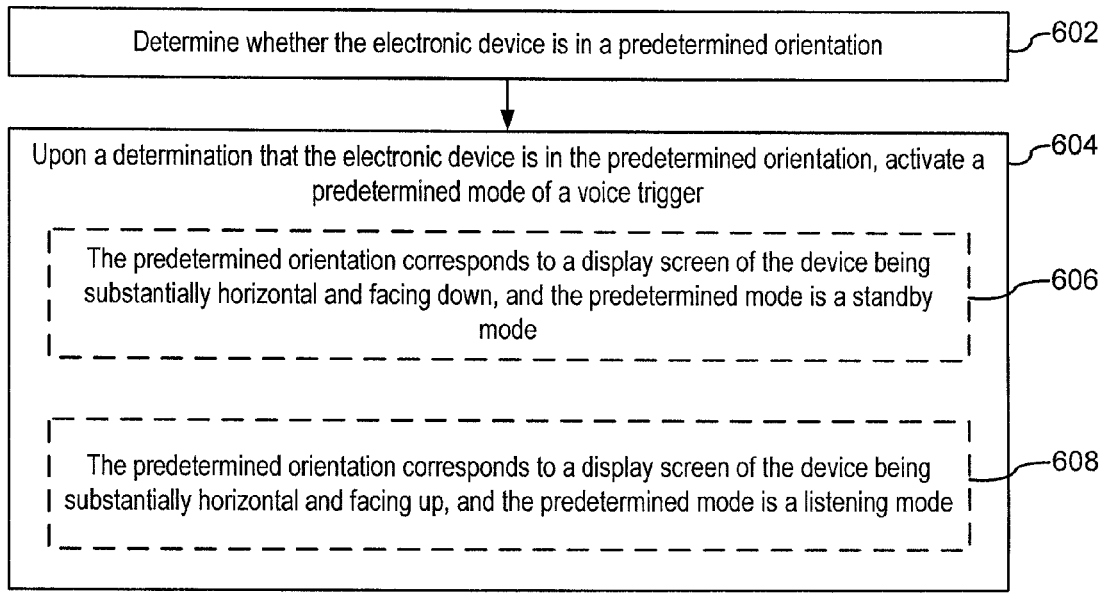
Figure 7:
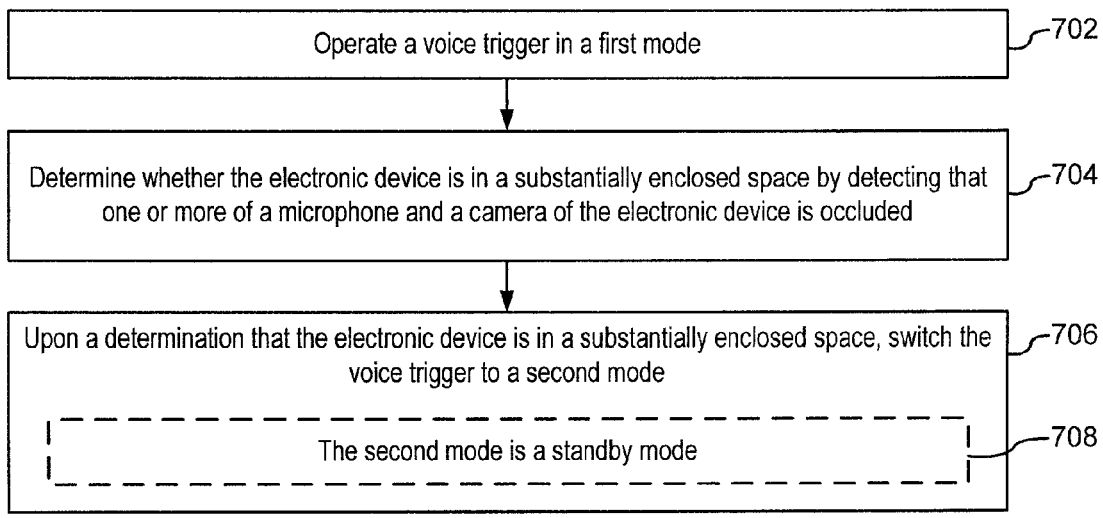

In some implementations, adaptation techniques such as those described above require more resources than the voice trigger system 400 is able to or is configured to provide. In particular, the sound detectors may not have, or have access to, the amount or the types of processors, data, or memory that are necessary to perform the iterative adaptation of a reference representation and/or a sound detection algorithm (or any other appropriate aspect of the voice trigger system 400). Thus, in some implementations, one or more of the above described adaptation techniques are performed by a more powerful processor, such as an application processor (e.g., the processor(s) 204), or by a different device (e.g., the server system 108). However, the voice trigger system 400 is designed to operate even when the application processor is in a standby mode. Thus, the sound inputs which are to be used to adapt the voice trigger system 400 are received when the application processor is not active and cannot process the sound input. Accordingly, in some implementations, the sound input is stored by the device so that it can be further processed and/or analyzed after it is received. In some implementations, the sound input is stored in the memory buffer 414 of the audio subsystem 226. In some implementations, the sound input is stored in system memory (e.g., memory 250, FIG. 2) using direct memory access (DMA) techniques (including, for example, using a DMA engine so that data can be copied or moved without requiring the application processor to be initiated). The stored sound input is then provided to or accessed by the application processor (or the server system 108, or another appropriate device) once it is initiated so that the application processor can execute one or more of the adaptation techniques described above. In some implementations, FIGS. 5-7 are flow diagrams representing methods for operating a voice trigger, according to certain implementations. The methods are, optionally, governed by instructions that are stored in a computer memory or non-transitory computer readable storage medium (e.g., memory 250 of client device 104, memory 302 associated with the digital assistant system 300) and that are executed by one or more processors of one or more computer systems of a digital assistant system, including, but not limited to, the server system 108, and/or the user device 104a. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. In various implementations, some operations in each method may be combined and/or the order of some operations may be changed from the order shown in the figures. Also, in some implementations, operations shown in separate figures and/or discussed in association with separate methods may be combined to form other methods, and operations shown in the same figure and/or discussed in association with the same method may be separated into different methods. Moreover, in some implementations, one or more operations in the methods are performed by modules of the digital assistant system 300 and/or an electronic device (e.g., the user device 104), including, for example, the natural language processing module 332, the dialogue flow processing module 334, the audio subsystem 226, the noise detector 402, the sound-type detector 404, the trigger sound detector 406, the speech-based service 408, and/or any sub modules thereof FIG. 5 illustrates a method 500 of operating a voice trigger system (e.g., the voice trigger system 400, FIG. 4), according to some implementations. In some implementations, the method 500 is performed at an electronic device including one or more processors and memory storing instructions for execution by the one or more processors (e.g., the electronic device 104). The electronic device receives a sound input (502). The sound input may correspond to a spoken utterance (e.g., a word, phrase, or sentence), a human generated sound (e.g., whistle, tongue click, finger snap, clap, etc.), or any other sound (e.g., an electronically generated chirp, a mechanical noise maker, etc.). In some implementations, the electronic device receives the sound input via the audio subsystem 226 (including, for example, the codec 410, audio DSP 412, and buffer 414, as well as the microphones 230 and 418, described in reference to FIG. 4).

In some implementations, the electronic device determines whether the sound input satisfies a predetermined condition (504). In some implementations, the electronic device applies time-domain analysis to the sound input to determine whether the sound input satisfies the predetermined condition. For example, the electronic device analyzes the sound input over a time period in order to determine whether the sound amplitude reaches a predetermined level. In some implementations, the threshold is satisfied if the amplitude (e.g., the volume) of the sound input meets and/or exceeds a predetermined threshold. In some implementations, it is satisfied if the sound input meets and/or exceeds a predetermined threshold for a predetermined amount of time. As discussed in more detail below, in some implementations, determining whether the sound input satisfies the predetermined condition (504) is performed by a third sound detector (e.g., the noise detector 402). (The third sound detector is used in this case to differentiate the sound detector from other sound detectors (e.g., the first and second sound detectors that are discussed below), and does not necessarily indicate any operational position or order of the sound detectors.)

The electronic device determines whether the sound input corresponds to a predetermined type of sound (506). As noted above, sounds are categorized as different "types" based on certain identifiable characteristics of the sounds. Determining whether the sound input corresponds to a predetermined type includes determining whether the sound input includes or exhibits the characteristics of a particular type. In some implementations, the predetermined type of sound is a human voice. In such implementations, determining whether the sound input corresponds to a human voice includes determining whether the sound input includes frequencies characteristic of a human voice (508). As discussed in more detail below, in some implementations, determining whether the sound input corresponds to a predetermined type of sound (506) is performed by a first sound detector (e.g., the sound-type detector 404).

Upon a determination that the sound input corresponds to the predetermined type of sound, the electronic device determines whether the sound input includes predetermined content (510). In some implementations, the predetermined content corresponds to one or more predetermined phonemes (512). In some implementations, the one or more predetermined phonemes constitute at least one word. In some implementations, the predetermined content is a sound (e.g., a whistle, click, or clap). In some implementations, as discussed below, determining whether the sound input includes predetermined content (510) is performed by a second sound detector (e.g., the trigger sound detector 406).

Upon a determination that the sound input includes the predetermined content, the electronic device initiates a speech-based service (514). In some implementations, the speech-based service is a voice-based digital assistant, as described in detail above. In some implementations, the speech-based service is a dictation service in which speech inputs are converted into text and included in and/or displayed in a text input field (e.g., of an email, text message, word processing or note-taking application, etc.). In implementations where the speech-based service is a voice-based digital assistant, once the voice-based digital assistant is initiated, a prompt is issued to the user (e.g., a sound or a speech prompt) indicating that the user may provide a voice input and/or command to the digital assistant. In some implementations, initiating the voice-based digital assistant includes activating an application processor (e.g., the processor(s) 204, FIG. 2), initiating one or more programs or modules (e.g., the digital assistant client module 264, FIG. 2), and/or establishing a connection to remote servers or devices (e.g., the digital assistant server 106, FIG. 1).

In some implementations, the electronic device determines whether the sound input corresponds to a voice of a particular user (516). For example, one or more voice authentication techniques are applied to the sound input to determine whether it corresponds to the voice of an authorized user of the device. Voice authentication techniques are described in greater detail above. In some implementations, voice authentication is performed by one of the sound detectors (e.g., the trigger sound detector 406). In some implementations, voice authentication is performed by a dedicated voice authentication module (including any appropriate hardware and/or software).

In some implementations, the sound-based service is initiated in response to a determination that the sound input includes the predetermined content and the sound input corresponds to the voice of the particular user. Thus, for example, the sound-based service (e.g., a voice-based digital assistant) will only be initiated when the trigger word or phrase is spoken by an authorized user. This reduces the possibility that the service can be invoked by an unauthorized user, and may be particularly useful when multiple electronic devices are in close proximity, as one user's utterance of a trigger sound will not activate another user's voice trigger.

In some implementations, where the speech-based service is a voice-based digital assistant, in response to determining that the sound input includes the predetermined content but does not correspond to the voice of the particular user, the voice-based digital assistant is initiated in a limited access mode. In some implementations, the limited access mode allows the digital assistant to access only a subset of the data, services, and/or functionality that the digital assistant can otherwise provide. In some implementations, the limited access mode corresponds to a write-only mode (e.g., so that an unauthorized user of the digital assistant cannot access data from calendars, task lists, contacts, photographs, emails, text messages, etc.). In some implementations, the limited access mode corresponds to a sandboxed instance of a speech-based service, so that the speech-based service will not read from or write to a user's data, such as user data 266 on the device 104 (FIG. 2), or on any other device (e.g., user data 348, FIG. 3A, which may be stored on a remote server, such as the server system 108, FIG. 1).

In some implementations, in response to a determination that the sound input includes the predetermined content and the sound input corresponds to the voice of the particular user, the voice-based digital assistant outputs a prompt including a name of the particular user. For example, when a particular user is identified via voice authentication, the voice-based digital assistant may output a prompt such as "What can I help you with, Peter?", instead of a more generic prompt such as a tone, beep, or non-personalized voice prompt.

As noted above, in some implementations, a first sound detector determines whether the sound input corresponds to a predetermined type of sound (at step 506), and a second sound detector determines whether the sound detector includes the predetermined content (at step 510). In some implementations, the first sound detector consumes less power while operating than the second sound detector, for example, because the first sound detector uses a less processor-intensive technique than the second sound detector. In some implementations, the first sound detector is the sound-type detector 404, and the second sound detector is the trigger sound detector 406, both of which are discussed above with respect to FIG. 4. In some implementations, when they are operating, the first and/or the second sound detector periodically monitor an audio channel according to a duty cycle, as described above with reference to FIG. 4.

In some implementations, the first and/or the sound detector performs frequency-domain analysis of the sound input. For example, these sound detectors perform a Laplace, Z-, or Fourier transform to generate a frequency spectrum or to determine the spectral density of the sound input or a portion thereof. In some implementations, the first sound detector is a voice-activity detector that is configured to determine whether the sound input includes frequencies that are characteristic of a human voice (or other features, aspects, or properties of the sound input that are characteristic of a human voice).

In some implementations, the second sound detector is off or inactive until the first sound detector detects a sound input of the predetermined type. Accordingly, in some implementations, the method 500 includes initiating the second sound detector in response to determining that the sound input corresponds to the predetermined type. (In other implementations, the second sound detector is initiated in response to other conditions, or is continuously operated regardless of a determination from the first sound detector.) In some implementations, initiating the second sound detector includes activating hardware and/or software (including, for example, circuits, processors, programs, memory, etc.).

In some implementations, the second sound detector is operated (e.g., is active and is monitoring an audio channel) for at least a predetermined amount of time after it is initiated. For example, when the first sound detector determines that the sound input corresponds to a predetermined type (e.g., includes a human voice), the second sound detector is operated in order to determine if the sound input also includes the predetermined content (e.g., the trigger word). In some implementations, the predetermined amount of time corresponds to a duration of the predetermined content. Thus, if the predetermined content is the phrase "Hey, SIRI," the predetermined amount of time will be long enough to determine if that phrase was uttered (e.g., 1 or 2 seconds, or any another appropriate duration). If the predetermined content is longer, such as the phrase "Hey, SIRI, please wake up and help me out," the predetermined time will be longer (e.g., 5 seconds, or another appropriate duration). In some implementations, the second sound detector operates as long as the first sound detector detects sound corresponding to the predetermined type. In such implementations, for example, as long as the first sound detector detects human speech in a sound input, the second sound detector will process the sound input to determine if it includes the predetermined content.

As noted above, in some implementations, a third sound detector (e.g., the noise detector 402) determines whether the sound input satisfies a predetermined condition (at step 504). In some implementations, the third sound detector consumes less power while operating than the first sound detector. In some implementations, the third sound detector periodically monitors an audio channel according to a duty cycle, as discussed above with respect to FIG. 4. Also, in some implementations, the third sound detector performs time-domain analysis of the sound input. In some implementations, the third sound detector consumes less power than the first sound detector because time-domain analysis is less processor intensive than the frequency-domain analysis applied by the second sound detector.

Similar to the discussion above with respect to initiating the second sound detector (e.g., a trigger sound detector 406) in response to a determination by the first sound detector (e.g., the sound-type detector 404), in some implementations, the first sound detector is initiated in response to a determination by the third sound detector (e.g., the noise detector 402). For example, in some implementations, the sound-type detector 404 is initiated in response to a determination by the noise detector 402 that the sound input satisfies a predetermined condition (e.g., is above a certain volume for a sufficient duration). In some implementations, initiating the first sound detector includes activating hardware and/or software (including, for example, circuits, processors, programs, memory, etc.). In other implementations, the first sound detector is initiated in response to other conditions, or is continuously operated.

In some implementations, the device stores at least a portion of the sound input in memory (518). In some implementations, the memory is the buffer 414 of the audio subsystem 226 (FIG. 4). The stored sound input allows non-real-time processing of the sound input by the device. For example, in some implementations, one or more of the sound detectors read and/or receive the stored sound input in order to process the stored sound input. This may be particularly useful where an upstream sound detector (e.g., the trigger sound detector 406) is not initiated until part-way through receipt of a sound input by the audio subsystem 226. In some implementations, the stored portion of the sound input is provided to the speech-based service once the speech-based service is initiated (520). Thus, the speech-based service can transcribe, process, or otherwise operate on the stored portion of the sound input even if the speech-based service is not fully operational until after that portion of sound input has been received. In some implementations, the stored portion of the sound input is provided to an adaptation module of the electronic device.

In various implementations, steps (516)-(520) are performed at different positions within the method 500. For example, in some implementations, one or more of steps (516)-(520) are performed between steps (502) and (504), between steps (510) and (514), or at any other appropriate position.

FIG. 6 illustrates a method 600 of operating a voice trigger system (e.g., the voice trigger system 400, FIG. 4), according to some implementations. In some implementations, the method 600 is performed at an electronic device including one or more processors and memory storing instructions for execution by the one or more processors (e.g., the electronic device 104). The electronic device determines whether it is in a predetermined orientation (602). In some implementations, the electronic device detects its orientation using light sensors (including cameras), microphones, proximity sensors, magnetic sensors, accelerometers, gyroscopes, tilt sensors, and the like. For example, the electronic device determines whether it is resting face-down or face-up on a surface by comparing the amount or brightness of light incident on a sensor of a front-facing camera and the amount or brightness of light incident on a sensor of a rear-facing camera. If the amount and/or brightness detected by the front-facing camera is sufficiently greater than that detected by the rear-facing camera, the electronic device will determine that it is facing up. On the other hand, if the amount and/or brightness detected by the rear-facing camera is sufficiently greater than that of the front-facing camera, the device will determine that it is facing down.

Upon a determination that the electronic device is in the predetermined orientation, the electronic device activates a predetermined mode of a voice trigger (604). In some implementations, the predetermined orientation corresponds to a display screen of the device being substantially horizontal and facing down, and the predetermined mode is a standby mode (606). For example, in some implementations, if a smartphone or tablet is placed on a table or desk so that the screen is facing down, the voice trigger is placed in a standby mode (e.g., turned off) to prevent inadvertent activation of the voice trigger.

On the other hand, in some implementations, the predetermined orientation corresponds to a display screen of the device being substantially horizontal and facing up, and the predetermined mode is a listening mode (608). Thus, for example, if a smartphone or tablet is placed on a table or desk so that the screen is facing up, the voice trigger is placed in a listening mode so that it can respond to the user when it detects the trigger.

FIG. 7 illustrates a method 700 of operating a voice trigger (e.g., the voice trigger system 400, FIG. 4), according to some implementations. In some implementations, the method 700 is performed at an electronic device including one or more processors and memory storing instructions for execution by the one or more processors (e.g., the electronic device 104). The electronic device operates a voice trigger (e.g., the voice trigger system 400) in a first mode (702). In some implementations, the first mode is a normal listening mode.

The electronic device determines whether it is in a substantially enclosed space by detecting that one or more of a microphone and a camera of the electronic device is occluded (704). In some implementations, a substantially enclosed space includes a pocket, purse, bag, drawer, glovebox, briefcase, or the like.

As described above, in some implementations, a device detects that a microphone is occluded by emitting one or more sounds (e.g., tones, clicks, pings, etc.) from a speaker or transducer, and monitoring one or more microphones or transducers to detect echoes of the omitted sound(s). For example, a relatively large environment (e.g., a room or a vehicle) will reflect the sound differently than a relatively small, substantially enclosed environment (e.g., a purse or pocket). Thus, if the device detects that the microphone (or the speaker that emitted the sounds) is occluded based on the echoes (or lack thereof), the device determines that it is in a substantially enclosed space. In some implementations, the device detects that a microphone is occluded by detecting that the microphone is picking up a sound characteristic of an enclosed space. For example, when a device is in a pocket, the microphone may detect a characteristic rustling noise due to the microphone coming into contact or close proximity with the fabric of the pocket.

In some implementations, a device detects that a camera is occluded based on the level of light received by a sensor, or by determining whether it can achieve a focused image. For example, if a camera sensor detects a low level of light during a time when a high level of light would be expected (e.g., during daylight hours), then the device determines that the camera is occluded, and that the device is in a substantially enclosed space. As another example, the camera may attempt to achieve an in-focus image on its sensor. Usually, this will be difficult if the camera is in an extremely dark place (e.g., a pocket or backpack), or if it is too close to the object on which it is attempting to focus (e.g., the inside of a purse or backpack). Thus, if the camera is unable to achieve an in-focus image, it determines that the device is in a substantially enclosed space.

Upon a determination that the electronic device is in a substantially enclosed space, the electronic device switches the voice trigger to a second mode (706). In some implementations, the second mode is a standby mode (708). In some implementations, when in the standby mode, the voice trigger system 400 will continue to monitor ambient audio, but will not respond to received sounds regardless of whether they would otherwise trigger the voice trigger system 400. In some implementations, in the standby mode, the voice trigger system 400 is deactivated, and does not process audio to detect trigger sounds. In some implementations, the second mode includes operating one or more sound detectors of a voice trigger system 400 according to a different duty cycle than the first mode. In some implementations, the second mode includes operating a different combination of sound detectors than the first mode.

In some implementations, the second mode corresponds to a more sensitive monitoring mode, so that the voice trigger system 400 can detect and respond to a trigger sound even though it is in a substantially enclosed space.

In some implementations, once the voice trigger is switched to the second mode, the device periodically determines whether the electronic device is still in a substantially enclosed space by detecting whether one or more of a microphone and a camera of the electronic device is occluded (e.g., using any of the techniques described above with respect to step (704)). If the device remains in a substantially enclosed space, the voice trigger system 400 will be kept in the second mode. In some implementations, if the device is removed from a substantially enclosed space, the electronic device will return the voice trigger to the first mode.

Figure 8:
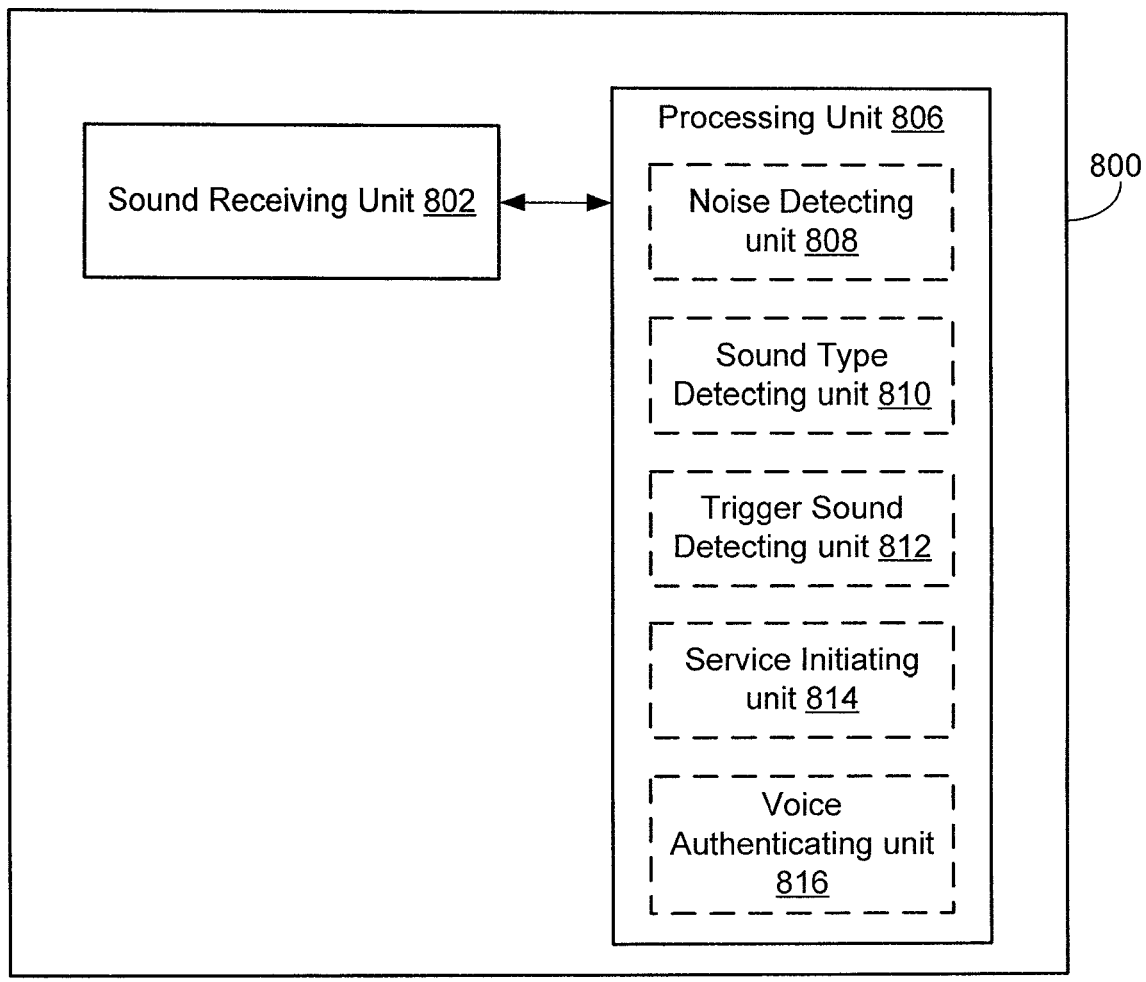
FIGS. 8-9 are functional block diagrams of electronic devices in accordance with some embodiments.

In accordance with some implementations, FIG. 8 shows a functional block diagram of an electronic device 800 configured in accordance with the principles of the invention as described above. The functional blocks of the device may be implemented by hardware, software, or a combination of hardware and software to carry out the principles of the invention. It is understood by persons of skill in the art that the functional blocks described in FIG. 8 may be combined or separated into sub-blocks to implement the principles of the invention as described above. Therefore, the description herein may support any possible combination or separation or further definition of the functional blocks described herein.

As shown in FIG. 8, the electronic device 800 includes a sound receiving unit 802 configured to receive sound input. The electronic device 800 also includes a processing unit 806 coupled to the speech receiving unit 802. In some implementations, the processing unit 806 includes a noise detecting unit 808, a sound type detecting unit 810, a trigger sound detecting unit 812, a service initiating unit 814, and a voice authenticating unit 816. In some implementations, the noise detecting unit 808 corresponds to the noise detector 402, discussed above, and is configured to perform any operations described above with reference to the noise detector 402. In some implementations, the sound type detecting unit 810 corresponds to the sound-type detector 404, discussed above, and is configured to perform any operations described above with reference to the sound-type detector 404. In some implementations, the trigger sound detecting unit 812 corresponds to the trigger sound detector 406, discussed above, and is configured to perform any operations described above with reference to the trigger sound detector 406. In some implementations, the voice authenticating unit 816 corresponds to the voice authentication module 428, discussed above, and is configured to perform any operations described above with reference to the voice authentication module 428.

The processing unit 806 is configured to: determine whether at least a portion of the sound input corresponds to a predetermined type of sound (e.g., with the sound type detecting unit 810); upon a determination that at least a portion of the sound input corresponds to the predetermined type, determine whether the sound input includes predetermined content (e.g., with the trigger sound detecting unit 812); and upon a determination that the sound input includes the predetermined content, initiate a speech-based service (e.g., with the service initiating unit 814).

In some implementations, the processing unit 806 is also configured to, prior to determining whether the sound input corresponds to a predetermined type of sound, determine whether the sound input satisfies a predetermined condition (e.g., with the noise detecting unit 808). In some implementations, the processing unit 806 is also configured to determine whether the sound input corresponds to a voice of a particular user (e.g., with the voice authenticating unit 816).

Figure 9:
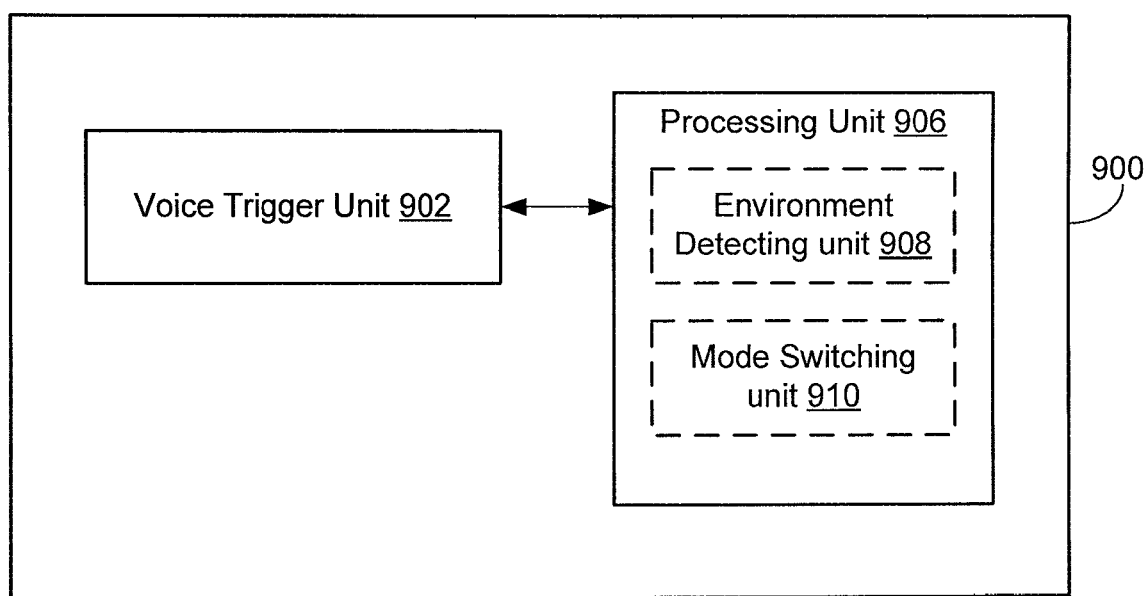

In accordance with some implementations, FIG. 9 shows a functional block diagram of an electronic device 900 configured in accordance with the principles of the invention as described above. The functional blocks of the device may be implemented by hardware, software, or a combination of hardware and software to carry out the principles of the invention. It is understood by persons of skill in the art that the functional blocks described in FIG. 9 may be combined or separated into sub-blocks to implement the principles of the invention as described above. Therefore, the description herein may support any possible combination or separation or further definition of the functional blocks described herein.

As shown in FIG. 9, the electronic device 900 includes a voice trigger unit 902. The voice trigger unit 902 can be operated in various different modes. In a first mode, the voice trigger unit receives sound inputs and determines if they satisfy certain criteria (e.g., a listening mode). In a second mode, the voice trigger unit 902 does not receive and/or does not process sound inputs (e.g., a standby mode). The electronic device 900 also includes a processing unit 906 coupled to the voice trigger unit 902. In some implementations, the processing unit 906 includes an environment detecting unit 908, which may include and/or interface with one or more sensors (e.g., including a microphone, a camera, an accelerometer, a gyroscope, etc.) and a mode switching unit 910.

In some implementations, the processing unit 906 is configured to: determine whether the electronic device is in a substantially enclosed space by detecting that one or more of a microphone and a camera of the electronic device is occluded (e.g., with the environment detecting unit 908); and upon a determination that the electronic device is in a substantially enclosed space, switching the voice trigger to a second mode (e.g., with the mode switching unit 910).

In some implementations, the processing unit is configured to: determine whether the electronic device is in a predetermined orientation (e.g., with the environment detecting unit 908); and upon a determination that the electronic device is in the predetermined orientation, activate a predetermined mode of a voice trigger (e.g., with the mode switching unit 910).

The foregoing description, for purpose of explanation, has been described with reference to specific implementations. However, the illustrative discussions above are not intended to be exhaustive or to limit the disclosed implementations to the precise forms disclosed. Many modifications and variations are possible in view of the above teachings. The implementations were chosen and described in order to best explain the principles and practical applications of the disclosed ideas, to thereby enable others skilled in the art to best utilize them with various modifications as are suited to the particular use contemplated.

It will be understood that, although the terms "first," "second," etc. may be used herein to describe various elements, these elements should not be limited by these terms. These terms are only used to distinguish one element from another. For example, a first sound detector could be termed a second sound detector, and, similarly, a second sound detector could be termed a first sound detector, without changing the meaning of the description, so long as all occurrences of the "first sound detector" are renamed consistently and all occurrences of the "second sound detector" are renamed consistently. The first sound detector and the second sound detector are both sound detectors, but they are not the same sound detector.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A non-transitory computer-readable storage medium, storing one or more programs for execution by one or more processors of an electronic device, the one or more programs including instructions for:
   receiving a sound input;
   determining whether the sound input corresponds to predetermined content based on comparing an input representation of the sound input to one or more reference representations of one or more trigger words for a voice trigger;
   in accordance with determining that the sound input does not correspond to the predetermined content, forgoing initiating a speech based service;
   after determining that the sound input does not correspond to the predetermined content, detecting, within a predetermined duration of receiving the sound input, user input to initiate the speech based service, wherein the user input to initiate the speech based service corresponds to a user selection of a button of the electronic device or a user selection of an affordance displayed by the electronic device; and
   in accordance with detecting the user input to initiate the speech based service within the predetermined duration, adjusting, based on a determination that the user input to initiate the speech based service is detected within the predetermined duration, the one or more reference representations using the sound input to increase a confidence level of a match between the one or more reference representations and the input representation of the sound input.

2. The non-transitory computer-readable storage medium of claim 1, wherein adjusting the one or more reference representations includes updating a moving average of the one or more reference representations using the sound input.

3. The non-transitory computer-readable storage medium of claim 1, wherein the one or more programs further include instructions for:
   prior to receiving the sound input, receiving a plurality of additional sound inputs, wherein each sound input of the plurality of additional sound inputs includes the one or more trigger words; and
   generating the one or more reference representations using the plurality of additional sound inputs.

4. The non-transitory computer-readable storage medium of claim 1, wherein the one or more programs further include instructions for:
   in accordance with determining that the sound input corresponds to the predetermined content, initiating the speech based service.

5. The non-transitory computer-readable storage medium of claim 4, wherein comparing the input representation of the sound input to the one or more reference representations includes determining whether the input representation of the sound input matches the one or more reference representations with a predetermined confidence level, and wherein the one or more programs further include instructions for:
   in accordance with initiating the speech based service:
      in accordance with a determination that the input representation matches the one or more reference representations with the predetermined confidence level:
         adjusting the one or more reference representations using the sound input; and in accordance with a determination that the input representation of the sound input does not match the one or more reference representations with the predetermined confidence level:
forgoing adjusting the one or more reference representations using the sound input.

6. The non-transitory computer-readable storage medium of claim 1, wherein the one or more programs further include instructions for:
after determining that the sound input does not correspond to the predetermined content, receiving one or more sound inputs consecutive to the sound input, wherein each sound input of the one or more sound inputs includes the one or more trigger words; and
adjusting the one or more reference representations using the one or more sound inputs.

7. The non-transitory computer-readable storage medium of claim 6, wherein adjusting the one or more reference representations using the one or more sound inputs is performed in accordance with a determination that the one or more sound inputs include at least two successive sound inputs.

8. The non-transitory computer-readable storage medium of claim 6, wherein the one or more sound inputs include at least two sound inputs, and wherein adjusting the one or more reference representations using the one or more sound inputs is performed in accordance with a determination that the at least two sound inputs are received within a predetermined time period.

9. The non-transitory computer-readable storage medium of claim 1, wherein comparing the input representation of the sound input to the one or more reference representations includes comparing the input representation to the one or more reference representations using an algorithm, and wherein the one or more programs further include instructions for:
in accordance with detecting the user input to initiate the speech based service, adjusting the algorithm.

10. The non-transitory computer-readable storage medium of claim 1, wherein:
determining whether the sound input corresponds to predetermined content is performed using a first processor; and
adjusting the one or more reference representations using the sound input is performed using a second processor.

11. The non-transitory computer-readable storage medium of claim 10, wherein the second processor is in a standby mode when determining whether the sound input corresponds to predetermined content.

12. The non-transitory computer-readable storage medium of claim 10, wherein the one or more processors further include instructions for:
storing the sound input in a memory of the electronic device;
in accordance with detecting the user input to initiate the speech based service, activating the second processor, wherein adjusting the one or more reference representations using the sound input includes accessing, by the activated second processor, the sound input.

13. The non-transitory computer-readable storage medium of claim 1, wherein the one or more processors further include instructions for:
prior to determining whether the sound input corresponds to predetermined content, determining whether the sound input corresponds to a predetermined type of sound.

14. The non-transitory computer-readable storage medium of claim 13, wherein determining whether the sound input corresponds to predetermined content is performed in accordance with determining that the sound input corresponds to the predetermined type of sound.

15. The non-transitory computer-readable storage medium of claim 1, wherein the speech based service includes a digital assistant.

16. An electronic device, comprising:
one or more processors;
memory; and
one or more programs, wherein the one or more programs are stored in the memory and configured to be executed by the one or more processors, the one or more programs including instructions for:
receiving a sound input;
determining whether the sound input corresponds to predetermined content based on comparing an input representation of the sound input to one or more reference representations of one or more trigger words for a voice trigger;
in accordance with determining that the sound input does not correspond to the predetermined content, forgoing initiating a speech based service;
after determining that the sound input does not correspond to the predetermined content, detecting, within a predetermined duration of receiving the sound input, user input to initiate the speech based service, wherein the user input to initiate the speech based service corresponds to a user selection of a button of the electronic device or a user selection of an affordance displayed by the electronic device; and
in accordance with detecting the user input to initiate the speech based service within the predetermined duration, adjusting, based on a determination that the user input to initiate the speech based service is detected within the predetermined duration, the one or more reference representations using the sound input to increase a confidence level of a match between the one or more reference representations and the input representation of the sound input.

17. A method for operating a voice trigger, performed at an electronic device including one or more processors and memory storing instructions for execution by the one or more processors, the method comprising:
receiving a sound input;
determining whether the sound input corresponds to predetermined content based on comparing an input representation of the sound input to one or more reference representations of one or more trigger words for the voice trigger;
in accordance with determining that the sound input does not correspond to the predetermined content, forgoing initiating a speech based service;
after determining that the sound input does not correspond to the predetermined content, detecting, within a predetermined duration of receiving the sound input, user input to initiate the speech based service, wherein the user input to initiate the speech based service corresponds to a user selection of a button of the electronic device or a user selection of an affordance displayed by the electronic device; and
in accordance with detecting the user input to initiate the speech based service within the predetermined duration, adjusting, based on a determination that the user input to initiate the speech based service is detected within the predetermined duration, the one or more reference representations using the sound input to increase a confidence level of a match between the one or more reference representations and the input representation of the sound input.

18. The electronic device of claim 16, wherein adjusting the one or more reference representations includes updating a moving average of the one or more reference representations using the sound input.

19. The electronic device of claim 16, wherein the one or more programs further include instructions for:
prior to receiving the sound input, receiving a plurality of additional sound inputs, wherein each sound input of the plurality of additional sound inputs includes the one or more trigger words; and
generating the one or more reference representations using the plurality of additional sound inputs.

20. The electronic device of claim 16, wherein the one or more programs further include instructions for:
in accordance with determining that the sound input corresponds to the predetermined content, initiating the speech based service.

21. The electronic device of claim 20, wherein comparing the input representation of the sound input to the one or more reference representations includes determining whether the input representation of the sound input matches the one or more reference representations with a predetermined confidence level, and wherein the one or more programs further include instructions for:
in accordance with initiating the speech based service:
in accordance with a determination that the input representation matches the one or more reference representations with the predetermined confidence level:
adjusting the one or more reference representations using the sound input; and
in accordance with a determination that the input representation of the sound input does not match the one or more reference representations with the predetermined confidence level:
forgoing adjusting the one or more reference representations using the sound input.

22. The electronic device of claim 16, wherein the one or more programs further include instructions for:
after determining that the sound input does not correspond to the predetermined content, receiving one or more sound inputs consecutive to the sound input, wherein each sound input of the one or more sound inputs includes the one or more trigger words; and
adjusting the one or more reference representations using the one or more sound inputs.

23. The electronic device of claim 22, wherein adjusting the one or more reference representations using the one or more sound inputs is performed in accordance with a determination that the one or more sound inputs include at least two successive sound inputs.

24. The electronic device of claim 22, wherein the one or more sound inputs include at least two sound inputs, and wherein adjusting the one or more reference representations using the one or more sound inputs is performed in accordance with a determination that the at least two sound inputs are received within a predetermined time period.

25. The electronic device of claim 16, wherein comparing the input representation of the sound input to the one or more reference representations includes comparing the input representation to the one or more reference representations using an algorithm, and wherein the one or more programs further include instructions for:
in accordance with detecting the user input to initiate the speech based service, adjusting the algorithm.

26. The electronic device of claim 16, wherein:
determining whether the sound input corresponds to predetermined content is performed using a first processor; and
adjusting the one or more reference representations using the sound input is performed using a second processor.

27. The electronic device of claim 26, wherein the second processor is in a standby mode when determining whether the sound input corresponds to predetermined content.

28. The electronic device of claim 26, wherein the one or more processors further include instructions for:
storing the sound input in a memory of the electronic device;
in accordance with detecting the user input to initiate the speech based service, activating the second processor, wherein adjusting the one or more reference representations using the sound input includes accessing, by the activated second processor, the sound input.

29. The electronic device of claim 16, wherein the one or more processors further include instructions for:
prior to determining whether the sound input corresponds to predetermined content, determining whether the sound input corresponds to a predetermined type of sound.

30. The electronic device of claim 29, wherein determining whether the sound input corresponds to predetermined content is performed in accordance with determining that the sound input corresponds to the predetermined type of sound.

31. The electronic device of claim 16, wherein the speech based service includes a digital assistant.

32. The method of claim 17, wherein adjusting the one or more reference representations includes updating a moving average of the one or more reference representations using the sound input.

33. The method of claim 17, further comprising:
prior to receiving the sound input, receiving a plurality of additional sound inputs, wherein each sound input of the plurality of additional sound inputs includes the one or more trigger words; and
generating the one or more reference representations using the plurality of additional sound inputs.

34. The method of claim 17, further comprising:
in accordance with determining that the sound input corresponds to the predetermined content, initiating the speech based service.

35. The method of claim 34, wherein comparing the input representation of the sound input to the one or more reference representations includes determining whether the input representation of the sound input matches the one or more reference representations with a predetermined confidence level, the method further comprising:
in accordance with initiating the speech based service:
in accordance with a determination that the input representation matches the one or more reference representations with the predetermined confidence level:
adjusting the one or more reference representations using the sound input; and
in accordance with a determination that the input representation of the sound input does not match the one or more reference representations with the predetermined confidence level:
forgoing adjusting the one or more reference representations using the sound input.

36. The method of claim 17, further comprising:

after determining that the sound input does not correspond to the predetermined content, receiving one or more sound inputs consecutive to the sound input, wherein each sound input of the one or more sound inputs includes the one or more trigger words; and adjusting the one or more reference representations using the one or more sound inputs.

37. The method of claim 36, wherein adjusting the one or more reference representations using the one or more sound inputs is performed in accordance with a determination that the one or more sound inputs include at least two successive sound inputs.

38. The method of claim 36, wherein the one or more sound inputs include at least two sound inputs, and wherein adjusting the one or more reference representations using the one or more sound inputs is performed in accordance with a determination that the at least two sound inputs are received within a predetermined time period.

39. The method of claim 17, wherein comparing the input representation of the sound input to the one or more reference representations includes comparing the input representation to the one or more reference representations using an algorithm, the method further comprising:

in accordance with detecting the user input to initiate the speech based service, adjusting the algorithm.

40. The method of claim 17, wherein:

determining whether the sound input corresponds to predetermined content is performed using a first processor; and adjusting the one or more reference representations using the sound input is performed using a second processor.

41. The method of claim 40, wherein the second processor is in a standby mode when determining whether the sound input corresponds to predetermined content.

42. The method of claim 40, further comprising:

storing the sound input in a memory of the electronic device;

in accordance with detecting the user input to initiate the speech based service, activating the second processor, wherein adjusting the one or more reference representations using the sound input includes accessing, by the activated second processor, the sound input.

43. The method of claim 17, further comprising:

prior to determining whether the sound input corresponds to predetermined content, determining whether the sound input corresponds to a predetermined type of sound.

44. The method of claim 43, wherein determining whether the sound input corresponds to predetermined content is performed in accordance with determining that the sound input corresponds to the predetermined type of sound.

45. The method of claim 17, wherein the speech based service includes a digital assistant.

* * * * *